US012522646B2

(12) United States Patent
Seehra et al.

(10) Patent No.: US 12,522,646 B2
(45) Date of Patent: Jan. 13, 2026

(54) ACTIVIN RECEPTOR TYPE II CHIMERAS AND METHODS OF USE THEREOF

(71) Applicant: Keros Therapeutics, Inc., Lexington, MA (US)

(72) Inventors: Jasbir S. Seehra, Lexington, MA (US); Jennifer Lachey, Lincoln, MA (US); Claire Tseng, Newton, MA (US); Jason O'Neill, Lake Forest Park, WA (US); Henning Thøgersen, Farum (DK)

(73) Assignee: Keros Therapeutics, Inc., Lexington, MA (US)

( * ) Notice: Subject to any disclaimer, the term of this patent is extended or adjusted under 35 U.S.C. 154(b) by 636 days.

(21) Appl. No.: 17/945,299

(22) Filed: Sep. 15, 2022

(65) Prior Publication Data

US 2023/0079602 A1 Mar. 16, 2023

Related U.S. Application Data

(63) Continuation of application No. PCT/US2021/023353, filed on Mar. 19, 2021.

(60) Provisional application No. 63/109,821, filed on Nov. 4, 2020, provisional application No. 63/029,443, filed on May 23, 2020, provisional application No. 62/992,839, filed on Mar. 20, 2020.

(51) Int. Cl.

| | |
|---|---|
| ***C07K 14/71*** | (2006.01) |
| ***A61P 3/04*** | (2006.01) |
| ***A61P 7/00*** | (2006.01) |
| ***A61P 7/04*** | (2006.01) |
| ***A61P 7/06*** | (2006.01) |
| ***A61P 11/00*** | (2006.01) |
| ***A61P 19/08*** | (2006.01) |
| ***A61P 21/00*** | (2006.01) |
| *A61K 38/00* | (2006.01) |

(52) U.S. Cl.

CPC ................ *C07K 14/71* (2013.01); *A61P 3/04* (2018.01); *A61P 7/00* (2018.01); *A61P 7/04* (2018.01); *A61P 7/06* (2018.01); *A61P 11/00* (2018.01); *A61P 19/08* (2018.01); *A61P 21/00* (2018.01); *A61K 38/00* (2013.01); *C07K 2319/30* (2013.01); *C07K 2319/31* (2013.01)

(58) Field of Classification Search

None

See application file for complete search history.

(56) References Cited

U.S. PATENT DOCUMENTS

| | | | |
|---|---|---|---|
| 7,612,041 | B2 | 11/2009 | Knopf et al. |
| 7,709,605 | B2 | 5/2010 | Knopf et al. |
| 7,842,663 | B2 | 11/2010 | Knopf et al. |
| 7,947,646 | B2 | 5/2011 | Sun et al. |
| 7,951,771 | B2 | 5/2011 | Knopf et al. |
| 7,960,343 | B2 | 6/2011 | Knopf et al. |
| 7,988,973 | B2 | 8/2011 | Sherman |
| 8,007,809 | B2 | 8/2011 | Sherman |
| 8,058,229 | B2 | 11/2011 | Seehra et al. |
| 8,067,360 | B2 | 11/2011 | Knopf et al. |
| 8,067,562 | B2 | 11/2011 | Han et al. |
| 8,101,564 | B2 | 1/2012 | Choi et al. |
| 8,138,142 | B2 | 3/2012 | Seehra et al. |
| 8,173,601 | B2 | 5/2012 | Knopf et al. |
| 8,178,488 | B2 | 5/2012 | Knopf et al. |
| 8,216,997 | B2 | 7/2012 | Seehra et al. |
| 8,252,900 | B2 | 8/2012 | Knopf et al. |
| 8,293,881 | B2 | 10/2012 | Seehra et al. |
| 8,343,933 | B2 | 1/2013 | Knopf et al. |
| 8,361,957 | B2 | 1/2013 | Seehra et al. |
| 8,367,611 | B2 | 2/2013 | Knopf et al. |
| 8,501,768 | B2 | 8/2013 | Conte et al. |
| 8,614,292 | B2 | 12/2013 | Han et al. |
| 8,629,109 | B2 | 1/2014 | Knopf et al. |
| 8,703,927 | B2 | 4/2014 | Seehra et al. |
| 8,710,016 | B2 | 4/2014 | Seehra et al. |
| 8,716,459 | B2 | 5/2014 | Sun et al. |
| 8,871,209 | B2 | 10/2014 | Stitt et al. |
| 8,895,016 | B2 | 11/2014 | Sherman et al. |
| 8,999,917 | B2 | 4/2015 | Sun et al. |
| 9,138,459 | B2 | 9/2015 | Knopf et al. |
| 9,163,075 | B2 | 10/2015 | Knopf et al. |
| 9,181,533 | B2 | 11/2015 | Seehra et al. |
| 9,273,114 | B2 | 3/2016 | Sun et al. |

(Continued)

FOREIGN PATENT DOCUMENTS

| | | | |
|---|---|---|---|
| AU | 2013204964 | A1 | 5/2013 |
| AU | 2016250354 | A1 | 11/2016 |

(Continued)

OTHER PUBLICATIONS

U.S. Appl. No. 19/067,565, filed Feb. 8, 2025, Seehra et al.

(Continued)

*Primary Examiner* — Craig D Ricci

(74) *Attorney, Agent, or Firm* — Clark & Elbing LLP

(57) ABSTRACT

The invention features polypeptides that include an extracellular ActRII chimera. In some embodiments, a polypeptide of the invention includes an extracellular ActRII chimera fused to an Fc domain monomer or moiety. The invention also features pharmaceutical compositions and methods of using the polypeptides to treat diseases and conditions involving weakness and atrophy of muscles, bone damage, low red blood cell levels (e.g., anemia or blood loss), low platelet levels (e.g., thrombocytopenia), low neutrophil levels (e.g., neutropenia), fibrosis, metabolic disorders, and/or pulmonary hypertension.

7 Claims, 14 Drawing Sheets

Specification includes a Sequence Listing.

(56) References Cited

U.S. PATENT DOCUMENTS

| | | | |
|---|---|---|---|
| 9,284,364 | B2 | 3/2016 | Han et al. |
| 9,353,356 | B2 | 5/2016 | Knopf et al. |
| 9,399,669 | B2 | 7/2016 | Knopf et al. |
| 9,439,945 | B2 | 9/2016 | Seehra et al. |
| 9,447,165 | B2 | 9/2016 | Sun et al. |
| 9,493,556 | B2 | 11/2016 | Seehra et al. |
| 9,505,813 | B2 | 11/2016 | Seehra et al. |
| 9,526,759 | B2 | 12/2016 | Knopf et al. |
| 9,572,865 | B2 | 2/2017 | Knopf et al. |
| 9,610,327 | B2 | 4/2017 | Sun et al. |
| 9,617,319 | B2 | 4/2017 | Seehra et al. |
| 9,745,559 | B2 | 8/2017 | Seehra et al. |
| 9,809,638 | B2 | 11/2017 | Sun et al. |
| 9,850,298 | B2 | 12/2017 | Attie |
| 9,932,379 | B2 | 4/2018 | Seehra et al. |
| 10,093,707 | B2 | 10/2018 | Sherman et al. |
| 10,131,700 | B2 | 11/2018 | Seehra et al. |
| 10,189,882 | B2 | 1/2019 | Attie et al. |
| 10,227,393 | B2 | 3/2019 | Kumar et al. |
| 10,259,861 | B2 | 4/2019 | Knopf et al. |
| 10,308,704 | B2 | 6/2019 | Sun et al. |
| 10,358,476 | B2 | 7/2019 | Kumar et al. |
| 10,358,633 | B2 | 7/2019 | Seehra et al. |
| 10,377,996 | B2 | 8/2019 | Seehra et al. |
| 10,407,487 | B2 | 9/2019 | Sun et al. |
| 10,487,144 | B2 | 11/2019 | Attie |
| 10,550,170 | B2 | 2/2020 | Sherman et al. |
| 11,013,785 | B2 | 5/2021 | Seehra et al. |
| 11,090,361 | B2 | 8/2021 | Seehra et al. |
| 11,484,573 | B2 | 11/2022 | Lachey et al. |
| 11,717,558 | B2 | 8/2023 | Seehra et al. |
| 11,884,715 | B2 | 1/2024 | Seehra et al. |
| 12,269,858 | B2 | 4/2025 | Seehra et al. |
| 12,350,313 | B2 | 7/2025 | Seehra et al. |
| 12,364,737 | B2 | 7/2025 | Seehra et al. |
| 2006/0068468 | A1 | 3/2006 | Knopf et al. |
| 2009/0005308 | A1 | 1/2009 | Knopf et al. |
| 2009/0163417 | A1 | 6/2009 | Sherman |
| 2010/0028331 | A1 | 2/2010 | Sherman et al. |
| 2010/0028332 | A1 | 2/2010 | Sherman et al. |
| 2010/0068215 | A1 | 3/2010 | Seehra et al. |
| 2010/0266591 | A1 | 10/2010 | Bugelski et al. |
| 2010/0267133 | A1 | 10/2010 | Knopf et al. |
| 2010/0316644 | A1 | 12/2010 | Seehra et al. |
| 2011/0038831 | A1 | 2/2011 | Seehra et al. |
| 2011/0092670 | A1 | 4/2011 | Knopf et al. |
| 2011/0135638 | A1 | 6/2011 | Seehra et al. |
| 2011/0250198 | A1 | 10/2011 | Wolfman et al. |
| 2012/0015877 | A1 | 1/2012 | Seehra et al. |
| 2012/0121576 | A1 | 5/2012 | Seehra et al. |
| 2012/0148588 | A1 | 6/2012 | Knopf et al. |
| 2013/0065299 | A1 | 3/2013 | Knopf et al. |
| 2013/0071393 | A1 | 3/2013 | Seehra et al. |
| 2013/0177559 | A1 | 7/2013 | Seehra et al. |
| 2013/0288983 | A1 | 10/2013 | Sun et al. |
| 2013/0315924 | A1 | 11/2013 | Hsu et al. |
| 2014/0079700 | A1 | 3/2014 | Knopf et al. |
| 2014/0314759 | A1 | 10/2014 | Seehra et al. |
| 2015/0023970 | A1 | 1/2015 | Seehra et al. |
| 2015/0023981 | A1 | 1/2015 | De Kretser et al. |
| 2015/0030595 | A1 | 1/2015 | Lee et al. |
| 2015/0183845 | A1 | 7/2015 | Sherman et al. |
| 2016/0039922 | A1 | 2/2016 | Attie |
| 2016/0108379 | A1 | 4/2016 | Knopf et al. |
| 2016/0298093 | A1 | 10/2016 | Kumar et al. |
| 2016/0333418 | A1 | 11/2016 | Haqq |
| 2017/0058016 | A1 | 3/2017 | Knopf et al. |
| 2017/0304397 | A1 | 10/2017 | Hruska et al. |
| 2017/0327800 | A1 | 11/2017 | Seehra et al. |
| 2017/0360887 | A1 | 12/2017 | Attie et al. |
| 2017/0369879 | A1 | 12/2017 | Duffield et al. |
| 2018/0050089 | A1 | 2/2018 | Kumar et al. |
| 2018/0125928 | A1 | 5/2018 | Attie et al. |
| 2018/0148491 | A1 | 5/2018 | Han et al. |
| 2018/0161426 | A1 | 6/2018 | Cappellini et al. |
| 2018/0334673 | A1 | 11/2018 | Wood et al. |
| 2019/0085067 | A1 | 3/2019 | Schurpf et al. |
| 2019/0151463 | A1 | 5/2019 | Gegg et al. |
| 2019/0225664 | A1 | 7/2019 | Sherman et al. |
| 2019/0233486 | A1 | 8/2019 | Attie et al. |
| 2019/0256605 | A1 | 8/2019 | Han et al. |
| 2019/0282663 | A1 | 9/2019 | Seehra et al. |
| 2019/0284251 | A1 | 9/2019 | Seehra et al. |
| 2019/0330307 | A1 | 10/2019 | Han et al. |
| 2019/0345225 | A1 | 11/2019 | Seehra et al. |
| 2019/0352619 | A1 | 11/2019 | Knopf et al. |
| 2020/0055919 | A1 | 2/2020 | Kumar et al. |
| 2020/0071381 | A1 | 3/2020 | Knopf et al. |
| 2020/0101134 | A1 | 4/2020 | Laadem et al. |
| 2020/0407415 | A1 | 12/2020 | Seehra et al. |
| 2021/0015807 | A1 | 1/2021 | Poydenot et al. |
| 2021/0030841 | A1 | 2/2021 | Lachey et al. |
| 2021/0052698 | A1 | 2/2021 | Seehra et al. |
| 2021/0275637 | A1 | 9/2021 | Seehra et al. |
| 2021/0322514 | A1 | 10/2021 | Kumar et al. |
| 2022/0049257 | A1 | 2/2022 | Watanabe et al. |
| 2023/0087128 | A1 | 3/2023 | Seehra et al. |
| 2023/0134083 | A1 | 5/2023 | Li et al. |
| 2023/0142386 | A1 | 5/2023 | Attie et al. |
| 2023/0265162 | A1 | 8/2023 | Seehra et al. |
| 2023/0348565 | A1 | 11/2023 | Seehra et al. |
| 2024/0050528 | A1 | 2/2024 | Seehra et al. |
| 2024/0141012 | A1 | 5/2024 | Seehra et al. |
| 2024/0218061 | A1 | 7/2024 | Seehra et al. |
| 2024/0228583 | A1 | 7/2024 | Seehra et al. |
| 2024/0252631 | A1 | 8/2024 | Seehra et al. |
| 2025/0188148 | A1 | 6/2025 | Seehra et al. |
| 2025/0206799 | A1 | 6/2025 | Seehra et al. |

FOREIGN PATENT DOCUMENTS

| | | | | |
|---|---|---|---|---|
| EP | 2314617 | A2 | 4/2011 | |
| EP | 2303918 | | 8/2012 | |
| EP | 2318028 | | 8/2012 | |
| EP | 2594280 | A1 | 5/2013 | |
| WO | WO-2004/039948 | A2 | 5/2004 | |
| WO | WO-2006/012627 | A2 | 2/2006 | |
| WO | WO-2006/012627 | A3 | 2/2006 | |
| WO | WO-2008/076437 | A2 | 6/2008 | |
| WO | WO-2008/094708 | A2 | 8/2008 | |
| WO | WO-2008/097541 | A2 | 8/2008 | |
| WO | WO-2008/100384 | A2 | 8/2008 | |
| WO | WO-2009/015345 | A1 | 1/2009 | |
| WO | WO-2009/158015 | A2 | 12/2009 | |
| WO | WO-2009/158015 | A3 | 12/2009 | |
| WO | WO-2009/158025 | A2 | 12/2009 | |
| WO | WO-2009/158033 | A2 | 12/2009 | |
| WO | WO-2009/158035 | A2 | 12/2009 | |
| WO | WO-2010/062383 | A2 | 6/2010 | |
| WO | WO-2010/083034 | A1 | 7/2010 | |
| WO | WO-2010/151426 | A1 | 12/2010 | |
| WO | WO-2011/020045 | A1 | 2/2011 | |
| WO | WO-2011/031901 | A1 | 3/2011 | |
| WO | WO-2011/056896 | A1 | 5/2011 | |
| WO | WO-2011/063018 | A1 | 5/2011 | |
| WO | WO-2012/027065 | A2 | 3/2012 | |
| WO | WO-2012/064771 | A1 | 5/2012 | |
| WO | WO-2013/059347 | A1 | 4/2013 | |
| WO | WO-2013/188448 | A3 | 12/2013 | |
| WO | WO-2014/058881 | A1 | 4/2014 | |
| WO | WO-2014/066487 | A2 | 5/2014 | |
| WO | WO-2014/138485 | A1 | 9/2014 | |
| WO | WO-2014/144903 | A1 | 9/2014 | |
| WO | WO-2015/143403 | A1 | 9/2015 | |
| WO | WO-2015/161220 | A1 | 10/2015 | |
| WO | WO-2015/192111 | A1 | 12/2015 | |
| WO | WO-2015/192127 | A2 | 12/2015 | |
| WO | WO-2016/029027 | A2 | 2/2016 | |
| WO | WO-2016/069234 | A1 | 5/2016 | |
| WO | WO-2016/090077 | A1 | 6/2016 | |
| WO | WO-2016/090188 | A1 | 6/2016 | |
| WO | WO-2016/164501 | A1 | 10/2016 | |
| WO | WO 2016/171948 | * | 10/2016 | ............ C07K 14/00 |
| WO | WO-2016/171948 | A1 | 10/2016 | |

(56) References Cited

FOREIGN PATENT DOCUMENTS

| | | | |
|---|---|---|---|
| WO | WO-2016/183280 | A1 | 11/2016 |
| WO | WO-2016/187378 | A1 | 11/2016 |
| WO | WO-2017/079591 | A2 | 5/2017 |
| WO | WO-2017/091706 | A1 | 6/2017 |
| WO | WO-2017/147182 | A1 | 8/2017 |
| WO | WO-2018/013936 | A1 | 1/2018 |
| WO | WO-2018/022762 | A1 | 2/2018 |
| WO | WO-2018/067740 | A1 | 4/2018 |
| WO | WO-2018/067874 | A1 | 4/2018 |
| WO | WO-2018/067879 | A1 | 4/2018 |
| WO | WO-2018/075747 | A1 | 4/2018 |
| WO | WO-2018/089706 | A2 | 5/2018 |
| WO | WO-2018/089715 | A1 | 5/2018 |
| WO | WO-2018/100483 | A1 | 6/2018 |
| WO | WO-2018/144542 | A1 | 8/2018 |
| WO | WO-2018/144968 | A1 | 8/2018 |
| WO | WO-2018/231905 | A1 | 12/2018 |
| WO | WO-2019/094751 | A1 | 5/2019 |
| WO | WO-2019/140283 | A1 | 7/2019 |
| WO | WO-2019/217715 | A1 | 11/2019 |
| WO | WO-2020/020896 | A1 | 1/2020 |
| WO | WO-2021/062163 | A1 | 4/2021 |
| WO | WO-2021/189006 | A1 | 9/2021 |
| WO | WO-2021/189010 | A1 | 9/2021 |
| WO | WO-2021/222322 | A1 | 11/2021 |
| WO | WO-2021/262718 | A1 | 12/2021 |
| WO | WO-2022/072882 | A1 | 4/2022 |
| WO | WO-2022/099166 | A1 | 5/2022 |
| WO | WO-2022/235620 | A1 | 11/2022 |
| WO | WO-2022/271716 | A2 | 12/2022 |
| WO | WO-2023/003815 | A1 | 1/2023 |
| WO | WO-2023/023345 | A2 | 2/2023 |
| WO | WO-2023/028606 | A1 | 3/2023 |
| WO | WO-2023/141724 | A1 | 8/2023 |
| WO | WO-2024/054985 | A2 | 3/2024 |
| WO | WO-2024/102906 | A2 | 5/2024 |
| WO | WO-2024/130435 | A1 | 6/2024 |
| WO | WO-2024/238920 | A1 | 11/2024 |
| WO | WO-2024/238950 | A1 | 11/2024 |
| WO | WO-2025/019954 | A1 | 1/2025 |
| WO | WO-2025/122830 | A1 | 6/2025 |
| WO | WO-2025/147483 | A1 | 7/2025 |

OTHER PUBLICATIONS

U.S. Appl. No. 19/077,471, filed Mar. 12, 2025, Seehra et al.

Agapova et al. "Ligand trap for the activin type IIA receptor protects against vascular disease and renal fibrosis in mice with chronic kidney disease," Kidney International. 89(1): 1231-1243 (Published online Mar. 11, 2016).

Bose et al., "Sotatercept (ACE-011) Alone and in Combination with Ruxolitinib in Patients (pts) with Myeloproliferative Neoplasm (MPN)-Associated Myelofibrosis (MF) and Anemia," Blood. 130(Suppl_1):255 (Dec. 2017) (3 pages).

Fabre et al., "Anti-Sclerostin Antibodies in Osteoporosis and Other Bone Diseases," J. Clin. Med. 9, 3439 (Oct. 2020) (16 pages).

Farrell et al., "Bisphosphonate conjugation for bone specific drug targeting," Bone Reports 9:47-60 (Jul. 2018) (14 pages).

Gilson et al., "Follistatin induces muscle hypertrophy through satellite cell proliferation and inhibition of both myostatin and activin," Am J Physiol Endocrinol Metab. 297(1):E157-E164 (May 2009) (8 pages).

Gudelsky et al., "RKER-012, a Novel Activin Receptor Type IIB (ActRIIB) Ligand Trap, Inhibited Mediators of Dysregulated Vascular Remodeling in Pulmonary Endothelial and Smooth Muscle Cells," 2023 ATS International Conference, presented May 22, 2023, retrieved from: <https://kerostx.com/wp-content/uploads/RKER-012-a-Novel-Activin-Receptor-Type-IIB-ActRIIB-Ligand-Trap-Inhibited-Mediators-of-Dysregulated-Vascular-Re.pdf>.

Hardy et al., "The activin A antagonist follistatin inhibits cystic fibrosis-like lung inflammation and pathology," Immunology and Cell Biology 93:567-574 (Mar. 2015) (8 pages).

Humbert et al., "Development of KER-012, a Novel Investigational Activin Receptor Type IIB Ligand Trap with High Activin/GDF Specificity and Target Engagement for the Treatment of Pulmonary Arterial Hypertension: Rationale and Design of the TROPOS Phase 2 Study," PVRI 2024 Annual Congress, presented Feb. 2, 2024, retrieved from: <https://kerostx.com/wp-content/uploads/Development-of-KER-012-a-Novel-Investigational-Activin-Receptor-Type-IIB.pdf>.

Jiang et al. "Activin A as a Novel Chemokine Induces Migration of L929 Fibroblasts by ERK Signaling in Microfluidic Devices," Frontiers in Cell and Developmental Biology 9, 660316 (May 2021) (11 pages).

Lach-Trifilieff et al., "An Antibody Blocking Activin Type II Receptors Induces Strong Skeletal Muscle Hypertrophy and Protects from Atrophy," Mol Cell Biol. 34(4):606-618 (Feb. 2014) (13 pages).

Langdon et al., "RAP-011, an activin receptor ligand trap, increases hemoglobin concentration in Hepcidin transgenic mice," Am J. Hematol. 90(1): 8-14 (Jan. 2015) (18 pages).

Lema et al., "KER-050, a novel muscle anabolic, functions as a ligand trap that binds myo-catabolic TGFβ ligands and has reduced binding affinity for BMP9, a critical vascular remodeling ligand," Neuromuscular Disorders. 29:Abstract p. 127 (Oct. 2019) (1 page).

Morrell et al., "Targeting BMP signalling in cardiovascular disease and anaemia," Nat Rev Cardiol. 13(2):106-20 (with supplemental material) (Aug. 2016) (32 pages).

Mulivor et al., "RAP-011, a Soluble Activin Receptor Type IIa Murine IgG-Fc Fusion Protein, Prevents Chemotherapy Induced Anemia," Blood. 114(22):161 (Nov. 2009) (2 pages).

Paddock and O'Meara, "Steps toward therapeutically targeting the activin type II receptor for treating heart failure," Am J Physiol Heart Circ Physiol. 318:H326-H328 (Jan. 2020) (3 pages).

Ralston and Gaston, "Management of Osteogenesis Imperfecta," Frontiers in Endocrinology 10, 924 (Feb. 2020) (10 pages).

Roh et al., "Activin type II receptor signaling in cardiac aging and heart failure," Sci. Transl. Med. 11, eaau8680 (Mar. 2019) (15 pages).

Ruffenach et al., "Role for Runt-related Transcription Factor 2 in Proliferative and Calcified Vascular Lesions in Pulmonary Arterial Hypertension," Am J Respir Crit Care Med. 194(10):1273-1285 (Nov. 2016).

Soomro et al. "A therapeutic target for CKD: activin A facilitates TGFbeta1 profibrotic signaling," Cellular Molecular Biology Letters. 28(10): 1-22 (Published: Jan. 30, 2023).

Valent et al., "Proposed diagnostic criteria for classical chronic myelomonocytic leukemia (CMML), CMML variants and pre-CMML conditions," Haematologica. 104(10):1935-49 (Epub May 2019) (Oct. 2019).

Zhang et al. "The caveolin-1 regulated protein follistatin protects against diabetic kidney disease," Kidney International. 96(1): 1134-1149 (Published online Jun. 17, 2019).

International Search Report and Written Opinion for International Application No. PCT/US17/60970, mailed Mar. 27, 2018 (15 pages).

International Search Report and Written Opinion for International Application No. PCT/US17/60960, mailed Aug. 9, 2018 (14 pages).

International Search Report and Written Opinion for International Application No. PCT/US2018/060076, mailed Mar. 14, 2019 (18 pages).

International Search Report and Written Opinion for International Application No. PCT/US2019/031573, mailed Sep. 17, 2019 (16 pages).

International Search Report and Written Opinion for International Application No. PCT/US2019/013329, mailed May 13, 2019 (19 pages).

Nagy et al., "Electrical impedance myography as a biomarker of myostatin inhibition with ActRIIB-mFc: a study in wild-type mice," Future Sci OA. 04(06):FSO308 (2018) (10 pages).

Nielsen et al., "Postnatal Hyperplasic Effects of ActRIIB Blockade in a Severely Dystrophic Muscle," J Cell Physiol. 232(7):1774-1793 (2016) (21 pages).

Graham et al., "A Soluble Activin Receptor IIB Fails to Prevent Muscle Atrophy in a Mouse Model of Spinal Cord Injury," J Neurotrauma. 33(12):1128-1135 (2016).

(56) References Cited

OTHER PUBLICATIONS

Sanchez et al., "Evaluation of Electrical Impedance as a Biomarker of Myostatin Inhibition in Wild Type and Muscular Dystrophy Mice," PLoS One. 10(10):e0140521 (2015) (14 pages).
Carlson et al., "Soluble Activin Receptor Type IIB Increases Forward Pulling Tension in the MDX Mouse," available in PMC May 1, 2012, published in final edited form as: Muscle Nerve. 43(5):694-699 (2011) (11 pages).
Akpan et al., "The effects of a soluble activin type IIB receptor on obesity and insulin sensitivity," available in PMC May 1, 2010, published in final edited form as: Int J Obes (Lond). 33(11):1265-73 (2009) (17 pages).
Campbell et al., "Myostatin inhibitor ACE-031 treatment of ambulatory boys with Duchenne muscular dystrophy: Results of a randomized, placebo-controlled clinical trial," Muscle Nerve. 55(4):458-464 (2017).
Thevis et al., "Emerging drugs affecting skeletal muscle function and mitochondrial biogenesis—Potential implications for sports drug testing programs," Rapid Commun Mass Spectrom. 30(5):635-51 (2016).
Attie et al., "A single ascending-dose study of muscle regulator ACE-031 in healthy volunteers." Muscle Nerve. 47(3):416-23 (2013).
Sunada, "Anti-myostatin antibody therapy for myopathies," Clin Neurol. 51:1157-1159 (2011) (3 pages) (English abstract included).
Sunada, "Myostatin Blockade Therapy for Muscular Atrophy," Brain Nerve. 63(11):1271-7 (2011) (Abstract only) (2 pages).
Cadena et al., "Administration of a soluble activin type IIB receptor promotes skeletal muscle growth independent of fiber type," J Appl Physiol. 109(3):635-642 (2010).
Tomillero et al., "Gateways to Clinical Trials," Methods Find Exp Clin Pharmacol. 32(1):47-86 (2010).
Badesch et al., "PULSAR: A Phase 2, Randomized, Double-Blind, Placebo-Controlled Study to Assess the Efficacy and Safety of Sotatercept (ACE-011) When Added to Standard of Care for the Treatment of Pulmonary Arterial Hypertension (PAH)," ERS International Congress Sep. 28-Oct. 2, 2019, Madrid, Spain, Poster PA4750, Abstract 19918, retrieved from <acceleronpharma.com/wp-content/uploads/2019/10/Badesch-et-al-ERS-2019-PULSAR-TIP-Poster_FINAL-2.pdf> (2019) (1 page).
Joshi et al., "ActRIIA-Fc (Sotatercept) Reverses Pulmonary Vascular Remodeling to Attenuate Pulmonary Arterial Hypertension by Rebalancing Activin/BMP Signaling in a Preclinical Model," American Thoracic Society 2019 International Conference, May 17-22, Dallas, TX, Poster, retrieved from <acceleronpharma.com/wp-content/uploads/2019/06/Joshi-SR-et-al-ATS-2019-Poster-Sotatercept-Reverses-Pulmonary-Vascular-R . . . -1.pdf>, (2019) (1 page).
Yu, "Sotatercept for rebalancing BMP/TGF-beta/activin signaling in PAH," Scientific Sessions Presentation (2018) (12 pages).
Joshi et al., "RAP-011, a Murine Ortholog of ACTRIIA-FC (Sotatercept), Improves Pulmonary Hemodynamics and Restores Right Ventricular Structure and Function in a Preclinical Model of Severe Angio-obliterative Pulmonary Arterial Hypertension," American Heart Association Scientific Session, Nov. 10-12, Chicago, Illinois, retrieved from <http://acceleronpharma.com/wp-content/uploads/2018/11/SRJ-AHA-2018-Poster.pdf>, (2018) (1 page).
Yung, "ACTRIIA-Fc Rebalances Activin/GDF and BMP9 Signaling to Attenuate Experimental Pulmonary Hypertension," American Heart Association Scientific Session, Nov. 10-12, Chicago, Illinois, retrieved from <acceleronpharma.com/wp-content/uploads/2018/11/Lai-Ming-AHA-2018-ActRIIa-Fc-v2-final.pdf>, (2018) (14 pages).
Yung et al., "ACTRIIA-Fc rebalances BMP and activin/TGF-beta signaling to attenuate experimental pulmonary hypertension," American Heart Association Scientific Session, Nov. 11-15, Anaheim, CA, retrieved from <acceleronpharma.com/wp-content/uploads/2017/11/Dr.-Yu-Presentation-AHA-17-1.pdf>, (2017) (15 pages).
Yee et al., "Phase 1 Dose-Escalation Study of Sotatercept (ACE-011) in Combination with Lenalidomide and Dexamethasone in Patients with Relapsed and/or Refractory Multiple Myeloma," Headache. 1:0 (2015) (1 page).
Dellanna, "Safety and Hemoglobin Effect of Sotatercept, Administered Intravenously and Subcutaneously, for Maintenance of Hemoglobin in Hemodialysis Subjects: Interim Analysis of a Phase 2 Study," 48th Annual American Society of Nephrology Kidney Week, Nov. 3-8, San Diego, CA, retrieved from <acceleronpharma.com/wp-content/uploads/2017/03/20151106-ASN-2015_Sotatercept-REN-002-Oral-Presentation_10-22-15-v3-Final.pdf>, (2015) (14 pages).
Havill et al., "Sotatercept Improves Anemia, Vascular Calcification, and Bone Loss in Patients With End-Stage Kidney Disease on Hemodialysis," American Society of Nephrology Kidney Week Nov. 5-8, 2015, San Diego, CA, Poster TH-P0038, retrieved from <acceleronpharma.com/wp-content/uploads/2017/03/20151105-ASN-2015_Sotatercept-REN-001-Poster_10.20.15-Final-1.pdf>, (2015) (1 page).
Raftopoulos et al., "Sotatercept (ACE-011) for the treatment of chemotherapy-induced anemia in patients with metastatic breast cancer or advanced or metastatic solid tumors treated with platinum-based chemotherapeutic regimens: results from two phase 2 studies," Support Care Cancer. 24(4):1517-25 (2016).
Smith et al., "Quantitative Computed Tomography Results for Bone Mass and Abdominal Aortic Vascular Calcification in Hemodialysis Subjects Treated With Escalating Dose Levels of Sotatercept: Interim Analysis of ACE-011-REN-001," 52nd ERA-EDTA Congress, May 28-31, London, UK, Poster SP645, retrieved from <acceleronpharma.com/wp-content/uploads/2017/03/20150530-ERA-2015_Sotatercept-QCT-Poster_05.22.15-Final-for-QR-Code.pdf>, (2015) (1 page).
Malluche et al., "The Role of Activin Signaling in the Pathogenesis of Renal Osteodystrophy of CKD-MBD," 52nd ERA-EDTA Congress, May 28-31, London, United Kingdom, Poster FP406, retrieved from <acceleronpharma.com/wp-content/uploads/2017/03/20150529-ERA-2015_RAP-011-Bone-Histomorphometry-Poster_05.22.15-Final-for-QR-Code.pdf>, (2015) (1 page).
Smith et al., "Long-term Effects of Sotatercept Compared With Placebo for Correction of Anemia in Hemodialysis Subjects: Interim Analysis of ACE-011-REN-001," 52nd ERA-EDTA Congress, May 28-31, London, UK, Poster FP661, retrieved from <http://acceleronpharma.com/wp-content/uploads/2017/03/20150529-ERA-2015_Sotatercept-Hb-Safety-Poster_05.22.15-Final-for-QR-Code-1.pdf>, (2015) (1 page).
Komrokji et al., "A Phase 2, Dose-Finding Study of Sotatercept (ACE-011) in Patients with Lower-Risk Myelodysplastic Syndromes or Non-Proliferative Chronic Myelomonocytic Leukemia and Anemia Requiring Transfusion," The 13th International Symposium on Myelodysplastic Syndromes, Apr. 29-May 2, Washington, D.C., retrieved from <http://acceleronpharma.com/wp-content/uploads/2017/03/20150429-Komrokji-MDS-001_MDSF-2015-presentation_29-April-2015_FINAL.pdf>, (2015) (21 pages).
Komrokji et al., "An Open-Label, Phase 2, Dose-Finding Study of Sotatercept (ACE-011) in Patients with Low or Intermediate (Int)-1-Risk Myelodysplastic Syndromes (MDS) or Non-Proliferative Chronic Myelomonocytic Leukemia (CMML) and Anemia Requiring Transfusion," 56th Annual Meeting of the American Society of Hematology (ASH), Dec. 6-9, San Francisco, California. Poster P3251 (2014) (1 page).
Malluche et al., "Sotatercept: Initial Signal-Seeking Quantitative Computed Tomography Results for Bone Mass and Vascular Calcification in Hemodialysis Subjects Treated With Escalating Doses: Interim Analysis of ACE-011-REN-001," American Society of Nephrology Kidney Week Nov. 11-16, 2014, Philadelphia, PA, retrieved from <http://acceleronpharma.com/wp-content/uploads/2017/03/20141113-Malluche_ASN-2014_Sotatercept-Bone-Mass-VC-Poster_11-10-14-Final.pdf>, (2014) (1 page).
El-Shahawy et al., "Safety and Hemoglobin Effect of the First 28-Day Dose Cycle of Sotatercept 0.7 mg/kg Compared With Lower Doses and Placebo for Correction of Anemia in Hemodialysis Subjects: Interim Analysis," American Society of Nephrology Kidney Week Nov. 11-16, 2014, Philadelphia, PA. Poster, retrieved from <acceleronpharma.com/wp-content/uploads/2014/11/20141113-El-Shahawy-ASN-2014-Sotatercept-Safety-Poster.pdf>, (2014) (1 page).
El-Shahawy et al., "Long-term Effects of Sotatercept Compared With Placebo for Correction of Anemia in Hemodialysis Subjects:

(56) References Cited

OTHER PUBLICATIONS

Interim Analysis of ACE-011-REN-001 Phase 2A Study," 51st Congress of the European Renal Association and European Dialysis and Transplant Association, May 31-Jun. 3, Amsterdam, Poster SP244, retrieved from <acceleronpharma.com/wp-content/uploads/2014/06/20140601-Long-Term-Effects-of-Sotatercept-Compared-with-Placebo-for-Correction-of-Anemia.pdf>, (2014) (7 pages).
Sako et al., "Characterization of the ligand binding functionality of the extracellular domain of activin receptor Type IIb," J Biol Chem. 285(27):21037-48 (2010).
Townson et al., "Specificity and Structure of a High Affinity Activin Receptor-like Kinase 1 (ALK1) Signaling Complex," J Biol Chem. 287(33):27313-27325 (2012).
MacDonald et al., "Denervation atrophy is independent from Akt and mTOR activation and is not rescued by myostatin inhibition," first posted online on Feb. 6, 2014, published in final edited form as: Dis Model Mech. 7(4):471-81 (2014) (Author manuscript) (39 pages).
Lee et al., "Role of satellite cells versus myofibers in muscle hypertrophy induced by inhibition of the myostatin/activin signaling pathway," Proc Natl Acad Sci U S A. 109(35):E2353-60 (2012).
Fakhfakh et al., "Administration of a soluble activin type IIB receptor promotes the transplantation of human myoblasts in dystrophic mice," available in PMC Jul. 10, 2014, published in final edited form as: Cell Transplant. 21(7):1419-30 (2012) (19 pages).
DiGirolamo et al., "Administration of soluble activin receptor 2B increases bone and muscle mass in a mouse model of osteogenesis imperfecta," Bone Res. 3:14042 (2015) (6 pages).
Bernstein et al., "Activin Decoy Receptor ActRIIB:Fc Lowers FSH and Therapeutically Restores Oocyte Yield, Prevents Oocyte Chromosome Misalignments and Spindle Aberrations, and Increases Fertility in Midlife Female SAMP8 Mice," Endocrinology. 157(3):1234-47 (2016).
Morine et al., "Activin IIB receptor blockade attenuates dystrophic pathology in a mouse model of Duchenne muscular dystrophy," available in PMC Jul. 17, 2015, published in final edited form as: Muscle Nerve. 42(5):722-30 (2010) (17 pages).
Goh et al., "Activin receptor type 2A (ACVR2A) functions directly in osteoblasts as a negative regulator of bone mass," J Biol Chem. 292(33):13809-13822 (2017).
Cash et al., "The structure of myostatin:follistatin 288: insights into receptor utilization and heparin binding," EMBO J. 28(17):2662-76 (2009).
Guo et al., "Myostatin inhibition in muscle, but not adipose tissue, decreases fat mass and improves insulin sensitivity," PLoS One. 4(3):e4937 (2009) (11 pages).
Guo et al., "Myostatin inhibition prevents diabetes and hyperphagia in a mouse model of lipodystrophy," Diabetes. 61(10):2414-23 (2012).
Wang et al., "Myostatin inhibition induces muscle fibre hypertrophy prior to satellite cell activation," J Physiol. 590(9):2151-65 (2012).
Bond et al., "Modeling Energy Dynamics in Mice with Skeletal Muscle Hypertrophy Fed High Calorie Diets," Int J Biol Sci. 12(5):617-30 (2016).
McPherron et al., "Soluble activin receptor type IIB treatment does not cause fat loss in mice with diet-induced obesity," available in PMC Mar. 1, 2013, published in final edited form as: Diabetes Obes Metab. 14(3):279-82 (2012) (6 pages).
Wang et al., "A soluble activin receptor Type IIB does not improve blood glucose in streptozotocin-treated mice," Int J Biol Sci. 11(2):199-208 (2015).
Lee et al., "Growth differentiation factor 11 signaling controls retinoic acid activity for axial vertebral development," available in PMC Nov. 1, 2011, published in final edited form as: Dev Biol. 347(1):195-203 (2010) (19 pages).
Wolfman et al., "Activation of latent myostatin by the BMP-1/tolloid family of metalloproteinases," Proc Nat Acad Sci. 100(26):15842-6 (2003).
Wagner et al., "Loss of myostatin attenuates severity of muscular dystrophy in mdx mice," Ann Neurol. 52(6):832-6 (2002).
McPherron et al., "Regulation of anterior/posterior patterning of the axial skeleton by growth/differentiation factor 11," Nat Genet. 22(3):260-264 (1999).
McPherron et al., "Double muscling in cattle due to mutations in the myostatin gene," Proc Natl Acad Sci USA. 94(23):12457-61 (1997).
El-Shahawy et al., "Interim Analysis of ACE-011-REN-001: The First 28 Day Dose Cycle of Low and Medium Starting Doses of Sotatercept Compared to Placebo for Correction of Anemia in Hemodialysis Subjects," National Kidney Foundation (NKF) 2014 Spring Clinical Meeting, Apr. 22-26, Las Vegas, NV, retrieved from <acceleronpharma.com/wp-content/uploads/2017/03/20140423-NKF-2014_REN-001-Interim-Analysis-Poster_FINAL.pdf>, (2014) (7 pages).
McPherron et al., "Regulation of skeletal muscle mass in mice by a new TGF-beta superfamily member," Nature. 387(6628):83-90 (1997).
McPherron et al., "Suppression of body fat accumulation in myostatin-deficient mice," J Clin Invest. 109(5):595-601 (2002).
Dussiot et al., "An activin receptor IIA ligand trap corrects ineffective erythropoiesis in beta-thalassemia," Nat Med. 20(4):398-407 (2014) (12 pages).
Lee et al., "Regulation of muscle growth by multiple ligands signaling through activin type II receptors," Proc Natl Acad Sci U S A. 102(50):18117-18122 (2005).
Abdulkadyrov et al., "Sotatercept in Patients with Osteolytic Lesions of Multiple Myeloma," Br J Haematol. 165(6):814-823 (2014).
McPherron et al., "Redundancy of myostatin and growth/differentiation factor 11 function," BMC Dev Biol. 9:24 (2009) (9 pages).
Lee et al., "Regulation of myostatin activity and muscle growth," Proc Natl Acad Sci U S A. 98(16):9306-9311 (2001).
Carrancio et al., "An activin receptor IIA ligand trap promotes erythropoiesis resulting in a rapid induction of red blood cells and haemoglobin," Br J Haematol. 165(6):870-882 (2014).
McPherron et al., "GDF-3 and GDF-9: two new members of the transforming growth factor-beta superfamily containing a novel pattern of cysteines*," J Biol Chem. 268(5):3444-3449 (1993) (7 pages).
Cappellini et al., "A Phase 2a, Open-Label, Dose-Finding Study To Determine The Safety and Tolerability Of Sotatercept (ACE-011) In Adults With Beta-Thalassemia: Interim Results," 55th Annual Meeting of the American Society of Hematology (ASH), Dec. 7-10, New Orleans, LA, Poster 3448 (2013) (1 page).
Zimmers et al., "Induction of Cachexia in Mice by Systemically Administered Myostatin," Science. 296(5572):1486-8 (2002) (4 pages).
Sherman et al., "Multiple-Dose, Safety, Pharmacokinetic, and Pharmacodynamic Study of Sotatercept (ActRIIA-IgGl), a Novel Erythropoietic Agent, in Healthy Postmenopausal Women," J Clin Pharmacol. 53(11):1121-1130 (2013).
Lee et al., "Myostatin and the control of skeletal muscle mass," Curr Opin Genet Devel. 9(5):604-607 (1999).
Fields et al., "Activin receptor antagonists for cancer-related anemia and bone disease," Exp Opin Invest Drugs. 22(1):87-101 (2013).
McPherron et al., "The transforming growth factor beta superfamily," Growth Factors and Cytokines in Health and Disease. 1:357-393 (1996).
Suragani et al., "Transforming growth factor-beta superfamily ligand trap ACE-536 corrects anemia by promoting late-stage erythropoiesis," Nat Med. 20(4):408-414 (2014) (10 pages).
Paulson, "Targeting a new regulator of erythropoiesis to alleviate anemia," Nat Med. 20(4):334-335 (2014).
Attie et al., "A phase 1 study of ACE-536, a regulator of erythroid differentiation, in healthy volunteers," Am J Hematol. 89(7): 766-770 (2014) (5 pages).
Chantry et al., "Inhibiting activin-A signaling stimulates bone formation and prevents cancer-induced bone destruction in vivo." J Bone Miner Res. 25(12):2633-46 (2010).
Lotinun et al., "A soluble activin receptor Type IIA fusion protein (ACE-011) increases bone mass via a dual anabolic-antiresorptive effect in Cynomolgus monkeys." Bone. 46(4):1082-8 (2010).
Vallet et al., "Activin A promotes multiple myeloma-induced osteolysis and is a promising target for myeloma bone disease," Proc Nat Acad Sci. 107(11):5124-9 (2010).

(56) References Cited

OTHER PUBLICATIONS

Fajardo et al., "Treatment with a soluble receptor for activin improves bone mass and structure in the axial and appendicular skeleton of female cynomolgus macaques (*Macaca fascicularis*)," Bone. 46(1):64-71 (2010).
Ruckle et al., "Single-Dose, Randomized, Double-Blind, Placebo-Controlled Study of ACE-011 (ActRIIA-IgG1) in Postmenopausal Women," J Bone Mineral Res. 24(4):744-752 (2009).
Suragani et al., "Modified ActRIIB-Fc Fusion Protein (ACE-536) Decreases Irreversible Sickle Cells in a Murine Model of Sickle Cell Disease," EHA, Poster P535, retrieved from <acceleronpharma.com/wp-content/uploads/2017/03/20140614-ACE-536-20140613-Modified-ActRIIB-Fc-Fusion-Protein-Decreases-Irreversible-Sickle-Cells-in-a-Murine-Model-of-1.pdf>, (2014) (1 page).
Pearsall et al., "A soluble activin type IIA receptor induces bone formation and improves skeletal integrity," Proc Nat Acad Sci U S A. 105(19):7082-7087 (2008).
Fenaux et al., "Luspatercept in Patients with Lower-Risk Myelodysplastic Syndromes," N Engl J Med. 382(2):140-151 (Jan. 2020).
Viprakasit et al., "Evaluating Luspatercept Responders in the Phase 3, Randomized, Double-Blind, Placebo-Controlled BELIEVE Trial of Luspatercept in Adult beta-Thalassemia Patients Who Require Regular Red Blood Cell Transfusions," Blood. 134(Supplement 1):3545 (2019) (1 page).
"A Study of Sotatercept for the Treatment of Pulmonary Arterial Hypertension (SPECTRA)," U.S. National Library of Medicine, <clinicaltrials.gov/ct2/show/NCT03738150?term=sotatercept&draw=2&rank=1>, first posted Nov. 13, 2018, retrieved on Mar. 30, 2020 (9 pages).
"Safety and Efficacy Study of Sotatercept in Adults With Transfusion Dependent Diamond Blackfan Anemia (ACE-011-DBA)," U.S. National Library of Medicine, <clinicaltrials.gov/ct2/show/NCT01464164?term=sotatercept&draw=2&rank=2>, first posted Nov. 3, 2011, retrieved Mar. 30, 2020 (10 pages).
Garcia-Manero et al., "Hematologic Improvement-Neutrophil and -Platelet in the MEDALIST Trial: Multilineage Data from a Phase 3, Randomized, Double-Blind, Placebo-Controlled Study of Luspatercept to Treat Anemia in Patients with Very Low-, Low-, or Intermediate-Risk Myelodysplastic Syndromes with Ring Sideroblasts Who Require Red Blood Cell (RBC) Transfusions," 61st Annual Meeting of the American Society of Hematology (ASH), Dec. 7-10, Orlando, Florida, Abstract 4243 (2019) (1 page).
"A Study of Sotatercept for the Treatment of Pulmonary Arterial Hypertension (PAH) (PULSAR)," U.S. National Library of Medicine, <clinicaltrials.gov/ct2/show/NCT03496207?term=sotatercept&draw=2&rank=3>, first posted Apr. 12, 2018, retrieved Mar. 30, 2020 (8 pages).
"A Phase IIa Study of Sotatercept on Bone Mass and Turnover in Patients With Multiple Myeloma," U.S. National Library of Medicine, <clinicaltrials.gov/ct2/show/NCT02230917?term=sotatercept&draw=2&rank=4>, first posted Sep. 3, 2014, retrieved Mar. 30, 2020 (7 pages).
"Study of Sotatercept for the Treatment of Anemia in low-or Intermediate-1 Risk Myelodysplastic Syndromes (MDS) or Non-proliferative Chronic Myelomonocytic Leukemia (CMML)," U.S. National Library of Medicine, <clinicaltrials.gov/ct2/show/NCT01736683?term=sotatercept&draw=2&rank=5>, first posted Nov. 29, 2012, retrieved Mar. 30, 2020 (12 pages).
"To Determine Safe and Effective Dose of ACE-011 for the Treatment of Chemotherapy Induced Anemia in Patients With Advanced Non-small Cell Lung Cancer," U.S. National Library of Medicine,<clinicaltrials.gov/ct2/show/NCT01284348?term=sotatercept&draw=2&rank=6>, first posted Jan. 27, 2011, retrieved Mar. 30, 2020 (10 pages).
Gerds et al., "A Phase 2 Study of Luspatercept in Patients With Myelofibrosis-Associated Anemia," 61st Annual Meeting of the American Society of Hematology (ASH), Dec. 7-10, Orlando FL, Presentation, Abstract 557, retrieved from <acceleronpharma.com/wp-content/uploads/2019/12/Gerds-et-al.-Luspatercept-in-MF_ASH-2019-7-Dec-2019-FINAL-FOR-UPLOAD.pdf>, (2019) (13 pages).
"Study to Evaluate Effect of a Single Dose of Sotatercept (ACE-011) on Red Blood Cell Mass and Plasma Volume in Subjects With Solid Tumors," U.S. National Library of Medicine, <clinicaltrials.gov/ct2/show/NCT01190644?term=sotatercept&draw=2&rank=7>, first posted Aug. 27, 2010, retrieved Mar. 30, 2020 (6 pages).
Fenaux et al., "Assessment of Longer-Term Efficacy and Safety in the Phase 3, Randomized, Double-Blind, Placebo-Controlled MEDALIST Trial of Luspatercept to Treat Anemia in IPSS-R Very Low-, Low-, or Int-Risk RBC Transfusion-Dependent MDS with Ring Sideroblasts," 61st Annual Meeting of the American Society of Hematology (ASH), Dec. 7-10, Orlando, Florida, retrieved from <acceleronpharma.com/wp-content/uploads/2019/12/ASH-2019-MEDALIST-long-term-analysis-Fenaux-oral-7-Dec-2019V2.pdf>, (2019) (18 pages).
"Sotatercept in Treating Patients With Myeloproliferative Neoplasm-Associated Myelofibrosis or Anemia," U.S. National Library of Medicine, <clinicaltrials.gov/ct2/show/NCT01712308?term=sotatercept&draw=2&rank=8>, first posted Oct. 23, 2012, retrieved Mar. 30, 2020 (7 pages).
"A Phase 2 Study of Intravenous or Subcutaneous Dosing of Sotatercept (ACE-011) in Patients With End-Stage Kidney Disease on Hemodialysis," U.S. National Library of Medicine, <clinicaltrials.gov/ct2/show/NCT01999582?term=sotatercept&draw=2&rank=9>, first posted Dec. 3, 2013, retrieved on Mar. 30, 2020 (6 pages).
Porter et al., "Effects of Luspatercept on Iron Overload and Impact on Responders to Luspatercept: Results from the BELIEVE Trial," 61st Annual Meeting of the American Society of Hematology (ASH), Abstract 2245, Blood. 134(Supplement 1):2245 (2019) (1 page).
"Efficacy and Safety Study of Luspatercept (ACE-536) Versus Epoetin Alfa for the Treatment of Anemia Due to IPSS-R Very Low, Low or Intermediate Risk Myelodysplastic Syndromes (MDS) in ESA Naïve Subjects Who Require Red Blood Cell Transfusions (COMMANDS)," U.S. National Library of Medicine, <clinicaltrials.gov/ct2/show/NCT03682536?term=luspatercept&draw=2&rank=10>, first posted Sep. 24, 2018, retrieved Mar. 30, 2020 (13 pages).
Platzbecker et al., "Luspatercept Significantly Reduces Red Blood Cell (RBC) Transfusion Burden, Regardless of Gene Mutation Frequency, Spectrum, and Prognostic Significance, Among Patients with Lower-Risk Myelodysplastic Syndromes Enrolled in the MEDALIST Trial," retrieved from <http://acceleronpharma.com/wp-content/uploads/2019/12/ASH-2019-Platzbecker-MEDALIST-Mutational-analysis.pdf>, (2019) (1 page).
Piga et al., "Luspatercept improves hemoglobin levels and blood transfusion requirements in a study of patients with beta-thalassemia," Blood. 133(12):1279-1289 (2019).
"Study to Evaluate the Effects of ACE-536 in Patients With Beta-thalassemia," U.S. National Library of Medicine, <clinicaltrials.gov/ct2/show/NCT01749540?term=luspatercept&draw=2&rank=11>, first posted Dec. 13, 2012, retrieved Mar. 30, 2020 (8 pages).
"Study of ACE-536 for the Treatment of Anemia in Patients With Myelodysplastic Syndromes (MDS)," U.S. National Library of Medicine, <clinicaltrials.gov/ct2/show/NCT01749514?term=luspatercept&draw=2&rank=12>, first posted Dec. 13, 2012, retrieved Mar. 30, 2020 (8 pages).
"Study of ACE-536 in Healthy Postmenopausal Women," U.S. National Library of Medicine, <clinicaltrials.gov/ct2/show/NCT01432717?term=luspatercept&draw=2&rank=13>, first posted Sep. 13, 2011, retrieved Mar. 30, 2020 (5 pages).
"To Document the Burden of Illness on the Quality of Life and the Impact on Healthcare Utilization in (Beta)-thalassemia Subjects Who Are Transfusion Dependent (TD) and Non-transfusion Dependent (NTD) Receiving Standard of Care," U.S. National Library of Medicine, <clinicaltrials.gov/ct2/show/NCT02626689?term=luspatercept&draw=2&rank=14>, first posted Dec. 10, 2015, retrieved Mar. 30, 2020 (9 pages).
Suragani et al., "Modified activin receptor IIB ligand trap mitigates ineffective erythropoiesis and disease complications in murine beta-thalassemia," Blood. 123(25):3864-3872 (2014).
Piga et al., "Luspatercept (ACE-536) Increases Hemoglobin and Decreases Transfusion Burden and Serum Ferritin in Adults with

(56) References Cited

OTHER PUBLICATIONS

Beta-Thalassemia: Preliminary Results from a Phase 2 Study," American Society of Hematology, Oral Presentation, dated Dec. 7, 2014 (21 pages).

Platzbecker et al., "Luspatercept (ACE-536) Increases Hemoglobin and Reduces Transfusion Burden in Patients with Low or Intermediate-1 Risk Myelodysplastic Syndromes (MDS): Preliminary Results from a Phase 2 Study," American Society of Hematology, Oral Presentation (2014) (21 pages).

Suragani et al., "Modified ActRIIB-mFc Fusion Protein (murine ortholog of Luspatercept) Mitigates Sickling and Red Cell Pathology in a Murine Model of Sickle Cell Disease," ASH 56th Annual Meeting, Dec. 6-9, San Francisco, California. Poster 4055 (2014) (1 page).

Fenaux et al., "The MEDALIST Trial: Results of a Phase 3, Randomized, Double-Blind, Placebo-Controlled Study of Luspatercept to Treat Patients With Very Low-, Low-, or Intermediate-Risk Myelodysplastic Syndromes (MDS) Associated Anemia With Ring Sideroblasts (RS) Who Require Red Blood Cell (RBC) Transfusions," 60th Annual Meeting of the American Society of Hematology (ASH), Dec. 1-4, San Diego, California, Oral Presentation (2018) (18 pages).

Cappellini et al., "The BELIEVE Trial: Results of a Phase 3, Randomized, Double-Blind, Placebo-Controlled Study of Luspatercept in Adult Beta-Thalassemia Patients Who Require Regular Red Blood Cell (RBC) Transfusions," 60th Annual Meeting of the American Society of Hematology (ASH), Dec. 1-4, San Diego CA, Oral Presentation, retrieved from <http://acceleronpharma.com/wp-content/uploads/2018/12/BELIEVE-ASH-2018-Oral-Presentation-for-upload.pdf> (2018) (17 pages).

Martinez, "Luspatercept Inhibits pSmad2/3 Signaling and Promotes Erythroid Maturation Through a GATA1 Dependent Mechanism," 23rd European Hematology Association Congress, Jun. 14-17, Stockholm, Sweden, Oral Presentation, retrieved from <acceleronpharma.com/wp-content/uploads/2018/06/EHA2018PMFinal.pdf>, (2018) (25 pages).

Platzbecker et al., "Luspatercept Increases Hemoglobin And Reduces Transfusion Burden In Patients With Low Or Intermediate-1 Risk Myelodysplastic Syndromes (MDS): Preliminary Results From A Phase 2 Study," Advancing Research & Patient Care, The 13th International Symposium on Myelodysplastic Syndromes, Washington, D.C., Apr. 19-May 2, 2015 (15 pages).

Piga et al., "Luspatercept (ACE-536) Increases Hemoglobin and Decreases Transfusion Burden and Liver Iron Concentration in Adults with Beta-Thalassemia: Preliminary Results from a Phase 2 Study," EHA (2015) (22 pages).

Piga et al., "Improvements in Hemoglobin, Quality of Life, and Six-Minute-Walk Distance in Adults with beta-Thalassemia Treated with Luspatercept: Long-Term Phase 2 Study," 23rd European Hematology Association Congress, Jun. 14-17, Stockholm, Sweden, Oral Presentation, retrieved from <acceleronpharma.com/wp-content/uploads/2018/06/Piga-et-al-EHA-2018-Presentation-Improvements-in-Hemoglobin-Quality-of-Life-and-Six-Minute-Walk-Distance.pdf>, (2018) (22 pages).

Platzbecker et al., "Luspatercept Increases Hemoglobin And Reduces Transfusion Burden In Patients With Low Or Intermediate-1 Risk Myelodysplastic Syndromes (MDS): Preliminary Results From A Phase 2 Study," EHA MDS Oral Presentation, Jun. 13, 2015 (16 pages).

Platzbecker et al., "Mutational and Subgroup Analyses of Lower-Risk Myelodysplastic Syndromes (MDS) Patients Treated With Luspatercept: Phase 2 PACE-MDS Study," 23rd European Hematology Association Congress, Jun. 14-17, Stockholm, Sweden, Abstract PF498, retrieved from <http://acceleronpharma.com/wp-content/uploads/2018/06/EHA-2018-MDS-Poster-06June2018.pdf>, (2018) (1 page).

Platzebecker et al., "Erythropoietic cellular analyses in luspatercept-treated lower-risk myelodysplastic syndromes (MDS): Phase 2 PACE-MDS study," 2018 American Society of Clinical Oncology (ASCO) Annual Meeting, Jun. 1-5, Chicago, Illinois, Abstract 7018, retrieved from <http://acceleronpharma.com/wp-content/uploads/2018/06/Platzbecker-ASCO-2018-Poster-Erythropoietic-Cellular-Analyses-Ph-2-PACE-MDS-Study-1.pdf>, (2018) (1 page).

Mesa et al., "A Phase 2, Multicenter, Open-Label Study of the Safety and Efficacy of Luspatercept in Subjects With Myeloproliferative Neoplasm (MPN)-Associated Myelofibrosis and Anemia With or Without RBC Transfusion Dependence," American Society of Clinical Oncology (ASCO) Annual Meeting, Jun. 1-5, Chicago Illinois, Poster TPS7083, retrieved from <http://acceleronpharma.com/wp-content/uploads/2018/06/Mesa-MF-TiP-ASCO-2018-Poster-May-24-2018_FINAL-1.pdf>, (2018) (1 page).

Platzbecker et al., "Mutational Profile and Analysis of Lower-Risk Myelodysplastic Syndromes (MDS) Patients Treated with Luspatercept: Phase 2 PACE-MDS Study," American Society of Hematology (ASH) 59th Annual Meeting & Exposition, Dec. 9-12, Atlanta, GA, Abstract 2982, retrieved from <acceleronpharma.com/wp-content/uploads/2017/12/Platzbecker-U-ASH-2017-MDS-Luspatercept-Poster-Final.pdf> (2017) (1 page).

Platzbecker et al., "Luspatercept for the treatment of anaemia in patients with lower-risk myelodysplastic syndromes (PACE-MDS): a multicentre, open-label phase 2 dose-finding study with long-term extension study," Lancet Oncol. 18(10):P1338-1347 (2017).

Giagounidis et al., "Luspatercept Increases Hemoglobin and Reduces Transfusion Burden in Patients With Lower-Risk Myelodysplastic Syndromes (MDS): Long-Term Results From the Phase 2 PACE-MDS Study," 22nd European Hematology Association Congress, Jun. 22-25, Madrid, Spain, Abstract P666, retrieved from <acceleronpharma.com/wp-content/uploads/2017/06/EHA-2017-MDS-Poster-20Jun2017-FINAL.pdf>, (2017).

Platzbecker et al., "Luspatercept Response in New Subpopulations of Patients With Lower-Risk Myelodysplastic Syndromes (MDS): Update of the PACE Study," 14th International Symposium on Myelodysplastic Syndromes, May 3-6, Valencia, Spain, Oral Presentation, retrieved from <acceleronpharma.com/wp-content/uploads/2017/05/Platzbecker-U-MDS-Symposium-2017-Slides-Luspatercept-Response-in-New-Subpopulations-Website-Version.pdf>, (2017).

Chen et al., "Pharmacokinetics and Exposure-Response of Luspatercept in Patients With Beta-Thalassemia: Preliminary Results From Phase 2 Studies," 58th Annual Meeting of the American Society of Hematology (ASH), Dec. 3-6, San Diego, CA, Poster 2463, retrieved from <acceleronpharma.com/wp-content/uploads/2017/03/20161204-Chen-ASH-2016-Poster-Luspatercept-PK-B-thal.pdf>, (2016) (1 page).

Piga et al., "Luspatercept Increases Hemoglobin, Decreases Transfusion Burden, and Improves Patient-Reported Outcomes in Adults with Beta-Thalassemia," 58th Annual Meeting of the American Society of Hematology (ASH), Dec. 3-6, San Diego, California, Oral Presentation, retrieved from <http://acceleronpharma.com/wp-content/uploads/2017/03/20161205-Luspatercept-Increases-Hemoglobin.pdf>, (2016) (21 pages).

Chen et al., "Pharmacokinetics and Exposure-Response of Luspatercept in Patients With Anemia Due to Low- or Intermediate-1-Risk Myelodysplastic Syndromes (MDS): Preliminary Results From Phase 2 Studies," 58th Annual Meeting of the American Society of Hematology (ASH), Dec. 3-6, San Diego, California, Poster 1990, retrieved from <acceleronpharma.com/wp-content/uploads/2017/03/Chen-ASH-2016-Poster-Luspatercept-PK-MDS.pdf>, (2016) (1 page).

Piga et al., "Luspatercept Decreases Transfusion Burden and Liver Iron Concentration in Regularly Transfused Adults with Beta-Thalassemia," 21st European Hematology Association Congress, Jun. 9-12, Copenhagen, Denmark, Presentation, retrieved from <acceleronpharma.com/wp-content/uploads/2017/03/20160612-EHA-2016-Luspatercept-Thal-TD-FINAL.pdf>, (2016) (15 pages).

Piga et al., "Luspatercept Increases Hemoglobin, Reduces Liver Iron Concentration and Improves Quality of Life in Non-Transfusion Dependent Adults with Beta-Thalassemia," 21st European Hematology Association Congress, Jun. 9-12, Copenhagen, Denmark, Abstract P758, retrieved from <http://acceleronpharma.com/wp-content/uploads/2017/03/20160611-EHA-2016-Luspatercept-BThal-NTD-poster-FINAL.pdf>, (2016) (1 page).

Piga et al., "Luspatercept Increases Hemoglobin and Reduces Transfusion Burden in Patients with Low-Intermediate Risk Myelodysplastic Syndromes (MDS): Long-Term Results From Phase 2 PACE-MDS Study," 21st European Hematology Association

(56) References Cited

OTHER PUBLICATIONS

Congress, Jun. 9-12, Copenhagen, Denmark, Presentation, retrieved from <http://acceleronpharma.com/wp-content/uploads/2017/03/20160610-EHA-2016-Luspatercept-MDS-FINAL.pdf> (2016) (16 pages).

Martinez, "RAP-536 (Murine ACE-536/Luspatercept) Inhibits Smad2/3 Signaling and Promotes Erythroid Differentiation By Restoring GATA1 Function in Murine Beta-thalassemia," 21st European Hematology Association Congress, Jun. 9-12, Copenhagen, Denmark, Oral Presentation, retrieved from <acceleronpharma.com/wp-content/uploads/2017/03/20160610-PedroEHA2016Final.pdf> (2016) (23 pages).

Platzbecker et al., "Biomarkers of Ineffective Erythropoiesis Predict Response to Luspatercept in Patients with Low or Intermediate-1 Risk Myelodysplastic Syndromes (MDS): Final Results from the Phase 2 PACE-MDS Study," 57th American Society of Hematology Annual Meeting and Exposition, Dec. 5-8, Orlando, FL, Abstract 2862, retrieved from <Biomarkers of Ineffective Erythropoiesis Predict Response to Luspatercept in Patients with Low or Intermediate-1 Risk Myelodysplastic Syndromes (MDS): Final Results from the Phase 2 PACE-MDS Study>, (2015) (1 page).

Giagounidis et al., "Luspatercept Treatment Leads to Long Term Increases in Hemoglobin and Reductions in Transfusion Burden in Patients with Low or Intermediate-1 Risk Myelodysplastic Syndromes (MDS): Preliminary Results from the Phase 2 PACE-MDS Extension Study," Presentation. (2015) (16 pages).

Ngo et al., Computational Complexity, Protein Structure Prediction, and the Levinthal Paradox. *The Protein Folding Problem and Tertiary Structure Prediction.* Birkhäuser Boston, pp. 433, 492-495 (1994).

Wells, "Additivity of mutational effects in proteins," Biochemistry. 29(37):8509-17 (1990).

"Keros Therapeutics Presents Results from Preclinical Studies Investigating KER-012 at the American Society for Bone and Mineral Research 2020 Annual Meeting," Keros Therapeutics, <https://www.globenewswire.com/news-release/2020/09/11/2092586/0/en/Keros-Therapeutics-Presents-Results-from-Preclinical-Studies-Investigating-KER-012-at-the-American-Society-for-Bone-and-Mineral-Research-2020-Annual-Meeting.html>, dated Sep. 11, 2020, retrieved on Feb. 25, 2021 (4 pages).

Marisavljevic et al., "Myelofibrosis in primary myelodysplastic syndromes: clinical and biological significance," Med Oncol. 21(4):325-31 (2004) (Abstract only) (2 pages).

Morgenroth et al., "Insights into bone health in Duchenne muscular dystrophy," Bonekey Rep. 1:9 (2012) (11 pages).

International Search Report and Written Opinion for International Application No. PCT/US2021/023353, mailed Jul. 20, 2021 (9 pages).

International Search Report and Written Opinion for International Application No. PCT/US2021/023339, mailed Jun. 21, 2021 (23 pages).

Kuo et al., "MB109 as bioactive human bone morphogenetic protein-9 refolded and purified from *E. coli* inclusion bodies," Microb Cell Fact. 13(1):29 (2014) (13 pages).

Wu et al., "Identification and analysis of type II TGF-beta receptors in BMP-9-induced osteogenic differentiation of C3H10T1/2 mesenchymal stem cells," Acta Biochim Biophys Sin (Shanghai). 42(10):699-708 (2010).

International Search Report and Written Opinion for International Application No. PCT/US2021/023335, mailed Jul. 9, 2021 (29 pages).

International Search Report and Written Opinion for International Application No. PCT/US2021/053239, mailed Feb. 23, 2022 (13 pages).

Rodgarkia-Dara et al., "The activin axis in liver biology and disease," Mutat Res. 613(2-3):123-37 (2006).

Ballen et al., "Outcome of transplantation for myelofibrosis," Biol Blood Marrow Transplant. 16(3):358-67 (Mar. 2010).

Stegelmann et al., "Updated Results from the German Mpnsg-0212 Combination Trial: Ruxolitinib Plus Pomalidomide in Myelofibrosis with Anemia," Blood. 134(Supplement_1):672 (5 pages) (Nov. 2019).

Bose et al. "Management of Myelofibrosis-Related Cytopenias," Curr Hematol Malig Rep. 13(3):164-172 (Jun. 2018).

International Search Report and Written Opinion for International Application No. PCT/US2022/040920, dated Mar. 29, 2023 (13 pages).

International Search Report and Written Opinion for International Application No. PCT/US2022/034366, mailed Jan. 4, 2023 (13 pages).

Humeniuk et al., "Brief Report: Loss of p15lnk4b Accelerates Development of Myeloid Neoplasms in Nup98-HoxD13 Transgenic Mice," Stem Cells. 32(5):1361-1366 (2014).

Park et al., "The prognostic value of serum erythropoietin in patients with lower-risk myelodysplastic syndromes: a review of the literature and expert opinion." Ann Hematol. 99(1):7-19 (Jan. 2020).

Feigenson et al., "Ker-050, a Modified Actriia Ligand Trap, Alleviates Cytopenia Arising from Multiple Etiologies," Blood. 136(Supplement_1):38 (2 Pages) (Nov. 2020).

International Search Report and Written Opinion for International Application No. PCT/US2022/027399, mailed Sep. 21, 2022 (14 pages).

Fenaux et al., "Luspatercept for the treatment of anemia in myelodysplastic syndromes and primary myelofibrosis," Blood. 133(8):790-794 (Feb. 2019) (5 pages).

Tournier et al., "Calibrated automated thrombography demonstrates hypercoagulability in patients with idiopathic pulmonary arterial hypertension," Thrombosis Res. 126:e418-e422 (2010) (5 pages).

Rabinovitch et al., "Inflammation and Immunity in the Pathogenesis of Pulmonary Arterial Hypertension," Circ Res. 115(1):165-175 (Jun. 2014) (11 pages).

Highland et al., "Development of the Pulmonary Hypertension Functional Classification Self-Report: a patient version adapted from the World Health Organization Functional Classification measure," Health Qual Life Outcomes. 19(1):202 (Aug. 2021) (13 pages).

Hoffmann et al., "Compartment-specific expression of collagens and their processing enzymes in intrapulmonary arteries of IPAH patients," Am J Physiol Lung Cell Mol Physiol. 308(10):L1002-L1013 (2015) (12 pages).

Bauer et al., "Complement C3 Deficiency Attenuates Chronic Hypoxia-Induced Pulmonary Hypertension in Mice," PLoS One 6(12):e28578 (Dec. 2011) (10 pages).

Ogawa et al., "Long-term patient survival with idiopathic/heritable pulmonary arterial hypertension treated at a single center in Japan," Life Science 118(2):414-419 (2014) (6 pages).

Galiè et al., "2015 ESC/ERS Guidelines for the diagnosis and treatment of pulmonary hypertension: The Joint Task Force for the Diagnosis and Treatment of Pulmonary Hypertension of the European Society of Cardiology (ESC) and the European Respiratory Society (ERS): Endorsed by: Association for European Paediatric and Congenital Cardiology (AEPC), International Society for Heart and Lung Transplantation (ISHLT)," European Heart Journal. 37:67-119 (2016) (58 pages).

Huertas et al., "Immune Dysregulation and Endothelial Dysfunction in Pulmonary Arterial Hypertension: a complex interplay," Circulation. 129(12):1332-40 (Mar. 2014) (9 pages).

Yndestad et al., "Elevated levels of activin A in clinical and experimental pulmonary hypertension," J Appl Physiol 106(4):1356-1364 (2009) (9 pages).

U.S. Appl. No. 19/204,105, filed May 9, 2025, Seehra et al.

U.S. Appl. No. 19/229,468, filed Jun. 5, 2025, Seehra et al.

U.S. Appl. No. 19/244,381, filed Jun. 20, 2025, Seehra et al.

"Results from the Cibotercept TROPOS PAH Phase 2 Trial", Keros Therapeutics. May 29, 2025 (14 pages). https://ir.kerostx.com/static-files/2b772f73-4ec5-4003-a18e-926dc68f19c4.

Aversa et al., "Cancer-induced muscle wasting: latest findings in prevention and treatment," Ther Adv Med Oncol. 9(5):369-382 (May 2017).

Bose et al., "JAK2 inhibitors for myeloproliferative neoplasms: what is next?" Blood. 130(2):115-125 (Jul. 2017).

(56) References Cited

OTHER PUBLICATIONS

Bose et al., "Sotatercept (ACE-011) in Subjects With MPN-Associated Myelofibrosis and Anemia," HemaSphere. 3(S1):367-368, New Agents in MPN Abstract S829 (Jun. 13-16, 2019).
Bose et al., "Sotatercept for anemia of myelofibrosis: a phase II investigator-initiated study," Haematologica. 109(8):2660-4 (Aug. 2024) (includes suppl content) (9 pages).
Cascio et al., "Anemia: Evaluation and Diagnostic Tests," Med Clin North Am. 101(2): 263-284 (Mar. 2017).
Efstratiadis et al., "Cardio-renal anemia syndrome," Hippokratia. 12(1): 11-6 (Jan. 2008).
Eisenstaedt et al., "Anemia in the elderly: current understanding and emerging concepts" Blood Rev. 20(4):213-26 (Jul. 2006).
El-Halabi et al., "Under-diagnosing and under-treating iron deficiency in hospitalized patients with gastrointestinal bleeding," World J Gastrointest Pharmacol Ther. 7(1): 139-44 (Feb. 2016).
Feigenson et al., "EP758: Ker-050, an inhibitor of the TGF-[beta] superfamily signaling, observed to have a rapid, dynamic, and durable effect on erythropoiesis," HemaSphere. 5:S2 (Jun. 2021) (5 pages).
Feigenson et al., "Ker-050, a novel inhibitor of Tgf[beta] superfamily signaling, induces red blood cell production by promoting multiple stages of erythyroid differentiation," Blood. 136(S1):34 (Nov. 2020) (2 pages).
Germing et al., "Myelodysplastic syndromes: diagnosis, prognosis, and treatment," Dtsch Arztebl Int.110(46):783-90 (Nov. 2013).
Guralnik et al., "Prevalence of anemia in persons 65 years and older in the United States: evidence for a high rate of unexplained anemia," Blood. 104(8):2263-8 (Oct. 2004).
Harrison et al., "Management of myelofibrosis after ruxolitinib failure," Ann Hematol. 99(6):1177-91 (Epub Mar. 2020) (Jun. 2020).
Komrokji et al., "Sotatercept with long-term extension for the treatment of anaemia in patients with lower-risk myelodysplastic syndromes: a phase 2, dose-ranging trial," Lancet Haematol. 5(2):e63-e72 (Epub Jan. 2018) (Feb. 2018).
Mellibovsky et al., "Relationship among densitometry, bone histomorphometry, and histologic stage in idiopathic myelofibrosis," Bone.34(2):330-5 (Feb. 2004).
Naymagon et al., "Myelofibrosis-Related Anemia: Current and Emerging Therapeutic Strategies," Hemasphere. 1(1): 1-9 (Dec. 2017).
Ordonez et al., "EP806: Administration of KER-050, a novel actriia ligand trap, to healthy participants elicited robust and sustained increases in hemoglobin and platelets," HemaSphere. 4:S1 (Jun. 2020) (1 page).
Savona, "Are we altering the natural history of primary myelo fibrosis?," Leuk Res.38(9):1004-12 (Sep. 2014).
Weidner et al., "Myelodysplastic syndromes and bone loss in mice and men," Leukemia. 31(4):1003-1007 (Apr. 2017).

* cited by examiner

FIG. 1

| | |
|---|---|
| Chimera 1 (SEQ ID NO: 22) | GAILGRAETRECIYYNANWELERTNQSGLERCEGEQDKRLHCYASWRNSSGTIEIVKQGCWLDDINCYDRTDCVATEENPQVYFCCCEGNMCNEKFSYFPEMEVTQPTS |
| Chimera 2 (SEQ ID NO: 23) | --GRGEAETRECIYYNANWELERTNQSGLERCEGEQDKRLHCYASWRNSSGTIEIVKQGCWLDDINCYDRTDCVEKKDSPEVYFCCCEGNMCNEKFSYFPEMEVTQPTS |
| Chimera 2 E81Q (SEQ ID NO: 24) | --GRGEAETRECIYYNANWELERTNQSGLERCEGEQDKRLHCYASWRNSSGTIEIVKQGCWLDDINCYDRTDCVEKKDSPQVYFCCCEGNMCNEKFSYFPEMEVTQPTS |
| Chimera 2 I65F_E81Q (SEQ ID NO: 25) | --GRGEAETRECIYYNANWELERTNQSGLERCEGEQDKRLHCYASWRNSSGTIEIVKQGCWLDDFNCYDRTDCVEKKDSPQVYFCCCEGNMCNEKFSYFPEMEVTQPTS |
| Chimera 1/2 (SEQ ID NO: 40) | GAILGRAETRECIYYNANWELERTNQSGLERCEGEQDKRLHCYASWRNSSGTIEIVKQGCWLDDFNCYDRTDCVEKKDSPQVYFCCCEGNMCNEKFSYFPEMEVTQPTS |
| Chimera 1/2b (SEQ ID NO: 41) | GAILGRSETQECIYYNANWELERTNQSGLERCEGEQDKRLHCYASWRNSSGTIEIVKQGCWLDDFNCYDRTDCVEKKDSPQVYFCCCEGNMCNEKFSYFPEMEVTQPTS |
| Chimera 3 (SEQ ID NO: 28) | --GRGEAETRECIYYNANWELERTNQSGLERCEGEQDKRRHCFATWKNISGSIEIVKQGCWLDDFNCYDRTDCVEKKDSPQVYFCCCEGNMCNEKFSYFPEMEVTQPTS |
| Chimera 4 (SEQ ID NO: 42) | --GRGEAETRECIYYNANWELERTNQSGLERCEGEQDKRLHCYASWRNSSGTIELVKKGCWLDDFNCYDRQECVATKDSPEVYFCCCEGNMCNEKFSYFPEMEVTQPTS |
| Chimera 5 (SEQ ID NO: 43) | --GRGEAETRECIYYNANWELERTNQSGLERCEGEQDKRLHCYASWRNSSGTIELVKKGCWLDDFNCYDRQECVATKENPQVYFCCCEGNMCNEKFSYFPEMEVTQPTS |
| Chimera I65E N66T E81Q (SEQ ID NO: 37) | --GRGEAETRECIYYNANWELERTNQSGLERCEGEQDKRLHCYASWRNSSGTIEIVKQGCWLDD**ET**CYDRTDCVEKKDSPQVYFCCCEGNMCNEKFSYFPEMEVTQPTS |

ActRIIA *ActRIIB* *Non-ActRIIA or ActRIIB Substitution*

ACTIVIN RECEPTOR TYPE II CHIMERAS AND METHODS OF USE THEREOF

SEQUENCE LISTING

The instant application contains a Sequence Listing which has been submitted electronically in XML format and is hereby incorporated by reference in its entirety. Said XML copy, created on Oct. 19, 2022, is named 51184-013005_Sequence_Listing_1019_22 and is 400,402 bytes in size.

BACKGROUND OF THE INVENTION

Duchenne muscular dystrophy (DMD), facioscapulohumeral muscular dystrophy (FSHD), inclusion body myositis (IBM), and amyotrophic lateral sclerosis (ALS) are examples of muscle diseases that involve weakness and atrophy of muscles and/or motor neurons that control voluntary muscle movements. DMD is caused by mutations in the X-linked dystrophin gene and characterized by progressive muscle degeneration and weakness in all skeletal muscles. FSHD particularly affects skeletal muscles of the face, shoulders, upper arms, and lower legs. IBM is an inflammatory muscle disease that mainly affects muscles of the thighs and muscles of the arms that control finger and wrist flexion. ALS is a motor neuron disease characterized by stiff muscles, muscle twitching, and muscle atrophy throughout the body due to the degeneration of the motor neurons. Efforts to improve treatment and survival of subjects having these devastating muscle diseases have not been successful.

Healthy bone undergoes a constant remodeling that involves both bone breakdown and bone growth. Bone growth is mediated by the osteoblast cell type whereas the osteoclasts resorb the bone. Pathology occurs when these systems fall out of balance either through downregulation of the anabolic program, upregulation of the catabolic system or a combination of both, resulting in a net bone loss. Therefore, controlling the balance in bone remodeling can be useful for promoting the healing of damage to bone as well as the treatment of disorders, such as osteoporosis, associated with loss of bone mass and bone demineralization.

Bone damage can result from a range of root causes, including age- or cancer-related bone loss, genetic conditions, or adverse side effects of drug treatment. The World Health Organization estimates that osteoporosis alone affects 75 million people in the U.S., Europe, and Japan, and is a significant risk factor in bone damage. In general, the whole of bone loss represents pathological states for which there are few effective treatments. Treatment instead focuses on immobilization, exercise, and dietary modifications rather than agents that directly promote bone growth and increase bone density. With respect to osteoporosis, estrogen, calcitonin, osteocalcin with vitamin K, or high doses of dietary calcium are all used as therapeutic interventions. Other therapeutic approaches to osteoporosis include bisphosphonates, parathyroid hormone, parathyroid hormone related protein, calcimimetics, statins, anabolic steroids, lanthanum and strontium salts, and sodium fluoride. Such therapeutics, however, are often associated with undesirable side effects.

Fibrosis is the formation of excess connective tissue in an organ or tissue. The connective tissue, which can form in response to damage (e.g., injury) or as part of an immune response (e.g., an inflammatory response), can disrupt the structure and function of the organ or tissue in which it forms, leading to an increase in tissue stiffness. Fibrosis can occur in many organs and tissues within the body, including the lung (e.g., pulmonary fibrosis, cystic fibrosis), liver (e.g., cirrhosis), heart (e.g., endomyocardial fibrosis or fibrosis after myocardial infarction), brain (e.g., glial scar formation), skin (e.g., formation of keloids), kidney (e.g., renal fibrosis), and eye (e.g., corneal fibrosis), among others; and is known to be associated with certain medical treatments (e.g., chemotherapy, radiation therapy, and surgery). There are limited treatment options for patients with fibrosis, and most treatments are focused on improving quality of life or temporarily slowing disease progression.

Anemia is a global health problem with health implications that affect both morbidity and mortality. In the United States alone, the prevalence of anemia nearly doubled from 2003 to 2012. Symptoms of anemia include fatigue, weakness, shortness of breath, heart palpitations, and reduced cognitive performance, and children, pregnant women, women of reproductive age, and the elderly have been found to have the highest risk of developing anemia. The most common form of anemia is iron deficiency anemia, but anemia can also be caused by chronic diseases, blood loss, and red blood cell destruction. While iron deficiency anemia can be treated with iron supplements, many other forms of anemia, such as aplastic anemia, anemia of chronic disease, and hemolytic anemia may require blood transfusions.

Thrombocytopenia is a condition characterized by abnormally low levels of platelets, also called thrombocytes, in the blood, and occurs when the bone marrow makes too few platelets or when too many platelets are destroyed or accumulate within an enlarged spleen. Patients with thrombocytopenia may experience internal or external bleeding, bleeding under the skin, and/or bruising. Treatment for thrombocytopenia depends on its cause and severity and is primarily focused on preventing death or disability caused by bleeding. Certain types of thrombocytopenia (e.g., immune thrombocytopenia) may be treated using corticosteroids, but other types of thrombocytopenia may require splenectomy or platelet transfusion.

Neutropenia is a condition characterized by an abnormally low number of neutrophils in the blood. Neutrophils typically constitute 45% to 75% of all white blood cells in the bloodstream and serve as the primary defense against infections. Reduced numbers of neutrophils can lead to difficulty in controlling infections and increase the risk of dying from an infection. In patients with severe neutropenia, infections can rapidly become severe or fatal. Antibiotics are used treat infection in patients having neutropenia, but treatments for neutropenia itself are limited, and primarily involve the use of growth factors, such as colony stimulating factors, to stimulate the production of white blood cells. Blood transfusions have not proven effective.

Myelodysplastic syndromes, or MDS, is a collection of bone marrow disorders characterized by ineffective hematopoiesis, often with a dramatic expansion of progenitor cells that are unable to mature into functioning blood cells. In the United States, there are 60,000 to 170,000 patients with MDS and 15,000 to 20,000 new cases of MDS reported each year. MDS predominantly affects older adults, with approximately 75% of patients aged 60 years or older at diagnosis. Median survival ranges from approximately nine years for very low-risk patients to less than a year for high-risk patients. Anemia is the most frequent consequence of ineffective hematopoiesis in patients with MDS due to low red blood cell production, and impacts 90% of MDS patients. Another consequence is thrombocytopenia. Patients with MDS-associated anemia are generally treated with red blood cell transfusions and erythropoiesis stimulating agents (ESAs), which are not approved for such treatment. MDS-associated thrombocytopenia is treated with platelet transfusions and platelet-stimulating agents.

Myelofibrosis is an uncommon type of bone marrow cancer that disrupts the normal production of blood cells. It can cause extensive scarring in the bone marrow, leading to severe anemia and a low number of platelets. Symptoms of myelofibrosis include fatigue, bone pain, easy bruising, easy bleeding, and fever. Patients with aggressive or high-risk myelofibrosis may require a blood transfusion or bone marrow transplant. Other treatment options include therapies that have known risks, such as androgen therapy and treatment with thalidomide or related medications. For patients with intermediate-risk myelofibrosis, treatment is typically directed at symptom management.

Pulmonary hypertension (PH) is a serious condition characterized by higher than normal pressure in the blood vessels between the lungs and the heart. PH can be categorized into five major types: arterial (PAH), venous (PH secondary to left-sided heart disease), hypoxic (PH caused by lung disease), thromboembolic (PH caused by chronic arterial obstruction, e.g., blood clots), or miscellaneous (PH with unclear or multifactorial mechanisms), also known as WHO groups I-V. PAH features increased pressure in blood vessels of the lungs caused by obstruction in or narrowing of small blood vessels in the lungs due to scarring. This leads to increased resistance to blood flow through the lungs and forces the right side of the heart to work harder, which may lead to heart failure, reduced blood oxygenation, and reduced life expectancy. PAH can be idiopathic (e.g., having no identifiable cause), heritable (e.g., familial, often due to a genetic mutation), or may be related to drug use (e.g., methamphetamine or cocaine use), infection (e.g., HIV infection or schistosomiasis), cirrhosis of the liver, congenital heart abnormalities, or connective tissue/autoimmune disorders (e.g., scleroderma or lupus). Treatments for PH include vasodilators, anticoagulants, and supplemental oxygen, but these treatments manage disease symptoms rather than targeting the biological mechanisms that cause the disease.

Excess body weight is an increasing problem in large parts of the world, with about 39% of adults aged 18 years and over found to be overweight in 2016 and about 13% of the world's adult population found to be obese. Increased visceral and subcutaneous fact causes dysfunction of various organs. Excessive body weight is a risk factor for an array of complications, including diabetes (e.g., Type 1 and Type 2 diabetes), cardiovascular disease, and several forms of cancer. Insulin resistance is also associated with obesity and results in pancreatic tissues producing an elevated amount of insulin. Once pancreatic p cells can no longer produce sufficient insulin to meet the demand, hyperglycemia occurs and Type 2 diabetes develops. Adipocytes, which are increased in obesity, are believed to play a role in this process. Despite the prevalence of obesity and metabolic diseases few therapeutic options are available.

There exists a need for novel and effective treatments for muscular diseases, bone diseases, anemia, thrombocytopenia, neutropenia, myelofibrosis, myelodysplastic syndromes, fibrosis, PH, and metabolic diseases.

SUMMARY OF THE INVENTION

The present invention features polypeptides that include an extracellular activin receptor type II (ActRII) chimera. In some embodiments, a polypeptide of the invention includes an extracellular ActRII chimera fused to the N- or C-terminus of an Fc domain monomer or another moiety. Such moieties may be attached by amino acid or other covalent bonds and may increase stability of the polypeptide. A polypeptide including an extracellular ActRII chimera fused to an Fc domain monomer may also form a dimer (e.g., a homodimer or heterodimer) through the interaction between two Fc domain monomers. The polypeptides of the invention may be used to increase lean mass, muscle mass, and/or strength in a subject having or at risk of developing a disease or condition involving weakness and atrophy of muscles, e.g., a neuromuscular disease, sarcopenia, cachexia, disuse atrophy, treatment related muscle loss or atrophy, hypotonia, hypoxia, or muscle loss or atrophy associated with a burn injury. The polypeptides of the invention may also be used to increase bone mass or bone mineral density in a subject having or at risk of developing a disease or condition involving bone damage, e.g., osteoporosis (e.g., primary osteoporosis or secondary osteoporosis), osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss (e.g., bone loss associated with a burn injury), anorexia-related bone loss, diet-related bone loss, bone loss associated with the treatment of obesity, low gravity-related bone loss, or immobility. Additionally, the polypeptides of the invention may be used to increase red blood cell levels (e.g., increase hemoglobin levels, increase hematocrit, and/or increase red blood cell count), promote or increase the maturation and/or differentiation of erythroid progenitors, increase late-stage erythroid precursor maturation, or recruit early-stage progenitors into the erythroid lineage in a subject in need thereof, e.g., a subject having or at risk of developing anemia or blood loss, to increase platelet levels (e.g., increase platelet count) in a subject in need thereof, e.g., a subject having or at risk of developing thrombocytopenia, to increase neutrophil levels (e.g., increase neutrophil count) in a subject in need thereof, e.g., a subject having or at risk of developing neutropenia, to prevent or reduce fibrosis in a subject having or at risk of developing fibrosis, or to treat, prevent, or delay the development or progression of pulmonary hypertension in a subject having or at risk of developing pulmonary hypertension (e.g., arterial, venous, hypoxic, thromboembolic, or miscellaneous pulmonary hypertension). The polypeptides of the invention may also be used to reduce body weight, reduce body fat, increase glucose clearance, increase insulin sensitivity, or reduce fasting insulin levels in a subject having or at risk of developing a metabolic disease, e.g., obesity, Type 1 diabetes, or Type 2 diabetes. Further, the polypeptides of the invention may also be used to affect myostatin, activin (e.g., activin A and/or activin B), and/or bone morphogenetic protein 9 (BMP9) signaling in a subject having a risk of developing or having a disease or condition involving weakness and atrophy of muscles, bone damage or bone demineralization, low blood cell levels (e.g., low hemoglobin levels, low hematocrit, and/or low red blood cell counts), low platelet levels (e.g., low platelet counts), low neutrophil levels (e.g., low neutrophil counts), fibrosis, pulmonary hypertension (e.g., arterial, venous, hypoxic, thromboembolic, or miscellaneous pulmonary hypertension), or a metabolic disease (e.g., obesity, Type 1 diabetes, or Type 2 diabetes).

Exemplary embodiments of the invention are described in the enumerated paragraphs below.

E1. A polypeptide containing an extracellular ActRII chimera, the chimera having a sequence of any one of (SEQ ID NO: 1)
GAILGRAETRECIYYNANWELERTNQSGLERCEGEQ$X_1$KRRHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 2)
GAILGRAETRECIYYNANWELERTNQSGLERCEGEQ$X_1$KRLHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 3)
GAILGRAETRECIYYNANWELERTNQSGLERCEGEQ$X_1$KRLHCYASWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 4)
GAILGRAETRECIYYNANWELERTNQSGLERCEGEQ$X_1$KRLHCYASWRNSSGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 5)
GAILGRAETRECIYYNANWELERTNQSGLERCEGEQ$X_1$KRLHCYASWRNSSGTIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 6)
GAILGRAETRECIYYNANWELERTNQSGLERCEGEQ$X_1$KRLHCYASWRNSSGTIELVKKGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 7)
GAILGRAETRECIYYNANWELERTNQSGLERCEGEQ$X_1$KRLHCYASWRNSSGTIELVKKGCWLDD$X_2$$X_3$CYDRQECV$X_4$$X_5$$X_6$$X_7$$X_8$P$X_9$VYFCCCEGNMCNEKFSYFPEMEVTQPTS, (SEQ ID NO: 8)
GRGEAETRECIYYNANWELERTNQSGLERCEGEQ$X_1$KRRHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 9)
GRGEAETRECIYYNANWELERTNQSGLERCEGEQ$X_1$KRLHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, -continued (SEQ ID NO: 10)
GRGEAETRECIYYNANWELERTNQSGLERCEGEQ$X_1$KRLHCYASWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 11)
GRGEAETRECIYYNANWELERTNQSGLERCEGEQ$X_1$KRLHCYASWRNSSGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 12)
GRGEAETRECIYYNANWELERTNQSGLERCEGEQ$X_1$KRLHCYASWRNSSGTIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 13)
GRGEAETRECIYYNANWELERTNQSGLERCEGEQ$X_1$KRLHCYASWRNSSGTIELVKKGCWLDD$X_2$$X_3$CYDRTDCV$X_4$$X_5$$X_6$$X_7$$X_8$P$X_9$VYFCCCEGNMCNEKFSYFPEMEVTQPTS, and (SEQ ID NO: 14)
GRGEAETRECIYYNANWELERTNQSGLERCEGEQ$X_1$KRLHCYASWRNSSGTIELVKKGCWLDD $X_2$$X_3$CYDRQECV$X_4$$X_5$$X_6$$X_7$$X_8$P$X_9$VYFCCCEGNMCNEKFSYFPEMEVTQPTS, in which $X_1$ is D or R, $X_2$ is I, F, E, D, Y, S, N, Q, or T, $X_3$ is N or T, $X_4$ is A or E, $X_5$ is T or K, $X_6$ is E or K, $X_7$ is E or D, $X_8$ is N or S, and $X_9$ is Q, E, K, R, D, or N, optionally wherein the chimera is truncated from the N-terminus by deletion of 1, 2, 3, 4, 5, 6, 7, 8, or 9 amino acids, wherein the chimera retains the two amino acids before the first cysteine.

E2. A polypeptide containing an extracellular ActRII chimera, the chimera having a sequence of any one of (SEQ ID NO: 15)
GAILGRSETQECIYYNANWELERTNQSGLERCEGEQ$X_1$KRRHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, (SEQ ID NO: 16)
GAILGRSETQECIYYNANWELERTNQSGLERCEGEQ$X_1$KRLHCFATWKNISGSIEIVKQGCWLDD$X_2$$X_3$CYDRTDCV$X_4$$X_5$$X_6$$X_7$$X_8$P$X_9$VYFCCCEGNMCNEKFSYFPEMEVTQPTS, GAILGRSETQECIYYNANWELERTNQSGLERCEGEQ$X_1$ (SEQ ID NO: 17)
KRLHCYASWKNISGSIEIVKQGCWLDD$X_2$$X_3$CYDRTDC -continued

VX$_4$X$_5$X$_6$X$_7$X$_8$PX$_9$VYFCCCEGNMCNEKFSYFPEMEVT
QPTS, (SEQ ID NO: 18)
GAILGRSETQECIYYNANWELERTNQSGLERCEGEQX$_1$
KRLHCYASWRNSSGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 19)
GAILGRSETQECIYYNANWELERTNQSGLERCEGEQX$_1$
KRLHCYASWRNSSGTIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 20)
GAILGRSETQECIYYNANWELERTNQSGLERCEGEQX$_1$
KRLHCYASWRNSSGTIELVKKGCWLDDX$_2$X$_3$CYDRTDC
VX$_4$X$_5$X$_6$X$_7$X$_8$PX$_9$VYFCCCEGNMCNEKFSYFPEMEVT
QPTS, and (SEQ ID NO: 21)
GAILGRSETQECIYYNANWELERTNQSGLERCEGEQX$_1$
KRLHCYASWRNSSGTIELVKKGCWLDDX$_2$X$_3$CYDRQEC
VX$_4$X$_5$X$_6$X$_7$X$_8$PX$_9$VYFCCCEGNMCNEKFSYFPEMEVT
QPTS, in which $X_1$ is D or R, $X_2$ is I, F, E, D, Y, S, N, Q, or T, $X_3$ is N or T, $X_4$ is A or E, $X_5$ is T or K, $X_6$ is E or K, $X_7$ is E or D, $X_8$ is N or S, and $X_9$ is Q, E, K, R, D, or N, optionally wherein the chimera is truncated from the N-terminus by deletion of 1, 2, 3, 4, 5, 6, 7, 8, or 9 amino acids, wherein the chimera retains the two amino acids before the first cysteine.

E3. The polypeptide of E1, wherein the chimera has the sequence of (SEQ ID NO: 1)
GAILGRAETRECIYYNANWELERTNQSGLERCEGEQX$_1$
KRRHCFATWKNISGSIEIVKQGCWLDDX$_2$X$_3$CYDRTDC
VX$_4$X$_5$X$_6$X$_7$X$_8$PXVYFCCCEGNMCNEKFSYFPEMEVTQ
PTS.

E4. The polypeptide of E1, wherein the chimera has the sequence of (SEQ ID NO: 2)
GAILGRAETRECIYYNANWELERTNQSGLERCEGEQX$_1$
KRLHCFATWKNISGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS.

E5. The polypeptide of E1, wherein the chimera has the sequence of (SEQ ID NO: 3)
GAILGRAETRECIYYNANWELERTNQSGLERCEGEQX$_1$
KRLHCYASWKNISGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS.

E6. The polypeptide of E1, wherein the chimera has the sequence of (SEQ ID NO: 4)
GAILGRAETRECIYYNANWELERTNQSGLERCEGEQX$_1$
KRLHCYASWRNSSGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS.

E7. The polypeptide of E1, wherein the chimera has the sequence of (SEQ ID NO: 5)
GAILGRAETRECIYYNANWELERTNQSGLERCEGEQX$_1$
KRLHCYASWRNSSGTIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS.

E8. The polypeptide of E1, wherein the chimera has the sequence of (SEQ ID NO: 6)
GAILGRAETRECIYYNANWELERTNQSGLERCEGEQX$_1$
KRLHCYASWRNSSGTIELVKKGCWLDDX$_2$X$_3$CYDRTDC
VX$_4$X$_5$X$_6$X$_7$X$_8$PX$_9$VYFCCCEGNMCNEKFSYFPEMEVT
QPTS.

E9. The polypeptide of E1, wherein the chimera has the sequence of (SEQ ID NO: 7)
GAILGRAETRECIYYNANWELERTNQSGLERCEGEQX$_1$KR
LHCYASWRNSSGTIELVKKGCWLDDX$_2$XCYDRQECVX$_4$X$_5$
X$_6$X$_7$XPXVYFCCCEGNMCNEKFSYFPEMEVTQPTS.

E10. The polypeptide of E1, wherein the chimera has the sequence of (SEQ ID NO: 8)
GRGEAETRECIYYNANWELERTNQSGLERCEGEQX$_1$KRRH
CFATWKNISGSIEIVKQGCWLDDX$_2$X$_3$CYDRTDCVX$_4$X$_5$
X$_6$X$_7$XPXVYFCCCEGNMCNEKFSYFPEMEVTQPTS.

E11. The polypeptide of E1, wherein the chimera has the sequence of (SEQ ID NO: 9)
GRGEAETRECIYYNANWELERTNQSGLERCEGEQ$X_1$KRLH
CFATWKNISGSIEIVKQGCWLDD$X_2X_3$CYDRTDCV$X_4X_5$
$X_6X_7X_8$PXVYFCCCEGNMCNEKFSYFPEMEVTQPTS.

E12. The polypeptide of E1, wherein the chimera has the sequence of (SEQ ID NO: 10)
GRGEAETRECIYYNANWELERTNQSGLERCEGEQXKRLHC
YASWKNISGSIEIVKQGCWLDD$X_2X_3$CYDRTDCV$X_4X_5X_6$
$X_7$XPXVYFCCCEGNMCNEKFSYFPEMEVTQPTS.

E13. The polypeptide of E1, wherein the chimera has the sequence of (SEQ ID NO: 11)
GRGEAETRECIYYNANWELERTNQSGLERCEGEQ$X_1$KRLH
CYASWRNSSGSIEIVKQGCWLDD$X_2X_3$CYDRTDCV$X_4X_5$
$X_6X_7X_8$PXVYFCCCEGNMCNEKFSYFPEMEVTQPTS.

E14. The polypeptide of E1, wherein the chimera has the sequence of (SEQ ID NO: 12)
GRGEAETRECIYYNANWELERTNQSGLERCEGEQ$X_1$KRLH
CYASWRNSSGTIEIVKQGCWLDD$X_2X_3$CYDRTDCV$X_4X_5$
$X_6$X$X_8$PXVYFCCCEGNMCNEKFSYFPEMEVTQPTS.

E15. The polypeptide of E1, wherein the chimera has the sequence of (SEQ ID NO: 13)
GRGEAETRECIYYNANWELERTNQSGLERCEGEQ$X_1$KRLH
CYASWRNSSGTIELVKKGCWLDD$X_2X_3$CYDRTDCV$X_4X_5X_6$
X$X_8$PXVYFCCCEGNMCNEKFSYFPEMEVTQPTS.

E16. The polypeptide of E1, wherein the chimera has the sequence of (SEQ ID NO: 14)
GRGEAETRECIYYNANWELERTNQSGLERCEGEQ$X_1$KRLH
CYASWRNSSGTIELVKKGCWLDD$X_2X_3$CYDRQECV$X_4X_5X_6$
$X_7$XPXVYFCCCEGNMCNEKFSYFPEMEVTQPTS.

E17. The polypeptide of E2, wherein the chimera has the sequence of (SEQ ID NO: 15)
GAILGRSETQECIYYNANWELERTNQSGLERCEGEQ$X_1$KR
RHCFATWKNISGSIEIVKQGCWLDD$X_2X_3$CYDRTDCV$X_4X_5$
$X_6X_7X_8$PXVYFCCCEGNMCNEKFSYFPEMEVTQPTS.

E18. The peptide of E2, wherein the chimera has the sequence of (SEQ ID NO: 16)
GAILGRSETQECIYYNANWELERTNQSGLERCEGEQ$X_1$KR
LHCFATWKNISGSIEIVKQGCWLDD$X_2X_3$CYDRTDCV$X_4X_5$
$X_6X_7$XPXVYFCCCEGNMCNEKFSYFPEMEVTQPTS.

E19. The polypeptide of E2, wherein the chimera has the sequence of (SEQ ID NO: 17)
GAILGRSETQECIYYNANWELERTNQSGLERCEGEQ$X_1$KR
LHCYASWKNISGSIEIVKQGCWLDD$X_2X_3$CYDRTDCV$X_4X_5$
$X_6X_7X_8$PXVYFCCCEGNMCNEKFSYFPEMEVTQPTS.

E20. The polypeptide of E2, wherein the chimera has the sequence of (SEQ ID NO: 18)
GAILGRSETQECIYYNANWELERTNQSGLERCEGEQ$X_1$KR
LHCYASWRNSSGSIEIVKQGCWLDD$X_2X_3$CYDRTDCV$X_4X_5$
$X_6X_7X_8$PXVYFCCCEGNMCNEKFSYFPEMEVTQPTS.

E21. The polypeptide of E2, wherein the chimera has the sequence of (SEQ ID NO: 19)
GAILGRSETQECIYYNANWELERTNQSGLERCEGEQ$X_1$KR
LHCYASWRNSSGTIEIVKQGCWLDD$X_2X_3$CYDRTDCV$X_4X_5$
$X_6X_7X_8$PXVYFCCCEGNMCNEKFSYFPEMEVTQPTS.

E22. The polypeptide of E2, wherein the chimera has the sequence of (SEQ ID NO: 20)
GAILGRSETQECIYYNANWELERTNQSGLERCEGEQ$X_1$KR
LHCYASWRNSSGTIELVKKGCWLDD$X_2X_3$CYDRTDCV$X_4X_5$
$X_6X_7X_8$PXVYFCCCEGNMCNEKFSYFPEMEVTQPTS.

E23. The polypeptide of E2, wherein the chimera has the sequence of

E24. The polypeptide of any one of E1-E23, wherein $X_1$ is D.

(SEQ ID NO: 21)
GAILGRSETQECIYYNANWELERTNQSGLERCEGEQ$X_1$KR
LHCYASWRNSSGTIELVKKGCWLDD$X_2$XCYDRQECV$X_4X_5$
$X_6X_7$XPXVYFCCCEGNMCNEKFSYFPEMEVTQPTS.

E25. The polypeptide of any one of E1-E23, wherein $X_1$ is R.

E26. The polypeptide of any one of E1-E25, wherein $X_2$ is I.

E27. The polypeptide of any one of E1-E25, wherein $X_2$ is F.

E28. The polypeptide of any one of E1-E25, wherein $X_2$ is E.

E29. The polypeptide of any one of E1-E25, wherein $X_2$ is D.

E30. The polypeptide of any one of E1-E25, wherein $X_2$ is Y.

E31. The polypeptide of any one of E1-E25, wherein $X_2$ is S.

E32. The polypeptide of any one of E1-E25, wherein $X_2$ is N.

E33. The polypeptide of any one of E1-E25, wherein $X_2$ is Q.

E34. The polypeptide of any one of E1-E25, wherein $X_2$ is T.

E35. The polypeptide of any one of E1-E34, wherein $X_3$ is N.

E36. The polypeptide of any one of E1-E34, wherein $X_3$ is T.

E37. The polypeptide of any one of E1-E36, wherein $X_4$ is A.

E38. The polypeptide of any one of E1-E36, wherein $X_4$ is E.

E39. The polypeptide of any one of E1-E38, wherein $X_5$ is T.

E40. The polypeptide of any one of E1-E38, wherein $X_5$ is K.

E41. The polypeptide of any one of E1-E40, wherein $X_6$ is E.

E42. The polypeptide of any one of E1-E40, wherein $X_6$ is K.

E43. The polypeptide of any one of E1-E42, wherein $X_7$ is E.

E44. The polypeptide of any one of E1-E42, wherein $X_7$ is D.

E45. The polypeptide of any one of E1-E44, wherein $X_8$ is N.

E46. The polypeptide of any one of E1-E44, wherein $X_8$ is S.

E47. The polypeptide of any one of E1-E46, wherein $X_9$ is Q.

E48. The polypeptide of any one of E1-E46, wherein $X_9$ is E.

E49. The polypeptide of any one of E1-E46, wherein $X_9$ is K.

E50. The polypeptide of any one of E1-E46, wherein $X_9$ is R.

E51. The polypeptide of any one of E1-E46, wherein $X_9$ is D.

E52. The polypeptide of any one of E1-E46, wherein $X_9$ is N.

E53. The polypeptide of any one of E1-E52, wherein $X_5$ is T, $X_6$ is E, $X_7$ is E, and $X_8$ is N.

E54. The polypeptide of any one of E1-E52, wherein $X_5$ is T, $X_6$ is K, $X_7$ is E, and $X_8$ is N.

E55. The polypeptide of any one of E1-E54, wherein $X_2$ is E and $X_3$ is T.

E56. The polypeptide of any one of E1-E54, wherein $X_2$ is I or F and $X_3$ is N.

E57. The polypeptide of E56, wherein $X_2$ is I.

E58. The polypeptide of E56, wherein $X_2$ is F.

E59. The polypeptide of E1 or E2, wherein the chimera has the sequence of any one of SEQ ID NOs: 22-43.

E60. The polypeptide of E59, wherein the chimera has the sequence of SEQ ID NO: 22.

E61. The polypeptide of E59, wherein the chimera has the sequence of SEQ ID NO: 23.

E62. The polypeptide of E59, wherein the chimera has the sequence of SEQ ID NO: 24.

E63. The polypeptide of E59, wherein the chimera has the sequence of SEQ ID NO: 25.

E64. The polypeptide of E59, wherein the chimera has the sequence of SEQ ID NO: 40.

E65. The polypeptide of E59, wherein the chimera has the sequence of SEQ ID NO: 41.

E66. The polypeptide of E59, wherein the chimera has the sequence of SEQ ID NO: 28.

E67. The polypeptide of E59, wherein the chimera has the sequence of SEQ ID NO: 42.

E68. The polypeptide of E59, wherein the chimera has the sequence of SEQ ID NO: 43.

E69. The polypeptide of E59, wherein the chimera has the sequence of SEQ ID NO: 37.

E70. The polypeptide of any one of E1-E69, wherein the chimera is truncated from the N-terminus by deletion of one amino acid.

E71. The polypeptide of any one of E1-E69, wherein the chimera is truncated from the N-terminus by deletion of two amino acids.

E72. The polypeptide of any one of E1-E69, wherein the chimera is truncated from the N-terminus by deletion of three amino acids.

E73. The polypeptide of any one of E1-E69, wherein the chimera is truncated from the N-terminus by deletion of four amino acids.

E74. The polypeptide of any one of E1-E69, wherein the chimera is truncated from the N-terminus by deletion of five amino acids.

E75. The polypeptide of any one of E1-E69, wherein the chimera is truncated from the N-terminus by deletion of six amino acids.

E76. The polypeptide of any one of E1-E69, wherein the chimera is truncated from the N-terminus by deletion of seven amino acids.

E77. The polypeptide of any one of E1-E69, wherein the chimera is truncated from the N-terminus by deletion of eight amino acids.

E78. The polypeptide of any one of E1-E69, wherein the chimera is truncated from the N-terminus by deletion of nine amino acids.

E79. The polypeptide of any one of E1, E2, and E70-E78, wherein the chimera has the sequence of any one of SEQ ID NOs: 111-183.

E80. The polypeptide of E79, wherein the chimera has the sequence of SEQ ID NO: 111.

E81. The polypeptide of E79, wherein the chimera has the sequence of SEQ ID NO: 116.

E82. The polypeptide of E79, wherein the chimera has the sequence of SEQ ID NO: 117.

E83. The polypeptide of E79, wherein the chimera has the sequence of SEQ ID NO: 118.

E84. The polypeptide of E79, wherein the chimera has the sequence of SEQ ID NO: 119.

E85. The polypeptide of E79, wherein the chimera has the sequence of SEQ ID NO: 120.

E86. The polypeptide of E79, wherein the chimera has the sequence of SEQ ID NO: 121.

E87. The polypeptide of E79, wherein the chimera has the sequence of SEQ ID NO: 122.

E88. The polypeptide of E79, wherein the chimera has the sequence of SEQ ID NO: 126.

E89. The polypeptide of E79, wherein the chimera has the sequence of SEQ ID NO: 130.

E90. The polypeptide of E79, wherein the chimera has the sequence of SEQ ID NO: 142.

E91. The polypeptide of E79, wherein the chimera has the sequence of SEQ ID NO: 143.

E92. The polypeptide of E79, wherein the chimera has the sequence of SEQ ID NO: 146.

E93. The polypeptide of E79, wherein the chimera has the sequence of SEQ ID NO: 147.

E94. The polypeptide of E79, wherein the chimera has the sequence of SEQ ID NO: 150.

E95. The polypeptide of E79, wherein the chimera has the sequence of SEQ ID NO: 151.

E96. The polypeptide of E79, wherein the chimera has the sequence of SEQ ID NO: 152.

E97. The polypeptide of E79, wherein the chimera has the sequence of SEQ ID NO: 153.

E98. The polypeptide of E79, wherein the chimera has the sequence of SEQ ID NO: 154.

E99. The polypeptide of E79, wherein the chimera has the sequence of SEQ ID NO: 155.

E100. The polypeptide of E79, wherein the chimera has the sequence of SEQ ID NO: 156.

E101. The polypeptide of E79, wherein the chimera has the sequence of SEQ ID NO: 158.

E102. The polypeptide of E79, wherein the chimera has the sequence of SEQ ID NO: 159.

E103. The polypeptide of E79, wherein the chimera has the sequence of SEQ ID NO: 162.

E104. The polypeptide of E79, wherein the chimera has the sequence of SEQ ID NO: 163.

E105. The polypeptide of E79, wherein the chimera has the sequence of SEQ ID NO: 164.

E106. The polypeptide of any one of E1-E105, wherein the polypeptide (e.g., the chimera) further includes a C-terminal extension of one or more amino acids (e.g., 1, 2, 3, 4, 5, 6, or more amino acids from wild-type extracellular ActRIIA or ActRIIB).

E107. The polypeptide of E106, wherein the C-terminal extension is NP.

E108. The polypeptide of E106, wherein the C-terminal extension is NPVTPK (SEQ ID NO: 104).

E109. The polypeptide of any one of E1-E108, wherein the polypeptide further includes an Fc domain monomer fused to the C-terminus of the polypeptide (e.g., the C-terminus of the chimera) by way of a linker.

E110. The polypeptide of E109, wherein the Fc domain monomer has the sequence of SEQ ID NO: 48.

E111. The polypeptide of E109 or E110, wherein the polypeptide forms a dimer.

E112. The polypeptide of any one of E1-E108, wherein the polypeptide further includes a wild-type Fc domain fused to the C-terminus of the polypeptide (e.g., the C-terminus of the chimera) by way of a linker.

E113. The polypeptide of E112, wherein the wild-type Fc domain has the sequence of SEQ ID NO: 100 or SEQ ID NO: 264.

E114. The polypeptide of E112 or E113, wherein the polypeptide has the sequence of any one of SEQ ID NOs: 107-110 and SEQ ID NOs: 184-263.

E115. The polypeptide of E114, wherein the polypeptide has the sequence of SEQ ID NO: 107.

E116. The polypeptide of E114, wherein the polypeptide has the sequence of SEQ ID NO: 108.

E117. The polypeptide of E114, wherein the polypeptide has the sequence of SEQ ID NO: 109.

E118. The polypeptide of E114, wherein the polypeptide has the sequence of SEQ ID NO: 110.

E119. The polypeptide of E114, wherein the polypeptide has the sequence of SEQ ID NO: 184.

E120. The polypeptide of E114, wherein the polypeptide has the sequence of SEQ ID NO: 189.

E121. The polypeptide of E114, wherein the polypeptide has the sequence of SEQ ID NO: 190.

E122. The polypeptide of E114, wherein the polypeptide has the sequence of SEQ ID NO: 191.

E123. The polypeptide of E114, wherein the polypeptide has the sequence of SEQ ID NO: 192.

E124. The polypeptide of E114, wherein the polypeptide has the sequence of SEQ ID NO: 193.

E125. The polypeptide of E114, wherein the polypeptide has the sequence of SEQ ID NO: 194.

E126. The polypeptide of E114, wherein the polypeptide has the sequence of SEQ ID NO: 195.

E127. The polypeptide of E114, wherein the polypeptide has the sequence of SEQ ID NO: 199.

E128. The polypeptide of E114, wherein the polypeptide has the sequence of SEQ ID NO: 200.

E129. The polypeptide of E114, wherein the polypeptide has the sequence of SEQ ID NO: 213.

E130. The polypeptide of E114, wherein the polypeptide has the sequence of SEQ ID NO: 214.

E131. The polypeptide of E114, wherein the polypeptide has the sequence of SEQ ID NO: 215.

E132. The polypeptide of E114, wherein the polypeptide has the sequence of SEQ ID NO: 216.

E133. The polypeptide of E114, wherein the polypeptide has the sequence of SEQ ID NO: 217.

E134. The polypeptide of E114, wherein the polypeptide has the sequence of SEQ ID NO: 218.

E135. The polypeptide of E114, wherein the polypeptide has the sequence of SEQ ID NO: 221.

E136. The polypeptide of E114, wherein the polypeptide has the sequence of SEQ ID NO: 222.

E137. The polypeptide of E114, wherein the polypeptide has the sequence of SEQ ID NO: 225.

E138. The polypeptide of E114, wherein the polypeptide has the sequence of SEQ ID NO: 226.

E139. The polypeptide of E114, wherein the polypeptide has the sequence of SEQ ID NO: 229.

E140. The polypeptide of E114, wherein the polypeptide has the sequence of SEQ ID NO: 230.

E141. The polypeptide of E114, wherein the polypeptide has the sequence of SEQ ID NO: 231.

E142. The polypeptide of E114, wherein the polypeptide has the sequence of SEQ ID NO: 232.

E143. The polypeptide of E114, wherein the polypeptide has the sequence of SEQ ID NO: 233.

E144. The polypeptide of E114, wherein the polypeptide has the sequence of SEQ ID NO: 234.

E145. The polypeptide of E114, wherein the polypeptide has the sequence of SEQ ID NO: 235.

E146. The polypeptide of E114, wherein the polypeptide has the sequence of SEQ ID NO: 236.

E147. The polypeptide of E114, wherein the polypeptide has the sequence of SEQ ID NO: 237.

E148. The polypeptide of E114, wherein the polypeptide has the sequence of SEQ ID NO: 238.

E149. The polypeptide of any one of E1-E108, wherein the polypeptide further includes an Fc domain containing amino acid substitutions fused to the C-terminus of the polypeptide (e.g., the C-terminus of the chimera) by way of a linker.

E150. The polypeptide of E149, wherein the Fc domain does not form a dimer.

E151. The polypeptide of any one of E1-E108, wherein the polypeptide further includes an albumin-binding peptide fused to the C-terminus of the polypeptide (e.g., the C-terminus of the chimera) by way of a linker.

E152. The polypeptide of E151, wherein the albumin-binding peptide has the sequence of SEQ ID NO: 101.

E153. The polypeptide of any one of E1-E108, wherein the polypeptide further includes a fibronectin domain fused to the C-terminus of the polypeptide (e.g., the C-terminus of the chimera) by way of a linker.

E154. The polypeptide of E153, wherein the fibronectin domain has the sequence of SEQ ID NO: 102.

E155. The polypeptide of any one of E1-E108, wherein the polypeptide further includes a human serum albumin fused to the C-terminus of the polypeptide (e.g., the C-terminus of the chimera) by way of a linker.

E156. The polypeptide of E155, wherein the human serum albumin has the sequence of SEQ ID NO: 103.

E157. The polypeptide of any one of E109-E156, wherein the linker is an amino acid spacer.

E158. The polypeptide of E157, wherein the amino acid spacer is GGG, GGGA (SEQ ID NO: 49), GGGG (SEQ ID NO: 51), GGGAG (SEQ ID NO: 81), GGGAGG (SEQ ID NO: 82), or GGGAGGG (SEQ ID NO: 83).

E159. The polypeptide of E157, wherein the amino acid spacer is GA, GS, GG, GGA, GGS, GGGS (SEQ ID NO: 50), GGGGA (SEQ ID NO: 52), GGGGS (SEQ ID NO: 53), GGGGG (SEQ ID NO: 54), GGAG (SEQ ID NO: 55), GGSG (SEQ ID NO: 56), AGGG (SEQ ID NO: 57), SGGG (SEQ ID NO: 58), GAGA (SEQ ID NO: 59), GSGS (SEQ ID NO: 60), GAGAGA (SEQ ID NO: 61), GSGSGS (SEQ ID NO: 62), GAGAGAGA (SEQ ID NO: 63), GSGSGSGS (SEQ ID NO: 64), GAGAGAGAGA (SEQ ID NO: 65), GSGSGSGSGS (SEQ ID NO: 66), GAGAGAGAGAGA (SEQ ID NO: 67), GSGSGSGSGSGS (SEQ ID NO: 68), GGAGGA (SEQ ID NO: 69), GGSGGS (SEQ ID NO: 70), GGAGGAGGA (SEQ ID NO: 71), GGSGGSGGS (SEQ ID NO: 72), GGAGGAGGAGGA (SEQ ID NO: 73), and GGSGGSGGSGGS (SEQ ID NO: 74), GGAGGGAG (SEQ ID NO: 75), GGSGGGSG (SEQ ID NO: 76), GGAGGGAGGGAG (SEQ ID NO: 77), and GGSGGGSGGGSG (SEQ ID NO: 78), GGGGAGGGGAGGGGA (SEQ ID NO: 79), GGGGSGGGGSGGGGS (SEQ ID NO: 80), AAAL (SEQ ID NO: 84), AAAK (SEQ ID NO: 85), AAAR (SEQ ID NO: 86), EGKSSGSGSESKST (SEQ ID NO: 87), GSAGSAAGSGEF (SEQ ID NO: 88), AEAAAKEAAAKA (SEQ ID NO: 89), KESGSVSSEQLAQFRSLD (SEQ ID NO: 90), GENLYFQSGG (SEQ ID NO: 91), SACYCELS (SEQ ID NO: 92), RSIAT (SEQ ID NO: 93), RPACKIPNDLKQKVMNH (SEQ ID NO: 94), GGSAGGSGSGSSGGSSGASGTGTAGGTGSGSGTGSG (SEQ ID NO: 95), AAANSSIDLISVPVDSR (SEQ ID NO: 96), GGSGGGSEGGGSEGGGSEGGGSEGGGSEGGGSGGGS (SEQ ID NO: 97), EAAAK (SEQ ID NO: 98), or PAPAP (SEQ ID NO: 99).

E160. The polypeptide of any one of E1-E159, wherein the polypeptide (e.g., an ActRII chimera-Fc fusion protein) has a serum half-life of at least seven days.

E161. The polypeptide of any one of E1-E160, wherein the polypeptide has increased binding to one or more an ActRII ligands (e.g., activin A, activin B, myostatin, and/or GDF-11) compared to wild-type ActRIIA and/or wild-type ActRIIB (e.g., wild-type extracellular ActRIIA and/or ActRIIB).

E162. The polypeptide of any one of E1-E161, wherein the polypeptide has decreased binding to bone morphogenetic protein 9 (BMP9, e.g., human BMP9) compared to wild-type ActRIIB (e.g., wild-type extracellular ActRIIB).

E163. The polypeptide of any one of E1-E162, wherein the polypeptide binds to activin A, activin B, and/or myostatin and has reduced or weak binding to human BMP9 (e.g., compared to wild-type extracellular ActRIIB).

E164. The polypeptide of any one of E1-E163, wherein the polypeptide does not substantially bind to human BMP9.

E165. The polypeptide of any one of E1-E164, wherein the polypeptide binds to human activin A with a $K_D$ of 800 μM or less.

E166. The polypeptide of any one of E1-E165, wherein the polypeptide binds to human activin B with a $K_D$ of 800 μM or less.

E167. The polypeptide of any one of E1-E166, wherein the polypeptide binds to human GDF-11 with a $K_D$ of 5 μM or higher.

E168. A nucleic acid molecule encoding the polypeptide of any one of E1-E167.

E169. A vector including the nucleic acid molecule of E168.

E170. A host cell that expresses the polypeptide of any one of E1-E167, wherein the host cell includes the nucleic acid molecule of E168 or the vector of E169, wherein the nucleic acid molecule or vector is expressed in the host cell.

E171. A method of preparing the polypeptide of any one of E1-E167, wherein the method includes: a) providing a host cell containing the nucleic acid molecule of E168 or the vector of E169, and b) expressing the nucleic acid molecule or vector in the host cell under conditions that allow for the formation of the polypeptide.

E172. A pharmaceutical composition including the polypeptide of any one of E1-E167, the nucleic acid molecule of E168, or the vector of E169 and one or more pharmaceutically acceptable carriers or excipients.

E173. The pharmaceutical composition of E172, wherein the polypeptide, nucleic acid molecule, or vector is in a therapeutically effective amount.

E174. A construct including two identical polypeptides (e.g., a homodimer), each including an extracellular ActRII chimera of any one of E1-E108 (e.g., an ActRII chimera having a sequence of any one of SEQ ID NOs: 1-43 and 111-183) fused to the N- or C-terminus of an Fc domain monomer (e.g., the sequence of SEQ ID NO: 48). The two Fc domain monomers in the two polypeptides interact to form an Fc domain in the construct.

E175. A construct including two different polypeptides (e.g., a heterodimer), each including an extracellular ActRII chimera of any one of E1-E108 (e.g., an ActRII chimera having a sequence of any one of SEQ ID NOs: 1-43 and 111-183) fused to the N- or C-terminus of an Fc domain monomer (e.g., the sequence of SEQ ID NO: 48). The two Fc domain monomers in the two polypeptides interact to form an Fc domain in the construct.

E176. A method of increasing lean mass in a subject in need thereof, comprising administering to the subject a therapeutically effective amount of the polypeptide of any one of E1-E167, the nucleic acid molecule of E168, the vector of E169, the construct of E174 or E175, or the pharmaceutical composition of E172 or E173.

E177. A method of increasing muscle mass in a subject in need thereof, comprising administering to the subject a therapeutically effective amount of the polypeptide of any one of E1-E167, the nucleic acid molecule of E168, the vector of E169, the construct of E174 or E175, or the pharmaceutical composition of E172 or E173.

E178. A method of increasing muscle strength in a subject in need thereof, comprising administering to the subject a therapeutically effective amount of the polypeptide of any one of E1-E167, the nucleic acid molecule of E168, the vector of E169, the construct of E174 or E175, or the pharmaceutical composition of E172 or E173.

E179. The method of any one of E176-E178, wherein the subject has or is at risk of developing a neuromuscular disease, sarcopenia, cachexia, disuse atrophy, treatment-related muscle loss or atrophy, hypotonia, muscle loss or atrophy associated with hypoxia, or muscle loss or atrophy associated with a burn injury.

E180. A method of treating a subject having or at risk of developing muscle disease, comprising administering to the subject a therapeutically effective amount of the polypeptide of any one of E1-E167, the nucleic acid molecule of E168, the vector of E169, the construct of E174 or E175, or the pharmaceutical composition of E172 or E173.

E181. The method of E180, wherein the muscle disease is a neuromuscular disease, sarcopenia, cachexia, disuse atrophy, treatment-related muscle loss or atrophy, hypotonia, muscle loss or atrophy associated with hypoxia, or muscle loss or atrophy associated with a burn injury.

E182. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving weakness and atrophy of muscles, wherein method includes administering to the subject a therapeutically effective amount of the polypeptide of any one of E1-E167, the nucleic acid molecule of E168, the vector of E169, the construct of E174 or E175, or the pharmaceutical composition of E172 or E173.

E183. The method of E182, wherein the disease or condition is a neuromuscular disease, sarcopenia, cachexia, disuse atrophy, treatment-related muscle loss or atrophy, hypotonia, muscle loss or atrophy associated with hypoxia, or muscle loss or atrophy associated with a burn injury.

E184. A method of treating a subject having or at risk of developing a neuromuscular disease, comprising administering to the subject a therapeutically effective amount of the polypeptide of any one of E1-E167, the nucleic acid molecule of E168, the vector of E169, the construct of E174 or E175, or the pharmaceutical composition of E172 or E173.

E185. The method of any one of E179, E181, and E183, wherein the subject has or is at risk of developing a neuromuscular disease or wherein the disease or condition is a neuromuscular disease.

E186. A method of treating a subject having or at risk of developing DMD by administering to the subject a therapeutically effective amount of the polypeptide of any one of E1-E167, the nucleic acid molecule of E168, the vector of E169, the construct of E174 or E175, or the pharmaceutical composition of E172 or E173.

E187. A method of treating a subject having or at risk of developing FSHD by administering to the subject a therapeutically effective amount of the polypeptide of any one of E1-E167, the nucleic acid molecule of E168, the vector of E169, the construct of E174 or E175, or the pharmaceutical composition of E172 or E173.

E188. A method of treating a subject having or at risk of developing IBM by administering to the subject a therapeutically effective amount of the polypeptide of any one of E1-E167, the nucleic acid molecule of E168, the vector of E169, the construct of E174 or E175, or the pharmaceutical composition of E172 or E173.

E189. A method of treating a subject having or at risk of developing ALS by administering to the subject a therapeutically effective amount of the polypeptide of any one of E1-E167, the nucleic acid molecule of E168, the vector of E169, the construct of E174 or E175, or the pharmaceutical composition of E172 or E173.

E190. The method of any one of E179, E181, and E183, wherein the subject has or is at risk of developing sarcopenia or wherein the disease or condition is sarcopenia.

E191. A method of treating a subject having or at risk of developing sarcopenia by administering to the subject a therapeutically effective amount of the polypeptide of any one of E1-E167, the nucleic acid molecule of E168, the vector of E169, the construct of E174 or E175, or the pharmaceutical composition of E172 or E173.

E192. The method of any one of E179, E181, and E183, wherein the subject has or is at risk of developing disuse atrophy or wherein the disease or condition is disuse atrophy.

E193. A method of treating a subject having or at risk of developing disuse atrophy by administering to the subject a therapeutically effective amount of the polypeptide of any one of E1-E167, the nucleic acid molecule of E168, the vector of E169, the construct of E174 or E175, or the pharmaceutical composition of E172 or E173.

E194. The method of any one of E179, E181, and E183, wherein the subject has or is at risk of developing treatment-related muscle loss or atrophy or wherein the disease or condition is treatment-related muscle loss or atrophy.

E195. A method of treating a subject having or at risk of developing treatment-related muscle loss or atrophy by administering to the subject a therapeutically effective amount of the polypeptide of any one of E1-E167, the nucleic acid molecule of E168, the vector of E169, the construct of E174 or E175, or the pharmaceutical composition of E172 or E173.

E196. The method of any one of E179, E181, E183, E194, and E195, wherein the treatment is glucocorticoid treatment, FGF-21 treatment, GLP-1 treatment, treatment with an FGF-21- or GLP-1-containing therapeutic, bariatric surgery (e.g., gastric bypass), cancer therapy (e.g., chemotherapy or radiation), or treatment for obesity or Type 2 diabetes.

E197. The method of any one of E179, E181, and E183, wherein the subject has or is at risk of developing hypotonia or wherein the disease or condition is hypotonia.

E198. A method of treating a subject having or at risk of developing hypotonia by administering to the subject a therapeutically effective amount of the polypeptide of any one of E1-E167, the nucleic acid molecule of E168, the vector of E169, the construct of E174 or E175, or the pharmaceutical composition of E172 or E173.

E199. The method of any one of E179, E181, and E183, wherein the subject has or is at risk of developing muscle loss or atrophy associated with hypoxia or wherein the disease or condition is muscle loss or atrophy associated with hypoxia.

E200. A method of treating a subject having or at risk of developing muscle loss or atrophy associated with hypoxia by administering to the subject a therapeutically effective amount of the polypeptide of any one of E1-E167, the nucleic acid molecule of E168, the vector of E169, the construct of E174 or E175, or the pharmaceutical composition of E172 or E173.

E201. The method of any one of E179, E181, and E183, wherein the subject has or is at risk of developing muscle loss or atrophy associated with a burn injury or wherein the disease or condition is muscle loss or atrophy associated with a burn injury.

E202. A method of treating a subject having or at risk of developing muscle loss or atrophy associated with a burn injury by administering to the subject a therapeutically effective amount of the polypeptide of any one of E1-E167, the nucleic acid molecule of E168, the vector of E169, the construct of E174 or E175, or the pharmaceutical composition of E172 or E173.

E203. The method of any one of E179, E181, and E183, wherein the subject has or is at risk of developing cachexia or wherein the disease or condition is cachexia.

E204. A method of treating a subject having or at risk of developing cachexia by administering to the subject a therapeutically effective amount of the polypeptide of any one of E1-E167, the nucleic acid molecule of E168, the vector of E169, the construct of E174 or E175, or the pharmaceutical composition of E172 or E173.

E205. The method of any one of E179, E181, E183, E203, and E204, wherein the cachexia is cancer cachexia, HIV-related cachexia, cardiac cachexia (e.g., cachexia associated with heart failure), cachexia associated with chronic kidney disease, or pulmonary cachexia (e.g., cachexia associated with COPD).

E206. The method of any one of E176-E205, wherein the method increases muscle mass.

E207. The method of any one of E176-E206, wherein the method increases lean mass.

E208. The method of any one of E176-E207, wherein the method increases muscle strength.

E209. A method of increasing bone mineral density in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E210. A method of reducing bone resorption in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E211. A method of increasing bone formation in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E212. A method of increasing bone strength in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E213. A method of reducing the risk or occurrence of bone fracture in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E214. The method of any one of E209-E213, wherein the subject has or is at risk of developing osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss.

E215. A method of treating a subject having or at risk of developing bone disease by administering to the subject a therapeutically effective amount of the polypeptide of any one of E1-E167, the nucleic acid molecule of E168, the vector of E169, the construct of E174 or E175, or the pharmaceutical composition of E172 or E173.

E216. The method of E215, wherein the bone disease is osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss.

E217. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving bone damage by administering to the subject a therapeutically effective amount of the polypeptide of any one of E1-E167, the nucleic acid molecule of E168, the vector of E169, the construct of E174 or E175, or the pharmaceutical composition of E172 or E173.

E218. The method of E217, wherein the disease or condition is osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss.

E219. The method of any one of E214, E216, or E218, wherein the subject has or is at risk of developing osteoporosis or wherein the disease or condition is osteoporosis.

E220. A method of treating a subject having or at risk of developing osteoporosis by administering to the subject a therapeutically effective amount of the polypeptide of any one of E1-E167, the nucleic acid molecule of E168, the vector of E169, the construct of E174 or E175, or the pharmaceutical composition of E172 or E173.

E221. The method of any one of E214, E216, and E218, wherein the subject has or is at risk of developing osteogenesis imperfecta or wherein the disease or condition is osteogenesis imperfecta.

E222. A method of treating a subject having or at risk of developing osteogenesis imperfecta by administering to the subject a therapeutically effective amount of the polypeptide of any one of E1-E167, the nucleic acid molecule of E168, the vector of E169, the construct of E174 or E175, or the pharmaceutical composition of E172 or E173.

E223. The method of any one of E214, E216, and E218, wherein the subject has or is at risk of developing osteopenia or wherein the disease or condition is osteopenia.

E224. A method of treating a subject having or at risk of developing osteopenia by administering to the subject a therapeutically effective amount of the polypeptide of any one of E1-E167, the nucleic acid molecule of E168, the vector of E169, the construct of E174 or E175, or the pharmaceutical composition of E172 or E173.

E225. The method of any one of E214, E216, and E218, wherein the subject has or is at risk of developing a bone fracture or wherein the disease or condition is bone fracture.

E226. A method of treating a subject having or at risk of developing a bone fracture by administering to the subject a therapeutically effective amount of the polypeptide of any one of E1-E167, the nucleic acid molecule of E168, the vector of E169, the construct of E174 or E175, or the pharmaceutical composition of E172 or E173.

E227. The method of any one of E214, E216, and E218, wherein the subject has or is at risk of developing bone cancer or cancer metastasis-related bone loss or wherein the disease or condition is bone cancer or cancer metastasis-related bone loss.

E228. A method of treating a subject having or at risk of developing bone cancer or cancer metastasis-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E229. The method of any one of E214, E216, and E218, wherein the subject has or is at risk of developing Paget's disease or wherein the disease or condition is Paget's disease.

E230. A method of treating a subject having or at risk of developing Paget's disease by administering to the subject a therapeutically effective amount of the polypeptide of any one of E1-E167, the nucleic acid molecule of E168, the vector of E169, the construct of E174 or E175, or the pharmaceutical composition of E172 or E173.

E231. The method of any one of E214, E216, and E218, wherein the subject has or is at risk of developing renal osteodystrophy or wherein the disease or condition is renal osteodystrophy.

E232. A method of treating a subject having or at risk of developing renal osteodystrophy by administering to the subject a therapeutically effective amount of the polypeptide of any one of E1-E167, the nucleic acid molecule of E168, the vector of E169, the construct of E174 or E175, or the pharmaceutical composition of E172 or E173.

E233. The method of any one of E214, E216, and E218, wherein the subject has or is at risk of developing treatment-related bone loss or wherein the disease or condition is treatment-related bone loss.

E234. A method of treating a subject having or at risk of developing treatment-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E235. The method of any one of E214, E216, and E218, wherein the subject has or is at risk of developing diet-related bone loss or wherein the disease or condition is diet-related bone loss.

E236. A method of treating a subject having or at risk of developing diet-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E237. The method of any one of E214, E216, and E218, wherein the subject has or is at risk of developing low gravity-related bone loss or wherein the disease or condition is low gravity-related bone loss.

E238. A method of treating a subject having or at risk of developing low gravity-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E239. The method of any one of E214, E216, and E218, wherein the subject has or is at risk of developing immobility-related bone loss or wherein the disease or condition is immobility-related bone loss.

E240. A method of treating a subject having or at risk of developing immobility-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E241. The method of any one of E214, E216, and E218, wherein the subject has or is at risk of developing neuromuscular disease-related bone loss or wherein the disease or condition is neuromuscular disease-related bone loss.

E242. A method of treating a subject having or at risk of developing neuromuscular disease-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E243. The method of any one of E179, E181, E183-E185, E214, E216, E218, E241, and E242, wherein the neuromuscular disease is a muscular dystrophy, amyotrophic lateral sclerosis (ALS), autonomic neuropathy, botulism, Charcot-Marie-Tooth disease (CMT), chronic inflammatory demyelinating polyradiculoneuropathy, congenital myasthenic syndrome, a congenital myopathy, cramp-fasciculation syndrome, dermatomyositis, diabetic neuropathy, a distal myopathy, a dystrophinopathy, an endocrine myopathy, a focal muscular atrophy, glycogen storage disease type II, Guillain-Barre syndrome, hereditary spastic paraplegia, inclusion body myositis (IBM), Isaac's syndrome, Kearns-Sayre syndrome, Kennedy disease, Lambert-Eaton myasthenic syndrome, a metabolic myopathy, a metabolic neuropathy, a mitochondrial myopathy, a motor neuron disease, multiple sclerosis, myasthenia gravis, myotonic dystrophy, a necrotizing myopathy, neuromyotonia, neuropathy of Friedreich's Ataxia, a nutritional neuropathy, peripheral neuropathy, polymyositis, primary lateral sclerosis, Schwartz-Jampel Syndrome, small fiber neuropathy, spinal and bulbar muscular atrophy, spinal muscular atrophy (SMA), spinal muscular atrophy with respiratory distress type 1, stiff person syndrome, toxic neuropathy, or Troyer syndrome.

E244. The method of E243, wherein the neuromuscular disease is a muscular dystrophy.

E245. The method of E244, wherein the muscular dystrophy is Duchenne muscular dystrophy (DMD), facioscapulohumeral muscular dystrophy (FSHD), Becker muscular dystrophy (BMD), myotonic dystrophy (DM), congenital muscular dystrophy, limb-girdle muscular dystrophy (LGMD), distal muscular dystrophy (DD), oculopharyngeal muscular dystrophy (OPMD), or Emery-Dreifuss muscular dystrophy (EDMD).

E246. The method of E245, wherein the muscular dystrophy is DMD.

E247. The method of E245, wherein the muscular dystrophy is FSHD.

E248. The method of E245, wherein the muscular dystrophy is BMD.

E249. The method of E245, wherein the muscular dystrophy is DM.

E250. The method of E245, wherein the muscular dystrophy is LGMD.

E251. The method of E245, wherein the muscular dystrophy is DD.

E252. The method of E245, wherein the muscular dystrophy is OPMD.

E253. The method of E245, wherein the muscular dystrophy is EDMD.

E254. The method of E245, wherein the muscular dystrophy is a congenital muscular dystrophy.

E255. The method of E254, wherein the congenital muscular dystrophy is congenital muscular dystrophy type 1A (MDC1A), congenital muscular dystrophy type 1C (MDC1C), congenital muscular dystrophy type 1 D (MDC1D), congenital muscular dystrophy type 1 B (MDC1B), Fukuyama congenital muscular dystrophy (FCMD), muscle-eye-brain disease (MEB), Walker-Warburg Syndrome (WWS), rigid spine muscular dystrophy (RSMD1), Ullrich congenital muscular dystrophy (UCMD), or muscular dystrophy associated with a mutation in integrin alpha 7, integrin alpha 9, docking protein 7, laminin A/C, SECIS binding protein 2, or choline kinase beta.

E256. The method of E255, wherein the congenital muscular dystrophy is MDC1A.

E257. The method of E255, wherein the congenital muscular dystrophy is MDC1B.

E258. The method of E255, wherein the congenital muscular dystrophy is MDC1C.

E259. The method of E255, wherein the congenital muscular dystrophy is MDC1D.

E260. The method of E255, wherein the congenital muscular dystrophy is FCMD.

E261. The method of E255, wherein the congenital muscular dystrophy is MEB.

E262. The method of E255, wherein the congenital muscular dystrophy is WWS.

E263. The method of E255, wherein the congenital muscular dystrophy is RSMD1.

E264. The method of E255, wherein the congenital muscular dystrophy is UCMD.

E265. The method of E243, wherein the neuromuscular disease is CMT.

E266. The method of E243, wherein the neuromuscular disease is ALS.

E267. The method of E243, wherein the neuromuscular disease is SMA.

E268. The method of E243, wherein the neuromuscular disease is IBM.

E269. The method of E243, wherein the neuromuscular disease is myasthenia gravis.

E270. The method of E243, wherein the neuromuscular disease is multiple sclerosis.

E271. The method of any one of E214, E216, and E218, wherein the subject has or is at risk of developing burn-induced bone loss or wherein the disease or condition is burn-induced bone loss.

E272. A method of treating a subject having or at risk of developing burn-induced bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E273. The method of any one of E214, E216, and E218, wherein the subject has or is at risk of developing anorexia-related bone loss or wherein the disease or condition is anorexia-related bone loss.

E274. A method of treating a subject having or at risk of developing anorexia-related bone loss by administering to the subject a therapeutically effective amount of the polypeptide of any one of E1-E167, the nucleic acid molecule of E168, the vector of E169, the construct of E174 or E175, or the pharmaceutical composition of E172 or E173.

E275. The method of any one of E214, E216, and E218-E220, wherein the osteoporosis is primary osteoporosis.

E276. The method of E275, wherein the primary osteoporosis is age-related osteoporosis or hormone-related osteoporosis.

E277. The method of any one of E214, E216, and E218-E220, wherein the osteoporosis is secondary osteoporosis.

E278. The method of E277, wherein the secondary osteoporosis is immobilization-induced osteoporosis or glucocorticoid-induced osteoporosis.

E279. The method of any one of E214, E216, E218, E227, and E228, wherein the cancer is multiple myeloma.

E280. The method of any one of E214, E216, E218, E233, and E234, wherein the treatment is FGF-21 treatment, GLP-1 treatment, treatment with an FGF-21- or GLP-1-containing therapeutic, cancer therapy (e.g., chemotherapy or radiation), bariatric surgery (e.g., gastric bypass), androgen or estrogen deprivation therapy, or treatment for obesity or Type 2 diabetes.

E281. The method of any one of E214, E216, E218, E235, and E236, wherein the diet-related bone loss is rickets.

E282. The method of any one of E209-E281, wherein the subject is at risk of bone fracture.

E283. The method of any one of E209-E282, wherein the method increases bone formation in the subject.

E284. The method of any one of E209-E283, wherein the method decreases bone resorption in the subject.

E285. The method of any one of E209-E284, wherein the method decreases bone loss in the subject.

E286. The method of any one of E209-E285, wherein the method increases osteoblast activity or osteoblastogenesis.

E287. The method of any one of E209-E286, wherein the method decreases osteoclast activity or decreases osteoclastogenesis.

E288. The method of any one of E209-E287, wherein the method decreases the risk or occurrence of bone fracture.

E289. The method of any one of E209-E288, wherein the method increases bone strength.

E290. The method of any one of E209-E289, wherein the bone is cortical bone.

E291. The method of any one of E209-E289, wherein the bone is trabecular bone.

E292. A method of decreasing or preventing fibrosis in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E293. A method of slowing or inhibiting the progression of fibrosis in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E294. A method of reducing the risk of developing fibrosis in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E295. A method of treating a subject having or at risk of developing fibrosis by administering to the subject a therapeutically effective amount of the polypeptide of any one of E1-E167, the nucleic acid molecule of E168, the vector of E169, the construct of E174 or E175, or the pharmaceutical composition of E172 or E173.

E296. A method of reversing fibrosis in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E297. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing fibrosis or a disease or condition involving fibrosis by administering to the subject a therapeutically effective amount of the polypeptide of any one of E1-E167, the nucleic acid molecule of E168, the vector of E169, the construct of E174 or E175, or the pharmaceutical composition of E172 or E173.

E298. The method of any one of E292-E297, wherein the fibrosis or the disease or condition involving fibrosis is chemotherapeutic drug-induced fibrosis, radiation-induced fibrosis, pulmonary fibrosis, hepatic fibrosis, renal fibrosis (e.g., fibrosis related to chronic kidney disease), corneal fibrosis, heart fibrosis, bone marrow fibrosis, myelofibrosis, mediastinal fibrosis, retroperitoneal fibrosis, arthrofibrosis, osteoarticular fibrosis, tissue fibrosis, a tumor stroma, a desmoplastic tumor, a surgical adhesion, a hypertrophic scar, or a keloid.

E299. The method of any one of E292-E297, wherein the fibrosis or the disease or condition involving fibrosis is fibrosis associated with a wound, a burn, hepatitis B or C infection, fatty liver disease, Schistosoma infection, kidney disease (e.g., chronic kidney disease), heart disease, macular degeneration, Crohn's disease, retinal or vitreal retinopathy, systemic or local scleroderma, atherosclerosis, or restenosis.

E300. The method of any one of E292-E298, wherein the fibrosis results from chronic kidney disease.

E301. The method of any one of E292-E298, wherein the fibrosis is myelofibrosis.

E302. The method of E298, wherein the tissue fibrosis is fibrosis affecting a tissue selected from the group consisting of muscle tissue, skin epidermis, skin dermis, tendon, cartilage, pancreatic tissue, uterine tissue, neural tissue, testis, ovary, adrenal gland, artery, vein, bone marrow, colon, small intestine, large intestine, biliary tract, and gut.

E303. The method of any one of E292-E302, wherein the method improves the function of a fibrotic tissue or organ.

E304. The method of any one of E292-E303, wherein the method slows, inhibits, or reverses the development or progression of fibrosis.

E305. The method of any one of E292-E304, wherein the method reduces (e.g., reduces the frequency or severity of) one or more symptom of fibrosis.

E306. A method of increasing red blood cell levels (e.g., increasing hemoglobin levels, red blood cell count, or hematocrit) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E307. A method of increasing hemoglobin levels in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E308. A method of increasing red blood cell count in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E309. A method of increasing hematocrit in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E310. A method of promoting or increasing red blood cell production in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E311. A method of promoting or increasing the maturation and/or differentiation of erythroid progenitors (e.g., early-stage or late- (e.g., terminal) stage erythroid progenitors, e.g., the maturation and/or differentiation of early-stage erythroid progenitors, such as colony forming unit-erythroid cells (CFU-Es) and burst forming unit-erythroid cells (BFU-Es), into proerythroblasts, reticulocytes, or red blood cells) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E312. A method of promoting or increasing proerythroblasts (e.g., proerythroblast numbers or proerythroblast count) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E313. A method of promoting or increasing reticulocytes (e.g., reticulocyte numbers or reticulocyte count) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E314. A method of promoting or increasing the recruitment of early-stage progenitors into the erythroid lineage in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E315. A method of promoting or increasing late-stage erythroid precursor maturation (e.g., terminal maturation, such as the maturation of reticulocytes into red blood cells or the maturation of erythroblasts into reticulocytes and/or red blood cells) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E316. A method of reducing the accumulation of red blood cell progenitor cells in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E317. A method of increasing the number of early-stage erythroid precursors and/or progenitors (e.g., expanding the early-stage precursor and/or progenitor population) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E318. A method of promoting the progression of erythroid precursors and/or progenitors through erythropoiesis in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E319. The method of any one of E306-E318, wherein the subject has or is at risk of developing anemia or blood loss.

E320. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving low red blood cell levels (e.g., low hemoglobin levels, low red blood cell count, or low hematocrit), wherein the method includes administering to the subject a therapeutically effective amount of the polypeptide of any one of E1-E167, the nucleic acid molecule of E168, the vector of E169, the construct of E174 or E175, or the pharmaceutical composition of E172 or E173.

E321. The method of E320, wherein the disease or condition is anemia or blood loss.

E322. A method of treating a subject having or at risk of developing anemia by administering to the subject a therapeutically effective amount of the polypeptide of any one of E1-E167, the nucleic acid molecule of E168, the vector of E169, the construct of E174 or E175, or the pharmaceutical composition of E172 or E173.

E323. The method of E319, E321, or E322, wherein the anemia or blood loss is associated with cancer (e.g., a solid tumor, such as breast cancer, lung cancer, colon cancer; a tumor of the lymphatic system, such as chronic lymphocytic leukemia, non-Hodgkin's lymphoma, Hodgkin's lymphoma; or a tumor of the hematopoietic system, such as leukemia or multiple myeloma), cancer treatment (e.g., chemotherapy or radiation), myelofibrosis treatment (e.g., treatment with a JAK inhibitor, such as ruxolitinib or fedratinib), renal disease or failure (e.g., chronic kidney disease or acute renal disease or failure), a myelodysplastic syndrome, thalassemia (e.g., α- or β-thalassemia), a nutritional deficit (e.g., vitamin deficiency, such as B-12 or folate deficiency), adverse reaction to medication, ineffective hematopoiesis, an inflammatory or autoimmune disease, splenomegaly, porphyria, vasculitis, hemolysis, a bone marrow defect, bone marrow transplantation, myelofibrosis, diabetes, liver disease (e.g., acute liver disease or chronic liver disease), bleeding (e.g., acute or chronic bleeding), infection, hemoglobinopathy, drug use, alcohol abuse, advanced age, Churg-Strauss syndrome, Felty syndrome, Pearson syndrome, dyskeratosis congenita, graft versus host disease, hematopoietic stem cell transplantation, osteomyelofibrosis, pancytopenia, pure red-cell aplasia, purpura Schoenlein-Henoch, Shwachman syndrome (e.g., Shwachman-Diamond syndrome), contraindication to transfusion, surgery, trauma, a wound, an ulcer, urinary tract bleeding, digestive tract bleeding, frequent blood donation, or heavy menstrual bleeding.

E324. The method of any one of E319 and E321-E323, wherein the anemia results from chronic kidney disease.

E325. The method of any one of E319 and E321-E323, wherein the anemia is associated with a myelodysplastic syndrome (e.g., the subject has a myelodysplastic syndrome).

E326. The method of any one of E319 and E321-E323, wherein the anemia is associated with myelofibrosis (e.g., the subject has myelofibrosis).

E327. The method of any one E319 and E321-E323, wherein anemia is associated with ineffective hematopoiesis (e.g., ineffective erythropoiesis).

E328. The method of any one of E319 and E321-E323, wherein the anemia is aplastic anemia, iron deficiency anemia, vitamin deficiency anemia, anemia of chronic disease (also called anemia of inflammation), anemia associated with bone marrow disease, hemolytic anemia, sickle cell anemia, microcytic anemia, hypochromic anemia, sideroblastic anemia, congenital dyserythropoietic anemia, Diamond Blackfan anemia, Fanconi anemia, or refractory anemia with excess of blasts.

E329. The method of E328, wherein the sideroblastic anemia is acquired sideroblastic anemia or congenital sideroblastic anemia.

E330. The method of E329, wherein the sideroblastic anemia is congenital sideroblastic anemia.

E331. The method of E330, wherein the congenital sideroblastic anemia is associated with a mutation in ALAS2, SLC25A38, FECH, GLRX5, HSPA9, HSCB, SLC25A38, or ABCB7.

E332. The method of E330, wherein the congenital sideroblastic anemia is associated with a mutation in PUS1, YARS2, LARS2, TRNT1, MT-ATP6, NDUFB11, or SLC19A2, or with an mtDNA mutation.

E333. The method of any one of E306-E332, wherein the method increases red blood cell production, red blood cell count, hemoglobin levels, hematocrit, erythrocyte progenitor differentiation and/or maturation (e.g., of early and/or terminal stage erythroid progenitors), late-stage erythroid precursor maturation, recruitment of early-stage progenitors into the erythroid lineage, proerythroblast numbers, early-stage erythroid precursor and/or progenitor numbers (e.g., increases the early-stage precursor and/or progenitor populations), the progression of erythroid precursors and/or progenitors through erythropoiesis, and/or reticulocyte numbers.

E334. The method of any one of E306-E333, wherein the method reduces the accumulation of red blood cell progenitor cells.

E335. The method of any one of E306-E334, wherein the subject is identified as having anemia prior to administration of the polypeptide of any one of E1-E167, the nucleic acid molecule of E168, the vector of E169, the construct of E174 or E175, or the pharmaceutical composition of E172 or E173.

E336. The method of any one of E306-E334, wherein the method further comprises identifying the subject as having anemia prior to administration of the polypeptide of any one of E1-E167, the nucleic acid molecule of E168, the vector of E169, the construct of E174 or E175, or the pharmaceutical composition of E172 or E173.

E337. The method of any one of E306-E336, wherein the method further comprises evaluating red blood cell, hemoglobin, hematocrit, and/or reticulocyte levels after administration of the polypeptide of any one of E1-E167, the nucleic acid molecule of E168, the vector of E169, the construct of E174 or E175, or the pharmaceutical composition of E172 or E173.

E338. A method of increasing platelet levels (e.g., increasing platelet count) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E339. A method of increasing platelet count in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E340. A method of promoting or increasing platelet production in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E341. A method of promoting or increasing megakaryocyte differentiation and/or maturation (e.g., to produce platelets) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E342. A method of reducing the accumulation of platelet progenitor cells in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E343. The method of any one of E338-E342, wherein the subject has or is at risk of developing thrombocytopenia.

E344. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving low platelet levels, wherein the method includes administering to the subject a therapeutically effective amount of the polypeptide of any one of E1-E167, the nucleic acid molecule of E168, the vector of E169, the construct of E174 or E175, or the pharmaceutical composition of E172 or E173.

E345. The method of E344, wherein the disease or condition is thrombocytopenia.

E346. A method of treating a subject having or at risk of developing thrombocytopenia by administering to the subject a therapeutically effective amount of the polypeptide of any one of E1-E167, the nucleic acid molecule of E168, the vector of E169, the construct of E174 or E175, or the pharmaceutical composition of E172 or E173.

E347. A method of promoting platelet production by contacting a megakaryocyte with the polypeptide of any one of E1-E167, the nucleic acid molecule of E168, the vector of E169, or the construct of E174 or E175 in an amount effective to promote platelet production.

E348. The method of E347, wherein the contacting is in vitro.

E349. A method of treating a subject having or at risk of developing thrombocytopenia by administering to the subject a platelet produced by the method of E347 or E348.

E350. The method of any one of E343, E345, E346, and E349, wherein the thrombocytopenia is associated with a bone marrow defect, a myelodysplastic syndrome, bone marrow transplantation, myelofibrosis, myelofibrosis treatment (e.g., treatment with a JAK inhibitor, such as with ruxolitinib or fedratinib), ineffective hematopoiesis, Gaucher disease, aplastic anemia, Fanconi anemia, Diamond Blackfan anemia, Shwachman Diamond syndrome, heavy alcohol consumption, cirrhosis of the liver, cancer (e.g., leukemia or lymphoma), an autoimmune disease, a viral infection, a bacterial infection, an enlarged spleen, a vitamin deficiency, cancer treatment, thrombotic thrombocytopenic purpura, idiopathic thrombocytopenic purpura, disseminated intravascular coagulation, hemolytic uremic syndrome, paroxysmal nocturnal hemoglobinuria, a reduction of platelets caused by medication (medication-induced thrombocytopenia, e.g., thrombocytopenia caused by treatment with heparin, quinine, a sulfa-containing antibiotic, such as vancomycin, rifampin, or trimethoprim, or an anticonvulsant, such as phenytoin), a dilution of platelets caused by a blood transfusion, hematopoietic stem cell transplantation, acquired amegakaryocytic thrombocytopenia, Pearson syndrome, dyskeratosis congenita, or contraindication to transfusion.

E351. The method of any one of E343, E345, E346, E349, and E350, wherein the thrombocytopenia is associated with a myelodysplastic syndrome (e.g., the subject has a myelodysplastic syndrome).

E352. The method of any one of E343, E345, E346, E349, and E350, wherein the thrombocytopenia is associated with myelofibrosis (e.g., the subject has myelofibrosis).

E353. The method of any one of E343, E345, E346, E349, and E350, wherein the thrombocytopenia is associated with a bone marrow defect.

E354. The method of any one of E343, E345, E346, E349, and E350, wherein the thrombocytopenia is associated with bone marrow transplantation.

E355. The method of any one of E343, E345, E346, E349, and E350, wherein the thrombocytopenia is associated with cancer.

E356. The method of any one of E343, E345, E346, E349, and E350, wherein the thrombocytopenia is associated with cancer treatment (e.g., chemotherapy or radiation).

E357. The method of any one of E343, E345, E346, E349, and E350, wherein the thrombocytopenia is associated with hematopoietic stem cell transplantation.

E358. The method of any one of E343, E345, E346, E349, and E350, wherein the thrombocytopenia is associated with an autoimmune disease.

E359. The method of any one of E343, E345, E346, E349, and E350, wherein the thrombocytopenia is associated with contraindication to transfusion.

E360. The method of any one of E343, E345, E346, E349, and E350, wherein the thrombocytopenia is associated with myelofibrosis treatment.

E361. The method of any one of E343, E345, E346, E349, and E350, wherein the thrombocytopenia is associated with ineffective hematopoiesis.

E362. The method of any one of E343, E345, E346, and E349, wherein the thrombocytopenia is familial thrombocytopenia.

E363. The method of E362, wherein the familial thrombocytopenia is May-Hegglin anomaly, Sebastian syndrome, Fechtner syndrome, Epstein's syndrome, Wiskott-Aldrich syndrome, congenital amegakaryocytic thrombocytopenia, platelet storage pool deficiency, Hermansky-Pudlak syndrome, Bernard-Soulier syndrome, Von Willebrand Disease Type 2B, ANKRD26-related thrombocytopenia, thrombocytopenia absent radius syndrome, familial platelet disorder with associated myeloid malignancy (FPD/AML), thrombocytopenia associated with a mutation in Filamin-A, or thrombocytopenia associated with a mutation in GATA-1.

E364. The method any one of E343, E345, E346, and E349, wherein the thrombocytopenia is immune thrombocytopenia.

E365. The method of any one of E338-E364, wherein the method increases platelet count, platelet production and/or megakaryocyte differentiation and/or maturation.

E366. The method of any one of E338-E365, wherein the method reduces the accumulation of platelet progenitor cells.

E367. The method of any one of E338-E366, wherein the method improves blood clotting, reduces bleeding events (e.g., reduces the incidence of bleeding events), and/or reduces bleeding in the skin of the subject.

E368. The method of any one of E338-E347 and E349-E367, wherein the subject is identified as having thrombocytopenia prior to administration of the polypeptide of any one of E1-E167, the nucleic acid molecule of E168, the vector of E169, the construct of E174 or E175, or the pharmaceutical composition of E172 or E173 or the platelets produced by the method of E347 or E348.

E369. The method of any one of E338-E347 and E349-E367, wherein the method further comprises identifying the subject as having thrombocytopenia prior to administration of the polypeptide of any one of E1-E167, the nucleic acid molecule of E168, the vector of E169, the construct of E174 or E175, or the pharmaceutical composition of E172 or E173 or the platelets produced by the method of E347 or E348.

E370. The method of any one of E338-E347 and E349-E369, wherein the method further comprises evaluating platelet levels after administration of the polypeptide of any one of E1-E167, the nucleic acid molecule of E168, the vector of E169, the construct of E174 or E175, or the pharmaceutical composition of E172 or E173 or the platelets produced by the method of E347 or E348.

E371. A method of increasing neutrophil levels (e.g., increasing neutrophil count) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E372. A method of increasing neutrophil count in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E373. A method of promoting or increasing neutrophil production in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E374. A method of promoting or increasing the differentiation and/or maturation of progenitor cells (e.g., myeloid progenitors, myeloblasts, and/or myelocytes) into neutrophils in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E375. The method of any one of E371-E374, wherein the subject has or is at risk of developing neutropenia.

E376. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving low neutrophil levels, wherein method includes administering to the subject a therapeutically effective amount of the polypeptide of any one of E1-E167, the nucleic acid molecule of E168, the vector of E169, the construct of E174 or E175, or the pharmaceutical composition of E172 or E173.

E377. The method of E376, wherein the disease or condition is neutropenia.

E378. A method of treating a subject having or at risk of developing neutropenia by administering to the subject a therapeutically effective amount of the polypeptide of any one of E1-E167, the nucleic acid molecule of E168, the vector of E169, the construct of E174 or E175, or the pharmaceutical composition of E172 or E173.

E379. The method of E375, E377, or E378, wherein the neutropenia is associated with a bone marrow defect, a myelodysplastic syndrome, bone marrow transplantation, myelofibrosis, ineffective hematopoiesis, aplastic anemia, Fanconi anemia, Diamond Blackfan anemia, Shwachman Diamond syndrome, paroxysmal nocturnal hemoglobinuria, Pearson syndrome, dyskeratosis congenita, cancer (e.g., leukemia), a vitamin deficiency, an enlarged spleen, an autoimmune disease, a viral infection, a bacterial infection, cancer treatment, a reduction in neutrophils caused by medication (e.g., medication used to treat overactive thyroid, such as methimazole and propylthiouracil; an antibiotic, such as vancomycin, penicillin G, trimethoprim, and oxacillin; an antiviral drug, such as ganciclovir and valganciclovir; an anti-inflammatory medication for ulcerative colitis or rheumatoid arthritis, such as sulfasalazine; a drug used to treat irregular heart rhythms, such as quinidine and procainamide; an anticonvulsant, such as phenytoin and valproate; an antipsychotic, such as clozapine; or levamisole), inflammation, hematopoietic stem cell transplantation, or contraindication to transfusion.

E380. The method of any one of E375 and E377-E379, wherein the neutropenia is associated with a myelodysplastic syndrome (e.g., the subject has a myelodysplastic syndrome).

E381. The method of any one of E375 and E377-E379, wherein the neutropenia is associated with myelofibrosis (e.g., the subject has myelofibrosis).

E382. The method of any one of E375 and E377-E379, wherein the neutropenia is associated with a bone marrow defect.

E383. The method of any one of E375 and E377-E379, wherein the neutropenia is associated with bone marrow transplantation.

E384. The method of any one of E375 and E377-E379, wherein the neutropenia is associated with cancer.

E385. The method of any one of E375 and E377-E379, wherein the neutropenia is associated with cancer treatment (e.g., chemotherapy or radiation).

E386. The method of any one of E375 and E377-E379, wherein the neutropenia is associated with hematopoietic stem cell transplantation.

E387. The method of any one of E375 and E377-E379, wherein the neutropenia is associated with inflammation.

E388. The method of any one of E375 and E377-E379, wherein the neutropenia is associated with contraindication to transfusion.

E389. The method of any one of E375 and E377-E379, wherein the neutropenia is associated with ineffective hematopoiesis.

E390. The method of E375, E377, or E378, wherein the neutropenia is chronic idiopathic neutropenia.

E391. The method of E375, E377, or E378, wherein the neutropenia is familial neutropenia.

E392. The method of E391, wherein the familial neutropenia is cyclic neutropenia, chronic benign neutropenia, or severe congenital neutropenia (e.g., neutropenia associated with mutations in the genes ELANE (associated with SCN1), HAX1 (associated with SCN3), G6PC3 (associated with SCN4), GF11 (associated with SCN2), CSF3R, WAS (associated with X-linked neutropenia/X-linked SCN), CXCR4, VPS45A (associated with SCN5), or JAGN1).

E393. The method of any one of E371-E392, wherein the method increases neutrophil count, neutrophil production, and/or the differentiation and/or maturation of progenitor cells into neutrophils.

E394. The method of any one of E371-E393, wherein the method reduces the subject's susceptibility to infection.

E395. The method of any one of E371-E394, wherein the subject is identified as having neutropenia prior to administration of the polypeptide of any one of E1-E167, the nucleic acid molecule of E168, the vector of E169, the construct of E174 or E175, or the pharmaceutical composition of E172 or E173.

E396. The method of any one of E371-E394, wherein the method further comprises identifying the subject as having neutropenia prior to administration of the polypeptide of any one of E1-E167, the nucleic acid molecule of E168, the vector of E169, the construct of E174 or E175, or the pharmaceutical composition of E172 or E173.

E397. The method of any one of E371-E396, wherein the method further comprises evaluating neutrophil levels after administration of the polypeptide of any one of E1-E167, the nucleic acid molecule of E168, the vector of E169, the construct of E174 or E175, or the pharmaceutical composition of E172 or E173.

E398. A method of treating a subject having or at risk of developing a myelodysplastic syndrome by administering to the subject a therapeutically effective amount of the polypeptide of any one of E1-E167, the nucleic acid molecule of E168, the vector of E169, the construct of E174 or E175, or the pharmaceutical composition of E172 or E173.

E399. A method of increasing red blood cell count, increasing hemoglobin levels, increasing hematocrit, increasing red blood cell production, increasing or inducing erythroid progenitor cell maturation and/or differentiation, increasing or inducing late-stage erythroid precursor maturation, promoting or increasing recruitment of early-stage progenitors into the erythroid lineage, increasing proerythroblasts, increasing early-stage erythroid precursor numbers (e.g., increasing the early-stage precursor population), promoting the progression of erythroid precursors through erythropoiesis, increasing reticulocytes, increasing platelet count, increasing platelet production, increasing or inducing megakaryocyte differentiation and/or maturation, reducing the accumulation of platelet progenitor cells, increasing neutrophil count, increasing neutrophil production, increasing or inducing the differentiation and/or maturation of progenitor cells into neutrophils, improving blood clotting, reducing bleeding events, reducing bleeding in the skin, and/or reducing susceptibility to infection in a subject having or at risk of developing a myelodysplastic syndrome by administering to the subject a therapeutically effective amount of the polypeptide of any one of E1-E167, the nucleic acid molecule of E168, the vector of E169, the construct of E174 or E175, or the pharmaceutical composition of E172 or E173.

E400. The method of any one of E323, E325, E350, E351, E379, E380, E398, and E399, wherein the myelodysplastic syndrome is myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (myelodysplastic syndrome with isolated del(5q)), myelodysplastic syndrome with excess blasts (e.g., myelodysplastic syndrome with excess blasts—type 1 (MDS-EB-1) or myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T).

E401. The method of any one of E323, E325, E350, E351, E379, E380, and E398-E400, wherein the myelodysplastic syndrome is MDS-SLD.

E402. The method of any one of E323, E325, E350, E351, E379, E380, and E398-E400, wherein the myelodysplastic syndrome is MDS-MLD.

E403. The method of any one of E323, E325, E350, E351, E379, E380, and E398-E400, wherein the myelodysplastic syndrome is MDS-RS-SLD.

E404. The method of any one of E323, E325, E350, E351, E379, E380, and E398-E400, wherein the myelodysplastic syndrome is MDS-RS-MLD.

E405. The method of any one of E323, E325, E350, E351, E379, E380, and E398-E400, wherein the myelodysplastic syndrome is myelodysplastic syndrome with isolated del(5q).

E406. The method of any one of E323, E325, E350, E351, E379, E380, and E398-E400, wherein the myelodysplastic syndrome is MDS-EB-1.

E407. The method of any one of E323, E325, E350, E351, E379, E380, and E398-E400, wherein the myelodysplastic syndrome is MDS-EB-2.

E408. The method of any one of E323, E325, E350, E351, E379, E380, and E398-E400, wherein the myelodysplastic syndrome is MDS-U.

E409. The method of any one of E323, E325, E350, E351, E379, E380, and E398-E400, wherein the myelodysplastic syndrome is MDS/MPN-RS-T.

E410. The method of any one of E323, E325, E350, E351, E379, E380, and E398-E409, wherein the myelodysplastic syndrome is a ring sideroblast positive myelodysplastic syndrome (RS positive MDS, e.g., the subject has ring sideroblasts).

E411. The method of E410, wherein the RS-positive myelodysplastic syndrome is associated with a splicing factor mutation.

E412. The method of E411, wherein the splicing factor mutation is a mutation in Splicing Factor 3b Subunit 1 (SF3B1).

E413. The method of any one of E323, E325, E350, E351, E379, E380, E398-E402, and E405-E409, wherein the myelodysplastic syndrome is a non-ring sideroblast myelodysplastic syndrome (non-RS, e.g., the subject lacks ring sideroblasts).

E414. The method of any one of E323, E325, E350, E351, E379, E380, and E398-E413, wherein the myelodysplastic syndrome is a very low, low, or intermediate risk myelodysplastic syndrome (e.g., as determined by the Revised International Prognostic Scoring System).

E415. The method of E414, wherein the myelodysplastic syndrome is a very low risk myelodysplastic syndrome (e.g., as determined by the Revised International Prognostic Scoring System).

E416. The method of E414, wherein the myelodysplastic syndrome is a low risk myelodysplastic syndrome (e.g., as determined by the Revised International Prognostic Scoring System).

E417. The method of E414, wherein the myelodysplastic syndrome is an intermediate risk myelodysplastic syndrome (e.g., as determined by the Revised International Prognostic Scoring System).

E418. The method of any one of E323, E325, E350, E351, E379, E380, and E398-E417, wherein the myelodysplastic syndrome is associated with a defect in terminal maturation.

E419. The method of any one of E323, E325, E350, E351, E379, E380, and E398-E417, wherein the myelodysplastic syndrome is associated with a defect in early-stage hematopoiesis (e.g., commitment or differentiation of progenitor cells).

E420. The method of any one of E323, E325, E350, E351, E379, E380, and E398-E419, wherein the myelodysplastic syndrome is associated with elevated endogenous erythropoietin levels.

E421. The method of any one of E323, E325, E350, E351, E379, E380, and E398-E420, wherein the myelodysplastic syndrome is associated with hypocellular bone marrow (e.g., the subject has hypocellular bone marrow).

E422. A method of treating a subject having or at risk of developing myelofibrosis by administering to the subject a therapeutically effective amount of the polypeptide of any one of E1-E167, the nucleic acid molecule of E168, the vector of E169, the construct of E174 or E175, or the pharmaceutical composition of E172 or E173.

E423. A method of increasing red blood cell count, increasing hemoglobin levels, increasing hematocrit, increasing red blood cell production, increasing or inducing erythroid progenitor cell maturation and/or differentiation, increasing or inducing late-stage erythroid precursor maturation, promoting or increasing recruitment of early-stage progenitors into the erythroid lineage, increasing proerythroblasts, increasing early-stage erythroid precursor numbers (e.g., increasing the early-stage precursor population), promoting the progression of erythroid precursors through erythropoiesis, increasing reticulocytes, increasing platelet count, increasing platelet count, increasing platelet production, increasing or inducing megakaryocyte differentiation and/or maturation, reducing the accumulation of platelet progenitor cells, increasing neutrophil count, increasing neutrophil production, increasing or inducing the differentiation and/or maturation of progenitor cells into neutrophils, improving blood clotting, reducing bleeding events, reducing bleeding in the skin, and/or reducing susceptibility to infection in a subject having or at risk of developing myelofibrosis by administering to the subject a therapeutically effective amount of the polypeptide of any one of E1-E167, the nucleic acid molecule of E168, the vector of E169, the construct of E174 or E175, or the pharmaceutical composition of E172 or E173.

E424. The method of any one of E306-E423, wherein the subject does not respond well to treatment with erythropoietin (EPO), is susceptible to the adverse effects of EPO, or does not respond well to treatment with an erythroid maturation agent.

E425. The method of any one of E306-E424, wherein the subject has previously been treated with an erythropoiesis stimulating agent (ESA).

E426. The method of any one of E306-E424, wherein the subject has not previously been treated with an erythropoiesis stimulating agent (ESA).

E427. The method of any one of E306-E426, wherein the subject has a low transfusion burden.

E428. The method of E427, wherein the subject has received 1-3 units of RBCs (1-3 RBC transfusions) within eight weeks prior to starting treatment with the polypeptide of any one of E1-E167, the nucleic acid molecule of E168, the vector of E169, the construct of E174 or E175, or the pharmaceutical composition of E172 or E173.

E429. The method of E427, wherein the subject has received 0 units of RBCs (0 RBC transfusions) within eight weeks prior to starting treatment with the polypeptide of any one of E1-E167, the nucleic acid molecule of E168, the vector of E169, the construct of E174 or E175, or the pharmaceutical composition of E172 or E173.

E430. The method of any one of E306-E426, wherein the subject has a high transfusion burden.

E431. The method of any one of E306-E430, wherein the method reduces the subject's need for a blood transfusion (e.g., reduces transfusion burden).

E432. A method of preventing (e.g., preventing the development of) pulmonary hypertension (PH) in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E433. A method of reducing the risk of developing PH in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E434. A method of slowing or inhibiting the progression of PH in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E435. A method of treating a subject having or at risk of developing PH by administering to the subject a therapeutically effective amount of the polypeptide of any one of E1-E167, the nucleic acid molecule of E168, the vector of E169, the construct of E174 or E175, or the pharmaceutical composition of E172 or E173.

E436. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing PH by administering to the subject a therapeutically effective amount of the polypeptide of any one of E1-E167, the nucleic acid molecule of E168, the vector of E169, the construct of E174 or E175, or the pharmaceutical composition of E172 or E173.

E437. A method of reducing vascular remodeling in a subject having or at risk of developing PH by administering to the subject a therapeutically effective amount of the polypeptide of any one of E1-E167, the nucleic acid molecule of E168, the vector of E169, the construct of E174 or E175, or the pharmaceutical composition of E172 or E173.

E438. A method of reducing right ventricular hypertrophy in a subject having or at risk of developing PH by administering to the subject a therapeutically effective amount of the polypeptide of any one of E1-E167, the nucleic acid molecule of E168, the vector of E169, the construct of E174 or E175, or the pharmaceutical composition of E172 or E173.

E439. A method of reducing pulmonary vascular resistance in a subject having or at risk of developing PH by administering to the subject a therapeutically effective amount of the polypeptide of any one of E1-E167, the nucleic acid molecule of E168, the vector of E169, the construct of E174 or E175, or the pharmaceutical composition of E172 or E173.

E440. The method of any one of E432-E439, wherein the PH is pulmonary arterial hypertension (PAH).

E441. The method of E440, wherein the PAH is idiopathic PAH.

E442. The method of E440, wherein the PAH is heritable PAH.

E443. The method of E440, wherein the PAH is associated with HIV infection, schistosomiasis, cirrhosis of the liver, a congenital heart abnormality, portal hypertension, pulmonary veno-occlusive disease, pulmonary capillary hemangiomatosis, a connective tissue disorder, an autoimmune disorder (e.g., scleroderma or lupus), or drug use or abuse (e.g., use of cocaine or methamphetamine).

E444. The method of any one of E432-E439, wherein the PH is venous PH.

E445. The method of E444, wherein the venous PH is associated with left ventricular systolic dysfunction, left ventricular diastolic dysfunction, valvular heart disease, congenital cardiomyopathy, or congenital or acquired pulmonary venous stenosis.

E446. The method of any one of E432-E439, wherein the PH is hypoxic PH.

E447. The method of E446, wherein the hypoxic PH is associated with chronic obstructive pulmonary disease (e.g., emphysema), interstitial lung disease, sleep-disordered breathing (e.g., sleep apnea), a lung disease (e.g., pulmonary fibrosis), an alveolar hypoventilation disorder, chronic exposure to high altitude, or a developmental abnormality.

E448. The method of any one of E432-E439, wherein the PH is thromboembolic PH.

E449. The method of E448, wherein the thromboembolic PH is associated with chronic thromboembolic pulmonary hypertension, pulmonary emboli, angiosarcoma, arteritis, congenital pulmonary artery stenosis, or parasitic infection.

E450. The method of any one of E432-E439, wherein the PH is miscellaneous PH.

E451. The method of E450, wherein the miscellaneous PH is associated with a hematologic disease (e.g., chronic hemolytic anemia, sickle cell disease), a systemic disease (e.g., sarcoidosis, pulmonary Langerhans cell histiocytosis, lymphangioleiomyomatosis, neurofibromatosis, or vasculitis), a metabolic disorder (e.g., glycogen storage disease, Gaucher disease, or thyroid diseases), pulmonary tumoral thrombotic microangiopathy, fibrosing mediastinitis, chronic kidney failure, or segmental pulmonary hypertension.

E452. The method of any one of E432-E451, wherein the method reduces the frequency or severity of one or more symptoms of PH (e.g., reduces the severity or frequency of one or more of shortness of breath (dyspnea), fatigue, swelling (e.g., edema) of the legs, feet, belly (ascites), or neck, chest pain or pressure, racing pulse or heart palpitations, bluish color to lips or skin (cyanosis), dizziness, or fainting).

E453. The method of any one of E432-E452, wherein the method reduces pulmonary vascular remodeling.

E454. The method of any one of E432-E453, wherein the method reduces vascular remodeling in the heart.

E455. The method of any one of E432-E454, wherein the method reduces right ventricular hypertrophy.

E456. The method of any one of E432-E455, wherein the method reduces pulmonary vascular resistance (e.g., reduces pulmonary vascular resistance compared to measurements taken prior to treatment).

E457. The method of any one of E432-E456, wherein the method improves performance in the 6-minute walk test (e.g., improves performance compared to measurements taken prior to treatment).

E458. The method of any one of E432-E457, wherein the method reduces bone loss.

E459. The method of any one of E432-E458, wherein the method reduces pulmonary arterial muscularization or pulmonary arterial wall thickening.

E460. The method of any one of E432-E459, wherein the method reduces right ventricular compensation.

E461. A method of reducing body fat in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E462. A method of reducing body weight in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E463. A method of reducing blood glucose in a subject in need thereof by administering to the subject a therapeutically effective amount of the polypeptide of any one of E1-E167, the nucleic acid molecule of E168, the vector of E169, the construct of E174 or E175, or the pharmaceutical composition of E172 or E173.

E464. A method of increasing insulin sensitivity in a subject in need thereof, by administering to the subject a therapeutically effective amount of the polypeptide of any one of E1-E167, the nucleic acid molecule of E168, the vector of E169, the construct of E174 or E175, or the pharmaceutical composition of E172 or E173.

E465. The method of any one of E461-E464, wherein the subject has or is at risk of developing a metabolic disease.

E466. A method of affecting myostatin, activin A, activin B, and/or BMP9 signaling (e.g., reducing or inhibiting the binding of myostatin, activin A, activin B, and/or BMP9 to their receptors) in a subject having or at risk of developing a metabolic disease by administering to the subject a therapeutically effective amount of the polypeptide of any one of E1-E167, the nucleic acid molecule of E168, the vector of E169, the construct of E174 or E175, or the pharmaceutical composition of E172 or E173.

E467. A method of treating and/or preventing a metabolic disease in a subject by administering to the subject a therapeutically effective amount of the polypeptide of any one of E1-E167, the nucleic acid molecule of E168, the vector of E169, the construct of E174 or E175, or the pharmaceutical composition of E172 or E173.

E468. The method of any one of E465-E467, wherein the metabolic disease is age-related metabolic disease.

E469. The method of any one of E465-E467, wherein the metabolic disease is treatment-related metabolic disease.

E470. The method of E469, wherein the treatment is treatment with a glucocorticoid (e.g., a corticosteroid, such as prednisone), a selective serotonin reuptake inhibitor (SSRI, e.g., paroxetine, mirtazapine, fluoxetine, escitalopram, or sertraline), a serotonin-norepinephrine reuptake inhibitor (SNRI), a tricyclic antidepressant (e.g., amitriptyline), a mood stabilizer (e.g., valproic acid or lithium), an antipsychotic (e.g., olanzapine, chlorpromazine, or clozapine), or a diabetes medication (e.g., insulin, chlorpropamide).

E471. The method of any one of E465-E470, wherein the metabolic disease is selected from the group including obesity, Type 1 diabetes, and Type 2 diabetes.

E472. The method of E471, wherein the metabolic disease is obesity.

E473. The method of E471, wherein the metabolic disease is Type 1 diabetes.

E474. The method of E471, wherein the metabolic disease is Type 2 diabetes.

E475. The method of any one of E461-E474, wherein the method reduces body weight and/or percentage of body weight gain of said subject.

E476. The method of any one of E461-E475, wherein the method reduces amount of body fat and/or percentage of body fat of said subject.

E477. The method of any one of E461-E476, wherein the method does not affect the appetite for food intake of said subject.

E478. The method of any one of E461-E477, wherein the method reduces adiposity of said subject.

E479. The method of any one of E461-E478, wherein the method reduces the weights of epididymal and perirenal fat pads of said subject.

E480. The method of any one of E461-E479, wherein the method reduces the amount of subcutaneous, visceral, and/or hepatic fat of said subject.

E481. The method of any one of E461-E480, wherein the method lowers the level of fasting insulin of said subject.

E482. The method of any one of E461-E481, wherein the method lowers the level of blood glucose of said subject.

E483. The method of any one of E461-E482, wherein the method increases insulin sensitivity of said subject.

E484. The method of any one of E461-E483, wherein the method increases the rate of glucose clearance of said subject.

E485. The method of any one of E461-E484, wherein the method improves the serum lipid profile of said subject.

E486. The method of any one of E461-E485, wherein the method delays, reduces, or eliminates the need for insulin treatment.

E487. The method of any one of E461-E486, wherein the method does not reduce lean mass.

E488. The method of any one of E176-E487, wherein the method reduces or inhibits the binding of activin A, activin B, and/or myostatin to their receptors (e.g., their endogenous receptors).

E489. The method of any one of E176-E208, E243-E270, and E488, wherein the polypeptide, nucleic acid, vector, construct, or pharmaceutical composition is administered in an amount sufficient to increase muscle mass and/or strength, increase lean mass, affect myostatin, activin A, activin B, and/or BMP9 signaling in the subject, or reduce or inhibit the binding of activin A, activin B and/or myostatin to their receptors (e.g., their endogenous receptors).

E490. The method of any one of E209-E291 and E488, wherein the polypeptide, nucleic acid, vector, construct, or pharmaceutical composition is administered in an amount sufficient to increase mineral bone density, reduce bone resorption, reduce bone loss, reduce the rate of bone resorption, increase bone formation, increase the rate of bone formation, reduce osteoclast activity, increase osteoblast activity, increase bone strength, reduce the risk or occurrence of bone fracture, affect myostatin, A, activin B, and/or BMP9 signaling in the subject, or reduce or inhibit the binding of activin A, activin B and/or myostatin to their receptors (e.g., their endogenous receptors).

E491. The method of any one of E292-E305 and E488, wherein the polypeptide, nucleic acid, vector, construct, or pharmaceutical composition is administered in an amount sufficient to reduce fibrosis, prevent the development of fibrosis, reduce the risk of developing fibrosis, delay the development of fibrosis, slow or inhibit the progression of fibrosis, treat fibrosis, reduce one or more symptom of fibrosis, improve the function of a fibrotic tissue or organ, affect myostatin, activin A, activin B, and/or BMP9 signaling in the subject, or reduce or inhibit the binding of activin A, activin B, and/or myostatin to their receptors (e.g., their endogenous receptors).

E492. The method of any one of E306-E337, E398-E431, and E488, wherein the polypeptide, nucleic acid, vector, construct, or pharmaceutical composition is administered in an amount sufficient to increase red blood cell levels, increase hemoglobin levels, increase red blood cell production, increase red blood cell count, increase hematocrit, reduce the need for a blood transfusion, increase the maturation and/or differentiation of erythroid progenitors (e.g., early and/or terminal stage erythroid progenitors), increase late-stage erythroid precursor maturation, recruit early-stage progenitors into the erythroid lineage, increase reticulocytes, increase proerythroblast numbers, increase reticulocyte numbers, reduce the accumulation of red blood cell progenitor cells, increase the number of early-stage erythroid precursors and/or progenitors, promote the progression of erythroid precursors and/or progenitors through erythropoiesis, treat anemia, affect myostatin, activin A, activin B, and/or BMP9 signaling in the subject, or reduce or inhibit the binding of activin A, activin B, and/or myostatin to their receptors (e.g., their endogenous receptors).

E493. The method of any one of E338-E370, E98-E431, and E488, wherein the polypeptide, nucleic acid, vector, construct, or pharmaceutical composition is administered in an amount sufficient to increase platelet levels, increase platelet production, increase platelet count, increase or induce megakaryocyte differentiation and/or maturation, reduce the accumulation of platelet progenitor cells, improve blood clotting, reduce bleeding events, reduce bleeding in the skin, treat thrombocytopenia, affect myostatin, activin A, activin B, and/or BMP9 signaling in the subject, or reduce or inhibit the binding of activin A, activin B, and/or myostatin to their receptors (e.g., their endogenous receptors).

E494. The method of any one of E371-E431 and E488, wherein the polypeptide, nucleic acid, vector, construct, or pharmaceutical composition is administered in an amount sufficient to increase neutrophil levels, increase neutrophil production, increase neutrophil count, increase or induce the differentiation and/or maturation of progenitor cells into neutrophils, treat neutropenia, reduce susceptibility to infection, affect myostatin, activin A, activin B, and/or BMP9 signaling in the subject, or reduce or inhibit the binding of activin A, activin B, and/or myostatin to their receptors (e.g., their endogenous receptors).

E495. The method of any one of E432-E460 and E488, wherein the polypeptide, nucleic acid, vector, construct, or pharmaceutical composition is administered in an amount sufficient to prevent PH, reduce the risk of developing PH, reduce the severity or frequency of one or more symptoms of PH, delay the development of PH, slow or inhibit the progression of PH, treat PH, reduce pulmonary vascular remodeling, reduce vascular remodeling in the heart, reduce right ventricular hypertrophy, reduce pulmonary vascular resistance, improve performance in the 6 minute walk test, affect myostatin, activin A, activin B, and/or BMP9 signaling in the subject, or reduce or inhibit the binding of activin A, activin B, and/or myostatin to their receptors (e.g., their endogenous receptors).

E496. The method of any one of E461-E488, wherein the polypeptide, nucleic acid, vector, construct, or pharmaceutical composition is administered in an amount sufficient to reduce body fat, reduce the amount of subcutaneous fat, reduce the amount of visceral and/or hepatic fat, reduce adiposity, reduce the weights of epididymal and perirenal fat pads, reduce body fat percentage, reduce body weight, reduce the percentage of body weight gain, reduce fasting insulin levels, reduce blood glucose levels, increase insulin sensitivity, affect myostatin, activin A, activin B, and/or BMP9 signaling in the subject, reduce the proliferation of adipose cells, reduce or inhibit the binding of activin A, activin B, and/or myostatin to their receptors (e.g., their endogenous receptors), reduce LDL, reduce triglycerides, improve the serum lipid profile, regulate insulin biosynthesis and/or secretion from β-cells, delay, postpone, or reduce the need for insulin, or increase glucose clearance.

E497. The method of any one of E176-E496, wherein the method does not cause a vascular complication in the subject.

E498. The method of E497, wherein the method does not increase vascular permeability or leakage.

E499. The method of any one of E176-E498, wherein the subject is a human.

Definitions

To facilitate the understanding of this invention, a number of terms are defined below. Terms defined herein have meanings as commonly understood by a person of ordinary skill in the areas relevant to the invention. Terms such as "a", "an," and "the" are not intended to refer to only a singular entity, but include the general class of which a specific example may be used for illustration. The terminology herein is used to describe specific embodiments of the invention, but their usage does not limit the invention, except as outlined in the claims.

As used herein, the term "about" refers to a value that is within 10% above or below the value being described.

As used herein, any values provided in a range of values include both the upper and lower bounds, and any values contained within the upper and lower bounds.

As used herein, the terms "extracellular activin receptor type II (ActRII) chimera," "extracellular ActRII chimera," and "ActRII chimera" refer to a peptide including a soluble, extracellular portion of the single transmembrane receptor ActRIIB and a soluble, extracellular portion of the single transmembrane receptor ActRIIA. The ActRII chimeras described herein result from joining an N-terminal portion of extracellular ActRIIB to a C-terminal portion of extracellular ActRIIA such that the sequences are contiguous (e.g., the ActRIIA sequence continues where the ActRIIB sequence left off, starting with the next the amino acid located in the corresponding position of ActRIIA). The extracellular ActRII chimera may also include one or more amino acid substitutions in the portion of the chimera that corresponds to the sequence of ActRIIB compared to a wild-type extracellular ActRIIB (e.g., bold portion of the sequence of SEQ ID NO: 46 shown below), and one or more amino acid substitutions in the portion of the chimera that corresponds to the sequence of ActRIIA compared to a wild-type extracellular ActRIIA (e.g., bold portion of the sequence of SEQ ID NO: 47 shown below). The extracellular ActRII chimera may also have an N-terminal truncation of 1-9 amino acids relative to the extracellular portion of ActRIIB or ActRIIA. The sequences of wild-type, human ActRIIB (SEQ ID NO: 46) and wild-type, human ActRIIA (SEQ ID NO: 47) are shown below, in which the signal peptide is italicized and the extracellular portion is bold.

Wild-type human ActRIIB (SEQ ID NO: 46):
*MTAPWVALALLWGSLCAGS*GRGEAETRECIYYNANWELERTNQSGLERCEGEQDKRLHCYAS

WRNSSGTIELVKKGCWLDDFNCYDRQECVATEENPQVYFCCCEGNFCNERFTHLPEAGGPEV

TYEPPPTAPTLLTVLAYSLLPIGGLSLIVLLAFWMYRHRKPPYGHVDIHEDPGPPP

PSPLVGLKPLQLLEIKARGRFGCVWKAQLMNDFVAVKIFPLQDKQSWQSEREIFSTPGMK

HENLLQFIAAEKRGSNLEVELWLITAFHDKGSLTDYLKGNIITWNELCHVAETMSRGLSY

LHEDVPWCRGEGHKPSIAHRDFKSKNVLLKSDLTAVLADFGLAVRFEPGKPPGDTHGQVG

TRRYMAPEVLEGAINFQRDAFLRIDMYAMGLVLWELVSRCKAADGPVDEYMLPFEEEIGQ

HPSLEELQEVVVHKKMRPTIKDHWLKHPGLAQLCVTIEECWDHDAEARLSAGCVEERVSL

IRRSVNGTTSDCLVSLVTSVTNVDLPPKESSI

Wild-type, human ActRIIA precursor protein (SEQ ID NO: 47):
*MGAAAKLAFAVFLISCSS*GAILGRSETQECLFFNANWEKDRTNQTGVEPCYGDKDKRRHCFAT

WKNISGSIEIVKQGCWLDDINCYDRTDCVEKKDSPEVYFCCCEGNMCNEKFSYFPEMEVTQPT

SNPVTPKPPYYNILLYSLVPLMLIAGIVICAFWVYRHHKMAYPPVLVPTQDPGPPPPSPLLGLKPL

QLLEVKARGRFGCVWKAQLLNEYVAVKIFPIQDKQSWQNEYEVYSLPGMKHENILQFIGAEKRG

TSVDVDLWLITAFHEKGSLSDFLKANVVSWNELCHIAETMARGLAYLHEDIPGLKDGHKPAISHR

DIKSKNVLLKNNLTACIADFGLALKFEAGKSAGDTHGQVGTRRYMAPEVLEGAINFQRDAFLRID

MYAMGLVLWELASRCTAADGPVDEYMLPFEEEIGQHPSLEDMQEVVVHKKKRPVLRDYWQKH

AGMAMLCETIEECWDHDAEARLSAGCVGERITQMQRLTNIITTEDIVTVVTMVTNVDFPPKESSL

An extracellular ActRII chimera may have the sequence of any one of SEQ ID NOs: 1-43. In particular embodiments, an extracellular ActRII chimera has the sequence of any one of SEQ ID NOs: 22-43 (Table 2).

As used herein, the term "N-terminal truncation" refers to a deletion of 1-9 amino acids (e.g., 1, 2, 3, 4, 5, 6, 7, 8, or 9 amino acids) from the N-terminus of an extracellular ActRII chimera (e.g., an extracellular ActRII chimera having the sequence of any one of SEQ ID NOs: 1-43 (e.g., SEQ ID NOs: 22-43)). The N-terminal truncation can remove amino acids up two to amino acids before the first cysteine (e.g., the two amino acids before the first cysteine (RE or QE) are retained in the N-terminally truncated ActRII chimeras).

As used herein, the term "linker" refers to a linkage between two elements, e.g., peptides or protein domains. A polypeptide described herein may include an extracellular ActRII chimera (e.g., an extracellular ActRII chimera having the sequence of any one of SEQ ID NOs: 1-43 (e.g., SEQ ID NOs: 22-43)), fused to a moiety. The moiety may increase stability or improve pharmacokinetic properties of the polypeptide. The moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin) may be fused to the polypeptide by way of a linker. A linker can be a covalent bond or a spacer. The term "bond" refers to a chemical bond, e.g., an amide bond or a disulfide bond, or any kind of bond created from a chemical reaction, e.g., chemical conjugation. The term "spacer" refers to a moiety (e.g., a polyethylene glycol (PEG) polymer) or an amino acid sequence (e.g., a 1-200 amino acid sequence) occurring between two elements, e.g., peptides or protein domains, to provide space and/or flexibility between the two elements. An amino acid spacer is part of the primary sequence of a polypeptide (e.g., fused to the spaced peptides via the polypeptide backbone). The formation of disulfide bonds, e.g., between two hinge regions that form an Fc domain, is not considered a linker.

As used herein, the term "Fc domain" refers to a dimer of two Fc domain monomers. An Fc domain has at least 80% sequence identity (e.g., at least 85%, 90%, 95%, 97%, or 100% sequence identity) to a human Fc domain that includes at least a $C_H2$ domain and a $C_H3$ domain. An Fc domain monomer includes second and third antibody constant domains ($C_H2$ and $C_H3$). In some embodiments, the Fc domain monomer also includes a hinge domain. An Fc domain does not include any portion of an immunoglobulin that is capable of acting as an antigen-recognition region, e.g., a variable domain or a complementarity determining region (CDR). In the wild-type Fc domain, the two Fc domain monomers dimerize by the interaction between the two $C_H3$ antibody constant domains, as well as one or more disulfide bonds that form between the hinge domains of the two dimerizing Fc domain monomers. In some embodiments, an Fc domain may be mutated to lack effector functions, typical of a "dead Fc domain." In certain embodiments, each of the Fc domain monomers in an Fc domain includes amino acid substitutions in the $C_H2$ antibody constant domain to reduce the interaction or binding between the Fc domain and an Fcγ receptor. In some embodiments, the Fc domain contains one or more amino acid substitutions that reduce or inhibit Fc domain dimerization. An Fc domain can be any immunoglobulin antibody isotype, including IgG, IgE, IgM, IgA, or IgD. Additionally, an Fc domain can be an IgG subtype (e.g., IgG1, IgG2a, IgG2b, IgG3, or IgG4). The Fc domain can also be a non-naturally occurring Fc domain, e.g., a recombinant Fc domain.

As used herein, the term "albumin-binding peptide" refers to an amino acid sequence of 12 to 16 amino acids that has affinity for and functions to bind serum albumin. An albumin-binding peptide can be of different origins, e.g., human, mouse, or rat. In some embodiments, an albumin-binding peptide has the sequence DICLPRWGCLW (SEQ ID NO: 101).

As used herein, the term "endogenous" describes a molecule (e.g., a polypeptide, nucleic acid, or cofactor) that is found naturally in a particular organism (e.g., a human) or in a particular location within an organism (e.g., an organ, a tissue, or a cell, such as a human cell, e.g., a human red blood cell, platelet, neutrophil, or muscle cell).

As used herein, the term "fibronectin domain" refers to a high molecular weight glycoprotein of the extracellular matrix, or a fragment thereof, that binds to, e.g., membrane-spanning receptor proteins such as integrins and extracellular matrix components such as collagens and fibrins. In some embodiments, a fibronectin domain is a fibronectin type II domain (SEQ ID NO: 102) having amino acids 610-702 of the sequence of UniProt ID NO: P02751. In other embodiments, a fibronectin domain is an adnectin protein.

As used herein, the term "human serum albumin" refers to the albumin protein present in human blood plasma. Human serum albumin is the most abundant protein in the blood. It constitutes about half of the blood serum protein. In some embodiments, a human serum albumin has the sequence of UniProt ID NO: P02768 (SEQ ID NO: 103).

As used herein, the term "fused" is used to describe the combination or attachment of two or more elements, components, or protein domains, e.g., peptides or polypeptides, by means including chemical conjugation, recombinant means, and chemical bonds, e.g., amide bonds. For example, two single peptides in tandem series can be fused to form one contiguous protein structure, e.g., a polypeptide, through chemical conjugation, a chemical bond, a peptide linker, or any other means of covalent linkage. In some embodiments of a polypeptide described herein, an extracellular ActRII chimera (e.g., an extracellular ActRII chimera having the sequence of any one of SEQ ID NOs: 1-43 (e.g., SEQ ID NOs: 22-43)), may be fused in tandem series to the N- or C-terminus of a moiety (e.g., Fc domain monomer (e.g., the sequence of SEQ ID NO: 48) a wild-type Fc domain (e.g., the sequence of SEQ ID NO: 100 or SEQ ID NO: 264), an Fc domain with amino acid substitutions (e.g., one or more substitutions that reduce dimerization), an albumin-binding peptide (e.g., the sequence of SEQ ID NO: 101), a fibronectin domain (e.g., the sequence of SEQ ID NO: 102), or a human serum albumin (e.g., the sequence of SEQ ID NO: 103)) by way of a linker. For example, an extracellular ActRII chimera is fused to a moiety (e.g., an Fc domain monomer, a wild-type Fc domain, an Fc domain with amino acid substitutions (e.g., one or more substitutions that reduce dimerization), an albumin-binding peptide, a fibronectin domain, or a human serum albumin) by way of a peptide linker, in which the N-terminus of the peptide linker is fused to the C-terminus of the extracellular ActRII chimera through a chemical bond, e.g., a peptide bond, and the C-terminus of the peptide linker is fused to the N-terminus of the moiety (e.g., Fc domain monomer, wild-type Fc domain, Fc domain with amino acid substitutions (e.g., one or more substitutions that reduce dimerization), albumin-binding peptide, fibronectin domain, or human serum albumin) through a chemical bond, e.g., a peptide bond.

As used herein, the terms "bone mineral density (BMD)," "bone density," and "bone mass" refer to a measure of the amount of bone mineral (e.g., calcium) in bone tissue. BMD may be measured by well-established clinical techniques known to one of skill in the art (e.g., by single-1 or dual-energy photon or X-ray absorptiometry). The concept of BMD relates to the mass of mineral per volume of bone, although clinically it is measured by proxy according to optical density per square centimeter of bone surface upon imaging. BMD measurement is used in clinical medicine as an indirect indicator of osteoporosis and fracture risk. In some embodiments, BMD test results are provided as a T-score, where the T-score represents the BMD of a subject compared to the ideal or peak bone mineral density of a healthy 30-year-old adult. A score of 0 indicates that the BMD is equal to the normal reference value for a healthy young adult. Differences between the measured BMD of subject and that of the reference value for a healthy young adult are measured in standard deviations units (SDs). Accordingly, a T-score of between +1 SD and −1 SD may indicate a normal BMD, a T-score of between −1 SD and −2.5 SD may indicate low bone mass (e.g., osteopenia), and a T-score lower than −2.5 SD may indicate osteoporosis or severe osteoporosis. In some embodiments, a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule is administered to a subject in need thereof, wherein the patient has low bone mass (e.g., a T-Score of between −1 SD and −2.5 SD). In some embodiments, a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule is administered to a subject in need thereof, wherein the patient has osteoporosis (e.g., a T-Score of less than −2.5 SD). In some embodiments, administration of a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule treats the subject by increasing their BMD. In some embodiments, administration of a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule increases the BMD of a subject resulting in an increase in the T-Score of the subject (e.g., resulting in an increase in the T-Score of the subject of 0.1 or more, 0.2 or more, 0.3 or more, 0.4 or more, 0.5 or more, 1.0 or more, or 2.0 or more).

As used herein, the term "bone strength" refers to a measurement of bone that is determined by bone quality in addition to bone mineral density. Bone quality is influenced by bone geometry, microarchitecture, and the properties of constituent tissues. Bone strength can be used to assess the bone's risk of fracture.

As used herein, the term "bone disease" refers to a condition characterized by bone damage (e.g., decreased bone mineral density, decreased bone strength, and/or bone loss). Such diseases or conditions may be caused by an imbalance in osteoblast and/or osteoclast activity (e.g., increased bone resorption or reduced bone formation). Bone diseases include primary osteoporosis, secondary osteoporosis, osteopenia, osteopetrosis, bone fracture, bone cancer or cancer metastasis-related bone loss (e.g., bone loss associated with multiple myeloma), Paget's disease, renal osteodystrophy, osteogenesis imperfecta, neuromuscular disease-related bone loss, burn-induced bone loss (e.g., bone loss associated with a burn injury), anorexia-related bone loss, treatment-related bone loss, diet-related bone loss, bone loss associated with the treatment of obesity, low gravity-related bone loss, and immobility-related bone loss.

As used herein, the term "neuromuscular disease-related bone loss" refers to bone loss that occurs in a subject having a neuromuscular disease. Poor bone health is often a significant problem for patients with neuromuscular disease. Deficiency of bone mineral density and increased incidence of bone fractures, for example, are a well-recognized clinical consequence of diseases such as DMD, ALS, and SMA.

As used herein, the terms "bone remodeling" or "bone metabolism" refer to the process for maintaining bone strength and ion homeostasis by replacing discrete parts of old bone with newly synthesized packets of proteinaceous matrix. Bone is resorbed by osteoclasts and is deposited by osteoblasts in a process called ossification. Osteocyte activity plays a key role in this process. Conditions that result in a decrease in bone mass, can either be caused by an increase in resorption, or a decrease in ossification. In a healthy individual, during childhood, bone formation exceeds resorption. As the aging process occurs, resorption exceeds formation. Bone resorption rates are also typically much higher in post-menopausal older women due to estrogen deficiency related to menopause.

As used herein, the terms "bone resorption" or "bone catabolic activity" refer to a process by which osteoclasts break down the tissue in bones and release the minerals, resulting in a transfer of the mineral (e.g., calcium) from bone tissue to the blood. Increased rates of bone resorption are associated with aging, including in post-menopausal women. High rates of bone resorption, or rates of bone resorption that exceed the rate of ossification, are associated with bone disorders, such as decreased bone mineral density, including osteopenia and osteoporosis, and can result in bone loss. In some embodiments, a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule is administered to a subject in need thereof to decrease bone resorption (e.g., decrease bone loss) in the subject (e.g., the amount or rate of bone resorption in the subject).

As used herein, the terms "bone formation," "ossification," "osteogenesis," or "bone anabolic activity" refer to the process of forming new bone tissue by osteoblasts. In some embodiments, a polypeptide of the invention including an extracellular ActRII chimera (e.g., an extracellular ActRII chimera having the sequence of any one of SEQ ID NOs: 1-43 (e.g., SEQ ID NOs: 22-43)), a nucleic acid encoding such a polypeptide, or a vector containing such a nucleic acid molecule is administered to a subject in need thereof, to increase bone formation (e.g., increase the amount or rate of bone formation or osteogenesis in the subject). Reduced rates of bone formation, or rates of bone formation that are exceeded by the rate of bone resorption, can result in bone loss.

As used herein, the terms "increasing" and "decreasing" refer to modulating resulting in, respectively, greater or lesser amounts, of function, expression, or activity of a metric relative to a reference. For example, subsequent to administration of a polypeptide of the invention including an extracellular ActRII chimera in a method described herein, the amount of a marker of a metric (e.g., lean mass) as described herein may be increased or decreased in a subject relative to the amount of the marker prior to administration.

Generally, the metric is measured subsequent to administration at a time that the administration has had the recited effect, e.g., at least one week, one month, 3 months, or 6 months, after a treatment regimen has begun.

As used herein, the term "fibrosis" refers to the pathological process of excess formation of fibrous connective tissue. Fibrosis is characterized by fibroblast accumulation and collagen deposition in excess of normal deposition in any particular tissue. In response to inflammation or an injury to a tissue, nearby fibroblasts can migrate into the wound, proliferate, and produce large amounts of collagenous extracellular matrix. When fibrosis occurs in response to injury, the term "scarring" can be used as synonym. Fibrosis may occur in many tissues of the body, including, e.g., lungs, skin, liver, kidney, heart, eye, tendon, cartilage, pancreatic tissue, uterine tissue, neural tissue, testis, ovary, adrenal gland, artery, vein, bone marrow, colon, small and large intestine, biliary tract, and gut.

As used herein, the terms "pulmonary hypertension" or "PH" refer to a disease characterized by an increase in blood pressure between the heart and lungs, which can include an increase in blood pressure in pulmonary arteries (pulmonary arterial hypertension), pulmonary veins, or pulmonary capillaries. Pulmonary hypertension can have a number of symptoms, shortness of breath (dyspnea), fatigue, swelling (e.g., edema) of the legs, feet, belly (ascites), or neck, chest pain or pressure, racing pulse or heart palpitations, bluish color to lips or skin (cyanosis), dizziness, or fainting. PH also features reduce exercise tolerance and may lead to heart failure.

As used herein, the terms "pulmonary arterial hypertension" or "PAH" refer to a form of pulmonary hypertension characterized by a narrowing or obstruction in the small pulmonary arteries, often caused by scarring, and an increase in pulmonary arterial blood pressure. PAH is also known as WHO Group I PH. PAH can be diagnosed based on an increase in blood pressure in the pulmonary artery mean pulmonary arterial pressure above 25 mmHg at rest, with a normal pulmonary artery capillary wedge pressure. PAH can lead to shortness of breath, dizziness, fainting, and other symptoms, all of which are exacerbated by exertion. PAH can be a severe disease with a markedly decreased exercise tolerance and heart failure. Two major types of PAH include idiopathic PAH (e.g., PAH in which no predisposing factor is identified) and heritable PAH (e.g., PAH associated with a mutation in BMPR2, ALK1, SMAD9, caveolin 1, KCNK3, or EIF2AK4). In 70% of familial PAH cases, mutations are located in the BMPR2 gene. Risk factors for the development of PAH include family history of PAH, drug use (e.g., methamphetamine or cocaine use), infection (e.g., HIV infection or schistosomiasis), cirrhosis of the liver, congenital heart abnormalities, portal hypertension, pulmonary veno-occlusive disease, pulmonary capillary hemangiomatosis, or connective tissue/autoimmune disorders (e.g., scleroderma or lupus).

As used herein, the terms "venous pulmonary hypertension" and "venous PH" refer to a form of pulmonary hypertension that is secondary to left heart disease. Venous PH is also known as WHO Group II PH. Venous PH may be associated with or caused by left ventricular systolic dysfunction (e.g., failure of the left ventricle), left ventricular diastolic dysfunction, valvular heart disease (e.g., mitral valve or aortic valve disease), congenital cardiomyopathy, or congenital/acquired pulmonary venous stenosis.

As used herein, the terms "hypoxic pulmonary hypertension" and "hypoxic PH" refer to a form of pulmonary hypertension that is due to lung disease or chronic hypoxia. This form of PH is also known as WHO Group III PH. Hypoxic PH may be associated with or caused by chronic obstructive pulmonary disease (e.g., emphysema), interstitial lung disease, sleep-disordered breathing (e.g., sleep apnea), lung disease (e.g., pulmonary fibrosis), alveolar hypoventilation disorders, chronic exposure to high altitude, or developmental abnormalities.

As used herein, the terms "thromboembolic pulmonary hypertension" and "thromboembolic PH" refer to a form of pulmonary hypertension that is related to chronic arterial obstruction (e.g., blood clots). Thromboembolic PH is also known as WHO Group IV PH. Thromboembolic PH may be associated with or caused by chronic thromboembolic pulmonary hypertension, or other pulmonary artery obstructions (e.g., pulmonary emboli, angiosarcoma, arteritis, congenital pulmonary artery stenosis, or parasitic infection).

As used herein, the terms "miscellaneous pulmonary hypertension" and "miscellaneous PH" refer to a form of pulmonary hypertension with unclear or multifactorial mechanisms. This form of PH is categorized as WHO Group V PH. Miscellaneous PH may be associated with or caused by a hematologic disease (e.g., chronic hemolytic anemia, sickle cell disease), a systemic disease (e.g., sarcoidosis, pulmonary Langerhans cell histiocytosis, lymphangioleiomyomatosis, neurofibromatosis, or vasculitis), a metabolic disorder (e.g., glycogen storage disease, Gaucher disease, or thyroid diseases), pulmonary tumoral thrombotic microangiopathy, fibrosing mediastinitis, chronic kidney failure, or segmental pulmonary hypertension.

As used herein, the terms "increase red blood cell levels" and "promote red blood cell formation" refer to clinically observable metrics, such as hematocrit, red blood cell counts, and hemoglobin measurements, and are intended to be neutral as to the mechanism by which such changes occur. The term "low red blood cell levels" as used herein refers to red blood cell counts, hematocrit, and hemoglobin measurements that are below the range of values that is considered normal for the subject's age and gender.

As used herein, the terms "red blood cell formation" and "red blood cell production" refer to the generation of red blood cells, such as the process of erythropoiesis in which red blood cells are produced in the bone marrow.

As used herein, the terms "increase platelet levels" and "promote platelet formation" refer to clinically observable metrics, such as platelet counts, and are intended to be neutral as to the mechanism by which such changes occur. The term "low platelet levels" as used herein refers to platelet counts that are below the range of values that is considered normal for the subject's age and gender. The terms "platelet formation" and "platelet production" refer to the generation of platelets, such as the process in which platelets are produced from megakaryocytes.

As used herein, the terms "increase neutrophil levels" and "promote neutrophil formation" refer to clinically observable metrics, such as neutrophil counts, and are intended to be neutral as to the mechanism by which such changes occur. The term "low neutrophil levels" as used herein refers to neutrophil counts that are below the range of values that is considered normal for the subject's age and gender. The terms "neutrophil formation" and "neutrophil production" refer to the generation of neutrophils such as the process in which neutrophils are produced in the bone marrow.

As used herein, the term "anemia" refers to any abnormality in hemoglobin or red blood cells that leads to reduced oxygen levels in the blood. Anemia can be associated with abnormal production, processing, or performance of erythrocytes and/or hemoglobin. The term anemia refers to any reduction in the number of red blood cells and/or level of hemoglobin in blood relative to normal blood levels.

As used herein, the term "thrombocytopenia" refers to a condition in which the blood contains a lower than normal number of platelets, which may be due to a deficiency in platelet production, accumulation of platelets within an enlarged spleen, or the destruction of platelets. Normal blood platelet levels range from about 150,000 to 450,000 per microliter blood in humans. A platelet count of less than 150,000 platelets per microliter is lower than normal. Bleeding can occur after a relatively minor injury if the platelet count falls below 50,000 platelets per microliter of blood, and serious bleeding may occur without any recognized injury if the platelet count falls below 10,000 to 20,000 platelets per microliter of blood.

As used herein, the term "immune thrombocytopenia" is used herein to refer to any type of thrombocytopenia arising from an autoimmune response directed against an individual's own platelets. Immune thrombocytopenia includes primary immune thrombocytopenia, in which autoimmune response is the original cause for the decrease in the platelet counts, such as idiopathic thrombocytopenic purpura. Immune thrombocytopenia also includes secondary immune thrombocytopenia, in which the decrease in platelet counts is associated with one or more other diseases that cause an individual's body to generate an autoimmune response against its own platelets, such as systemic lupus erythematosus (SLE), antiphospholipid syndrome (APS), Evans syndrome, immune thyroid disease, leukemia (e.g., chronic lymphocytic leukemia or large granular T-lymphocyte lymphocytic leukemia), or chronic infection (e.g., with *Helicobacter pylori*, human immunodeficiency virus (HIV), or Hepatitis C).

As used herein, the term "neutropenia" refers to a condition in which the blood contains an abnormally low number of neutrophils. The typical lower limit of the neutrophil count is about 1500 cells per microliter of blood. Below this level, the risk of infection increases. Neutropenia severity is classified as: mild (1000 to 1500 neutrophils per microliter of blood), moderate (500 to 1000 neutrophils per microliter of blood), and severe (below 500 neutrophils per microliter of blood). Neutropenia has many causes, but they typically fall into two main categories: destruction or depletion of neutrophils faster than the bone marrow can produce new neutrophils, or reduced production of neutrophils in the bone marrow.

As used herein, the term "low transfusion burden" refers to a condition of a subject that has received less than four units of red blood cells (RBCs) within eight weeks (e.g., 3, 2, 1, or 0 units of RBCs within eight weeks) prior to treatment with an ActRII chimera described herein. A subject with a low transfusion burden can be identified as having anemia based on measurements of mean hemoglobin concentration. A subject with a low transfusion burden and a mean hemoglobin concentration of less than 10.0 g/dL of two measurements performed at least one week apart prior to treatment with an ActRII chimera described herein (e.g., one measurement performed within one day prior to treatment and the other performed 7-28 days prior, not influenced by RBC transfusion within seven days of measurement) is defined as having anemia. In some embodiments, a subject with a low transfusion burden receives 1-3 units of RBCs (1-3 RBC transfusions) within eight weeks prior to treatment with an ActRII chimera described herein. In some embodiments, a subject with a low transfusion burden does not receive any units of RBCs (0 RBC transfusions) within eight weeks prior to treatment with an ActRII chimera described herein.

As used herein, the term "high transfusion burden" refers to a condition of a subject requiring greater than or equal to four units of RBCs (e.g., 4, 5, 6, 7, 8, or more units) within eight weeks prior to treatment with an ActRII chimera described herein. A subject with a high transfusion burden can be identified as having anemia based on measurements of mean hemoglobin concentration. A subject with a high transfusion burden and a mean hemoglobin concentration of less than or equal to 9.0 g/dL is defined as having anemia.

As used herein, the term "ineffective hematopoiesis" refers to the failure to produce fully mature hematopoietic cells (e.g., the failure to produce red blood cells, platelets, and neutrophils). Ineffective hematopoiesis may be due to single or multiple defects, such as abnormal proliferation and/or differentiation of progenitor cells (e.g., an excessive production of progenitors that are unable to complete differentiation), that can lead to a hyperproliferation or a shortage of progenitor cells.

As used herein, the terms "erythropoiesis stimulating agent" and "ESA" refer to a class of drugs that act on the proliferation stage of red blood cell development by expanding the pool of early-stage progenitor cells. Examples of erythropoiesis-stimulating agents are epoetin alfa and darbepoetin alfa.

As used herein, the term "metabolic disease" refers to a disease, disorder, or syndrome that is related to a subject's metabolism, such as breaking down carbohydrates, proteins, and fats in food to release energy, and converting chemicals into other substances and transporting them inside cells for energy utilization and/or storage. Some symptoms of a metabolic disease include high serum triglycerides, high low-density cholesterol (LDL), low high-density cholesterol (HDL), and/or high fasting insulin levels, elevated fasting plasma glucose, abdominal (central) obesity, and elevated blood pressure. Metabolic diseases increase the risk of developing other diseases, such as cardiovascular disease. In the present invention, metabolic diseases include, but are not limited to, obesity, Type 1 diabetes, and Type 2 diabetes.

As used herein, the term "treatment-related metabolic disease" refers to a metabolic disease (e.g., obesity, Type 1 diabetes, or Type 2 diabetes) associated with a medication taken by the subject (e.g., a metabolic disease developed during treatment with the medication). The medication can be one that the subject continues to take, or one taken previously that led to the development of metabolic disease. Medications associated with the development of obesity include glucocorticoids (e.g., corticosteroids, such as prednisone), selective serotonin reuptake inhibitors (SSRIs, e.g., paroxetine, mirtazapine, fluoxetine, escitalopram, sertraline), tricyclic antidepressants (e.g., amitriptyline), mood stabilizers (e.g., valproic acid, lithium), antipsychotics (e.g., olanzapine, chlorpromazine, clozapine), and diabetes medication (e.g., insulin, chlorpropamide). Medications associated with the development of diabetes include glucocorticoids (e.g., corticosteroids, which may cause glucocorticoid-induced diabetes mellitus), SSRIs, serotonin-norepinephrine reuptake inhibitors (SNRIs), mood stabilizers (e.g., lithium and valproic acid), and antipsychotics (e.g., olanzapine and clozapine). In some embodiments, the development of obesity may lead to the development of diabetes.

As used herein, the term "age-related metabolic disease" refers to a metabolic disease (e.g., obesity, Type 1 diabetes, or Type 2 diabetes) that develops with age. For example, the risk of diabetes increases with age and is more common in older adults, with approximately 25% of adults over 60 having diabetes. Adults can develop Type 2 diabetes or new-onset Type 1 diabetes. Rates of obesity also increase with age, with the highest rates of obesity in the United States occurring in adults aged 40-59 (with a prevalence of obesity of 45%). Aging also reduces the body's ability to burn fat, leading to increased fat surrounding internal organs.

As used herein, the term "percentage of body weight gain" refers to the percentage of gained body weight compared to a prior body weight of a subject at a prior time. The percentage of body weight gain can be calculated as follows:

$$100\times[(\text{body weight at a later time}-\text{body weight at a prior time})/(\text{body weight at a prior time})]$$

In the present invention, administration of a polypeptide including an extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject can reduce the percentage of body weight gain of the subject.

As used herein, the term "appetite for food intake" refers to a subject's natural desire or need for food. The appetite for food intake of a subject can be monitored by measuring the amount of food consumed after the polypeptide including an extracellular ActRII chimera (e.g., an extracellular ActRII chimera having the sequence of any one of SEQ ID NOs: 1-43 (e.g., SEQ ID NOs: 22-43)) is administered. In the present invention, administration of a polypeptide including an extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject does not affect the subject's appetite for food intake.

As used herein, the term "adiposity" refers to the fat stored in the adipose tissue of a subject. In the present invention, administration of a polypeptide including extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject can reduce the subject's adiposity without affecting lean mass.

As used herein, the term "epididymal and perirenal fat pads" refers to the tightly packed fat cells in the epididymis and around the kidney. In the present invention, administration of a polypeptide including an extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject can reduce the weights of epididymal and perirenal fat pads of the subject.

As used herein, the term "fasting insulin" refers to a subject's level of insulin while the subject has not had any food intake for a length of time (i.e., 12-24 hours). Fasting insulin level is used in diagnosing metabolic diseases. Fasting insulin level is also used as an indication of whether a subject is at the risk of developing a metabolic disease. Normally, in a subject suffering from Type 1 diabetes, the subject's fasting insulin level is low compared to that of a healthy subject. In a subject suffering from insulin resistance (i.e., Type 2 diabetes), the subject's fasting insulin level is high compared to that of a healthy subject. In the present invention, administration of a polypeptide including an extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject can modulate the subject's fasting insulin level.

As used herein, the term "rate of glucose clearance" refers to the rate at which glucose is being cleared from the blood. The rate of glucose clearance can be measured in a glucose tolerance test (GTT). In a GTT, a subject is given a certain amount of glucose and blood samples are taken afterward to determine how quickly it is cleared from the blood. The rate of glucose clearance can be used as a parameter in diagnosing and/or determining the risk of developing metabolic diseases such as obesity, diabetes, and insulin resistance.

As used herein, the term "serum lipid profile" refers to the measurement of the distribution of different types of lipids and lipoproteins in a subject's serum. Such measurement can be accomplished by a panel of blood tests. The types of lipids and lipoproteins in a subject's serum include, but are not limited to, cholesterol (e.g., high-density lipoprotein (HDL) and low-density lipoprotein (LDL)), triglyceride, and free fatty acid (FFA). The distribution of the different types of lipids and lipoproteins can be used as a parameter in diagnosing and/or determining the risk of developing metabolic diseases such as obesity, diabetes, and insulin resistance. High levels of cholesterol, especially low-density lipoprotein, is generally regarded as an indication or risk factor for developing certain metabolic diseases, or in some severe medical cases, cardiovascular diseases. In the present invention, administration of a polypeptide including an extracellular ActRII chimera (e.g., an extracellular ActRII chimera having the sequence of any one of SEQ ID NOs: 1-43 (e.g., SEQ ID NOs: 22-43)), a nucleic acid molecule encoding a polypeptide including an extracellular ActRII chimera (e.g., an extracellular ActRII chimera having the sequence of any one of SEQ ID NOs: 1-43 (e.g., SEQ ID NOs: 22-43)), or vector containing such a nucleic acid molecule to a subject improves the subject's serum lipid profile such that the levels of cholesterol (especially low-density lipoprotein) and triglyceride are lowered.

As used herein, the term "C-terminal extension" refers to the addition of one or more amino acids to the C-terminus of a an extracellular ActRII chimera (e.g., an extracellular ActRII chimera having the sequence of any one of SEQ ID NOs: 1-43 (e.g., SEQ ID NOs: 22-43)). The C-terminal extension can be one or more amino acids, such as 1-6 amino acids (e.g., 1, 2, 3, 4, 5, 6 or more amino acids). The C-terminal extension may include amino acids from the corresponding position of wild-type ActRIIA or ActRIIB. Exemplary C-terminal extensions are the amino acid sequence NP (a two amino acid C-terminal extension) and the amino acid sequence NPVTPK (SEQ ID NO: 104) (a six amino acid C-terminal extension). Any amino acid sequence that does not disrupt the activity of the polypeptide can be used.

As used herein, the term "percent (%) identity" refers to the percentage of amino acid (or nucleic acid) residues of a candidate sequence that are identical to the amino acid (or nucleic acid) residues of a reference sequence after aligning the sequences and introducing gaps, if necessary, to achieve the maximum percent identity (i.e., gaps can be introduced in one or both of the candidate and reference sequences for optimal alignment and non-homologous sequences can be disregarded for comparison purposes). Alignment for purposes of determining percent identity can be achieved in various ways that are within the skill in the art, for instance, using publicly available computer software such as BLAST, ALIGN, or Megalign (DNASTAR) software. Those skilled in the art can determine appropriate parameters for measuring alignment, including any algorithms needed to achieve maximal alignment over the full length of the sequences being compared. In some embodiments, the percent amino acid (or nucleic acid) sequence identity of a given candidate sequence to, with, or against a given reference sequence (which can alternatively be phrased as a given candidate sequence that has or includes a certain percent amino acid (or nucleic acid) sequence identity to, with, or against a given reference sequence) is calculated as follows:

$$100\times(\text{fraction of } A/B)$$

where A is the number of amino acid (or nucleic acid) residues scored as identical in the alignment of the candidate sequence and the reference sequence, and where B is the total number of amino acid (or nucleic acid) residues in the reference sequence. In some embodiments where the length of the candidate sequence does not equal to the length of the reference sequence, the percent amino acid (or nucleic acid) sequence identity of the candidate sequence to the reference sequence would not equal to the percent amino acid (or nucleic acid) sequence identity of the reference sequence to the candidate sequence.

In particular embodiments, a reference sequence aligned for comparison with a candidate sequence may show that the candidate sequence exhibits from 50% to 100% identity across the full length of the candidate sequence or a selected portion of contiguous amino acid (or nucleic acid) residues of the candidate sequence. The length of the candidate sequence aligned for comparison purpose is at least 30%, e.g., at least 40%, e.g., at least 50%, 60%, 70%, 80%, 90%, or 100% of the length of the reference sequence. When a position in the candidate sequence is occupied by the same amino acid (or nucleic acid) residue as the corresponding position in the reference sequence, then the molecules are identical at that position.

As used herein, the term "serum half-life" refers to, in the context of administering a therapeutic protein to a subject, the time required for plasma concentration of the protein in the subject to be reduced by half. The protein can be redistributed or cleared from the bloodstream, or degraded, e.g., by proteolysis. Serum half-life comparisons can be made by comparing the serum half-life of Fc fusion proteins.

As used herein, the term "lean mass" refers to a component of body composition which includes, e.g., lean mass, body fat, and body fluid. Normally lean mass is calculated by subtracting the weights of body fat and body fluid from total body weight. Typically, a subject's lean mass is between 60% and 90% of totally body weight. In the present invention, administration of a polypeptide including an extracellular ActRII chimera having the sequence of any one of SEQ ID NOs: 1-43 (e.g., SEQ ID NOs: 22-43), a nucleic acid molecule encoding a polypeptide including an extracellular ActRII chimera (e.g., extracellular ActRII chimera having the sequence of any one of SEQ ID NOs: 1-43 (e.g., SEQ ID NOs: 22-43), or vector containing such a nucleic acid molecule to a subject increases the subject's lean mass.

As used herein, the term "affinity" or "binding affinity" refers to the strength of the binding interaction between two molecules. Generally, binding affinity refers to the strength of the sum total of non-covalent interactions between a molecule and its binding partner, such as an extracellular ActRII chimera and BMP9 or activin A. Unless indicated otherwise, binding affinity refers to intrinsic binding affinity, which reflects a 1:1 interaction between members of a binding pair. The binding affinity between two molecules is commonly described by the dissociation constant ($K_D$) or the affinity constant (KA). Two molecules that have low binding affinity for each other generally bind slowly, tend to dissociate easily, and exhibit a large $K_D$. Two molecules that have high affinity for each other generally bind readily, tend to remain bound longer, and exhibit a small $K_D$. The $K_D$ of two interacting molecules may be determined using methods and techniques well known in the art, e.g., surface plasmon resonance. $K_D$ is calculated as the ratio of $k_{on}/k_{on}$.

As used herein, the term "muscle mass" refers to the primary component of lean mass. Muscle mass can be measured experimentally by measuring muscle weight.

As used herein, the term "neuromuscular disease" refers to a disease that affects voluntary or involuntary muscle function due to problems in the nerves and muscles, typically leading to muscle weakness. Exemplary neuromuscular diseases include amyotrophic lateral sclerosis (ALS), autonomic neuropathy, botulism, Charcot-Marie-Tooth disease (CMT), chronic inflammatory demyelinating polyradiculoneuropathy, congenital myasthenic syndrome, congenital myopathies, cramp-fasciculation syndrome, dermatomyositis, diabetic neuropathy, distal myopathies, dystrophinopathies, endocrine myopathies, focal muscular atrophies, glycogen storage disease type II, Guillain-Barre syndrome, hereditary spastic paraplegia, inclusion body myositis (IBM), Isaac's syndrome, Kearns-Sayre syndrome, Kennedy disease, Lambert-Eaton myasthenic syndrome, metabolic myopathies, metabolic neuropathies, mitochondrial myopathies, motor neuron diseases, multiple sclerosis, muscular dystrophy (e.g., Duchenne (DMD), Becker (BMD), myotonic (DM), facioscapulohumeral (FSHD), limb-girdle (LGMD), distal (DD), oculopharyngeal (OPMD), Emery-Dreifuss (EDMD), and congenital (e.g., MDC1A, MDC1B, MDC1C, FCMD, WWS, RSMD1, MEB, and UCMD)), myasthenia gravis, myotonic dystrophy, necrotizing myopathies, neuromyotonia, neuropathy of Friedreich's Ataxia, nutritional neuropathy, peripheral neuropathy, polymyositis, primary lateral sclerosis, Schwartz-Jampel Syndrome, small fiber neuropathy, spinal and bulbar muscular atrophy, spinal muscular atrophy, spinal muscular atrophy with respiratory distress type 1, spinocerebellar ataxia, stiff person syndrome, toxic neuropathy, and Troyer syndrome. A neuromuscular disease may be inherited in an autosomal dominant or recessive pattern or mutations may occur spontaneously.

As used herein, the phrase "affecting myostatin, activin A, activin B, and/or BMP9 signaling" means changing the binding of myostatin, activin A, activin B, and/or BMP9 to their receptors, e.g., ActRIIA, ActRIIB, and BMPRII (e.g., endogenous receptors). In some embodiments, a polypeptide including an extracellular ActRII chimera described herein reduces or inhibits the binding of myostatin, activin A, activin B, and/or BMP9 to their receptors, e.g., ActRIIA, ActRIIB, and BMPRII (e.g., endogenous ActRIIA and/or ActRIIB).

As used herein, the term "vascular complication" refers to a vascular disorder or any damage to the blood vessels, such as damage to the blood vessel walls. Damage to the blood vessel walls may cause an increase in vascular permeability or leakage. The term "vascular permeability or leakage" refers to the capacity of the blood vessel walls to allow the flow of small molecules, proteins, and cells in and out of blood vessels. An increase in vascular permeability or leakage may be caused by an increase in the gaps (e.g., an increase in the size and/or number of the gaps) between endothelial cells that line the blood vessel walls and/or thinning of the blood vessel walls.

As used herein, the term "polypeptide" describes a single polymer in which the monomers are amino acid residues which are covalently conjugated together through amide bonds. A polypeptide is intended to encompass any amino acid sequence, either naturally occurring, recombinant, or synthetically produced.

As used herein, the term "homodimer" refers to a molecular construct formed by two identical macromolecules, such as proteins or nucleic acids. The two identical monomers may form a homodimer by covalent bonds or non-covalent bonds. For example, an Fc domain may be a homodimer of two Fc domain monomers if the two Fc domain monomers contain the same sequence. In another example, a polypeptide described herein including an extracellular ActRII chimera fused to an Fc domain monomer may form a homodimer through the interaction of two Fc domain monomers, which form an Fc domain in the homodimer.

As used herein, the term "heterodimer" refers to a molecular construct formed by two different macromolecules, such as proteins or nucleic acids. The two monomers may form a heterodimer by covalent bonds or non-covalent bonds. For example, a polypeptide described herein including an extracellular ActRII chimera fused to an Fc domain monomer may form a heterodimer through the interaction of two Fc domain monomers, each fused to a different ActRII chimera, which form an Fc domain in the heterodimer.

As used herein, the term "host cell" refers to a vehicle that includes the necessary cellular components, e.g., organelles, needed to express proteins from their corresponding nucleic acids. The nucleic acids are typically included in nucleic acid vectors that can be introduced into the host cell by conventional techniques known in the art (transformation, transfection, electroporation, calcium phosphate precipitation, direct microinjection, etc.). A host cell may be a prokaryotic cell, e.g., a bacterial cell, or a eukaryotic cell, e.g., a mammalian cell (e.g., a CHO cell or a HEK293 cell).

As used herein, the term "therapeutically effective amount" refers an amount of a polypeptide, nucleic acid, or vector of the invention or a pharmaceutical composition containing a polypeptide, nucleic acid, or vector of the invention effective in achieving the desired therapeutic effect in treating a patient having a or at risk of developing a disease, such as a muscle disease, a condition involving weakness and atrophy of muscles (e.g., a neuromuscular disease, such as a muscular dystrophy, IBM, ALS, SMA, CMT, myasthenia gravis, or multiple sclerosis; sarcopenia; or cachexia), a disease or condition involving bone damage (e.g., osteoporosis, or a condition involving bone damage, e.g., primary osteoporosis, secondary osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss), a disease or condition involving low red blood cell levels (e.g., anemia or blood loss), a disease or condition involving low platelet levels (e.g., thrombocytopenia), a disease or condition involving low neutrophil levels (e.g., neutropenia), a disease or condition involving fibrosis, a metabolic disease, or PH (e.g., PAH, venous PH, hypoxic PH, thromboembolic PH, or miscellaneous PH). In particular, the therapeutically effective amount of the polypeptide, nucleic acid, or vector avoids adverse side effects.

As used herein, the term "pharmaceutical composition" refers to a medicinal or pharmaceutical formulation that includes an active ingredient as well as excipients and diluents to enable the active ingredient suitable for the method of administration. The pharmaceutical composition of the present invention includes pharmaceutically acceptable components that are compatible with the polypeptide, nucleic acid, or vector. The pharmaceutical composition may be in tablet or capsule form for oral administration or in aqueous form for intravenous or subcutaneous administration.

As used herein, the term "pharmaceutically acceptable carrier or excipient" refers to an excipient or diluent in a pharmaceutical composition. The pharmaceutically acceptable carrier must be compatible with the other ingredients of the formulation and not deleterious to the recipient. In the present invention, the pharmaceutically acceptable carrier or excipient must provide adequate pharmaceutical stability to the polypeptide including an extracellular ActRII chimera, the nucleic acid molecule(s) encoding the polypeptide, or a vector containing such nucleic acid molecule(s). The nature of the carrier or excipient differs with the mode of administration. For example, for intravenous administration, an aqueous solution carrier is generally used; for oral administration, a solid carrier is preferred.

As used herein, the term "treating and/or preventing" refers to the treatment and/or prevention of a disease, e.g., a muscle disease (e.g., a neuromuscular disease, such as a muscular dystrophy, IBM, SMA, CMT, ALS, myasthenia gravis, or multiple sclerosis; sarcopenia; or cachexia), a bone disease (e.g., a disease or condition involving bone damage, e.g., osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss), a disease involving low blood cell levels (e.g., anemia or blood loss), a disease involving low platelet levels (e.g., thrombocytopenia), a disease involving low neutrophil levels (e.g., neutropenia), fibrosis, a metabolic disease, or PH (e.g., PAH, venous PH, hypoxic PH, thromboembolic PH, or miscellaneous PH) using methods and compositions of the invention. Generally, treating a muscle, bone, low blood cell, low platelet, low neutrophil, metabolic, or fibrotic disease, or PH occurs after a subject has developed the muscle, bone, low blood cell, low platelet, low neutrophil, metabolic, or fibrotic disease, or PH and/or is already diagnosed with the muscle, bone, low blood cell, low platelet, low neutrophil, metabolic, or fibrotic disease, or PH. Preventing a muscle, bone, low blood cell, low platelet, low neutrophil, metabolic, or fibrotic disease, or PH refers to steps or procedures taken when a subject is at risk of developing the muscle, bone, low blood cell, low platelet, low neutrophil, metabolic, or fibrotic disease, or PH (The subject may show signs or mild symptoms that are judged by a physician to be indications or risk factors for developing the muscle, bone, low blood cell, low platelet, low neutrophil, metabolic, or fibrotic disease, or PH, have another disease or condition associated with the development of the muscle, bone, low blood cell, low platelet, low neutrophil, metabolic, or fibrotic disease, or PH, be undergoing treatment that may cause anemia, thrombocytopenia, neutropenia, fibrosis, obesity or diabetes, or loss of bone density (e.g., surgery, chemotherapy, or radiation), or have a family history or genetic predisposition to developing the muscle, bone, low blood cell, low platelet, low neutrophil, metabolic or fibrotic disease, or PH, but has not yet developed the disease.

As used herein, the term "subject" refers to a mammal, e.g., preferably a human. Mammals include, but are not limited to, humans and domestic and farm animals, such as monkeys (e.g., a cynomolgus monkey), mice, rats, dogs, cats, horses, sheep, goats, rabbits, and cows, etc.

BRIEF DESCRIPTION OF THE DRAWINGS

FIG. 1 is a schematic showing the amino acid sequence of exemplary extracellular ActRII chimeras. Sequence corresponding to wild-type extracellular ActRIIA is shown in bold and sequence corresponding to wild-type extracellular ActRIIB is shown in italics. Amino acid substitutions that are not derived from the sequence of ActRIIA or ActRIIB are shown in bold italics.

FIG. 7 shows the effect of the extracellular ActRII chimeras on lean mass. Data are shown as average±SEM. Statistics are shown relative to vehicle treatment using a 1-way ANOVA with a Fisher's LSD post test. *P≤0.05 and ****P<0.0001.

DETAILED DESCRIPTION OF THE INVENTION

Figure 2:
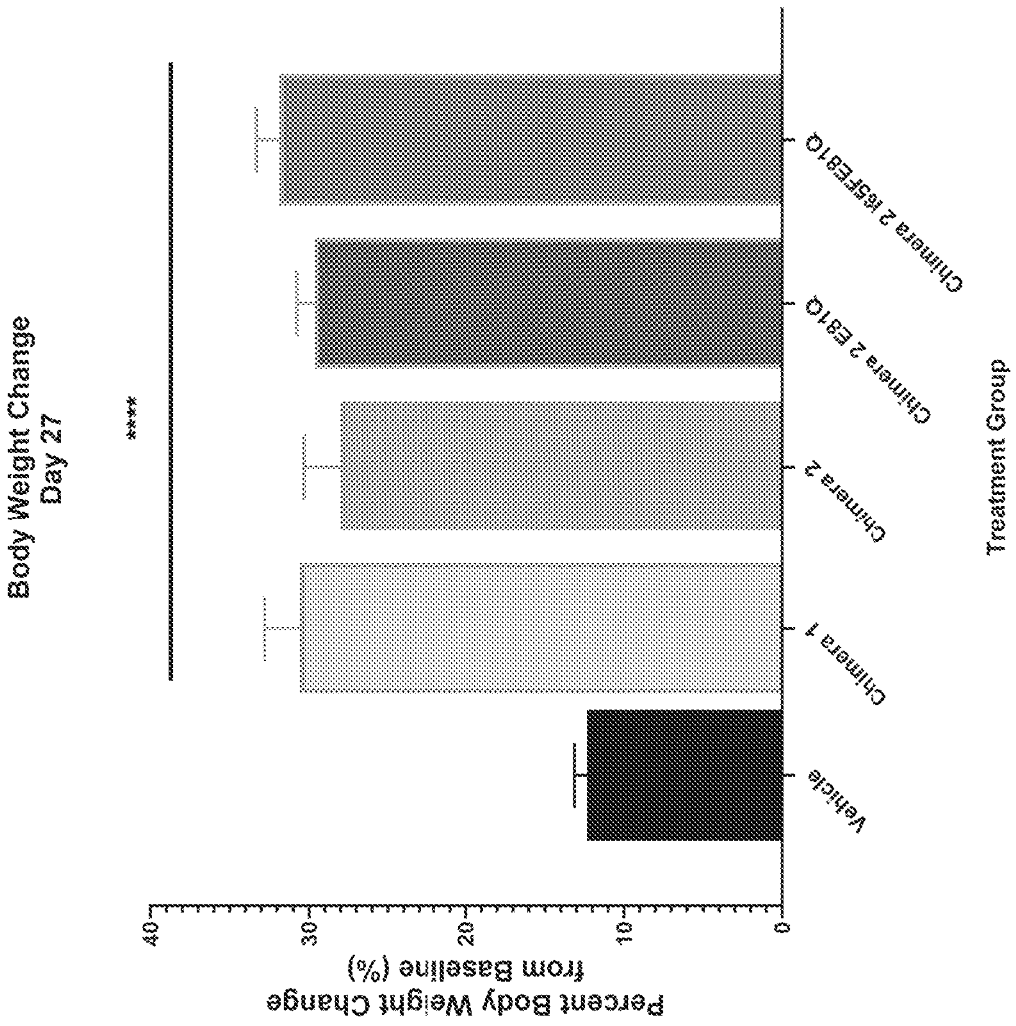
FIG. 2 is a bar graph showing the effects of extracellular ActRII chimeras on body weight. Mice received a single hydrodynamic injection of a plasmid construct encoding the indicated ActRII chimera or vehicle.

The invention features polypeptides that include an extracellular activin receptor type II (ActRII) chimera. In some embodiments, a polypeptide of the invention includes an extracellular ActRII chimera fused to a moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin). A polypeptide including an extracellular ActRII chimera fused to an Fc domain monomer may also form a dimer (e.g., homodimer or heterodimer) through the interaction between two Fc domain monomers. The ActRII chimeras described herein may have reduced binding to bone morphogenetic protein 9 (BMP9) relative to the wild-type extracellular ActRIIB, or have weak binding affinity or no binding affinity to BMP9 compared to binding affinity to activins (e.g., activin A and/or activin B) and myostatin. The invention also includes methods of treating diseases and conditions involving weakness and atrophy of muscles by increasing muscle mass, lean mass, and/or muscle strength, methods of treating or preventing bone damage by increasing bone mineral density, increasing bone formation, or decreasing bone resorption, methods of treating or preventing fibrosis, methods of treating or preventing low blood cell levels (e.g., anemia or blood loss) by increasing red blood cell levels (e.g., red blood cell count, hemoglobin levels, or hematocrit), red blood cell production, or erythroid progenitor maturation and/or differentiation (e.g., the maturation and/or differentiation of early-stage or late- (e.g., terminal) stage erythroid progenitors into proerythroblasts, reticulocytes, or red blood cells), late-stage precursor (erythroid precursor) maturation (e.g., terminal maturation, such as the maturation of reticulocytes into red blood cells or the maturation of erythroblasts into reticulocytes and/or red blood cells), by recruiting early-stage progenitors into the erythroid lineage, by reducing the accumulation of red blood cell progenitor cells (e.g., by stimulating progenitor cells to progress to maturation), by increasing the number of early-stage erythroid precursors and/or progenitors (e.g., by expanding the early-stage precursor and/or progenitor populations to provide a continuous supply of precursors to replenish polychromatic erythroblasts and allow for a continuous supply of maturing reticulocytes), or by promoting the progression of erythroid precursors and/or progenitors through erythropoiesis, methods of treating or preventing low platelet levels (e.g., thrombocytopenia) by increasing platelet levels (e.g., platelet count, megakaryocyte differentiation and/or maturation, and/or platelet production) or by reducing the accumulation of platelet progenitor cells (e.g., by stimulating progenitor cells to progress to maturation), methods of treating or preventing low neutrophil levels (e.g., neutropenia) by increasing neutrophil levels (e.g., neutrophil count, e.g., neutrophil production) or differentiation and/or maturation of progenitor cells (e.g., myeloid progenitors, myeloblasts, or myelocytes) into neutrophils, methods of treating or preventing pulmonary hypertension (PH) (e.g., PAH, venous PH, hypoxic PH, thromboembolic PH, or miscellaneous PH), methods of treating or preventing metabolic disease (e.g., obesity, Type 1 diabetes, or Type 2 diabetes), or methods of affecting myostatin, activin A, activin B, and/or BMP9 signaling in a subject by administering to the subject a polypeptide including an extracellular ActRII chimera described herein.

I. Extracellular Activin Receptor Type II Chimeras

Activin type II receptors are single transmembrane domain receptors that modulate signals for ligands in the transforming growth factor β (TGF-β) superfamily. Ligands in the TGF-β superfamily are involved in a host of physiological processes, such as muscle growth, vascular growth, cell differentiation, homeostasis, hematopoiesis, and osteogenesis. Examples of ligands in the TGF-β superfamily include, e.g., activin (e.g., activin A and activin B), inhibin, growth differentiation factors (GDFs) (e.g., GDF8, also known as myostatin, and GDF11), and bone morphogenetic proteins (BMPs) (e.g., BMP9).

Myostatin and activins are known to play a role in the regulation of skeletal muscle growth. For example, mice without myostatin show a large increase in skeletal muscle mass. Myostatin has also been implicated in promoting fibrosis. Mice lacking myostatin show a reduction in muscle fibrosis, and injection of myostatin-coated beads induces muscle fibrosis in mice. Mice overexpressing an activin subunit that leads to the production of diffusible activin A also exhibit fibrosis. In addition, activins are expressed abundantly in bone tissues and regulate bone formation by controlling both osteoblast and osteoclast functions. Activin A has been reported to be upregulated in bone disease and inhibits osteoblast activity. Myostatin is also implicated in bone homeostasis through increasing osteogenesis and inhibiting osteoblast activity. TGF-β signaling pathways also regulate hematopoiesis, with signaling pathways involving activins preventing the differentiation of red blood cell, platelet, and neutrophil progenitor cells in order to maintain progenitor cells in a quiescent state, and signaling pathways involving BMPs promoting differentiation of progenitor cells. Homeostasis of this process is essential to ensure that all cell types, including red cells, white cells, and platelets, are properly replenished in the blood. Relatedly, activin receptor ligand GDF11 has been found to be over-expressed in a mouse model of hemolytic anemia and associated with defects in red blood cell production. Elevated activin A has also been observed in clinical and experimental pulmonary hypertension. Furthermore, activins are highly expressed in adipose tissue, and increased myostatin levels and activin receptor levels have been observed in subcutaneous and visceral fat of obese mice. Additionally, myostatin has been shown to be elevated in skeletal muscle and plasma of obese and insulin resistant women, and both type I and type II activin receptors have been linked to pancreatic function and diabetes. These data suggest that increased signaling through activin receptors, either due to increased expression of activin receptor ligands (e.g., activin A, activin B, myostatin) or increased expression of activin receptors themselves, could contribute to a variety of diseases and conditions, including muscle atrophy or weakness, fibrosis, bone disease, anemia, thrombocytopenia, neutropenia, pulmonary hypertension, and metabolic disease. Methods that reduce or inhibit activin A, activin B, or myostatin signaling could, therefore, be used in the treatment of diseases and conditions involving muscle atrophy or weakness, fibrosis, bone damage, low red blood cell levels (e.g., anemia), low platelet levels (e.g., thrombocytopenia), low neutrophil levels (e.g., neutropenia), pulmonary hypertension (e.g., PAH, venous PH, hypoxic PH, thromboembolic PH, or miscellaneous PH), or metabolic disorders (e.g., obesity, Type 1 diabetes, or Type 2 diabetes).

There exist two types of activin type II receptors: ActRIIA and ActRIIB. Studies have shown that BMP9 binds ActRIIB with about 300-fold higher binding affinity than ActRIIA (see, e.g., Townson et al., *J. Biol. Chem.* 287:27313, 2012). ActRIIA-Fc is known to have a longer half-life compared to ActRIIB-Fc. The present invention describes extracellular ActRII chimeras that are constructed by combining portions of extracellular ActRIIA and ActRIIB with the goal of generating proteins that bind to ActRII ligands (e.g., activin A, activin B, myostatin, and GDF11) and retain the function of wild-type extracellular ActRII proteins (e.g., the ability to increase muscle mass and/or lean mass or red blood cell levels). In some embodiments, the ActRII chimeras exhibit reduced BMP9 binding relative to wild-type extracellular ActRIIB, which can prevent or reduce disruption of endogenous BMP9 signaling. In some embodiments, the chimeras have properties of both ActRIIA (e.g., low binding affinity to BMP9, the ability to increase red blood cell levels, and/or longer serum half-life as an Fc fusion protein) and ActRIIB (e.g., the ability to increase muscle mass). In one example, the ActRII chimeras have reduced binding affinity for BMP9 compared to wild-type extracellular ActRIIB, and confer increases in lean mass, muscle mass, bone mineral density, and/or red blood cell levels (e.g., increase red blood cell production and/or red cell mass or volume), decreases in body weight and/or body fat, and/or treat muscle disease (e.g., a neuromuscular disease, such as a muscular dystrophy, IBM, SMA, CMT, ALS, myasthenia gravis, or multiple sclerosis; sarcopenia; or cachexia), bone disease (e.g., a disease or condition involving bone damage, e.g., osteoporosis, osteopenia, osteopetrosis, bone fracture, bone cancer or cancer metastasis-related bone loss, Paget's disease, renal osteodystrophy, treatment-related bone loss, osteogenesis imperfecta, neuromuscular disease-related bone loss, burn-induced bone loss, anorexia-related bone loss, diet-related bone loss, bone loss associated with the treatment of obesity, low gravity-related bone loss, or immobility-related bone loss), anemia, thrombocytopenia, neutropenia, metabolic disease (e.g., obesity, Type 1 diabetes, or Type 2 diabetes), fibrosis, or PH.

The ActRII chimeras may exhibit similar or improved binding to activins (e.g., activin A and/or activin B) and/or myostatin compared to wild-type extracellular ActRIIA and/or ActRIIB, allowing them to compete with endogenous activin receptors for ligand binding and reduce or inhibit endogenous activin receptor signaling. Consequently, the chimeras can be used to treat disorders in which activin receptor signaling is elevated, such as bone disease, muscle disease, fibrosis, PH, metabolic disease, thrombocytopenia, neutropenia, and/or anemia, leading to a reduction in bone resorption or osteoclast activity, an increase in bone formation or bone mineral density, an increase in muscle mass, lean mass, or muscle strength, a reduction in fibrosis (e.g., reduced fibrosis or a slowing or stopping of the progression of fibrosis), an increase red blood cell levels (e.g., an increase in hemoglobin levels, hematocrit, or red blood cell counts, e.g., an increase in red blood cell production and/or red cell mass or volume), an increase in the maturation and/or differentiation of erythroid progenitors (e.g., early-stage or late- (e.g., terminal) stage erythroid progenitors, e.g., maturation and/or differentiation of early-stage erythroid progenitors, such as colony forming unit-erythroid cells (CFU-Es) and burst forming unit-erythroid cells (BFU-Es), into proerythroblasts, reticulocytes, or red blood cells), recruitment of early-stage progenitors into the erythroid lineage, an increase in late-stage erythroid precursor maturation (e.g., terminal maturation, such as the maturation of reticulocytes into red blood cells, or the maturation of erythroblasts into reticulocytes and/or red blood cells), a reduction the accumulation of red blood cell progenitor cells (e.g., by stimulating progenitor cells to progress to maturation), an increase in the number of early-stage erythroid precursors and/or progenitors (e.g., an expansion of the early-stage precursor and/or progenitor populations), progression of erythroid precursors and/or progenitors through erythropoiesis (e.g., through the erythropoiesis pathway), an increase in platelet levels (e.g., an increase in platelet count, megakaryocyte differentiation and/or maturation, and/or platelet production), a reduction in the accumulation of platelet progenitor cells (e.g., by stimulating progenitor cells to progress to maturation), an increase in neutrophil levels (e.g., an increase in neutrophil count, e.g., an increase in neutrophil production), an increase in the differentiation and/or maturation of progenitor cells (e.g., myeloid progenitors, myeloblasts, or myelocytes) into neutrophils, a reduction in the symptoms or progression of PH, or a reduction in body fat, body weight, blood glucose levels, or insulin resistance (e.g., leading to an increase in insulin sensitivity).

The wild-type amino acid sequences of the extracellular portions of human ActRIIA and ActRIIB are shown below.

```
Human ActRIIA, extracellular portion (SEQ ID NO: 44):
GAILGRSETQECLFFNANWEKDRTNQTGVEPCYGDKDKRRHCFATWKNISGSIEIVKQGC
WLDDINCYDRTDCVEKKDSPEVYFCCCEGNMCNEKFSYFPEMEVTQPTS

Human ActRIIB, extracellular portion (SEQ ID NO: 45):
GRGEAETRECIYYNANWELERTNQSGLERCEGEQDKRLHCYASWRNSSGTIELVKKGCWL
DDFNCYDRQECVATEENPQVYFCCCEGNFCNERFTHLPEAGGPEVTYEPPPTAPT
```

Polypeptides described herein include an extracellular ActRII chimera containing sequence from both the extracellular portion of ActRIIB and the extracellular portion of ActRIIA. The ActRII chimeras described herein result from joining an N-terminal portion of extracellular ActRIIB (SEQ ID NO: 45 shown above) to a C-terminal portion of extracellular ActRIIA (SEQ ID NO: 44 shown above) such that the sequences are contiguous (e.g., the ActRIIA sequence continues where the ActRIIB sequence left off, starting with the next the amino acid located in the corresponding position of ActRIIA). In some embodiments, the N-terminus of the ActRII chimera includes the six amino acids found at the N-terminus of extracellular ActRIIA joined to the fifth amino acid of extracellular ActRIIB. In some embodiments, the N-terminus of the ActRII chimera begins with the first amino acid located at the N-terminus of extracellular ActRIIB. Accordingly, in some embodiments, the N-terminal portion of ActRIIB begins with the amino acid in the fifth position of SEQ ID NO: 45 (A), while in other embodiments (e.g., in embodiments in which the six amino acids found at the N-terminus of extracellular ActRIIA are not included in the chimera), the N-terminal portion of ActRIIB begins with the amino acid in the first position of SEQ ID NO: 45 (G). In some embodiments, the N-terminus of the ActRII chimera includes the first ten amino acids found at the N-terminus of extracellular ActRIIA joined to the ninth amino acid of extracellular ActRIIB, in which case the N-terminal portion of ActRIIB begins with the amino acid in the ninth position of SEQ ID NO: 45 (E). The extracellular ActRII chimera may also include one or more amino acid substitutions in the portion of the chimera that corresponds to the sequence of ActRIIB compared to wild-type extracellular ActRIIB (e.g., SEQ ID NO: 45 shown above), and one or more amino acid substitutions in the portion of the chimera that corresponds to the sequence of ActRIIA compared to wild-type extracellular ActRIIA (e.g., SEQ ID NO: 44 shown above). Amino acid substitutions at 9 different positions may be introduced into an extracellular ActRII chimera (Table 1). An extracellular ActRII chimera may have one or more (e.g., 1, 2, 3, 4, 5, 6, 7, 8, or 9) amino acid substitutions relative the sequence of a wild-type sequence (e.g., relative to the sequence of wild-type extracellular ActRIIB (SEQ ID NO: 45) if the portion of the chimera corresponds to a region of wild-type extracellular ActRIIB, or relative to the sequence of wild-type extracellular ActRIIA (SEQ ID NO: 44) if the portion of the chimera corresponds to a region of wild-type extracellular ActRIIA). The positions at which amino acid substitutions may be made, as well as the amino acids that may be substituted at these positions, are listed in Table 1.

Amino acid substitutions can alter the activity and/or binding affinity of the extracellular ActRII chimeras of the invention. In some embodiments, the extracellular ActRII chimeras bind to activin A, activin B, myostatin, and/or GDF11 with sufficient affinity to compete with endogenous activin receptors for binding to one or more of these ligands. In some embodiments, the extracellular ActRII chimeras of the invention have reduced, weak, or no substantial binding to BMP9 (e.g., compared to wild-type ActRIIB). BMP9 binding may be reduced in extracellular ActRII chimeras containing the amino acid sequence TEEN (SEQ ID NO: 265) or TKEN (SEQ ID NO: 266) at positions $X_3$, $X_4$, $X_5$, and $X_6$. In some embodiments, a polypeptide of the invention including an extracellular ActRII chimera (e.g., any one of SEQ ID NOs: 1-43 (e.g., SEQ ID NOs: 22-43)) with the sequence TEEN (SEQ ID NO: 265) at positions $X_3$, $X_4$, $X_5$, and $X_6$ can have a substitution of the amino acid K for the amino acid E at position $X_4$. In some embodiments, a polypeptide of the invention including an extracellular ActRII chimera (e.g., any one of SEQ ID NOs: 1-43 (e.g., SEQ ID NOs: 22-43)) with the sequence TKEN (SEQ ID NO: 266) at positions $X_3$, $X_4$, $X_5$, and $X_6$ can have a substitution of the amino acid E for the amino acid K at position $X_4$. The sequences TEEN (SEQ ID NO: 265) and TKEN (SEQ ID NO: 266) can be used interchangeably in the extracellular ActRII chimeras (e.g., the chimeras in Tables 1 and 2, e.g., SEQ ID NOs: 1-43 (e.g., SEQ ID NOs: 22-43)) of the invention. The extracellular ActRII chimeras of the invention may further include a C-terminal extension (e.g., additional amino acids at the C-terminus). The C-terminal extension can add one or more additional amino acids at the C-terminus (e.g., 1, 2, 3, 4, 5, 6 or more additional amino acids) to any of the chimeras shown in Tables 1 and 2 (e.g., SEQ ID NOs: 1-43 (e.g., SEQ ID NOs: 22-43)). The C-terminal extension may correspond to sequence from the same position in wild-type ActRIIA or ActRIIB. For example, C-terminal extensions that can be included in the extracellular ActRII chimeras of the invention are the amino acid sequence NP and the amino acid sequence NPVTPK (SEQ ID NO: 104), which correspond to sequence found in the same position in wild-type ActRIIA.

TABLE 1

| Amino acid substitutions in an extracellular ActRII chimera having a sequence of any one of SEQ ID NOs: 1-21 |
|---|
| GAILGRAETRECIYYNANWELERTNQSGLERCEGEQ$X_1$KRRHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 1) |
| GAILGRAETRECIYYNANWELERTNQSGLERCEGEQ$X_1$KRLHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 2) |
| GAILGRAETRECIYYNANWELERTNQSGLERCEGEQ$X_1$KRLHCYASWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 3) |
| GAILGRAETRECIYYNANWELERTNQSGLERCEGEQ$X_1$KRLHCYASWRNSSGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 4) |
| GAILGRAETRECIYYNANWELERTNQSGLERCEGEQ$X_1$KRLHCYASWRNSSGTIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 5) |
| GAILGRAETRECIYYNANWELERTNQSGLERCEGEQ$X_1$KRLHCYASWRNSSGTIELVKKGCWLDD$X_2X_3$CYDRTDCV$X_4X_5X_6X_7X_8$P$X_9$VYFCCCEGNMCNEKFSYFPEMEVTQPTS (SEQ ID NO: 6) |
| GAILGRAETRECIYYNANWELERTNQSGLERCEGEQ$X_1$KRLHCYASWRNSSGTIELVKKGCWLDD$X_2X_3$CYDRQECV$X_4X_5X_6X_7X_8$P$X_9$VYFCCCEGNMCNEKFSYFPEMEVTQPTS (SEQ ID NO: 7) |
| GRGEAETRECIYYNANWELERTNQSGLERCEGEQ$X_1$KRRHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 8) |
| GRGEAETRECIYYNANWELERTNQSGLERCEGEQ$X_1$KRLHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 9) |
| GRGEAETRECIYYNANWELERTNQSGLERCEGEQ$X_1$KRLHCYASWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 10) |
| GRGEAETRECIYYNANWELERTNQSGLERCEGEQ$X_1$KRLHCYASWRNSSGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 11) |
| GRGEAETRECIYYNANWELERTNQSGLERCEGEQ$X_1$KRLHCYASWRNSSGTIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 12) |
| GRGEAETRECIYYNANWELERTNQSGLERCEGEQ$X_1$KRLHCYASWRNSSGTIELVKKGCWLDD$X_2X_3$CYDRTDCV$X_4X_5X_6X_7X_8$P$X_9$VYFCCCEGNMCNEKFSYFPEMEVTQPTS (SEQ ID NO: 13) |
| GRGEAETRECIYYNANWELERTNQSGLERCEGEQ$X_1$KRLHCYASWRNSSGTIELVKKGCWLDD$X_2X_3$CYDRQECV$X_4X_5X_6X_7X_8$P$X_9$VYFCCCEGNMCNEKFSYFPEMEVTQPTS (SEQ ID NO: 14) |
| GAILGRSETQECIYYNANWELERTNQSGLERCEGEQ$X_1$KRRHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 15) |
| GAILGRSETQECIYYNANWELERTNQSGLERCEGEQ$X_1$KRLHCFATWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 16) |
| GAILGRSETQECIYYNANWELERTNQSGLERCEGEQ$X_1$KRLHCYASWKNISGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 17) |
| GAILGRSETQECIYYNANWELERTNQSGLERCEGEQ$X_1$KRLHCYASWRNSSGSIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 18) |
| GAILGRSETQECIYYNANWELERTNQSGLERCEGEQ$X_1$KRLHCYASWRNSSGTIEIVKQGCWLDD$X_2X_3$CYDRTDCV$X_4X_5X_6X_7X_8$P$X_9$VYFCCCEGNMCNEKFSYFPEMEVTQPTS (SEQ ID NO: 19) |
| GAILGRSETQECIYYNANWELERTNQSGLERCEGEQ$X_1$KRLHCYASWRNSSGTIELVKKGCWLDD$X_2X_3$CYDRTDCV$X_4X_5X_6X_7X_8$P$X_9$VYFCCCEGNMCNEKFSYFPEMEVTQPTS (SEQ ID NO: 20) |

TABLE 1-continued

Amino acid substitutions in an extracellular ActRII chimera having a sequence of any one of SEQ ID NOs: 1-21

GAILGRSETQECIYYNANWELERTNQSGLERCEGEQ$X_1$KRLHCYASWRNSSGTIELVKKGCWLDD$X_2$ $X_3$CYDRQECV$X_4X_5X_6X_7X_8$P$X_9$VYFCCCEGNMCNEKFSYFPEMEVTQPTS (SEQ ID NO: 21)

| | | | |
|---|---|---|---|
| $X_1$ | D or R | X6 | E or K |
| $X_2$ | I, F, E, D, Y, S, N, Q, or T | $X_7$ | E or D |
| $X_3$ | N or T | $X_8$ | N or S |
| $X_4$ | A or E | $X_9$ | Q, E, K, R, D, or N |
| $X_5$ | T or K | | |

In some embodiments, in the extracellular ActRII chimeras of SEQ ID NOs: 1-21 (shown in Table 1) $X_1$ is D, $X_2$ is 1, F, or E, $X_3$ is N or T, $X_4$ is A or E, $X_5$ is T or K, $X_6$ is E or K, $X_7$ is E or D, $X_8$ is N or S, and $X_9$ is E or Q. In some embodiments, in the extracellular ActRII chimeras of SEQ ID NOs: 1-21 X, is D, $X_2$ is I or F, $X_3$ is N, $X_4$ is A or E, $X_5$ is T or K, $X_6$ is E or K, $X_7$ is E or D, $X_8$ is N or S, and $X_9$ is E or Q.

In some embodiments, a polypeptide described herein includes an extracellular ActRII chimera having the sequence of any one of SEQ ID NOs: 22-43 (Table 2).

TABLE 2

Extracellular ActRII chimeras having the sequences of SEQ ID NOs: 22-43

| SEQ ID NO: | Amino Acid Sequence |
|---|---|
| 22 | GAILGRAETRECIYYNANWELERTNQSGLERCEGEQDKRLHCYASWRNSSGTIEIV KQGCWLDDINCYDRTDCVATEENPQVYFCCCEGNMCNEKFSYFPEMEVTQPTS |
| 23 | GRGEAETRECIYYNANWELERTNQSGLERCEGEQDKRLHCYASWRNSSGTIEIVK QGCWLDDINCYDRTDCVEKKDSPEVYFCCCEGNMCNEKFSYFPEMEVTQPTS |
| 24 | GRGEAETRECIYYNANWELERTNQSGLERCEGEQDKRLHCYASWRNSSGTIEIVK QGCWLDDINCYDRTDCVEKKDSPQVYFCCCEGNMCNEKFSYFPEMEVTQPTS |
| 25 | GRGEAETRECIYYNANWELERTNQSGLERCEGEQDKRLHCYASWRNSSGTIEIVK QGCWLDDFNCYDRTDCVEKKDSPQVYFCCCEGNMCNEKFSYFPEMEVTQPTS |
| 26 | GAILGRAETRECIYYNANWELERTNQSGLERCEGEQDKRLHCYASWRNSSGTIEIV KQGCWLDDFNCYDRTDCVATEENPQVYFCCCEGNMCNEKFSYFPEMEVTQPTS |
| 27 | GRGEAETRECIYYNANWELERTNQSGLERCEGEQDKRLHCYASWRNSSGTIEIVK QGCWLDDFNCYDRTDCVEKKDSPEVYFCCCEGNMCNEKFSYFPEMEVTQPTS |
| 28 | GRGEAETRECIYYNANWELERTNQSGLERCEGEQDKRRHCFATWKNISGSIEIVKQ GCWLDDFNCYDRTDCVEKKDSPQVYFCCCEGNMCNEKFSYFPEMEVTQPTS |
| 29 | GRGEAETRECIYYNANWELERTNQSGLERCEGEQDKRLHCFATWKNISGSIEIVKQ GCWLDDFNCYDRTDCVEKKDSPQVYFCCCEGNMCNEKFSYFPEMEVTQPTS |
| 30 | GRGEAETRECIYYNANWELERTNQSGLERCEGEQDKRLHCYASWKNISGSIEIVKQ GCWLDDFNCYDRTDCVEKKDSPQVYFCCCEGNMCNEKFSYFPEMEVTQPTS |
| 31 | GRGEAETRECIYYNANWELERTNQSGLERCEGEQDKRLHCYASWRNSSGSIEIVK QGCWLDDFNCYDRTDCVEKKDSPQVYFCCCEGNMCNEKFSYFPEMEVTQPTS |
| 32 | GRGEAETRECIYYNANWELERTNQSGLERCEGEQDKRLHCYASWRNSSGTIELVK KGCWLDDFNCYDRTDCVEKKDSPQVYFCCCEGNMCNEKFSYFPEMEVTQPTS |
| 33 | GRGEAETRECIYYNANWELERTNQSGLERCEGEQDKRLHCYASWRNSSGTIELVK KGCWLDDFNCYDRQECVATKDSPQVYFCCCEGNMCNEKFSYFPEMEVTQPTS |
| 34 | GRGEAETRECIYYNANWELERTNQSGLERCEGEQDKRLHCYASWRNSSGTIELVK KGCWLDDFNCYDRQECVATEENPQVYFCCCEGNMCNEKFSYFPEMEVTQPTS |
| 35 | GRGEAETRECIYYNANWELERTNQSGLERCEGEQDKRLHCYASWRNSSGTIEIVK QGCWLDDNNCYDRTDCVEKKDSPQVYFCCCEGNMCNEKFSYFPEMEVTQPTS |

TABLE 2-continued

Extracellular ActRII chimeras having the sequences of SEQ ID NOs: 22-43

| SEQ ID NO: | Amino Acid Sequence |
|---|---|
| 36 | GRGEAETRECIYYNANWELERTNQSGLERCEGEQDKRLHCYASWRNSSGTIEIVK QGCWLDDTNCYDRTDCVEKKDSPQVYFCCCEGNMCNEKFSYFPEMEVTQPTS |
| 37 | GRGEAETRECIYYNANWELERTNQSGLERCEGEQDKRLHCYASWRNSSGTIEIVK QGCWLDDETCYDRTDCVEKKDSPQVYFCCCEGNMCNEKFSYFPEMEVTQPTS |
| 38 | GRGEAETRECIYYNANWELERTNQSGLERCEGEQRKRLHCYASWRNSSGTIEIVK QGCWLDDFNCYDRTDCVEKKDSPQVYFCCCEGNMCNEKFSYFPEMEVTQPTS |
| 39 | GRGEAETRECIYYNANWELERTNQSGLERCEGEQDKRLHCYASWRNSSGTIEIVK QGCWLDDFNCYDRTDCVETKDSPQVYFCCCEGNMCNEKFSYFPEMEVTQPTS |
| 40 | GAILGRAETRECIYYNANWELERTNQSGLERCEGEQDKRLHCYASWRNSSGTIEIV KQGCWLDDFNCYDRTDCVEKKDSPQVYFCCCEGNMCNEKFSYFPEMEVTQPTS |
| 41 | GAILGRSETQECIYYNANWELERTNQSGLERCEGEQDKRLHCYASWRNSSGTIEIV KQGCWLDDFNCYDRTDCVEKKDSPQVYFCCCEGNMCNEKFSYFPEMEVTQPTS |
| 42 | GRGEAETRECIYYNANWELERTNQSGLERCEGEQDKRLHCYASWRNSSGTIELVK KGCWLDDFNCYDRQECVATKDSPEVYFCCCEGNMCNEKFSYFPEMEVTQPTS |
| 43 | GRGEAETRECIYYNANWELERTNQSGLERCEGEQDKRLHCYASWRNSSGTIELVK KGCWLDDFNCYDRQECVATKENPQVYFCCCEGNMCNEKFSYFPEMEVTQPTS |

In some embodiments, the extracellular ActRII chimeras described herein have an N-terminal truncation of 1-9 amino acids (e.g., 1, 2, 3, 4, 5, 6, 7, 8, or 9 amino acids). The N-terminal truncation can involve the removal of 1-9 amino acids from the N-terminus of any of the chimeras shown in Tables 1 and 2 (e.g., SEQ ID NOs: 1-43 (e.g., SEQ ID NOs: 22-43)). The N-terminal truncation can remove amino acids up two to amino acids before the first cysteine (e.g., the two amino acids before the first cysteine (RE or QE) are retained in the N-terminally truncated ActRII chimeras). Exemplary ActRII chimeras having N-terminal truncations are provided in Table 3, below.

TABLE 3

Extracellular ActRII chimeras having N-terminal truncations

| SEQ ID NO: | Amino Acid Sequence |
|---|---|
| 111 | ILGRAETRECIYYNANWELERTNQSGLERCEGEQDKRLHCYASWRNSSGTIEIVKQ GCWLDDINCYDRTDCVATEENPQVYFCCCEGNMCNEKFSYFPEMEVTQPTS |
| 112 | RGEAETRECIYYNANWELERTNQSGLERCEGEQDKRLHCYASWRNSSGTIEIVKQ GCWLDDINCYDRTDCVEKKDSPEVYFCCCEGNMCNEKFSYFPEMEVTQPTS |
| 113 | RGEAETRECIYYNANWELERTNQSGLERCEGEQDKRLHCYASWRNSSGTIEIVKQ GCWLDDINCYDRTDCVEKKDSPQVYFCCCEGNMCNEKFSYFPEMEVTQPTS |
| 114 | RGEAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTS |
| 115 | LGRAETRECIYYNANWELERTNQSGLERCEGEQDKRLHCYASWRNSSGTIEIVKQ GCWLDDINCYDRTDCVATEENPQVYFCCCEGNMCNEKFSYFPEMEVTQPTS |
| 116 | GEAETRECIYYNANWELERTNQSGLERCEGEQDKRLHCYASWRNSSGTIEIVKQG CWLDDINCYDRTDCVEKKDSPEVYFCCCEGNMCNEKFSYFPEMEVTQPTS |
| 117 | GEAETRECIYYNANWELERTNQSGLERCEGEQDKRLHCYASWRNSSGTIEIVKQG CWLDDINCYDRTDCVEKKDSPQVYFCCCEGNMCNEKFSYFPEMEVTQPTS |
| 118 | GEAETRECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTS |
| 119 | GRAETRECIYYNANWELERTNQSGLERCEGEQDKRLHCYASWRNSSGTIEIVKQG CWLDDINCYDRTDCVATEENPQVYFCCCEGNMCNEKFSYFPEMEVTQPTS |
| 120 | EAETRECIYYNANWELERTNQSGLERCEGEQDKRLHCYASWRNSSGTIEIVKQGC WLDDINCYDRTDCVEKKDSPEVYFCCCEGNMCNEKFSYFPEMEVTQPTS |
| 121 | EAETRECIYYNANWELERTNQSGLERCEGEQDKRLHCYASWRNSSGTIEIVKQGC WLDDINCYDRTDCVEKKDSPQVYFCCCEGNMCNEKFSYFPEMEVTQPTS |

TABLE 3-continued

Extracellular ActRII chimeras having N-terminal truncations

| SEQ ID NO: | Amino Acid Sequence |
|---|---|
| 122 | EAETRECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTS |
| 123 | RAETRECIYYNANWELERTNQSGLERCEGEQDKRLHCYASWRNSSGTIEIVKQGC WLDDINCYDRTDCVATEENPQVYFCCCEGNMCNEKFSYFPEMEVTQPTS |
| 124 | AETRECIYYNANWELERTNQSGLERCEGEQDKRLHCYASWRNSSGTIEIVKQGCW LDDINCYDRTDCVEKKDSPEVYFCCCEGNMCNEKFSYFPEMEVTQPTS |
| 125 | AETRECIYYNANWELERTNQSGLERCEGEQDKRLHCYASWRNSSGTIEIVKQGCW LDDINCYDRTDCVEKKDSPQVYFCCCEGNMCNEKFSYFPEMEVTQPTS |
| 126 | AETRECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTS |
| 127 | AETRECIYYNANWELERTNQSGLERCEGEQDKRLHCYASWRNSSGTIEIVKQGCW LDDINCYDRTDCVATEENPQVYFCCCEGNMCNEKFSYFPEMEVTQPTS |
| 128 | ETRECIYYNANWELERTNQSGLERCEGEQDKRLHCYASWRNSSGTIEIVKQGCWL DDINCYDRTDCVEKKDSPEVYFCCCEGNMCNEKFSYFPEMEVTQPTS |
| 129 | ETRECIYYNANWELERTNQSGLERCEGEQDKRLHCYASWRNSSGTIEIVKQGCWL DDINCYDRTDCVEKKDSPQVYFCCCEGNMCNEKFSYFPEMEVTQPTS |
| 130 | ETRECIYYNANWELERTNQSGLERCEGEQDKRLHCYASWRNSSGTIEIVKQGCWL DDFNCYDRTDCVEKKDSPQVYFCCCEGNMCNEKFSYFPEMEVTQPTS |
| 131 | ETRECIYYNANWELERTNQSGLERCEGEQDKRLHCYASWRNSSGTIEIVKQGCWL DDINCYDRTDCVATEENPQVYFCCCEGNMCNEKFSYFPEMEVTQPTS |
| 132 | TRECIYYNANWELERTNQSGLERCEGEQDKRLHCYASWRNSSGTIEIVKQGCWLD DINCYDRTDCVEKKDSPEVYFCCCEGNMCNEKFSYFPEMEVTQPTS |
| 133 | TRECIYYNANWELERTNQSGLERCEGEQDKRLHCYASWRNSSGTIEIVKQGCWLD DINCYDRTDCVEKKDSPQVYFCCCEGNMCNEKFSYFPEMEVTQPTS |
| 134 | TRECIYYNANWELERTNQSGLERCEGEQDKRLHCYASWRNSSGTIEIVKQGCWLD DFNCYDRTDCVEKKDSPQVYFCCCEGNMCNEKFSYFPEMEVTQPTS |
| 135 | TRECIYYNANWELERTNQSGLERCEGEQDKRLHCYASWRNSSGTIEIVKQGCWLD DINCYDRTDCVATEENPQVYFCCCEGNMCNEKFSYFPEMEVTQPTS |
| 136 | RECIYYNANWELERTNQSGLERCEGEQDKRLHCYASWRNSSGTIEIVKQGCWLDD INCYDRTDCVEKKDSPEVYFCCCEGNMCNEKFSYFPEMEVTQPTS |
| 137 | RECIYYNANWELERTNQSGLERCEGEQDKRLHCYASWRNSSGTIEIVKQGCWLDD INCYDRTDCVEKKDSPQVYFCCCEGNMCNEKFSYFPEMEVTQPTS |
| 138 | RECIYYNANWELERTNQSGLERCEGEQDKRLHCYASWRNSSGTIEIVKQGCWLDD FNCYDRTDCVEKKDSPQVYFCCCEGNMCNEKFSYFPEMEVTQPTS |
| 139 | RECIYYNANWELERTNQSGLERCEGEQDKRLHCYASWRNSSGTIEIVKQGCWLDD INCYDRTDCVATEENPQVYFCCCEGNMCNEKFSYFPEMEVTQPTS |
| 140 | RGEAETRECIYYNANWELERTNQSGLERCEGEQDKRRHCFATWKNISGSIEIVKQG CWLDDFNCYDRTDCVEKKDSPQVYFCCCEGNMCNEKFSYFPEMEVTQPTS |
| 141 | RGEAETRECIYYNANWELERTNQSGLERCEGEQDKRLHCYASWRNSSGTIEIVKQ GCWLDDETCYDRTDCVEKKDSPQVYFCCCEGNMCNEKFSYFPEMEVTQPTS |
| 142 | ILGRAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTS |
| 143 | ILGRSETQECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTS |
| 144 | RGEAETRECIYYNANWELERTNQSGLERCEGEQDKRLHCYASWRNSSGTIELVKK GCWLDDFNCYDRQECVATKDSPEVYFCCCEGNMCNEKFSYFPEMEVTQPTS |
| 145 | RGEAETRECIYYNANWELERTNQSGLERCEGEQDKRLHCYASWRNSSGTIELVKK GCWLDDFNCYDRQECVATKENPQVYFCCCEGNMCNEKFSYFPEMEVTQPTS |
| 146 | GEAETRECIYYNANWELERTNQSGLERCEGEQDKRRHCFATWKNISGSIEIVKQGC WLDDFNCYDRTDCVEKKDSPQVYFCCCEGNMCNEKFSYFPEMEVTQPTS |

TABLE 3-continued

Extracellular ActRII chimeras having N-terminal truncations

| SEQ ID NO: | Amino Acid Sequence |
|---|---|
| 147 | GEAETRECIYYNANWELERTNQSGLERCEGEQDKRLHCYASWRNSSGTIEIVKQG CWLDDETCYDRTDCVEKKDSPQVYFCCCEGNMCNEKFSYFPEMEVTQPTS |
| 148 | LGRAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTS |
| 149 | LGRSETQECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTS |
| 150 | GEAETRECIYYNANWELERTNQSGLERCEGEQDKRLHCYASWRNSSGTIELVKKG CWLDDFNCYDRQECVATKDSPEVYFCCCEGNMCNEKFSYFPEMEVTQPTS |
| 151 | GEAETRECIYYNANWELERTNQSGLERCEGEQDKRLHCYASWRNSSGTIELVKKG CWLDDFNCYDRQECVATKENPQVYFCCCEGNMCNEKFSYFPEMEVTQPTS |
| 152 | EAETRECIYYNANWELERTNQSGLERCEGEQDKRRHCFATWKNISGSIEIVKQGC WLDDFNCYDRTDCVEKKDSPQVYFCCCEGNMCNEKFSYFPEMEVTQPTS |
| 153 | EAETRECIYYNANWELERTNQSGLERCEGEQDKRLHCYASWRNSSGTIEIVKQGC WLDDETCYDRTDCVEKKDSPQVYFCCCEGNMCNEKFSYFPEMEVTQPTS |
| 154 | GRAETRECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTS |
| 155 | GRSETQECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTS |
| 156 | EAETRECIYYNANWELERTNQSGLERCEGEQDKRLHCYASWRNSSGTIELVKKGC WLDDFNCYDRQECVATKDSPEVYFCCCEGNMCNEKFSYFPEMEVTQPTS |
| 157 | EAETRECIYYNANWELERTNQSGLERCEGEQDKRLHCYASWRNSSGTIELVKKGC WLDDFNCYDRQECVATKENPQVYFCCCEGNMCNEKFSYFPEMEVTQPTS |
| 158 | AETRECIYYNANWELERTNQSGLERCEGEQDKRRHCFATWKNISGSIEIVKQGCW LDDFNCYDRTDCVEKKDSPQVYFCCCEGNMCNEKFSYFPEMEVTQPTS |
| 159 | AETRECIYYNANWELERTNQSGLERCEGEQDKRLHCYASWRNSSGTIEIVKQGCW LDDETCYDRTDCVEKKDSPQVYFCCCEGNMCNEKFSYFPEMEVTQPTS |
| 160 | RAETRECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTS |
| 161 | RSETQECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTS |
| 162 | AETRECIYYNANWELERTNQSGLERCEGEQDKRLHCYASWRNSSGTIELVKKGCW LDDFNCYDRQECVATKDSPEVYFCCCEGNMCNEKFSYFPEMEVTQPTS |
| 163 | AETRECIYYNANWELERTNQSGLERCEGEQDKRLHCYASWRNSSGTIELVKKGCW LDDFNCYDRQECVATKENPQVYFCCCEGNMCNEKFSYFPEMEVTQPTS |
| 164 | ETRECIYYNANWELERTNQSGLERCEGEQDKRRHCFATWKNISGSIEIVKQGCWL DDFNCYDRTDCVEKKDSPQVYFCCCEGNMCNEKFSYFPEMEVTQPTS |
| 165 | ETRECIYYNANWELERTNQSGLERCEGEQDKRLHCYASWRNSSGTIEIVKQGCWL DDETCYDRTDCVEKKDSPQVYFCCCEGNMCNEKFSYFPEMEVTQPTS |
| 166 | AETRECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTS |
| 167 | SETQECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTS |
| 168 | ETRECIYYNANWELERTNQSGLERCEGEQDKRLHCYASWRNSSGTIELVKKGCWL DDFNCYDRQECVATKDSPEVYFCCCEGNMCNEKFSYFPEMEVTQPTS |
| 169 | ETRECIYYNANWELERTNQSGLERCEGEQDKRLHCYASWRNSSGTIELVKKGCWL DDFNCYDRQECVATKENPQVYFCCCEGNMCNEKFSYFPEMEVTQPTS |
| 170 | TRECIYYNANWELERTNQSGLERCEGEQDKRRHCFATWKNISGSIEIVKQGCWLD DFNCYDRTDCVEKKDSPQVYFCCCEGNMCNEKFSYFPEMEVTQPTS |
| 171 | TRECIYYNANWELERTNQSGLERCEGEQDKRLHCYASWRNSSGTIEIVKQGCWLD DETCYDRTDCVEKKDSPQVYFCCCEGNMCNEKFSYFPEMEVTQPTS |

TABLE 3-continued

Extracellular ActRII chimeras having N-terminal truncations

| SEQ ID NO: | Amino Acid Sequence |
|---|---|
| 172 | ETRECIYYNANWELERTNQSGLERCEGEQDKRLHCYASWRNSSGTIEIVKQGCWL DDFNCYDRTDCVEKKDSPQVYFCCCEGNMCNEKFSYFPEMEVTQPTS |
| 173 | ETQECIYYNANWELERTNQSGLERCEGEQDKRLHCYASWRNSSGTIEIVKQGCWL DDFNCYDRTDCVEKKDSPQVYFCCCEGNMCNEKFSYFPEMEVTQPTS |
| 174 | TRECIYYNANWELERTNQSGLERCEGEQDKRLHCYASWRNSSGTIELVKKGCWLD DFNCYDRQECVATKDSPEVYFCCCEGNMCNEKFSYFPEMEVTQPTS |
| 175 | TRECIYYNANWELERTNQSGLERCEGEQDKRLHCYASWRNSSGTIELVKKGCWLD DFNCYDRQECVATKENPQVYFCCCEGNMCNEKFSYFPEMEVTQPTS |
| 176 | RECIYYNANWELERTNQSGLERCEGEQDKRRHCFATWKNISGSIEIVKQGCWLDD FNCYDRTDCVEKKDSPQVYFCCCEGNMCNEKFSYFPEMEVTQPTS |
| 177 | RECIYYNANWELERTNQSGLERCEGEQDKRLHCYASWRNSSGTIEIVKQGCWLDD ETCYDRTDCVEKKDSPQVYFCCCEGNMCNEKFSYFPEMEVTQPTS |
| 178 | TRECIYYNANWELERTNQSGLERCEGEQDKRLHCYASWRNSSGTIEIVKQGCWLD DFNCYDRTDCVEKKDSPQVYFCCCEGNMCNEKFSYFPEMEVTQPTS |
| 179 | TQECIYYNANWELERTNQSGLERCEGEQDKRLHCYASWRNSSGTIEIVKQGCWLD DFNCYDRTDCVEKKDSPQVYFCCCEGNMCNEKFSYFPEMEVTQPTS |
| 180 | RECIYYNANWELERTNQSGLERCEGEQDKRLHCYASWRNSSGTIELVKKGCWLD DFNCYDRQECVATKDSPEVYFCCCEGNMCNEKFSYFPEMEVTQPTS |
| 181 | RECIYYNANWELERTNQSGLERCEGEQDKRLHCYASWRNSSGTIELVKKGCWLD DFNCYDRQECVATKENPQVYFCCCEGNMCNEKFSYFPEMEVTQPTS |
| 182 | RECIYYNANWELERTNQSGLERCEGEQDKRLHCYASWRNSSGTIEIVKQGCWLDD FNCYDRTDCVEKKDSPQVYFCCCEGNMCNEKFSYFPEMEVTQPTS |
| 183 | QECIYYNANWELERTNQSGLERCEGEQDKRLHCYASWRNSSGTIEIVKQGCWLDD FNCYDRTDCVEKKDSPQVYFCCCEGNMCNEKFSYFPEMEVTQPTS |

In some embodiments, a polypeptide of the invention including an extracellular ActRII chimera may further include a moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin), which may be fused to the N- or C-terminus (e.g., C-terminus) of the extracellular ActRII chimera by way of a linker or other covalent bonds. A polypeptide including an extracellular ActRII chimera fused to an Fc domain monomer may form a dimer (e.g., homodimer or heterodimer) through the interaction between two Fc domain monomers, which combine to form an Fc domain in the dimer. Exemplary polypeptides containing an ActRII chimera, an Fc domain, and a linker are provided in Table 4, below. In some embodiments, the terminal lysine is absent from the Fc domain amino acid sequence.

TABLE 4

Polypeptides containing an extracellular ActRII chimera fused to an Fc domain by way of a linker

| SEQ ID NO: | Amino Acid Sequence |
|---|---|
| 107 | GAILGRAETRECIYYNANWELERTNQSGLERCEGEQDKRLHCYASWRNSSGTIEIV KQGCWLDDINCYDRTDCVATEENPQVYFCCCEGNMCNEKFSYFPEMEVTQPTSG GGDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKAL PAPIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| 108 | GRGEAETRECIYYNANWELERTNQSGLERCEGEQDKRLHCYASWRNSSGTIEIVK QGCWLDDINCYDRTDCVEKKDSPEVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 109 | GRGEAETRECIYYNANWELERTNQSGLERCEGEQDKRLHCYASWRNSSGTIEIVK QGCWLDDINCYDRTDCVEKKDSPQVYFCCCEGNMCNEKFSYFPEMEVTQPTSGG |

TABLE 4-continued

| Polypeptides containing an extracellular ActRII chimera fused to an Fc domain by way of a linker | |
|---|---|
| SEQ ID NO: | Amino Acid Sequence |
| | GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 110 | GRGEAETRECIYYNANWELERTNQSGLERCEGEQDKRLHCYASWRNSSGTIEIVK QGCWLDDFNCYDRTDCVEKKDSPQVYFCCCEGNMCNEKFSYFPEMEVTQPTSG GGDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKAL PAPIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| 184 | ILGRAETRECIYYNANWELERTNQSGLERCEGEQDKRLHCYASWRNSSGTIEIVKQ GCWLDDINCYDRTDCVATEENPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 185 | RGEAETRECIYYNANWELERTNQSGLERCEGEQDKRLHCYASWRNSSGTIEIVKQ GCWLDDINCYDRTDCVEKKDSPEVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 186 | RGEAETRECIYYNANWELERTNQSGLERCEGEQDKRLHCYASWRNSSGTIEIVKQ GCWLDDINCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 187 | RGEAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 188 | LGRAETRECIYYNANWELERTNQSGLERCEGEQDKRLHCYASWRNSSGTIEIVKQ GCWLDDINCYDRTDCVATEENPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 189 | GEAETRECIYYNANWELERTNQSGLERCEGEQDKRLHCYASWRNSSGTIEIVKQG CWLDDINCYDRTDCVEKKDSPEVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 190 | GEAETRECIYYNANWELERTNQSGLERCEGEQDKRLHCYASWRNSSGTIEIVKQG CWLDDINCYDRTDCVEKKDSPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 191 | GEAETRECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP |

TABLE 4-continued

| Polypeptides containing an extracellular ActRII chimera fused to an Fc domain by way of a linker | |
|---|---|
| SEQ ID NO: | Amino Acid Sequence |
| | ENNYKTTPPVLDSDGSFFLYSKLTVDKSRWQQGNVFSCSVMHEALHNHYTQKSLS LSPGK |
| 192 | GRAETRECIYYNANWELERTNQSGLERCEGEQDKRLHCYASWRNSSGTIEIVKQG CWLDDINCYDRTDCVATEENPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 193 | EAETRECIYYNANWELERTNQSGLERCEGEQDKRLHCYASWRNSSGTIEIVKQGC WLDDINCYDRTDCVEKKDSPEVYFCCCEGNMCNEKFSYFPEMEVTQPTSGGGDK THTCPPCPAPELLGGPSVFLFPPKPKDTLMISRTPEVTCVVVDVSHEDPEVKFNWY VDGVEVHNAKTKPREEQYNSTYRVVSVLTVLHQDWLNGKEYKCKVSNKALPAPIE KTISKAKGQPREPQVYTLPPSRDELTKNQVSLTCLVKGFYPSDIAVEWESNGQPEN NYKTTPPVLDSDGSFFLYSKLTVDKSRWQQGNVFSCSVMHEALHNHYTQKSLSLS PGK |
| 194 | EAETRECIYYNANWELERTNQSGLERCEGEQDKRLHCYASWRNSSGTIEIVKQGC WLDDINCYDRTDCVEKKDSPQVYFCCCEGNMCNEKFSYFPEMEVTQPTSGGGDK THTCPPCPAPELLGGPSVFLFPPKPKDTLMISRTPEVTCVVVDVSHEDPEVKFNWY VDGVEVHNAKTKPREEQYNSTYRVVSVLTVLHQDWLNGKEYKCKVSNKALPAPIE KTISKAKGQPREPQVYTLPPSRDELTKNQVSLTCLVKGFYPSDIAVEWESNGQPEN NYKTTPPVLDSDGSFFLYSKLTVDKSRWQQGNVFSCSVMHEALHNHYTQKSLSLS PGK |
| 195 | EAETRECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 196 | RAETRECIYYNANWELERTNQSGLERCEGEQDKRLHCYASWRNSSGTIEIVKQGC WLDDINCYDRTDCVATEENPQVYFCCCEGNMCNEKFSYFPEMEVTQPTSGGGDK THTCPPCPAPELLGGPSVFLFPPKPKDTLMISRTPEVTCVVVDVSHEDPEVKFNWY VDGVEVHNAKTKPREEQYNSTYRVVSVLTVLHQDWLNGKEYKCKVSNKALPAPIE KTISKAKGQPREPQVYTLPPSRDELTKNQVSLTCLVKGFYPSDIAVEWESNGQPEN NYKTTPPVLDSDGSFFLYSKLTVDKSRWQQGNVFSCSVMHEALHNHYTQKSLSLS PGK |
| 197 | AETRECIYYNANWELERTNQSGLERCEGEQDKRLHCYASWRNSSGTIEIVKQGCW LDDINCYDRTDCVEKKDSPEVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 198 | AETRECIYYNANWELERTNQSGLERCEGEQDKRLHCYASWRNSSGTIEIVKQGCW LDDINCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 199 | AETRECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 200 | AETRECIYYNANWELERTNQSGLERCEGEQDKRLHCYASWRNSSGTIEIVKQGCW LDDINCYDRTDCVATEENPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |

TABLE 4-continued

| Polypeptides containing an extracellular ActRII chimera fused to an Fc domain by way of a linker | |
|---|---|
| SEQ ID NO: | Amino Acid Sequence |
| 201 | ETRECIYYNANWELERTNQSGLERCEGEQDKRLHCYASWRNSSGTIEIVKQGCWL DDINCYDRTDCVEKKDSPEVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 202 | ETRECIYYNANWELERTNQSGLERCEGEQDKRLHCYASWRNSSGTIEIVKQGCWL DDINCYDRTDCVEKKDSPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 203 | ETRECIYYNANWELERTNQSGLERCEGEQDKRLHCYASWRNSSGTIEIVKQGCWL DDFNCYDRTDCVEKKDSPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 204 | ETRECIYYNANWELERTNQSGLERCEGEQDKRLHCYASWRNSSGTIEIVKQGCWL DDINCYDRTDCVATEENPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 205 | TRECIYYNANWELERTNQSGLERCEGEQDKRLHCYASWRNSSGTIEIVKQGCWLD DINCYDRTDCVEKKDSPEVYFCCCEGNMCNEKFSYFPEMEVTQPTSGGGDKTHT CPPCPAPELLGGPSVFLFPPKPKDTLMISRTPEVTCVVVDVSHEDPEVKFNWYVDG VEVHNAKTKPREEQYNSTYRVVSVLTVLHQDWLNGKEYKCKVSNKALPAPIEKTIS KAKGQPREPQVYTLPPSRDELTKNQVSLTCLVKGFYPSDIAVEWESNGQPENNYK TTPPVLDSDGSFFLYSKLTVDKSRWQQGNVFSCSVMHEALHNHYTQKSLSLSPGK |
| 206 | TRECIYYNANWELERTNQSGLERCEGEQDKRLHCYASWRNSSGTIEIVKQGCWLD DINCYDRTDCVEKKDSPQVYFCCCEGNMCNEKFSYFPEMEVTQPTSGGGDKTHT CPPCPAPELLGGPSVFLFPPKPKDTLMISRTPEVTCVVVDVSHEDPEVKFNWYVDG VEVHNAKTKPREEQYNSTYRVVSVLTVLHQDWLNGKEYKCKVSNKALPAPIEKTIS KAKGQPREPQVYTLPPSRDELTKNQVSLTCLVKGFYPSDIAVEWESNGQPENNYK TTPPVLDSDGSFFLYSKLTVDKSRWQQGNVFSCSVMHEALHNHYTQKSLSLSPGK |
| 207 | TRECIYYNANWELERTNQSGLERCEGEQDKRLHCYASWRNSSGTIEIVKQGCWLD DFNCYDRTDCVEKKDSPQVYFCCCEGNMCNEKFSYFPEMEVTQPTSGGGDKTHT CPPCPAPELLGGPSVFLFPPKPKDTLMISRTPEVTCVVVDVSHEDPEVKFNWYVDG VEVHNAKTKPREEQYNSTYRVVSVLTVLHQDWLNGKEYKCKVSNKALPAPIEKTIS KAKGQPREPQVYTLPPSRDELTKNQVSLTCLVKGFYPSDIAVEWESNGQPENNYK TTPPVLDSDGSFFLYSKLTVDKSRWQQGNVFSCSVMHEALHNHYTQKSLSLSPGK |
| 208 | TRECIYYNANWELERTNQSGLERCEGEQDKRLHCYASWRNSSGTIEIVKQGCWLD DINCYDRTDCVATEENPQVYFCCCEGNMCNEKFSYFPEMEVTQPTSGGGDKTHT CPPCPAPELLGGPSVFLFPPKPKDTLMISRTPEVTCVVVDVSHEDPEVKFNWYVDG VEVHNAKTKPREEQYNSTYRVVSVLTVLHQDWLNGKEYKCKVSNKALPAPIEKTIS KAKGQPREPQVYTLPPSRDELTKNQVSLTCLVKGFYPSDIAVEWESNGQPENNYK TTPPVLDSDGSFFLYSKLTVDKSRWQQGNVFSCSVMHEALHNHYTQKSLSLSPGK |
| 209 | RECIYYNANWELERTNQSGLERCEGEQDKRLHCYASWRNSSGTIEIVKQGCWLDD INCYDRTDCVEKKDSPEVYFCCCEGNMCNEKFSYFPEMEVTQPTSGGGDKTHTCP PCPAPELLGGPSVFLFPPKPKDTLMISRTPEVTCVVVDVSHEDPEVKFNWYVDGVE VHNAKTKPREEQYNSTYRVVSVLTVLHQDWLNGKEYKCKVSNKALPAPIEKTISKA KGQPREPQVYTLPPSRDELTKNQVSLTCLVKGFYPSDIAVEWESNGQPENNYKTT PPVLDSDGSFFLYSKLTVDKSRWQQGNVFSCSVMHEALHNHYTQKSLSLSPGK |
| 210 | RECIYYNANWELERTNQSGLERCEGEQDKRLHCYASWRNSSGTIEIVKQGCWLDD INCYDRTDCVEKKDSPQVYFCCCEGNMCNEKFSYFPEMEVTQPTSGGGDKTHTC PPCPAPELLGGPSVFLFPPKPKDTLMISRTPEVTCVVVDVSHEDPEVKFNWYVDGV EVHNAKTKPREEQYNSTYRVVSVLTVLHQDWLNGKEYKCKVSNKALPAPIEKTISK AKGQPREPQVYTLPPSRDELTKNQVSLTCLVKGFYPSDIAVEWESNGQPENNYKT TPPVLDSDGSFFLYSKLTVDKSRWQQGNVFSCSVMHEALHNHYTQKSLSLSPGK |

TABLE 4-continued

Polypeptides containing an extracellular ActRII chimera fused to an Fc domain by way of a linker

| SEQ ID NO: | Amino Acid Sequence |
|---|---|
| 211 | RECIYYNANWELERTNQSGLERCEGEQDKRLHCYASWRNSSGTIEIVKQGCWLDD FNCYDRTDCVEKKDSPQVYFCCCEGNMCNEKFSYFPEMEVTQPTSGGGDKTHTC PPCPAPELLGGPSVFLFPPKPKDTLMISRTPEVTCVVVDVSHEDPEVKFNWYVDGV EVHNAKTKPREEQYNSTYRVVSVLTVLHQDWLNGKEYKCKVSNKALPAPIEKTISK AKGQPREPQVYTLPPSRDELTKNQVSLTCLVKGFYPSDIAVEWESNGQPENNYKT TPPVLDSDGSFFLYSKLTVDKSRWQQGNVFSCSVMHEALHNHYTQKSLSLSPGK |
| 212 | RECIYYNANWELERTNQSGLERCEGEQDKRLHCYASWRNSSGTIEIVKQGCWLDD INCYDRTDCVATEENPQVYFCCCEGNMCNEKFSYFPEMEVTQPTSGGGDKTHTC PPCPAPELLGGPSVFLFPPKPKDTLMISRTPEVTCVVVDVSHEDPEVKFNWYVDGV EVHNAKTKPREEQYNSTYRVVSVLTVLHQDWLNGKEYKCKVSNKALPAPIEKTISK AKGQPREPQVYTLPPSRDELTKNQVSLTCLVKGFYPSDIAVEWESNGQPENNYKT TPPVLDSDGSFFLYSKLTVDKSRWQQGNVFSCSVMHEALHNHYTQKSLSLSPGK |
| 213 | GRGEAETRECIYYNANWELERTNQSGLERCEGEQDKRRHCFATWKNISGSIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 214 | GRGEAETRECIYYNANWELERTNQSGLERCEGEQDKRLHCYASWRNSSGTIEIVK QGCWLDDETCYDRTDCVEKKDSPQVYFCCCEGNMCNEKFSYFPEMEVTQPTSG GGDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKAL PAPIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| 215 | GAILGRAETRECIYYNANWELERTNQSGLERCEGEQDKRLHCYASWRNSSGTIEIV KQGCWLDDFNCYDRTDCVEKKDSPQVYFCCCEGNMCNEKFSYFPEMEVTQPTS GGGDKTHTCPPCPAPELLGGPSVFLFPPKPKDTLMISRTPEVTCVVVDVSHEDPEV KFNWYVDGVEVHNAKTKPREEQYNSTYRVVSVLTVLHQDWLNGKEYKCKVSNKA LPAPIEKTISKAKGQPREPQVYTLPPSRDELTKNQVSLTCLVKGFYPSDIAVEWESN GQPENNYKTTPPVLDSDGSFFLYSKLTVDKSRWQQGNVFSCSVMHEALHNHYTQ KSLSLSPGK |
| 216 | GAILGRSETQECIYYNANWELERTNQSGLERCEGEQDKRLHCYASWRNSSGTIEIV KQGCWLDDFNCYDRTDCVEKKDSPQVYFCCCEGNMCNEKFSYFPEMEVTQPTS GGGDKTHTCPPCPAPELLGGPSVFLFPPKPKDTLMISRTPEVTCVVVDVSHEDPEV KFNWYVDGVEVHNAKTKPREEQYNSTYRVVSVLTVLHQDWLNGKEYKCKVSNKA LPAPIEKTISKAKGQPREPQVYTLPPSRDELTKNQVSLTCLVKGFYPSDIAVEWESN GQPENNYKTTPPVLDSDGSFFLYSKLTVDKSRWQQGNVFSCSVMHEALHNHYTQ KSLSLSPGK |
| 217 | GRGEAETRECIYYNANWELERTNQSGLERCEGEQDKRLHCYASWRNSSGTIELVK KGCWLDDFNCYDRQECVATKDSPEVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 218 | GRGEAETRECIYYNANWELERTNQSGLERCEGEQDKRLHCYASWRNSSGTIELVK KGCWLDDFNCYDRQECVATKENPQVYFCCCEGNMCNEKFSYFPEMEVTQPTSG GGDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKAL PAPIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| 219 | RGEAETRECIYYNANWELERTNQSGLERCEGEQDKRRHCFATWKNISGSIEIVKQG CWLDDFNCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 220 | RGEAETRECIYYNANWELERTNQSGLERCEGEQDKRLHCYASWRNSSGTIEIVKQ GCWLDDETCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP |

TABLE 4-continued

Polypeptides containing an extracellular ActRII chimera fused to an Fc domain by way of a linker

| SEQ ID NO: | Amino Acid Sequence |
|---|---|
| | APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 221 | ILGRAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 222 | ILGRSETQECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 223 | RGEAETRECIYYNANWELERTNQSGLERCEGEQDKRLHCYASWRNSSGTIELVKK GCWLDDFNCYDRQECVATKDSPEVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 224 | RGEAETRECIYYNANWELERTNQSGLERCEGEQDKRLHCYASWRNSSGTIELVKK GCWLDDFNCYDRQECVATKENPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 225 | GEAETRECIYYNANWELERTNQSGLERCEGEQDKRRHCFATWKNISGSIEIVKQGC WLDDFNCYDRTDCVEKKDSPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 226 | GEAETRECIYYNANWELERTNQSGLERCEGEQDKRLHCYASWRNSSGTIEIVKQG CWLDDETCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 227 | LGRAETRECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 228 | LGRSETQECIYYNANWELERTNQSGLERCEGEQDKRLHCYASWRNSSGTIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| 229 | GEAETRECIYYNANWELERTNQSGLERCEGEQDKRLHCYASWRNSSGTIELVKKG CWLDDFNCYDRQECVATKDSPEVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |

TABLE 4-continued

Polypeptides containing an extracellular ActRII chimera fused to an Fc domain by way of a linker

| SEQ ID NO: | Amino Acid Sequence |
|---|---|
| 230 | GEAETRECIYYNANWELERTNQSGLERCEGEQDKRLHCYASWRNSSGTIELVKKG CWLDDFNCYDRQECVATKENPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 231 | EAETRECIYYNANWELERTNQSGLERCEGEQDKRRHCFATWKNISGSIEIVKQGC WLDDFNCYDRTDCVEKKDSPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 232 | EAETRECIYYNANWELERTNQSGLERCEGEQDKRLHCYASWRNSSGTIEIVKQGC WLDDETCYDRTDCVEKKDSPQVYFCCCEGNMCNEKFSYFPEMEVTQPTSGGGDK THTCPPCPAPELLGGPSVFLFPPKPKDTLMISRTPEVTCVVVDVSHEDPEVKFNWY VDGVEVHNAKTKPREEQYNSTYRVVSVLTVLHQDWLNGKEYKCKVSNKALPAPIE KTISKAKGQPREPQVYTLPPSRDELTKNQVSLTCLVKGFYPSDIAVEWESNGQPEN NYKTTPPVLDSDGSFFLYSKLTVDKSRWQQGNVFSCSVMHEALHNHYTQKSLSLS PGK |
| 233 | GRAETRECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 234 | GRSETQECIYYNANWELERTNQSGLERCEGEQDKRLHCYASWRNSSGTIEIVKQG CWLDDFNCYDRTDCVEKKDSPQVYFCCCEGNMCNEKFSYFPEMEVTQPTSGGG DKTHTCPPCPAPELLGGPSVFLFPPKPKDTLMISRTPEVTCVVVDVSHEDPEVKFN WYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNGQP ENNYKTTPPVLDSDGSFFLYSKLTVDKSRWQQGNVFSCSVMHEALHNHYTQKSLS LSPGK |
| 235 | EAETRECIYYNANWELERTNQSGLERCEGEQDKRLHCYASWRNSSGTIELVKKGC WLDDFNCYDRQECVATKDSPEVYFCCCEGNMCNEKFSYFPEMEVTQPTSGGGDK THTCPPCPAPELLGGPSVFLFPPKPKDTLMISRTPEVTCVVVDVSHEDPEVKFNWY VDGVEVHNAKTKPREEQYNSTYRVVSVLTVLHQDWLNGKEYKCKVSNKALPAPIE KTISKAKGQPREPQVYTLPPSRDELTKNQVSLTCLVKGFYPSDIAVEWESNGQPEN NYKTTPPVLDSDGSFFLYSKLTVDKSRWQQGNVFSCSVMHEALHNHYTQKSLSLS PGK |
| 236 | EAETRECIYYNANWELERTNQSGLERCEGEQDKRLHCYASWRNSSGTIELVKKGC WLDDFNCYDRQECVATKENPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 237 | AETRECIYYNANWELERTNQSGLERCEGEQDKRRHCFATWKNISGSIEIVKQGCW LDDFNCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 238 | AETRECIYYNANWELERTNQSGLERCEGEQDKRLHCYASWRNSSGTIEIVKQGCW LDDETCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 239 | RAETRECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTSGGGD |

TABLE 4-continued

| Polypeptides containing an extracellular ActRII chimera fused to an Fc domain by way of a linker | |
|---|---|
| SEQ ID NO: | Amino Acid Sequence |
| | KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 240 | RSETQECIYYNANWELERTNQSGLERCEGEQDKRLHCYASWRNSSGTIEIVKQGC WLDDFNCYDRTDCVEKKDSPQVYFCCCEGNMCNEKFSYFPEMEVTQPTSGGGD KTHTCPPCPAPELLGGPSVFLFPPKPKDTLMISRTPEVTCVVVDVSHEDPEVKFNW YVDGVEVHNAKTKPREEQYNSTYRVVSVLTVLHQDWLNGKEYKCKVSNKALPAPI EKTISKAKGQPREPQVYTLPPSRDELTKNQVSLTCLVKGFYPSDIAVEWESNGQPE NNYKTTPPVLDSDGSFFLYSKLTVDKSRWQQGNVFSCSVMHEALHNHYTQKSLSL SPGK |
| 241 | AETRECIYYNANWELERTNQSGLERCEGEQDKRLHCYASWRNSSGTIELVKKGCW LDDFNCYDRQECVATKDSPEVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 242 | AETRECIYYNANWELERTNQSGLERCEGEQDKRLHCYASWRNSSGTIELVKKGCW LDDFNCYDRQECVATKENPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 243 | ETRECIYYNANWELERTNQSGLERCEGEQDKRRHCFATWKNISGSIEIVKQGCWL DDFNCYDRTDCVEKKDSPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 244 | ETRECIYYNANWELERTNQSGLERCEGEQDKRLHCYASWRNSSGTIEIVKQGCWL DDETCYDRTDCVEKKDSPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 245 | AETRECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 246 | SETQECIYYNANWELERTNQSGLERCEGEQDKRLHCYASWRNSSGTIEIVKQGCW LDDFNCYDRTDCVEKKDSPQVYFCCCEGNMCNEKFSYFPEMEVTQPTSGGGDKT HTCPPCPAPELLGGPSVFLFPPKPKDTLMISRTPEVTCVVVDVSHEDPEVKFNWYV DGVEVHNAKTKPREEQYNSTYRVVSVLTVLHQDWLNGKEYKCKVSNKALPAPIEKT ISKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 247 | ETRECIYYNANWELERTNQSGLERCEGEQDKRLHCYASWRNSSGTIELVKKGCWL DDFNCYDRQECVATKDSPEVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY KTTPPVLDSDGSFFLYSKLTVDKSRWQQGNVFSCSVMHEALHNHYTQKSLSLSPG K |
| 248 | ETRECIYYNANWELERTNQSGLERCEGEQDKRLHCYASWRNSSGTIELVKKGCWL DDFNCYDRQECVATKENPQVYFCCCEGNMCNEKFSYFPEMEVTQPTSGGGDKTH TCPPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIEKTI SKAKGQPREPQVYTLPPSRDELTKNQVSLTCLVKGFYPSDIAVEWESNGQPENNY |

TABLE 4-continued

| Polypeptides containing an extracellular ActRII chimera fused to an Fc domain by way of a linker | |
|---|---|
| SEQ ID NO: | Amino Acid Sequence |
| | KTTPPVLDSDGSFFLYSKLTVDKSRWQQGNVFSCSVMHEALHNHYTQKSLSLSPG<br>K |
| 249 | TRECIYYNANWELERTNQSGLERCEGEQDKRRHCFATWKNISGSIEIVKQGCWLD<br>DFNCYDRTDCVEKKDSPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 250 | TRECIYYNANWELERTNQSGLERCEGEQDKRLHCYASWRNSSGTIEIVKQGCWLD<br>DETCYDRTDCVEKKDSPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 251 | QECIYYNANWELERTNQSGLERCEGEQDKRLHCYASWRNSSGTIEIVKQGCWLDD<br>FNCYDRTDCVEKKDSPQVYFCCCEGNMCNEKFSYFPEMEVTQPTSGGGDKTHTC<br>PPCPAPELLGGPSVFLFPPKPKDTLMISRTPEVTCVVVDVSHEDPEVKFNWYVDGV<br>EVHNAKTKPREEQYNSTYRVVSVLTVLHQDWLNGKEYKCKVSNKALPAPIEKTISK<br>AKGQPREPQVYTLPPSRDELTKNQVSLTCLVKGFYPSDIAVEWESNGQPENNYKT<br>TPPVLDSDGSFFLYSKLTVDKSRWQQGNVFSCSVMHEALHNHYTQKSLSLSPGK |
| 252 | ETRECIYYNANWELERTNQSGLERCEGEQDKRLHCYASWRNSSGTIEIVKQGCWL<br>DDFNCYDRTDCVEKKDSPQVYFCCCEGNMCNEKFSYFPEMEVTQPTSGGGDKTH<br>TCPPCPAPELLGGPSVFLFPPKPKDTLMISRTPEVTCVVVDVSHEDPEVKFNWYVD<br>GVEVHNAKTKPREEQYNSTYRVVSVLTVLHQDWLNGKEYKCKVSNKALPAPIEKTI<br>SKAKGQPREPQVYTLPPSRDELTKNQVSLTCLVKGFYPSDIAVEWESNGQPENNY<br>KTTPPVLDSDGSFFLYSKLTVDKSRWQQGNVFSCSVMHEALHNHYTQKSLSLSPG<br>K |
| 253 | ETQECIYYNANWELERTNQSGLERCEGEQDKRLHCYASWRNSSGTIEIVKQGCWL<br>DDFNCYDRTDCVEKKDSPQVYFCCCEGNMCNEKFSYFPEMEVTQPTSGGGDKTH<br>TCPPCPAPELLGGPSVFLFPPKPKDTLMISRTPEVTCVVVDVSHEDPEVKFNWYVD<br>GVEVHNAKTKPREEQYNSTYRVVSVLTVLHQDWLNGKEYKCKVSNKALPAPIEKTI<br>SKAKGQPREPQVYTLPPSRDELTKNQVSLTCLVKGFYPSDIAVEWESNGQPENNY<br>KTTPPVLDSDGSFFLYSKLTVDKSRWQQGNVFSCSVMHEALHNHYTQKSLSLSPG<br>K |
| 254 | TRECIYYNANWELERTNQSGLERCEGEQDKRLHCYASWRNSSGTIELVKKGCWLD<br>DFNCYDRQECVATKDSPEVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 255 | TRECIYYNANWELERTNQSGLERCEGEQDKRLHCYASWRNSSGTIELVKKGCWLD<br>DFNCYDRQECVATKENPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 256 | RECIYYNANWELERTNQSGLERCEGEQDKRRHCFATWKNISGSIEIVKQGCWLDD<br>FNCYDRTDCVEKKDSPQVYFCCCEGNMCNEKFSYFPEMEVTQPTSGGGDKTHTC<br>PPCPAPELLGGPSVFLFPPKPKDTLMISRTPEVTCVVVDVSHEDPEVKFNWYVDGV<br>EVHNAKTKPREEQYNSTYRVVSVLTVLHQDWLNGKEYKCKVSNKALPAPIEKTISK<br>AKGQPREPQVYTLPPSRDELTKNQVSLTCLVKGFYPSDIAVEWESNGQPENNYKT<br>TPPVLDSDGSFFLYSKLTVDKSRWQQGNVFSCSVMHEALHNHYTQKSLSLSPGK |
| 257 | RECIYYNANWELERTNQSGLERCEGEQDKRLHCYASWRNSSGTIEIVKQGCWLDD<br>ETCYDRTDCVEKKDSPQVYFCCCEGNMCNEKFSYFPEMEVTQPTSGGGDKTHTC<br>PPCPAPELLGGPSVFLFPPKPKDTLMISRTPEVTCVVVDVSHEDPEVKFNWYVDGV<br>EVHNAKTKPREEQYNSTYRVVSVLTVLHQDWLNGKEYKCKVSNKALPAPIEKTISK<br>AKGQPREPQVYTLPPSRDELTKNQVSLTCLVKGFYPSDIAVEWESNGQPENNYKT<br>TPPVLDSDGSFFLYSKLTVDKSRWQQGNVFSCSVMHEALHNHYTQKSLSLSPGK |
| 258 | TRECIYYNANWELERTNQSGLERCEGEQDKRLHCYASWRNSSGTIEIVKQGCWLD<br>DFNCYDRTDCVEKKDSPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |

TABLE 4-continued

Polypeptides containing an extracellular ActRII chimera fused to an Fc domain by way of a linker

| SEQ ID NO: | Amino Acid Sequence |
|---|---|
| 259 | TQECIYYNANWELERTNQSGLERCEGEQDKRLHCYASWRNSSGTIEIVKQGCWLD<br>DFNCYDRTDCVEKKDSPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 260 | RECIYYNANWELERTNQSGLERCEGEQDKRLHCYASWRNSSGTIELVKKGCWLD<br>DFNCYDRQECVATKDSPEVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 261 | RECIYYNANWELERTNQSGLERCEGEQDKRLHCYASWRNSSGTIELVKKGCWLD<br>DFNCYDRQECVATKENPQVYFCCCEGNMCNEKFSYFPEMEVTQPTSGGGDKTHT<br>CPPCPAPELLGGPSVFLFPPKPKDTLMISRTPEVTCVVVDVSHEDPEVKFNWYVDG<br>VEVHNAKTKPREEQYNSTYRVVSVLTVLHQDWLNGKEYKCKVSNKALPAPIEKTIS<br>KAKGQPREPQVYTLPPSRDELTKNQVSLTCLVKGFYPSDIAVEWESNGQPENNYK<br>TTPPVLDSDGSFFLYSKLTVDKSRWQQGNVFSCSVMHEALHNHYTQKSLSLSPGK |
| 262 | RECIYYNANWELERTNQSGLERCEGEQDKRLHCYASWRNSSGTIEIVKQGCWLDD<br>FNCYDRTDCVEKKDSPQVYFCCCEGNMCNEKFSYFPEMEVTQPTSGGGDKTHTC<br>PPCPAPELLGGPSVFLFPPKPKDTLMISRTPEVTCVVVDVSHEDPEVKFNWYVDGV<br>EVHNAKTKPREEQYNSTYRVVSVLTVLHQDWLNGKEYKCKVSNKALPAPIEKTISK<br>AKGQPREPQVYTLPPSRDELTKNQVSLTCLVKGFYPSDIAVEWESNGQPENNYKT<br>TPPVLDSDGSFFLYSKLTVDKSRWQQGNVFSCSVMHEALHNHYTQKSLSLSPGK |
| 263 | GRGEAETRECIYYNANWELERTNQSGLERCEGEQRKRLHCYASWRNSSGTIEIVK<br>QGCWLDDFNCYDRTDCVEKKDSPQVYFCCCEGNMCNEKFSYFPEMEVTQPTSG<br>GGDKTHTCPPCPAPELLGGPSVFLFPPKPKDTLMISRTPEVTCVVVDVSHEDPEVK<br>FNWYVDGVEVHNAKTKPREEQYNSTYRVVSVLTVLHQDWLNGKEYKCKVSNKAL<br>PAPIEKTISKAKGQPREPQVYTLPPSRDELTKNQVSLTCLVKGFYPSDIAVEWESNG<br>QPENNYKTTPPVLDSDGSFFLYSKLTVDKSRWQQGNVFSCSVMHEALHNHYTQKS<br>LSLSPGK |

Furthermore, in some embodiments, a polypeptide described herein (e.g., an ActRII chimera-Fc fusion protein) has a serum half-life of at least 7 days in humans. The polypeptide may bind to activin A with a $K_D$ of 10 µM or higher. In some embodiments, the polypeptide binds to activin A, activin B, and/or myostatin and exhibits reduced (e.g., weak) binding to BMP9 (e.g., compared to wild-type extracellular ActRIIB). In some embodiments, the polypeptide that has reduced or weak binding to BMP9 has the sequence TEEN (SEQ ID NO: 265) or TKEN (SEQ ID NO: 266) at positions $X_3$, $X_4$, $X_5$, and $X_6$. In some embodiments, the polypeptide that has reduced or weak binding to BMP9 has the sequence KKDS (SEQ ID NO: 267) or TKDS (SEQ ID NO: 268) at positions $X_3$, $X_4$, $X_5$, and $X_6$. In some embodiments, the polypeptide does not substantially bind to human BMP9.

In some embodiments, the polypeptide may bind to human activin A with a $K_D$ of about 800 µM or less (e.g., a $K_D$ of about 800, 700, 600, 500, 400, 300, 200, 100, 90, 80, 70, 60, 50, 40, 30, 20, 10, 9, 8, 7, 6, 5, 4, 3, 2, or 1 µM or less, e.g., a $K_D$ of between about 800 µM and about 30 µM). In some embodiments, the polypeptide may bind to human activin B with a $K_D$ of 800 µM or less (e.g., a $K_D$ of about 800, 700, 600, 500, 400, 300, 200, 100, 90, 80, 70, 60, 50, 40, 30, 20, 10, 9, 8, 7, 6, 5, 4, 3, 2, or 1 µM or less, e.g., a $K_D$ of between about 800 µM and about 5 µM) The polypeptide may also bind to growth and differentiation factor 11 (GDF-11) with a $K_D$ of approximately 5 µM or higher (e.g., a $K_D$ of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 µM or higher).

II. Fc Domains

In some embodiments, a polypeptide described herein may include an extracellular ActRII chimera fused to an Fc domain monomer of an immunoglobulin or a fragment of an Fc domain to increase the serum half-life of the polypeptide. A polypeptide including an extracellular ActRII chimera fused to an Fc domain monomer may form a dimer (e.g., homodimer or heterodimer) through the interaction between two Fc domain monomers, which form an Fc domain in the dimer. As conventionally known in the art, an Fc domain is the protein structure that is found at the C-terminus of an immunoglobulin. An Fc domain includes two Fc domain monomers that are dimerized by the interaction between the $C_H3$ antibody constant domains. A wild-type Fc domain forms the minimum structure that binds to an Fc receptor, e.g., FcγRI, FcγRIIa, FcγRIIb, FcγRIIIa, FcγRIIIb, FcγRIV. In some embodiments, an Fc domain may be mutated to lack effector functions, typical of a "dead" Fc domain. For example, an Fc domain may include specific amino acid substitutions that are known to minimize the interaction between the Fc domain and an Fcγ receptor. In some embodiments, an Fc domain is from an IgG1 antibody and includes amino acid substitutions L234A, L235A, and G237A. In some embodiments, an Fc domain is from an IgG1 antibody and includes amino acid substitutions D265A, K322A, and N434A. The aforementioned amino acid positions are defined according to Kabat (Sequences of Proteins of Immunological Interest, 5th Ed. Public Health Service, National Institutes of Health, Bethesda, MD (1991)). The Kabat numbering of amino acid residues may be determined for a given antibody by alignment at regions of homology of the sequence of the antibody with a "standard" Kabat numbered sequence. Furthermore, in some embodiments, an Fc domain does not induce any immune system-related response. For example, the Fc domain in a dimer of a polypeptide including an extracellular ActRII chimera fused to an Fc domain monomer may be modified to reduce the interaction or binding between the Fc domain and an Fcγ receptor. The sequence of an Fc domain monomer that may be fused to an extracellular ActRII chimera is shown below (SEQ ID NO: 48):

```
THTCPPCPAPELLGGPSVFLFPPKPKDTLMISRTPEVTCV
VVDVSHEDPEVKFNWYVDGVEVHNAKTKPREEQYNSTYRV
VSVLTVLHQDWLNGKEYKCKVSNKALPVPIEKTISKAKGQ
PREPQVYTLPPSREEMTKNQVSLTCLVKGFYPSDIAVEWE
SNGQPENNYKTTPPVLDSDGPFFLYSKLTVDKSRWQQGNV
FSCSVMHEALHNHYTQKSLSLSPGK
```

In some embodiments, an Fc domain is from an IgG1 antibody and includes amino acid substitutions L12A, L13A, and G15A, relative to the sequence of SEQ ID NO: 48. In some embodiments, an Fc domain is from an IgG1 antibody and includes amino acid substitutions D43A, K100A, and N212A, relative to the sequence of SEQ ID NO: 48. In some embodiments, the terminal lysine is absent from the Fc domain monomer having the sequence of SEQ ID NO: 48. In some embodiments, an extracellular ActRII chimera described herein (e.g., an extracellular ActRII chimera having the sequence of any one of SEQ ID NOs: 1-43 (e.g., SEQ ID NOs: 22-43)) may be fused to the N- or C-terminus of an Fc domain monomer (e.g., SEQ ID NO: 48) through conventional genetic or chemical means, e.g., chemical conjugation. If desired, a linker (e.g., a spacer) can be inserted between the extracellular ActRII chimera and the Fc domain monomer. The Fc domain monomer can be fused to the N- or C-terminus (e.g., C-terminus) of the extracellular ActRII chimera.

In some embodiments, a polypeptide described herein may include an extracellular ActRII chimera fused to an Fc domain. In some embodiments, the Fc domain contains one or more amino acid substitutions that reduce or inhibit Fc domain dimerization. In some embodiments, the Fc domain contains a hinge domain. The Fc domain can be of immunoglobulin antibody isotype IgG, IgE, IgM, IgA, or IgD. Additionally, the Fc domain can be an IgG subtype (e.g., IgG1, IgG2a, IgG2b, IgG3, or IgG4). The Fc domain can also be a non-naturally occurring Fc domain, e.g., a recombinant Fc domain.

Methods of engineering Fc domains that have reduced dimerization are known in the art. In some embodiments, one or more amino acids with large side-chains (e.g., tyrosine or tryptophan) may be introduced to the $C_H3$-$C_H3$ dimer interface to hinder dimer formation due to steric clash. In other embodiments, one or more amino acids with small side-chains (e.g., alanine, valine, or threonine) may be introduced to the $C_H3$-$C_H3$ dimer interface to remove favorable interactions. Methods of introducing amino acids with large or small side-chains in the $C_H3$ domain are described in, e.g., Ying et al. (*J Biol Chem.* 287:19399-19408, 2012), U.S. Patent Publication No. 2006/0074225, U.S. Pat. Nos. 8,216,805 and 5,731,168, Ridgway et al. (*Protein Eng.* 9:617-612, 1996), Atwell et al. (*J Mol Biol.* 270:26-35, 1997), and Merchant et al. (*Nat Biotechnol.* 16:677-681, 1998), all of which are incorporated herein by reference in their entireties.

In yet other embodiments, one or more amino acid residues in the $C_H3$ domain that make up the $C_H3$-$C_H3$ interface between two Fc domains are replaced with positively-charged amino acid residues (e.g., lysine, arginine, or histidine) or negatively-charged amino acid residues (e.g., aspartic acid or glutamic acid) such that the interaction becomes electrostatically unfavorable depending on the specific charged amino acids introduced. Methods of introducing charged amino acids in the $C_H3$ domain to disfavor or prevent dimer formation are described in, e.g., Ying et al. (*J Biol Chem.* 287:19399-19408, 2012), U.S. Patent Publication Nos. 2006/0074225, 2012/0244578, and 2014/0024111, all of which are incorporated herein by reference in their entireties.

In some embodiments of the invention, an Fc domain includes one or more of the following amino acid substitutions: T366W, T366Y, T394W, F405W, Y349T, Y349E, Y349V, L351T, L351H, L351N, L352K, P353S, S354D, D356K, D356R, D356S, E357K, E357R, E357Q, S364A, T366E, L368T, L368Y, L368E, K370E, K370D, K370Q, K392E, K392D, T394N, P395N, P396T, V397T, V397Q, L398T, D399K, D399R, D399N, F405T, F405H, F405R, Y407T, Y407H, Y4071, K409E, K409D, K409T, and K409I, relative to the sequence of human IgG1. In some embodiments, the terminal lysine is absent from the Fc domain amino acid sequence. In one particular embodiment, an Fc domain includes the amino acid substitution T366W, relative to the sequence of human IgG1. The sequence of a wild-type Fc domain is shown below in SEQ ID NO: 100:

```
DKTHTCPPCPAPELLGGPSVFLFPPKPKDTLMISRTPEVT
CVVVDVSHEDPEVKFNWYVDGVEVHNAKTKPREEQYNSTY
RVVSVLTVLHQDWLNGKEYKCKVSNKALPAPIEKTISKAK
GQPREPQVYTLPPSRDELTKNQVSLTCLVKGFYPSDIAVE
WESNGQPENNYKTTPPVLDSDGSFFLYSKLTVDKSRWQQG
NVFSCSVMHEALHNHYTQKSLSLSPGK
```

An exemplary sequence for a wild-type Fc domain lacking a terminal lysine is provided below (SEQ ID NO: 264):

```
DKTHTCPPCPAPELLGGPSVFLFPPKPKDTLMISRTPE
VTCVVVDVSHEDPEVKFNWYVDGVEVHNAKTKPREEQY
NSTYRVVSVLTVLHQDWLNGKEYKCKVSNKALPAPIEK
TISKAKGQPREPQVYTLPPSRDELTKNQVSLTCLVKGF
YPSDIAVEWESNGQPENNYKTTPPVLDSDGSFFLYSKL
TVDKSRWQQGNVFSCSVMHEALHNHYTQKSLSLSPG
```

III. Albumin-Binding Peptide

In some embodiments, a polypeptide described herein may include an extracellular ActRII chimera fused to a serum protein-binding peptide. Binding to serum protein-binding peptides can improve the pharmacokinetics of protein pharmaceuticals.

As one example, albumin-binding peptides that can be used in the methods and compositions described herein are generally known in the art. In one embodiment, the albumin binding peptide includes the sequence DICLPRWGCLW (SEQ ID NO: 101).

In the present invention, albumin-binding peptides may be joined to the N- or C-terminus (e.g., C-terminus) of an extracellular ActRII chimera described herein (e.g., an extracellular ActRII chimera having the sequence of any one of SEQ ID NOs: 1-43 (e.g., SEQ ID NOs: 22-43)) to increase the serum half-life of the extracellular ActRII chimera. In some embodiments, an albumin-binding peptide is joined, either directly or through a linker, to the N- or C-terminus of an extracellular ActRII chimera.

In some embodiments, an extracellular ActRII chimera described herein (e.g., an extracellular ActRII chimera having the sequence of any one of SEQ ID NOs: 1-43 (e.g., SEQ ID NOs: 22-43)) may be fused to the N- or C-terminus of albumin-binding peptide (e.g., SEQ ID NO: 101) through conventional genetic or chemical means, e.g., chemical conjugation. If desired, a linker (e.g., a spacer) can be inserted between the extracellular ActRII chimera and the albumin-binding peptide. Without wishing to be bound by theory, it is expected that inclusion of an albumin-binding peptide in an extracellular ActRII chimera described herein may lead to prolonged retention of the therapeutic protein through its binding to serum albumin.

IV. Fibronectin Domain

In some embodiments, a polypeptide described herein may include an extracellular ActRII chimera fused to fibronectin domains. Binding to fibronectin domains can improve the pharmacokinetics of protein pharmaceuticals.

Fibronectin domain is a high molecular weight glycoprotein of the extracellular matrix, or a fragment thereof, that binds to, e.g., membrane-spanning receptor proteins such as integrins and extracellular matrix components such as collagens and fibrins. In some embodiments of the present invention, a fibronectin domain is joined to the N- or C-terminus (e.g., C-terminus) of an extracellular ActRII chimera described herein (e.g., an extracellular ActRII chimera having the sequence of any one of SEQ ID NOs: 1-43 (e.g., SEQ ID NOs: 22-43)) to increase the serum half-life of the extracellular ActRII chimera. A fibronectin domain can be joined, either directly or through a linker, to the N- or C-terminus of an extracellular ActRII chimera.

As one example, fibronectin domains that can be used in the methods and compositions described here are generally known in the art. In one embodiment, the fibronectin domain is a fibronectin type II domain having amino acids 610-702 of the sequence of UniProt ID NO: P02751 (SEQ ID NO: 102, shown below):

```
GPVEVFITETPSQPNSHPIQWNAPQPSHISKYILRWRP
KNSVGRWKEATIPGHLNSYTIKGLKPGVVYEGQLISIQ
QYGHQEVTRFDFTTTST
```

In another embodiment, the fibronectin domain is an adnectin protein.

In some embodiments, an extracellular ActRII chimera described herein (e.g., an extracellular ActRII chimera having the sequence of any one of SEQ ID NOs: 1-43 (e.g., SEQ ID NOs: 22-43)) may be fused to the N- or C-terminus of a fibronectin domain (e.g., SEQ ID NO: 102) through conventional genetic or chemical means, e.g., chemical conjugation. If desired, a linker (e.g., a spacer) can be inserted between the extracellular ActRII chimera and the fibronectin domain. Without wishing to be bound by theory, it is expected that inclusion of a fibronectin domain in an extracellular ActRII chimera described herein may lead to prolonged retention of the therapeutic protein through its binding to integrins and extracellular matrix components such as collagens and fibrins.

V. Serum Albumin

In some embodiments, a polypeptide described herein may include an extracellular ActRII chimera fused to serum albumin. Binding to serum albumins can improve the pharmacokinetics of protein pharmaceuticals.

Serum albumin is a globular protein that is the most abundant blood protein in mammals. Serum albumin is produced in the liver and constitutes about half of the blood serum proteins. It is monomeric and soluble in the blood. Some of the most crucial functions of serum albumin include transporting hormones, fatty acids, and other proteins in the body, buffering pH, and maintaining osmotic pressure needed for proper distribution of bodily fluids between blood vessels and body tissues. In preferred embodiments, serum albumin is human serum albumin. In some embodiments of the present invention, a human serum albumin is joined to the N- or C-terminus (e.g., C-terminus) of an extracellular ActRII chimera described herein (e.g., an extracellular ActRII chimera having the sequence of any one of SEQ ID NOs: 1-43 (e.g., SEQ ID NOs: 22-43)) to increase the serum half-life of the extracellular ActRII chimera. A human serum albumin can be joined, either directly or through a linker, to the N- or C-terminus of an extracellular ActRII chimera.

As one example, serum albumins that can be used in the methods and compositions described herein are generally known in the art. In one embodiment, the serum albumin includes the sequence of UniProt ID NO: P02768 (SEQ ID NO: 103, shown below):

```
MKWVTFISLLFLFSSAYSRGVFRRDAHKSEVAHRFKDL
GEENFKALVLIAFAQYLQQCPFEDHVKLVNEVTEFAKT
CVADESAENCDKSLHTLFGDKLCTVATLRETYGEMADC
CAKQEPERNECFLQHKDDNPNLPRLVRPEVDVMCTAFH
DNEETFLKKYLYEIARRHPYFYAPELLFFAKRYKAAFT
ECCQAADKAACLLPKLDELRDEGKASSAKQRLKCASLQ
KFGERAFKAWAVARLSQRFPKAEFAEVSKLVTDLTKVH
TECCHGDLLECADDRADLAKYICENQDSISSKLKECCE
KPLLEKSHCIAEVENDEMPADLPSLAADFVESKDVCKN
YAEAKDVFLGMFLYEYARRHPDYSVVLLLRLAKTYETT
LEKCCAAADPHECYAKVFDEFKPLVEEPQNLIKQNCEL
FEQLGEYKFQNALLVRYTKKVPQVSTPTLVEVSRNLGK
VGSKCCKHPEAKRMPCAEDYLSVVLNQLCVLHEKTPVS
DRVTKCCTESLVNRRPCFSALEVDETYVPKEFNAETFT
FHADICTLSEKERQIKKQTALVELVKHKPKATKEQLKA
VMDDFAAFVEKCCKADDKETCFAEEGKKLVAASQAALG
L
```

In some embodiments, an extracellular ActRII chimera described herein (e.g., an extracellular ActRII chimera having the sequence of any one of SEQ ID NOs: 1-43 (e.g., SEQ ID NOs: 22-43)) may be fused to the N- or C-terminus of a human serum albumin (e.g., SEQ ID NO: 103) through conventional genetic or chemical means, e.g., chemical conjugation. If desired, a linker (e.g., a spacer) can be inserted between the extracellular ActRII chimera and the human serum albumin. Without wishing to be bound by theory, it is expected that inclusion of a human serum albumin in an extracellular ActRII chimera described herein may lead to prolonged retention of the therapeutic protein.

VI. Linkers

A polypeptide described herein may include an extracellular ActRII chimera (e.g., an extracellular ActRII chimera having a sequence of any one of SEQ ID NOs: 1-43 (e.g., SEQ ID NOs: 22-43)) fused to a moiety by way of a linker. In some embodiments, the moiety increases stability of the polypeptide.

Exemplary moieties include an Fc domain monomer, a wild-type Fc domain, an Fc domain with amino acid substitutions (e.g., one or more substitutions that reduce dimerization), an albumin-binding peptide, a fibronectin domain, or a human serum albumin. In the present invention, a linker between a moiety (e.g., an Fc domain monomer (e.g., the sequence of SEQ ID NO: 48), a wild-type Fc domain (e.g., SEQ ID NO: 100 or SEQ ID NO: 264), an Fc domain with amino acid substitutions (e.g., one or more substitutions that reduce dimerization), an albumin-binding peptide (e.g., SEQ ID NO: 101), a fibronectin domain (e.g., SEQ ID NO: 102), or a human serum albumin (e.g., SEQ ID NO: 103)) and an extracellular ActRII chimera (e.g., an extracellular ActRII chimera having the sequence of any one of SEQ ID NOs: 1-43 (e.g., SEQ ID NOs: 22-43)), can be an amino acid spacer including 1-200 amino acids. Suitable peptide spacers are known in the art, and include, for example, peptide linkers containing flexible amino acid residues such as glycine, alanine, and serine. In some embodiments, a spacer can contain motifs, e.g., multiple or repeating motifs, of GA, GS, GG, GGA, GGS, GGG, GGGA (SEQ ID NO: 49), GGGS (SEQ ID NO: 50), GGGG (SEQ ID NO: 51), GGGGA (SEQ ID NO: 52), GGGGS (SEQ ID NO: 53), GGGGG (SEQ ID NO: 54), GGAG (SEQ ID NO: 55), GGSG (SEQ ID NO: 56), AGGG (SEQ ID NO: 57), or SGGG (SEQ ID NO: 58). In some embodiments, a spacer can contain 2 to 12 amino acids including motifs of GA or GS, e.g., GA, GS, GAGA (SEQ ID NO: 59), GSGS (SEQ ID NO: 60), GAGAGA (SEQ ID NO: 61), GSGSGS (SEQ ID NO: 62), GAGAGAGA (SEQ ID NO: 63), GSGSGSGS (SEQ ID NO: 64), GAGAGAGAGA (SEQ ID NO: 65), GSGSGSGSGS (SEQ ID NO: 66), GAGAGAGAGAGA (SEQ ID NO: 67), and GSGSGSGSGSGS (SEQ ID NO: 68). In some embodiments, a spacer can contain 3 to 12 amino acids including motifs of GGA or GGS, e.g., GGA, GGS, GGAGGA (SEQ ID NO: 69), GGSGGS (SEQ ID NO: 70), GGAGGAGGA (SEQ ID NO: 71), GGSGGSGGS (SEQ ID NO: 72), GGAGGAGGAGGA (SEQ ID NO: 73), and GGSGGSGGSGGS (SEQ ID NO: 74). In yet some embodiments, a spacer can contain 4 to 12 amino acids including motifs of GGAG (SEQ ID NO: 55), GGSG (SEQ ID NO: 56), e.g., GGAG (SEQ ID NO: 55), GGSG (SEQ ID NO: 56), GGAGGGAG (SEQ ID NO: 75), GGSGGGSG (SEQ ID NO: 76), GGAGGGAGGGAG (SEQ ID NO: 77), and GGSGGGSGGGSG (SEQ ID NO: 78). In some embodiments, a spacer can contain motifs of GGGGA (SEQ ID NO: 52) or GGGGS (SEQ ID NO: 53), e.g., GGGGAGGGGAGGGGA (SEQ ID NO: 79) and GGGGSGGGGSGGGGS (SEQ ID NO: 80). In some embodiments of the invention, an amino acid spacer between a moiety (e.g., an Fc domain monomer, a wild-type Fc domain, an Fc domain with amino acid substitutions (e.g., one or more substitutions that reduce dimerization), an albumin-binding peptide, a fibronectin domain, or a human serum albumin) and an extracellular ActRII chimera (e.g., an extracellular ActRII chimera having the sequence of any one of SEQ ID NOs: 1-43 (e.g., SEQ ID NOs: 22-43)) may be GGG, GGGA (SEQ ID NO: 49), GGGG (SEQ ID NO: 51), GGGAG (SEQ ID NO: 81), GGGAGG (SEQ ID NO: 82), or GGGAGGG (SEQ ID NO: 83).

In some embodiments, a spacer can also contain amino acids other than glycine, alanine, and serine, e.g., AAAL (SEQ ID NO: 84), AAAK (SEQ ID NO: 85), AAAR (SEQ ID NO: 86), EGKSSGSGSESKST (SEQ ID NO: 87), GSAGSAAGSGEF (SEQ ID NO: 88), AEAAAKEAAAKA (SEQ ID NO: 89), KESGSVSSEQLAQFRSLD (SEQ ID NO: 90), GENLYFQSGG (SEQ ID NO: 91), SACYCELS (SEQ ID NO: 92), RSIAT (SEQ ID NO: 93), RPACKIPNDLKQKVMNH (SEQ ID NO: 94), GGSAGGSGSGSSGGSSGASGTGTAGGTGSGSGTGSG (SEQ ID NO: 95), AAANSSIDLISVPVDSR (SEQ ID NO: 96), or GGSGGGSEGGGSEGGGSEGGGSEGGGSEGGGSGGGS (SEQ ID NO: 97). In some embodiments, a spacer can contain motifs, e.g., multiple or repeating motifs, of EAAAK (SEQ ID NO: 98). In some embodiments, a spacer can contain motifs, e.g., multiple or repeating motifs, of proline-rich sequences such as $(XP)_n$, in which X may be any amino acid (e.g., A, K, or E) and n is from 1-5 (SEQ ID NO: 269), and PAPAP (SEQ ID NO: 99).

The length of the peptide spacer and the amino acids used can be adjusted depending on the two proteins involved and the degree of flexibility desired in the final protein fusion polypeptide. The length of the spacer can be adjusted to ensure proper protein folding and avoid aggregate formation.

VII. Vectors, Host Cells, and Protein Production

The polypeptides of the invention can be produced from a host cell. A host cell refers to a vehicle that includes the necessary cellular components, e.g., organelles, needed to express the polypeptides and fusion polypeptides described herein from their corresponding nucleic acids. The nucleic acids may be included in nucleic acid vectors that can be introduced into the host cell by conventional techniques known in the art (e.g., transformation, transfection, electroporation, calcium phosphate precipitation, direct microinjection, infection, or the like). The choice of nucleic acid vectors depends in part on the host cells to be used. Generally, preferred host cells are of either eukaryotic (e.g., mammalian) or prokaryotic (e.g., bacterial) origin.

Nucleic Acid Vector Construction and Host Cells

A nucleic acid sequence encoding the amino acid sequence of a polypeptide of the invention may be prepared by a variety of methods known in the art. These methods include, but are not limited to, oligonucleotide-mediated (or site-directed) mutagenesis, PCR mutagenesis, ligation, and overlap extension PCR. A nucleic acid molecule encoding a polypeptide of the invention may be obtained using standard techniques, e.g., gene synthesis. Alternatively, a nucleic acid molecule encoding a wild-type extracellular ActRIIA or ActRIIB may be mutated to include specific amino acid substitutions using standard techniques in the art, e.g., QuikChange™ mutagenesis. Nucleic acid molecules can be synthesized using a nucleotide synthesizer or PCR techniques.

A nucleic acid sequence encoding a polypeptide of the invention may be inserted into a vector capable of replicating and expressing the nucleic acid molecule in prokaryotic or eukaryotic host cells. Many vectors are available in the art and can be used for the purpose of the invention. Each vector may include various components that may be adjusted and optimized for compatibility with the particular host cell. For example, the vector components may include, but are not limited to, an origin of replication, a selection marker gene, a promoter, a ribosome binding site, a signal sequence, the nucleic acid sequence encoding protein of interest, and a transcription termination sequence.

In some embodiments, mammalian cells may be used as host cells for the invention. Examples of mammalian cell types include, but are not limited to, human embryonic kidney (HEK) (e.g., HEK293, HEK 293F), Chinese hamster ovary (CHO), HeLa, COS, PC3, Vero, MC3T3, NS0, Sp2/0, VERY, BHK, MDCK, W138, BT483, Hs578T, HTB2, BT20, T47D, NS0 (a murine myeloma cell line that does not endogenously produce any immunoglobulin chains), CRL7030, and HsS78Bst cells. In some embodiments, *E. coli* cells may also be used as host cells for the invention. Examples of *E. coli* strains include, but are not limited to, *E. coli* 294 (ATCC®31,446), *E. coli* Δ 1776 (ATCC®31,537, *E. coli* BL21 (DE3) (ATCC® BAA-1025), and *E. coli* RV308 (ATCC®31,608). Different host cells have characteristic and specific mechanisms for the posttranslational processing and modification of protein products (e.g., glycosylation). Appropriate cell lines or host systems may be chosen to ensure the correct modification and processing of the polypeptide expressed. The above-described expression vectors may be introduced into appropriate host cells using conventional techniques in the art, e.g., transformation, transfection, electroporation, calcium phosphate precipitation, and direct microinjection. Once the vectors are introduced into host cells for protein production, host cells are cultured in conventional nutrient media modified as appropriate for inducing promoters, selecting transformants, or amplifying the genes encoding the desired sequences. Methods for expression of therapeutic proteins are known in the art, see, for example, Paulina Balbas, Argelia Lorence (eds.) *Recombinant Gene Expression: Reviews and Protocols* (*Methods in Molecular Biology*), Humana Press; 2nd ed. 2004 and Vladimir Voynov and Justin A. Caravella (eds.) *Therapeutic Proteins: Methods and Protocols* (*Methods in Molecular Biology*) Humana Press; 2nd ed. 2012.

Protein Production, Recovery, and Purification

Host cells used to produce the polypeptides of the invention may be grown in media known in the art and suitable for culturing of the selected host cells. Examples of suitable media for mammalian host cells include Minimal Essential Medium (MEM), Dulbecco's Modified Eagle's Medium (DMEM), Expi293™ Expression Medium, DMEM with supplemented fetal bovine serum (FBS), and RPMI-1640. Examples of suitable media for bacterial host cells include Luria broth (LB) plus necessary supplements, such as a selection agent, e.g., ampicillin. Host cells are cultured at suitable temperatures, such as from about 20° C. to about 39° C., e.g., from 25° C. to about 37° C., preferably 37° C., and $CO_2$ levels, such as 5 to 10%. The pH of the medium is generally from about 6.8 to 7.4, e.g., 7.0, depending mainly on the host organism. If an inducible promoter is used in the expression vector of the invention, protein expression is induced under conditions suitable for the activation of the promoter.

In some embodiments, depending on the expression vector and the host cells used, the expressed protein may be secreted from the host cells (e.g., mammalian host cells) into the cell culture media. Protein recovery may involve filtering the cell culture media to remove cell debris. The proteins may be further purified. A polypeptide of the invention may be purified by any method known in the art of protein purification, for example, by chromatography (e.g., ion exchange, affinity, and size-exclusion column chromatography), centrifugation, differential solubility, or by any other standard technique for the purification of proteins. For example, the protein can be isolated and purified by appropriately selecting and combining affinity columns such as Protein A column (e.g., POROS Protein A chromatography) with chromatography columns (e.g., POROS HS-50 cation exchange chromatography), filtration, ultra filtration, salting-out and dialysis procedures.

In other embodiments, host cells may be disrupted, e.g., by osmotic shock, sonication, or lysis, to recover the expressed protein. Once the cells are disrupted, cell debris may be removed by centrifugation or filtration. In some instances, a polypeptide can be conjugated to marker sequences, such as a peptide to facilitate purification. An example of a marker amino acid sequence is a hexa-histidine peptide (His-tag) (SEQ ID NO: 270), which binds to nickel-functionalized agarose affinity column with micromolar affinity. Other peptide tags useful for purification include, but are not limited to, the hemagglutinin "HA" tag, which corresponds to an epitope derived from influenza hemagglutinin protein (Wilson et al., *Cell* 37:767, 1984).

Alternatively, the polypeptides of the invention can be produced by the cells of a subject (e.g., a human), e.g., in the context of gene therapy, by administrating a vector (such as a viral vector (e.g., a retroviral vector, adenoviral vector, poxviral vector (e.g., vaccinia viral vector, such as Modified Vaccinia Ankara (MVA)), adeno-associated viral vector, and alphaviral vector)) containing a nucleic acid molecule encoding the polypeptide of the invention. The vector, once inside a cell of the subject (e.g., by transformation, transfection, electroporation, calcium phosphate precipitation, direct microinjection, infection, etc.) will promote expression of the polypeptide, which is then secreted from the cell. If treatment of a disease or disorder is the desired outcome, no further action may be required. If collection of the protein is desired, blood may be collected from the subject and the protein purified from the blood by methods known in the art.

VIII. Pharmaceutical Compositions and Preparations

The invention features pharmaceutical compositions that include the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In some embodiments, a pharmaceutical composition of the invention includes a polypeptide including an extracellular ActRII chimera (e.g., an extracellular ActRII chimera having the sequence of any one of SEQ ID NOs: 1-43 (e.g., SEQ ID NOs: 22-43)) fused to a moiety (e.g., Fc domain monomer, or a dimer thereof, a wild-type Fc domain, an Fc domain with amino acid substitutions (e.g., one or more substitutions that reduce dimerization), an albumin-binding peptide, a fibronectin domain, or a human serum albumin) as the therapeutic protein. In some embodiments, a pharmaceutical composition of the invention including a polypeptide of the invention may be used in combination with other agents (e.g., therapeutic biologics and/or small molecules) or compositions in a therapy. In addition to a therapeutically effective amount of the polypeptide, the pharmaceutical composition may include one or more pharmaceutically acceptable carriers or excipients, which can be formulated by methods known to those skilled in the art. In some embodiments, a pharmaceutical composition of the invention includes a nucleic acid molecule (DNA or RNA, e.g., mRNA) encoding a polypeptide of the invention, or a vector containing such a nucleic acid molecule.

Acceptable carriers and excipients in the pharmaceutical compositions are nontoxic to recipients at the dosages and concentrations employed. Acceptable carriers and excipients may include buffers such as phosphate, citrate, HEPES, and TAE, antioxidants such as ascorbic acid and methionine, preservatives such as hexamethonium chloride, octadecyldimethylbenzyl ammonium chloride, resorcinol, and benzalkonium chloride, proteins such as human serum albumin, gelatin, dextran, and immunoglobulins, hydrophilic polymers such as polyvinylpyrrolidone, amino acids such as glycine, glutamine, histidine, arginine, and lysine, and carbohydrates such as glucose, mannose, sucrose, and sorbitol. Pharmaceutical compositions of the invention can be administered parenterally in the form of an injectable formulation. Pharmaceutical compositions for injection can be formulated using a sterile solution or any pharmaceutically acceptable liquid as a vehicle. Pharmaceutically acceptable vehicles include, but are not limited to, sterile water, physiological saline, and cell culture media (e.g., Dulbecco's Modified Eagle Medium (DMEM), α-Modified Eagles Medium (α-MEM), F-12 medium). Formulation methods are known in the art, see e.g., Banga (ed.) *Therapeutic Peptides and Proteins: Formulation, Processing and Delivery Systems* (3rd ed.) Taylor & Francis Group, CRC Press (2015).

The pharmaceutical compositions of the invention may be prepared in microcapsules, such as hydroxylmethylcellulose or gelatin-microcapsule and poly-(methylmethacrylate) microcapsule. The pharmaceutical compositions of the invention may also be prepared in other drug delivery systems such as liposomes, albumin microspheres, microemulsions, nanoparticles, and nanocapsules. Such techniques are described in Remington: The Science and Practice of Pharmacy 22nd edition (2012). The pharmaceutical compositions to be used for in vivo administration must be sterile. This is readily accomplished by filtration through sterile filtration membranes.

The pharmaceutical compositions of the invention may also be prepared as a sustained-release formulation. Suitable examples of sustained-release preparations include semipermeable matrices of solid hydrophobic polymers containing the polypeptides of the invention. Examples of sustained release matrices include polyesters, hydrogels, polylactides, copolymers of L-glutamic acid and γ ethyl-L-glutamate, non-degradable ethylene-vinyl acetate, degradable lactic acid-glycolic acid copolymers such as LUPRON DEPOT™, and poly-D-(−)-3-hydroxybutyric acid. Some sustained-release formulations enable release of molecules over a few months, e.g., one to six months, while other formulations release pharmaceutical compositions of the invention for shorter time periods, e.g., days to weeks.

The pharmaceutical composition may be formed in a unit dose form as needed. The amount of active component, e.g., a polypeptide of the invention, included in the pharmaceutical preparations is such that a suitable dose within the designated range is provided (e.g., a dose within the range of 0.01-100 mg/kg of body weight).

The pharmaceutical composition for gene therapy can be in an acceptable diluent, or can include a slow release matrix in which the gene delivery vehicle is imbedded. If hydrodynamic injection is used as the delivery method, the pharmaceutical composition containing a nucleic acid molecule encoding a polypeptide described herein or a vector (e.g., a viral vector) containing the nucleic acid molecule is delivered rapidly in a large fluid volume intravenously. Vectors that may be used as in vivo gene delivery vehicle include, but are not limited to, retroviral vectors, adenoviral vectors, poxviral vectors (e.g., vaccinia viral vectors, such as Modified Vaccinia Ankara), adeno-associated viral vectors, and alphaviral vectors.

IX. Routes, Dosage, and Administration

Pharmaceutical compositions that include the polypeptides of the invention as the therapeutic proteins may be formulated for, e.g., intravenous administration, parenteral administration, subcutaneous administration, intramuscular administration, intra-arterial administration, intrathecal administration, or intraperitoneal administration. The pharmaceutical composition may also be formulated for, or administered via, oral, nasal, spray, aerosol, rectal, or vaginal administration. For injectable formulations, various effective pharmaceutical carriers are known in the art. See, e.g., ASHP Handbook on Injectable Drugs, Toissel, 18th ed. (2014).

In some embodiments, a pharmaceutical composition that includes a nucleic acid molecule encoding a polypeptide of the invention or a vector containing such nucleic acid molecule may be administered by way of gene delivery. Methods of gene delivery are well-known to one of skill in the art. Vectors that may be used for in vivo gene delivery and expression include, but are not limited to, retroviral vectors, adenoviral vectors, poxviral vectors (e.g., vaccinia viral vectors, such as Modified Vaccinia Ankara (MVA)), adeno-associated viral vectors, and alphaviral vectors. In some embodiments, mRNA molecules encoding polypeptides of the invention may be administered directly to a subject.

In some embodiments of the present invention, nucleic acid molecules encoding a polypeptide described herein or vectors containing such nucleic acid molecules may be administered using a hydrodynamic injection platform. In the hydrodynamic injection method, a nucleic acid molecule encoding a polypeptide described herein is put under the control of a strong promoter in an engineered plasmid (e.g., a viral plasmid). The plasmid is often delivered rapidly in a large fluid volume intravenously. Hydrodynamic injection uses controlled hydrodynamic pressure in veins to enhance cell permeability such that the elevated pressure from the rapid injection of the large fluid volume results in fluid and plasmid extravasation from the vein. The expression of the nucleic acid molecule is driven primarily by the liver. In mice, hydrodynamic injection is often performed by injection of the plasmid into the tail vein. In certain embodiments, mRNA molecules encoding a polypeptide described herein may be administered using hydrodynamic injection.

The dosage of the pharmaceutical compositions of the invention depends on factors including the route of administration, the disease to be treated, and physical characteristics, e.g., age, weight, general health, of the subject. A pharmaceutical composition of the invention may include a dosage of a polypeptide of the invention ranging from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg) and, in a more specific embodiment, about 0.1 to about 30 mg/kg and, in a more specific embodiment, about 0.3 to about 30 mg/kg. The dosage may be adapted by the physician in accordance with conventional factors such as the extent of the disease and different parameters of the subject.

The pharmaceutical compositions are administered in a manner compatible with the dosage formulation and in such amount as is therapeutically effective to result in an improvement or remediation of the symptoms. The pharmaceutical compositions are administered in a variety of dosage forms, e.g., intravenous dosage forms, subcutaneous dosage forms, and oral dosage forms (e.g., ingestible solutions, drug release capsules). Generally, therapeutic proteins are dosed at 0.1-100 mg/kg, e.g., 0.5-50 mg/kg. Pharmaceutical compositions that include a polypeptide of the invention may be administered to a subject in need thereof, for example, one or more times (e.g., 1-10 times or more) daily, weekly, biweekly, every four weeks, monthly, bimonthly, quarterly, biannually, annually, or as medically necessary. In some embodiments, pharmaceutical compositions that include a polypeptide of the invention may be administered to a subject in need thereof weekly, biweekly, every four weeks, monthly, bimonthly, or quarterly. Dosages may be provided in either a single or multiple dosage regimens. The timing between administrations may decrease as the medical condition improves or increase as the health of the patient declines.

X. Methods of Treatment

The invention is based on the discovery that combining extracellular portions of ActRIIA and ActRIIB yields ActRII chimeras with improved properties (e.g., improved ligand binding properties) compared to wild-type extracellular ActRIIA and ActRIIB. The ActRII chimeras generated by combining extracellular portions of ActRIIA and ActRIIB may possess beneficial properties of both ActRIIB (e.g., an ability to increase muscle mass and strong binding affinity to activins A and B) and ActRIIA (e.g., reduced binding affinity to BMP9 and/or longer serum half-life as an Fc fusion protein (e.g., compared to ActRIIB-Fc), and/or an ability to increase red blood cell levels). As the ActRII chimeras contain extracellular portions of ActRIIA and ActRIIB, they will be soluble and able to compete with endogenous activin receptors by binding to and sequestering ligands (e.g., activins A and B, myostatin, GDF11) without activating intracellular signaling pathways. Therefore, the extracellular ActRII chimeras described herein can be used to treat diseases or conditions in which elevated activin signaling has been implicated in pathogenesis (e.g., diseases or conditions in which increased expression of activin receptors or activin receptor ligands has been observed). For example, myostatin has been implicated in promoting fibrosis, inhibiting skeletal muscle growth, and regulating bone homeostasis, and elevated myostatin has been observed in subcutaneous and visceral fat of obese mice and plasma of obese and insulin resistant women. In addition, activin A has been reported to be upregulated in bone disease, clinical and experimental pulmonary hypertension, adipose tissue, and subcutaneous and visceral fat of obese mice, and has been found to inhibit osteoblast activity and promote fibrosis. Another activin receptor ligand, GDF11, has been found to be overexpressed in a mouse model of hemolytic anemia and associated with defects in red blood cell production, and both type I and type II activin receptors have been linked to pancreatic function and diabetes. Without wishing to be bound by theory, a therapeutic agent that binds to activin receptor ligands (e.g., GDF11, myostatin, and/or activins) and reduces their binding to or interaction with endogenous activin receptors (e.g., by sequestering the endogenous ligands) may have therapeutic utility for treating or preventing a variety of diseases or conditions, such as muscle disease, bone disease, fibrosis, anemia, thrombocytopenia, neutropenia, metabolic disease (e.g., obesity, Type 1 diabetes, or Type 2 diabetes), or PH (e.g., PAH, venous PH, hypoxic PH, thromboembolic PH, or miscellaneous PH).

The compositions and methods described herein can be used to treat and/or prevent (e.g., prevent the development of or treat a subject diagnosed with) medical conditions, e.g., muscle disease (e.g., skeletal muscle weakness or atrophy), bone disease, low red blood cell levels (e.g., low hemoglobin levels or low red blood cell count, e.g., anemia), fibrosis, thrombocytopenia (e.g., low platelet count), neutropenia (e.g., low neutrophil count), metabolic disease (e.g., obesity, Type 1 diabetes, or Type 2 diabetes), or PH (e.g., PAH, venous PH, hypoxic PH, thromboembolic PH, or miscellaneous PH). In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to increase muscle mass and strength in a subject in need thereof. In some embodiments, the polypeptides described herein may be administered to increase lean mass. The polypeptides described herein may increase muscle mass and/or lean mass compared to measurements obtained prior to treatment. In some embodiments, the subject may have or be at risk of developing a disease or condition that results in muscle weakness or atrophy (e.g., a neuromuscular disease, cachexia, sarcopenia, or treatment-related muscle loss or atrophy). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a disease or condition involving weakness and atrophy of muscles.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to increase bone mineral density, increase bone formation, increase bone strength, reduce the risk or occurrence of bone fracture, or reduce bone resorption in a subject in need thereof. The polypeptides described herein may increase bone mineral density, increase bone formation, or reduce bone resorption compared to measurements obtained prior to treatment. In some embodiments, the subject may have or be at risk of developing a disease that results in bone damage (e.g., osteoporosis or osteopenia). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a disease or condition involving bone damage.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to increase red blood cell levels (e.g., increase hemoglobin levels, increase red blood cell count, increase red blood cell volume, increase red cell mass, increase hematocrit, or increase red blood cell formation or production), increase the maturation and/or differentiation of erythroid progenitors (early or late- (e.g., terminal) stage progenitors, e.g., early-stage erythroid progenitors, such burst-forming unit-erythroid cells (BFU-Es) and/or colony forming unit-erythroid cells (CFU-Es), e.g., increase the maturation and/or differentiation of BFU-Es and/or CFU-Es into proerythroblasts, reticulocytes, or red blood cells, e.g., increase proerythroblast and/or reticulocyte numbers), increase late-stage precursor (erythroid precursor) maturation (e.g., terminal maturation, such as the maturation of reticulocytes into red blood cells, or the maturation of erythroblasts into reticulocytes and/or red blood cells), recruit early-stage progenitors into the erythroid lineage, increase the number of early-stage erythroid precursors and/or progenitors (e.g., expand the early-stage precursor population to provide a continuous supply of precursors to replenish polychromatic erythroblasts and allow for a continuous supply of maturing reticulocytes), promote the progression of erythroid precursors and/or progenitors through erythropoiesis, and/or reduce the accumulation of red blood cell progenitor cells (e.g., by stimulating progenitor cells to progress to maturation) in a subject in need thereof. The polypeptides described herein may increase red blood cell levels, increase the maturation and/or differentiation of erythroid progenitors, increase late-stage erythroid precursor maturation, recruit early-stage progenitors into the erythroid lineage, increase the number of early-stage erythroid precursors, promote the progression of erythroid precursors through erythropoiesis, or reduce the accumulation of red blood cell progenitor cells compared to measurements obtained prior to treatment. In some embodiments, the subject may have a disease or condition associated with low red blood cell levels (e.g., anemia or blood loss). In some embodiments, the subject may have or be at risk of developing anemia or blood loss (e.g., the subject may have or be at risk of developing anemia due to other diseases or conditions, such as a myelodysplastic syndrome, myelofibrosis, chronic kidney disease, rheumatoid arthritis, ineffective hematopoiesis, cancer, or an inflammatory disease (e.g., Crohn's disease, SLE, or ulcerative colitis), or due to medical treatments, such as chemotherapy, radiation therapy, or surgery). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a disease or condition involving low red blood cell levels.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to increase platelet levels (e.g., increase platelet count), promote megakaryocyte differentiation and/or maturation (e.g., to produce platelets), reduce platelet progenitor accumulation, improve blood clotting, reduce bleeding events, reduce bleeding in the skin (e.g., petechiae or bruising), and/or promote or increase platelet formation or production in a subject in need thereof. The polypeptides described herein may increase platelet levels, promote megakaryocyte differentiation and/or maturation, reduce platelet progenitor accumulation (e.g., by stimulating progenitor cells to progress to maturation), improve blood clotting, reduce bleeding events, reducing bleeding in the skin, and/or promote or increase platelet formation or production compared to measurements obtained prior to treatment. In some embodiments, the subject may have a disease or condition associated with low platelet levels (e.g., thrombocytopenia). In some embodiments, a megakaryocyte can be contacted in vitro with a polypeptide described herein, a nucleic acid encoding the polypeptide, or a vector containing the nucleic acid to generate platelets for the treatment of thrombocytopenia. In some embodiments, the subject may have or be at risk of developing thrombocytopenia (e.g., the subject may have or be at risk of developing thrombocytopenia due to other diseases or conditions, such as a myelodysplastic syndrome, myelofibrosis, myelofibrosis treatment (e.g., treatment with a JAK inhibitor, such as with ruxolitinib or fedratinib), ineffective hematopoiesis, Gaucher disease, aplastic anemia, Fanconi anemia, Diamond Blackfan anemia, Shwachman Diamond syndrome, heavy alcohol consumption, cirrhosis of the liver, cancer (e.g., leukemia or lymphoma), immune thrombocytopenia, an autoimmune disease (e.g., rheumatoid arthritis or lupus (e.g., SLE)), a viral infection (e.g., hepatitis C, HIV, chickenpox, mumps, rubella, parvovirus, or Epstein-Barr virus), a bacterial infection (e.g., bacteremia), a vitamin deficiency (e.g., vitamin B-12 deficiency, folate deficiency, or iron deficiency), cancer treatment (e.g., chemotherapy or radiation therapy), an enlarged spleen, thrombotic thrombocytopenic purpura, idiopathic thrombocytopenic purpura, disseminated intravascular coagulation, hemolytic uremic syndrome, paroxysmal nocturnal hemoglobinuria, acquired amegakaryocytic thrombocytopenia, Pearson syndrome, dyskeratosis congenita, a genetic condition (e.g., Wiskott-Aldrich or May-Hegglin syndrome), dilution of platelets caused by blood transfusion, or a reduction of platelets caused by medication (e.g., heparin, quinine, a sulfa-containing antibiotic, such as vancomycin, rifampin, or trimethoprim, or an anticonvulsant, such as phenytoin)). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a disease or condition involving low platelet levels.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to increase neutrophil levels (e.g., increase neutrophil count), increase or promote the differentiation and/or maturation of progenitor cells (e.g., myeloid progenitors, myeloblasts, or myelocytes) into neutrophils, and/or promote or increase neutrophil formation or production in a subject in need thereof. The polypeptides described herein may increase neutrophil levels, increase or promote the differentiation and/or maturation of progenitor cells into neutrophils, and/or promote or increase neutrophil formation or production compared to measurements obtained prior to treatment. In some embodiments, the subject may have a disease or condition associated with low neutrophil levels (e.g., neutropenia). In some embodiments, the subject may have or be at risk of developing neutropenia (e.g., the subject may have or be at risk of developing neutropenia due to other diseases or conditions, such as a myelodysplastic syndrome, myelofibrosis, ineffective hematopoiesis, aplastic anemia, Fanconi anemia, Diamond Blackfan anemia, Shwachman Diamond syndrome, paroxysmal nocturnal hemoglobinuria, Pearson syndrome, dyskeratosis congenita, cancer (e.g., leukemia), a vitamin deficiency (e.g., B-12 deficiency or folate deficiency), an enlarged spleen, an autoimmune disease (e.g., granulomatosis with polyangiitis, lupus (e.g., SLE), Evans syndrome, Felty syndrome, Crohn's disease, or rheumatoid arthritis), a viral infection (e.g., chickenpox, Epstein-Barr, Hepatitis A, Hepatitis B, Hepatitis C, HIV/AIDS, cytomegalovirus, Dengue fever, or measles), a bacterial infection (e.g., tuberculosis, salmonella infection, or sepsis), cancer treatment (e.g., chemotherapy or radiation therapy), or treatment with other medications (e.g., medication used to treat overactive thyroid, such as methimazole and propylthiouracil; an antibiotic, such as vancomycin, penicillin G, trimethoprim, and oxacillin; an antiviral drugs, such as ganciclovir and valganciclovir; an anti-inflammatory medication for ulcerative colitis or rheumatoid arthritis, such as sulfasalazine; a drug used to treat irregular heart rhythms, such as quinidine and procainamide; an anticonvulsant, such as phenytoin and valproate; an antipsychotic, such as clozapine; or levamisole). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a disease or condition involving low neutrophil levels.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to prevent or reduce fibrosis in a subject in need thereof. In some embodiments, the polypeptides described herein may be administered to slow or stop the progression of fibrosis, to reduce the risk of developing fibrosis, or to reduce (e.g., reduce the frequency or severity of) one or more symptom of fibrosis. The polypeptides described herein may reduce fibrosis or slow the progression of fibrosis by at least compared to the progression of fibrosis prior to treatment or compared to the progression of fibrosis in untreated subjects. In some embodiments, the subject may have or be at risk of developing fibrosis (e.g., the subject may have a disease or condition associated with fibrosis, such as a wound, hepatitis B or C, fatty liver disease, kidney disease (e.g., chronic kidney disease), heart disease, or atherosclerosis, or may be undergoing treatment associated with the development of fibrosis, such as chemotherapy, radiation, or surgery). In some embodiments, the polypeptides described herein prevent or delay the development of fibrosis in a subject at risk of developing fibrosis (e.g., a subject being treated with chemotherapy, radiation, or surgery, or a subject having a disease or condition associated with fibrosis, such as a wound, hepatitis B or C, fatty liver disease, kidney disease (e.g., chronic kidney disease), heart disease, or atherosclerosis). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing fibrosis or a disease or condition associated with fibrosis.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to treat PH, reduce PH (e.g., reduce the severity or frequency of one or more symptoms of PH, such as shortness of breath (dyspnea), fatigue, swelling (e.g., edema) of the legs, feet, belly (ascites), or neck, chest pain or pressure, racing pulse or heart palpitations, bluish color to lips or skin (cyanosis), dizziness, or fainting), prevent (e.g., prevent the development of) PH, reduce the risk of developing PH, or slow or stop the progression of PH in a subject in need thereof. The polypeptides described herein may reduce the symptoms of PH or slow the progression of PH compared to the symptoms or progression observed prior to treatment or compared to symptoms or progression of PH in untreated subjects. In some embodiments, the subject may have or be at risk of developing PH (e.g., the subject may have idiopathic PAH; the subject may have a disease or condition associated with PAH (e.g., a disease or condition that leads to increased risk of developing PAH), such as HIV infection, schistosomiasis, portal hypertension, pulmonary veno-occlusive disease, pulmonary capillary hemangiomatosis, cirrhosis of the liver, a congenital heart abnormality, a connective tissue/autoimmune disorder (e.g., scleroderma or lupus), or drug use or abuse (e.g., methamphetamine or cocaine use); the subject may have a family history of PH (e.g., heritable PAH); the subject may have a disease or condition associated with venous PH (e.g., a disease or condition that leads to increased risk of developing venous PH), such as left ventricular systolic dysfunction, left ventricular diastolic dysfunction, valvular heart disease, congenital cardiomyopathy, or congenital/acquired pulmonary venous stenosis; the subject may have a disease or condition associated with hypoxic PH (e.g., a disease or condition that leads to increased risk of developing hypoxic PH), such as chronic obstructive pulmonary disease (e.g., emphysema), interstitial lung disease, sleep-disordered breathing (e.g., sleep apnea), lung disease (e.g., pulmonary fibrosis), an alveolar hypoventilation disorder, chronic exposure to high altitude, or a developmental abnormality; the subject may have a disease or condition associated with thromboembolic PH (e.g., a disease or condition that leads to increased risk of developing thromboembolic PH), such as chronic thromboembolic pulmonary hypertension, or a pulmonary artery obstruction (e.g., a pulmonary embolism, angiosarcoma, arteritis, congenital pulmonary artery stenosis, or parasitic infection); or the subject may have a disease or condition associated with miscellaneous PH (e.g., a disease or condition that leads to increased risk of developing miscellaneous PH), such as a hematologic disease (e.g., chronic hemolytic anemia, sickle cell disease), a systemic disease (e.g., sarcoidosis, pulmonary Langerhans cell histiocytosis, lymphangioleiomyomatosis, neurofibromatosis, or vasculitis), a metabolic disorder (e.g., glycogen storage disease, Gaucher disease, or a thyroid disease), pulmonary tumoral thrombotic microangiopathy, fibrosing mediastinitis, chronic kidney failure, or segmental pulmonary hypertension (pulmonary hypertension restricted to one or more lobes of the lungs)). In some embodiments, the polypeptides described herein prevent or delay the development of PH in a subject at risk of developing PH (e.g., a subject with a family history of PH (e.g., heritable PAH), or a subject having a disease or condition that leads to increased risk of developing PAH, venous PH, hypoxic PH, thromboembolic PH, or miscellaneous PH. In some embodiments, the methods described herein are directed to affecting myostatin, activin A, activin B, and/or BMP9 signaling (e.g., reducing or inhibiting the binding of activin A, activin B, myostatin, and/or BMP9 to their receptors) in a subject having or at risk of developing PH or a disease or condition associated with PH. In some embodiments, the PH is PAH, venous PH, hypoxic PH, thromboembolic PH, or miscellaneous PH.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to reduce body fat (e.g., amount of body fat or body fat percentage), reduce body weight or body weight gain, reduce fasting insulin levels, increase glucose clearance, reduce LDL, reduce triglycerides, improve serum lipid profile, or increase insulin sensitivity (e.g., reduce in insulin resistance) in a subject in need thereof. The polypeptides described herein may reduce body fat (e.g., amount of body fat or body fat percentage), reduce body weight or body weight gain, reduce fasting insulin levels, increase glucose clearance, reduce LDL, reduce triglycerides, improve serum lipid profile, or increase insulin sensitivity (e.g., reduce in insulin resistance) compared to measurements obtained prior to treatment. In some embodiments, the subject may have a disease or condition associated with obesity or diabetes (e.g., Type 1 or Type 2 diabetes). In some embodiments, the subject may have or be at risk of developing a metabolic disease (e.g., obesity, Type 1 diabetes, or Type 2 diabetes, e.g., the subject may be overweight, have a family history of obesity, have other medical conditions or risk factors linked to increased risk of developing obesity or diabetes (e.g., advanced age, or treatment with a glucocorticoid, selective serotonin reuptake inhibitor (SSRI), tricyclic antidepressant, mood stabilizer, antipsychotic, serotonin-norepinephrine reuptake inhibitor (SNRI)), have a family history of diabetes, or have prediabetes). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors) in a subject having or at risk of developing a metabolic disease (e.g., obesity, Type 1 diabetes, or Type 2 diabetes).

In some embodiments, a polypeptide including an extracellular ActRII chimera described herein reduces or inhibits the binding of myostatin, activin A, activin B, and/or BMP9 to their endogenous receptors, e.g., ActRIIA, ActRIIB, and/or BMPRII. The polypeptides described herein may reduce the binding of myostatin, activin A, activin B, and/or BMP9 to their endogenous receptors compared to the binding of myostatin, activin A, activin B, and/or BMP9 to their endogenous receptors in the absence of the polypeptides of the invention. In some embodiments, affecting myostatin, activin A, activin B, and/or BMP9 signaling (e.g., reducing or inhibiting the binding of myostatin, activin A, activin B, and/or BMP9 to their endogenous receptors, e.g., ActRIIA, ActRIIB, and/or BMPRII) results in an increase in the subject's muscle mass, an increase in the subject's lean mass, an increase in the subject's bone mineral density or bone formation, a decrease in the subject's bone resorption, an increase in the subject's red blood cell levels (e.g., hemoglobin levels, hematocrit, red blood cell count, red blood cell volume, or red cell mass, e.g., promotes or increases red blood cell formation or production), an increase the maturation and/or differentiation of erythroid progenitors, an increase in late-stage erythroid precursor maturation, recruitment of early-stage progenitors into the erythroid lineage, a reduction the accumulation of red blood cell progenitor cells, an increase the number of early-stage erythroid precursors and/or progenitors, progression of erythroid precursors and/or progenitors through erythropoiesis, an increase in the subject's platelet levels (e.g., an increase in platelet count, megakaryocyte differentiation and/or maturation, and/or platelet formation or production), a reduction in the accumulation of platelet progenitor cells, an improvement in blood clotting, a reduction in bleeding events, reduced bleeding in the skin, an increase in the subject's neutrophil levels (e.g., an increase in neutrophil count, e.g., an increase in neutrophil production or formation), an increase in the differentiation and/or maturation of progenitor cells into neutrophils, a reduction in the subject's fibrosis or risk of developing fibrosis, a delay in the development of fibrosis, a reduction (e.g., slowing or inhibiting) in the progression of fibrosis, a reduction body fat (e.g., amount of body fat or body fat percentage), a reduction in body weight or body weight gain, a reduction in fasting insulin levels, an increase in glucose clearance, an improvement in serum lipid profile, an increase in insulin sensitivity (e.g., a reduction in insulin resistance), a reduction in the symptoms of PH, a reduction in the risk of developing PH, a delay in the development of PH, and/or a reduction (e.g., slowing or inhibiting) in the progression of PH. The PH can be PAH, venous PH, hypoxic PH, thromboembolic PH, or miscellaneous PH.

In some embodiments, the polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43), e.g., an effective amount of an ActRII chimera) may be administered to a subject to increase muscle mass or strength, to increase lean mass, to increase bone mineral density, to increase bone formation, to increase bone strength, to reduce the risk or occurrence of bone fracture, to decrease bone resorption, to increase red blood cell levels, to increase the maturation and/or differentiation of erythroid progenitors, to increase late-stage erythroid precursor maturation, to recruit early-stage progenitors into the erythroid lineage, to reduce the accumulation of red blood cell progenitor cells, to increase the number of early-stage erythroid precursors and/or progenitors, to promote progression of erythroid precursors and/or progenitors through erythropoiesis, to increase the subject's platelet levels, to increase megakaryocyte differentiation and/or maturation, to increase platelet formation or production, to reduce the accumulation of platelet progenitor cells, to improve blood clotting, to reduce bleeding events, to reduce bleeding in the skin, to increase the subject's neutrophil levels, to increase neutrophil production or formation, to increase or promote the differentiation and/or maturation of progenitor cells into neutrophils, to prevent or reduce fibrosis (e.g., to reduce fibrosis, to prevent or delay the development of fibrosis, or to slow or stop the progression of fibrosis), to treat metabolic disease, to reduce body fat (e.g., amount of body fat or body fat percentage), to reduce body weight or body weight gain, to reduce fasting insulin levels, to increase glucose clearance, to improve serum lipid profile, to prevent or treat PH (e.g., to reduce symptoms of PH, to prevent or delay the development of PH, or to slow or stop the progression of PH), or to affect myostatin, activin A, activin B, and/or BMP9 signaling in the subject. The extracellular ActRII chimeras (e.g., an extracellular ActRII chimera having the sequence of any one of SEQ ID NOs: 1-43 (e.g., SEQ ID NOs: 22-43), e.g., an effective amount of an ActRII chimera) may increase muscle mass or strength, increase lean mass, increase bone mineral density, increase bone formation, increase bone strength, reduce the risk or occurrence of bone fracture, decrease bone resorption, increase red blood cell levels, increase the maturation and/or differentiation of erythroid progenitors, increase late-stage erythroid precursor maturation (e.g., terminal maturation, such as the maturation of reticulocytes into red blood cells, or the maturation of erythroblasts into reticulocytes and/or red blood cells), recruit early-stage progenitors into the erythroid lineage, reduce the accumulation of red blood cell progenitor cells, increase the number of early-stage erythroid precursors and/or progenitors, promote progression of erythroid precursors and/or progenitors through erythropoiesis, increase the subject's platelet levels, increase megakaryocyte differentiation and/or maturation, increase platelet formation or production, reduce the accumulation of platelet progenitor cells, improve blood clotting, reduce bleeding events, reduce bleeding in the skin, increase the subject's neutrophil levels, increase or promote the differentiation and/or maturation of progenitor cells into neutrophils, increase neutrophil production or formation, prevent or reduce fibrosis, treat metabolic disease, reduce body fat (e.g., amount of body fat or body fat percentage), reduce body weight or body weight gain, reduce fasting insulin levels, increase glucose clearance, improve serum lipid profile, prevent or treat PH, or affect myostatin, activin A, activin B, and/or BMP9 signaling compared to measurements obtained prior to treatment or compared to measurements obtained from untreated subjects having the same disease or condition. In some embodiments, the methods described herein do not cause any vascular complications in the subject, such as increased vascular permeability or leakage.

The invention also includes methods of treating a subject having or at risk of developing a disease or condition involving weakness or atrophy of muscles by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, a subject having or at risk of developing a disease or condition involving weakness or atrophy of muscles has or is at risk of developing a disease or condition including a neuromuscular disease (e.g., a muscular dystrophy, IBM, SMA, CMT, ALS, myasthenia gravis, or multiple sclerosis), sarcopenia, cachexia (e.g., cancer cachexia, HIV-related cachexia, cardiac cachexia (e.g., cachexia associated with heart failure), cachexia associated with chronic kidney disease, or pulmonary cachexia (e.g., cachexia associated with COPD)), disuse atrophy; treatment related muscle loss or atrophy (e.g., glucocorticoid treatment, FGF-21 treatment, GLP-1 treatment, bariatric surgery, cancer therapy, or treatment for obesity or Type 2 diabetes), hypotonia, hypoxia, or muscle loss or atrophy associated with a burn injury. Muscular dystrophies include Duchenne muscular dystrophy (DMD), facioscapulohumeral muscular dystrophy (FSHD), Becker muscular dystrophy (BMD), myotonic dystrophy (DM), congenital muscular dystrophy, limb-girdle muscular dystrophy (LGMD), distal muscular dystrophy (DD), oculopharyngeal muscular dystrophy (OPMD), and Emery-Dreifuss muscular dystrophy (EDMD). There are thirty three types of congenital muscular dystrophies, which include congenital muscular dystrophy type 1A (MDC1A, associated with mutations in laminin alpha 2), congenital muscular dystrophy type 1C (MDC1C, associated with mutations in FKRP), congenital muscular dystrophy type 1 D (MDC1D, associated with mutations in LARGE), congenital muscular dystrophy type 1 B (MDC1B), Fukuyama congenital muscular dystrophy (FCMD, associated with mutations in fukutin), muscle-eye-brain disease (MEB, which may be associated with mutations in POMGnT1), Walker-Warburg Syndrome (WWS, associated with mutations in B3GNT1 (MDDGA type), POMT1 (MDDGA1 type), POMT2 (MDDGA2 type), ISPD (MDDGA7 type), GTDC2 (MDDGA8 type), TMEM5 (MDDGA10 type), B3GALNT2 (MDDGA11 type), or SGK196 (MDDGA12 type)), rigid spine muscular dystrophy (RSMD1, associated with a mutation in SEPN1), Ullrich congenital muscular dystrophy (UCMD, associated in mutations in COLGA1, COL6A2, or COL6A3), and muscular dystrophies associated with mutations in integrin alpha 7, integrin alpha 9, DOK7, laminin A/C, SBP2, or choline kinase beta. In some embodiments, the methods described herein increase muscle mass, e.g., increase muscle mass, lean mass, and/or muscle strength, e.g., increase muscle mass, lean mass, and/or muscle strength compared to measurements obtained prior to treatment or compared to measurements typically observed in untreated subjects having the same disease or condition. In some embodiments, the muscle is skeletal muscle. In some embodiments, the subject is identified as having a disease or condition that results in muscle weakness or atrophy prior to treatment with an ActRII chimera described herein. In some embodiments, the method includes a step of identifying the subject as having a disease or condition that results in muscle weakness or atrophy (e.g., by evaluating lean mass, muscle mass, or strength or by genetic testing for congenital muscular dystrophy) prior to treatment with an ActRII chimera described herein. The method can further include evaluating lean mass, muscle mass, or strength after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing bone disease by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, a subject having or at risk of developing bone disease (e.g., bone damage) has or is at risk of developing a disease or condition including primary osteoporosis, secondary osteoporosis, osteopenia, osteopetrosis, osteogenesis imperfecta, bone fracture, bone cancer or cancer metastasis-related bone loss, Paget's disease, renal osteodystrophy, treatment-related bone loss, neuromuscular disease-related bone loss, burn-induced bone loss, anorexia-related bone loss, diet-related bone loss, bone loss associated with the treatment of obesity, low gravity-related bone loss, or immobility-related bone loss. In some embodiments, the primary osteoporosis is age-related or hormone-related osteoporosis (e.g., related to a decline in estrogen). In some embodiments, the secondary osteoporosis is immobilization-induced or glucocorticoid-induced osteoporosis. In some embodiments, the bone cancer is multiple myeloma or the cancer metastasis-related bone loss is caused by multiple myeloma. In some embodiments, the treatment-related bone loss occurs due to treatment with FGF-21 or GLP-1, due to treatment with an FGF-21 or GLP-1 containing therapeutic, due to treatment of Type 2 diabetes and/or obesity, due to bariatric surgery, due to androgen or estrogen deprivation therapy, or due to cancer therapy (e.g., chemotherapy or radiation). In some embodiments, the diet-related bone loss is rickets (e.g., vitamin D deficiency). In some embodiments, the low-gravity related bone loss is lack of load-related bone loss. In some embodiments, the methods described herein increase bone mineral density (e.g., increase bone mass), reduce bone resorption (e.g., reduce bone catabolic activity), increase bone formation (e.g., increase bone anabolic activity or increase osteogenesis), increase osteoblast activity or osteoblastogenesis, and/or decrease osteoclast activity or osteoclastogenesis, e.g., increase bone mineral density, reduce bone resorption, increase bone formation, increase osteoblast activity or osteoblastogenesis, and/or decrease osteoclast activity or osteoclastogenesis compared to measurements obtained prior to treatment or compared to measurements typically observed in untreated subjects having the same disease or condition. In some embodiments, the bone is cortical or trabecular bone. In some embodiments, the subject is identified as having a bone disease prior to treatment with an ActRII chimera described herein. In some embodiments, the method includes a step of identifying the subject as having a bone disease prior to treatment with an ActRII chimera described herein. The method can further include evaluating bone mineral density, bone formation, or bone resorption after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing anemia or blood loss by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, a subject having or at risk of developing low red blood cell levels (e.g., low hemoglobin levels, low hematocrit, or low red blood cell counts) has or is at risk of developing anemia or blood loss. In some embodiments, the anemia is associated with a nutritional deficit (e.g., a vitamin deficiency, such as vitamin B-12 deficiency, folate deficiency), a bone marrow defect (e.g., paroxysmal nocturnal hemoglobinuria), adverse reaction to medication (e.g., antiretroviral HIV drugs), a myelodysplastic syndrome, bone marrow transplantation, myelofibrosis, ineffective hematopoiesis, cancer (e.g., a solid tumor, such as breast cancer, lung cancer, colon cancer; a tumor of the lymphatic system, such as chronic lymphocytic leukemia, non-Hodgkin's lymphoma, Hodgkin's lymphoma; or a tumor of the hematopoietic system, such as leukemia or multiple myeloma), cancer treatment (e.g., radiation or chemotherapy, e.g., chemotherapy with platinum-containing agents), myelofibrosis treatment (e.g., treatment with a JAK inhibitor, such as ruxolitinib or fedratinib), an inflammatory or autoimmune disease (e.g., rheumatoid arthritis, other inflammatory arthritides, systemic lupus erythematosus (SLE), an acute or chronic skin disease (e.g. psoriasis), or inflammatory bowel disease (e.g., Crohn's disease or ulcerative colitis), cystitis, gastritis), acute or chronic renal disease or failure (e.g., chronic kidney disease) including idiopathic or congenital conditions, diabetes, acute or chronic liver disease, acute or chronic bleeding, infection (e.g., malaria, osteomyelitis), splenomegaly, *porphyria*, vasculitis, hemolysis, urinary tract infection, hemoglobinopathy (e.g., sickle cell disease), thalassemia (e.g., α- or β-thalassemia), Churg-Strauss syndrome, Felty syndrome, Pearson syndrome, dyskeratosis congenita, graft versus host disease, hematopoietic stem cell transplantation, osteomyelofibrosis, pancytopenia, pure red-cell aplasia, purpura Schoenlein-Henoch, Shwachman syndrome (e.g., Shwachman-Diamond syndrome), drug use or abuse (e.g., alcohol abuse), or contraindication to transfusion (e.g., patients of advanced age, patients with allo- or auto-antibodies, pediatric patients, patients with cardiopulmonary disease, patients who object to transfusion for religious reasons (e.g., some Jehovah's Witnesses)). The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be an RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations, such a subject may have increased erythroid progenitor cells in the bone marrow relative to a healthy subject). In some embodiments, the MDS is associated with a defect in early-stage hematopoiesis (e.g., early-stage erythroid cell development, such as commitment or early differentiation, such a subject may have fewer erythroid progenitor cells in the bone marrow compared to a healthy subject or to a subject with a defect in terminal maturation). In some embodiments, the MDS is associated with elevated endogenous erythropoietin levels. In some embodiments, the myelodysplastic syndrome is associated with hypocellular bone marrow (e.g., a subject with MDS has hypocellular bone marrow). The subject may have a low transfusion burden or a high transfusion burden. In some embodiments, the subject has a low transfusion burden and received 1-3 RBC units in the eight weeks prior to treatment with an ActRII chimera described herein. In some embodiments, the subject has a low transfusion burden and did not receive a transfusion (received 0 RBC units) in the eight weeks prior to treatment with an ActRII chimera described herein. In some embodiments, the anemia is aplastic anemia, iron deficiency anemia, vitamin deficiency anemia, anemia of chronic disease (also called anemia of inflammation), anemia associated with bone marrow disease, hemolytic anemia, sickle cell anemia, microcytic anemia, hypochromic anemia, sideroblastic anemia, congenital dyserythropoietic anemia, Diamond Blackfan anemia, Fanconi anemia, or refractory anemia with excess of blasts. The sideroblastic anemia can be acquired sideroblastic anemia or congenital sideroblastic anemia. In some embodiments, the congenital sideroblastic anemia is associated with a mutation in ALAS2, SLC25A38, FECH, GLRX5, HSPA9, HSCB, SLC25A38, or ABCB7. In some embodiments, the congenital sideroblastic anemia is associated with a mutation in PUS1, YARS2, LARS2, TRNT1, MT-ATP6, NDUFB11, or SLC19A2, or with an mtDNA mutation. The compositions and methods described herein can also be used to treat subjects that do not respond well to erythropoietin (EPO) or that are susceptible to adverse effects of EPO (e.g., hypertension, headaches, vascular thrombosis, influenza-like syndrome, obstruction of shunts, and myocardial infarction) or to treat subjects that do not respond to an erythroid maturation agent. In some embodiments, the subject has previously been treated with an ESA. In some embodiments, the subject has not previously been treated with an ESA. In some embodiments, the blood loss is due to surgery, trauma, a wound, an ulcer, urinary tract bleeding, digestive tract bleeding, frequent blood donation, or heavy menstrual bleeding (e.g., menorrhagia). In some embodiments, the methods described herein increase red blood cell levels (e.g., hemoglobin levels, hematocrit, red blood cell counts, red blood cell volume, and/or red cell mass), increase or induce red blood cell formation or production, increase the maturation and/or differentiation of erythroid progenitors (e.g., early-stage erythroid progenitors, such as BFU-Es and/or CFU-Es, e.g., increase the maturation and/or differentiation of BFU-Es and/or CFU-Es into proerythroblasts, reticulocytes, or red blood cells, e.g., increase proerythroblast and/or reticulocyte numbers), increase late-stage erythroid precursor maturation, recruit early-stage progenitors into the erythroid lineage, increase the number of early-stage erythroid precursors and/or progenitors, promote the progression of erythroid precursors and/or progenitors through erythropoiesis, and/or reduce the accumulation of red blood cell progenitor cells compared to measurements obtained prior to treatment or compared to measurements typically observed in untreated subjects having the same disease or condition. In some embodiments, the compositions and methods described herein reduce the need of a subject for a blood transfusion (e.g., reduce transfusion burden, for example, the subject no longer needs blood transfusions, or the subject needs less frequent blood transfusion than before treatment with the compositions and methods described herein). Subjects with normal red blood cell levels can also be treated using the methods and compositions described herein to increase red blood cell levels so that blood can be drawn and stored for later use in transfusions. In some embodiments, the compositions and methods described herein slow or inhibit the progression of lower-risk MDS to higher-risk MDS and/or acute myeloid leukemia (AML). For example, treatment of anemia in a subject having a very low, low, or intermediate risk MDS and a low transfusion burden may lead to a hemoglobin increase of greater than or equal to 1.5 g/dL from baseline or pretreatment measurements (e.g., for at least one day, two days, three days, four days, five days, six days, one week, two weeks, three weeks, one month, two months, or longer during treatment). In another example, treatment of anemia in a subject having a very low, low, or intermediate risk MDS and a high transfusion burden may lead to a reduction of 50% or 4 RBC units transfused compared to pretreatment (e.g., comparing an eight-week period during treatment to an eight-week period prior to treatment). In some embodiments, the subject is identified as having anemia (e.g., anemia associated with a myelodysplastic syndrome or myelofibrosis) prior to treatment with an ActRII chimera described herein. In some embodiments, the method includes a step of identifying the subject as having anemia (e.g., by evaluating red blood cell, hemoglobin, or hematocrit levels) prior to treatment with an ActRII chimera described herein. The method can further include evaluating red blood cell, hemoglobin, or hematocrit levels after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing thrombocytopenia by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, a subject having or at risk of developing low platelet levels (e.g., low platelet counts) has or is at risk of developing thrombocytopenia. In some embodiments, the thrombocytopenia is associated with a bone marrow defect, a myelodysplastic syndrome, bone marrow transplantation, myelofibrosis, myelofibrosis treatment (e.g., treatment with a JAK inhibitor, such as with ruxolitinib or fedratinib), ineffective hematopoiesis, Gaucher disease, aplastic anemia, Fanconi anemia, Diamond Blackfan anemia, Shwachman Diamond syndrome, heavy alcohol consumption, cirrhosis of the liver, cancer (e.g., leukemia or lymphoma), an autoimmune disease (e.g., rheumatoid arthritis, lupus (e.g., SLE), antiphospholipid syndrome (APS), Evans syndrome, or immune thyroid disease), a viral infection (e.g., hepatitis C, HIV, chickenpox, mumps, rubella, parvovirus, or Epstein-Barr virus), a bacterial infection (e.g., bacteremia), an enlarged spleen, a vitamin deficiency (e.g., vitamin B-12 deficiency, folate deficiency, or iron deficiency), cancer treatment (e.g., chemotherapy or radiation therapy), thrombotic thrombocytopenic purpura, idiopathic thrombocytopenic purpura, disseminated intravascular coagulation, hemolytic uremic syndrome, paroxysmal nocturnal hemoglobinuria, or a reduction of platelets caused by medication (medication-induced thrombocytopenia, e.g., thrombocytopenia caused by treatment with heparin, quinine, a sulfa-containing antibiotic, such as vancomycin, rifampin, or trimethoprim, or an anticonvulsant, such as phenytoin)), dilution of platelets caused by blood transfusion, hematopoietic stem cell transplantation, acquired amegakaryocytic thrombocytopenia, Pearson syndrome, dyskeratosis congenita, or contraindication to transfusion (e.g., patients of advanced age, patients with allo- or auto-antibodies, pediatric patients, patients with cardiopulmonary disease, patients who object to transfusion for religious reasons (e.g., some Jehovah's Witnesses)). The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be an RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations). In some embodiments, the MDS is associated with a defect in early-stage hematopoiesis (e.g., commitment or early differentiation). In some embodiments, the MDS is associated with elevated endogenous erythropoietin levels. In some embodiments, the myelodysplastic syndrome is associated with hypocellular bone marrow (e.g., the subject with MDS has hypocellular bone marrow). The subject may have a low transfusion burden or a high transfusion burden. In some embodiments, the subject has a low transfusion burden and received 1-3 RBC units in the eight weeks prior to treatment with an ActRII chimera described herein. In some embodiments, the subject has a low transfusion burden and did not receive a transfusion (received 0 RBC units) in the eight weeks prior to treatment with an ActRII chimera described herein. In some embodiments, the subject does not respond well to erythropoietin (EPO) or is susceptible to adverse effects of EPO (e.g., hypertension, headaches, vascular thrombosis, influenza-like syndrome, obstruction of shunts, and myocardial infarction). The compositions and methods described herein can also be used to treat subjects that do not respond to an erythroid maturation agent. In some embodiments, the subject has previously been treated with an ESA. In some embodiments, the subject has not previously been treated with an ESA. In some embodiments, the thrombocytopenia is familial thrombocytopenia (also referred to as inherited thrombocytopenia, e.g., thrombocytopenia associated with a genetic mutation, such as May-Hegglin anomaly, Sebastian syndrome, Fechtner syndrome, Epstein's syndrome, Wiskott-Aldrich syndrome, congenital amegakaryocytic thrombocytopenia, platelet storage pool deficiency, Hermansky-Pudlak syndrome, Bernard-Soulier syndrome, Von Willebrand Disease Type 2B, ANKRD26-related thrombocytopenia, thrombocytopenia absent radius syndrome, familial platelet disorder with associated myeloid malignancy (FPD/AML, associated with mutations in RUNX1), thrombocytopenia associated with a mutation in Filamin-A, or thrombocytopenia associated with a mutation in GATA-1). In some embodiments, the thrombocytopenia is immune thrombocytopenia. In some embodiments, the methods described herein increase platelet levels, increase or induce megakaryocyte differentiation and/or maturation, promote or increase platelet formation or production, reduce the accumulation of platelet progenitor cells, and/or improve blood clotting, reduce bleeding events, and/or reduce bleeding in the skin (petechiae or bruising) compared to measurements obtained prior to treatment or compared to measurements typically observed in untreated subjects having the same disease or condition. In some embodiments, the subject is identified as having thrombocytopenia prior to treatment with an ActRII chimera described herein. In some embodiments, the method includes a step of identifying the subject as having thrombocytopenia (e.g., by evaluating platelet levels) prior to treatment with an ActRII chimera described herein. The method can further include evaluating platelet levels after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing neutropenia by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, a subject having or at risk of developing low neutrophil levels (e.g., low neutrophil cell counts) has or is at risk of developing neutropenia. In some embodiments, the neutropenia is associated with a bone marrow defect, a myelodysplastic syndrome, bone marrow transplantation, myelofibrosis, ineffective hematopoiesis, aplastic anemia, Fanconi anemia, Diamond Blackfan anemia, Shwachman Diamond syndrome, paroxysmal nocturnal hemoglobinuria, Pearson syndrome, dyskeratosis congenita, cancer (e.g., leukemia), a vitamin deficiency (e.g., B-12 deficiency or folate deficiency), an enlarged spleen, an autoimmune disease (e.g., granulomatosis with polyangiitis, lupus (e.g., SLE), Evans syndrome, Felty syndrome, Crohn's disease, or rheumatoid arthritis), a viral infection (e.g., chickenpox, Epstein-Barr, Hepatitis A, Hepatitis B, Hepatitis C, HIV/AIDS, cytomegalovirus, Dengue fever, or measles), a bacterial infection (e.g., tuberculosis, salmonella infection, or sepsis), cancer treatment (e.g., chemotherapy or radiation therapy), treatment with other medications (e.g., a medication used to treat overactive thyroid, such as methimazole and propylthiouracil; an antibiotic, such as vancomycin, penicillin G, trimethoprim, and oxacillin; an antiviral drug, such as ganciclovir and valganciclovir; an anti-inflammatory medication for ulcerative colitis or rheumatoid arthritis, such as sulfasalazine; a drug used to treat irregular heart rhythms, such as quinidine and procainamide; an anticonvulsant, such as phenytoin and valproate; an antipsychotic, such as clozapine; or levamisole), inflammation, hematopoietic stem cell transplantation, or contraindication to transfusion (e.g., patients of advanced age, patients with allo- or auto-antibodies, pediatric patients, patients with cardiopulmonary disease, patients who object to transfusion for religious reasons (e.g., some Jehovah's Witnesses)). The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be an RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations). In some embodiments, the MDS is associated with a defect in early-stage hematopoiesis (e.g., commitment or early differentiation). In some embodiments, the MDS is associated with elevated endogenous erythropoietin levels. In some embodiments, the myelodysplastic syndrome is associated with hypocellular bone marrow (e.g., a subject with MDS has hypocellular bone marrow). The subject may have a low transfusion burden or a high transfusion burden. In some embodiments, the subject has a low transfusion burden and received 1-3 RBC units in the eight weeks prior to treatment with an ActRII chimera described herein. In some embodiments, the subject has a low transfusion burden and did not receive a transfusion (received 0 RBC units) in the eight weeks prior to treatment with an ActRII chimera described herein. In some embodiments, the subject does not respond well to erythropoietin (EPO) or is susceptible to adverse effects of EPO (e.g., hypertension, headaches, vascular thrombosis, influenza-like syndrome, obstruction of shunts, and myocardial infarction). The compositions and methods described herein can also be used to treat subjects that do not respond to an erythroid maturation agent. In some embodiments, the subject has previously been treated with an ESA. In some embodiments, the subject has not previously been treated with an ESA. In some embodiments, the neutropenia is chronic idiopathic neutropenia. In some embodiments, the neutropenia is familial neutropenia (also referred to as inherited neutropenia, e.g., cyclic neutropenia, chronic benign neutropenia, or severe congenital neutropenia (SCN), which may be associated with mutations in the genes ELANE (associated with SCN1), HAX1 (associated with SCN3), G6PC3 (associated with SCN4), GFI1 (associated with SCN2), CSF3R, WAS (associated with X-linked neutropenia/X-linked SCN), CXCR4, VPS45A (associated with SCN5), or JAGN1). In some embodiments, the methods described herein increase neutrophil levels, increase or induce neutrophil formation or production, and/or increase or induce the differentiation and/or maturation of progenitor cells (e.g., myeloid progenitors, myeloblasts, or myelocytes) into neutrophils compared to measurements obtained prior to treatment or compared to measurements typically observed in untreated subjects having the same disease or condition. In some embodiments, the methods described herein reduce the susceptibility of the subject to infection. In some embodiments, the subject is identified as having neutropenia prior to treatment with an ActRII chimera described herein. In some embodiments, the method includes a step of identifying the subject as having neutropenia (e.g., by evaluating neutrophil levels) prior to treatment with an ActRII chimera described herein. The method can further include evaluating neutrophil levels after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing fibrosis by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, the subject has or is at risk of developing fibrosis. In some embodiments, the fibrosis is fibrosis is chemotherapeutic drug-induced fibrosis, radiation-induced fibrosis, pulmonary fibrosis (e.g., cystic fibrosis, idiopathic fibrosis, or fibrosis related to tuberculosis, pneumonia, or coal dust), hepatic fibrosis (e.g., cirrhosis, biliary atresia), renal fibrosis (e.g., fibrosis related to chronic kidney disease), corneal fibrosis, heart fibrosis (e.g., endomyocardial fibrosis, or fibrosis related to myocardial infarction), bone marrow fibrosis, myelofibrosis, mediastinal fibrosis, retroperitoneal fibrosis, arthrofibrosis, osteoarticular fibrosis, tissue fibrosis (e.g., fibrosis affecting muscle tissue, skin epidermis, skin dermis, tendon, cartilage, pancreatic tissue, uterine tissue, neural tissue, testis, ovary, adrenal gland, artery, vein, bone marrow, colon, small intestine, large intestine, biliary tract, or gut), a tumor stroma, a desmoplastic tumor, a surgical adhesion, a hypertrophic scar, or a keloid. In some embodiments, the fibrosis is associated with a wound, a burn, hepatitis B or C infection, fatty liver disease, Schistosoma infection, kidney disease (e.g., chronic kidney disease), heart disease, macular degeneration, retinal or vitreal retinopathy, Crohn's disease, systemic or local scleroderma, atherosclerosis, or restenosis. In some embodiments, the subject is at risk of developing fibrosis related to cancer treatment (chemotherapy or radiation), disease or infection (e.g., tuberculosis, pneumonia, myocardial infarction, hepatitis B or C infection, fatty liver disease, Schistosoma infection, kidney disease (e.g., chronic kidney disease), heart disease, macular degeneration, retinal or vitreal retinopathy, Crohn's disease, systemic or local scleroderma, atherosclerosis, restenosis, surgery, a wound, or a burn. In some embodiments, the methods described herein reduce fibrosis compared to measurements obtained prior to treatment or compared to fibrosis in untreated subjects. In some embodiments, the methods described herein prevent the development of fibrosis or reduce the risk of developing fibrosis (e.g., reduce the risk of developing fibrosis compared to the development of fibrosis in untreated subjects). In some embodiments, the methods described herein slow or stop the progression of fibrosis (e.g., slow the progression of fibrosis compared to progression prior to treatment or compared to progression without treatment or in an untreated subject). In some embodiments, the methods described herein reduce the frequency or severity of one or more symptom of fibrosis. In some embodiments, the methods described herein improve organ or tissue function (e.g., the function of the organ or tissue having fibrosis) compared to organ or tissue function prior to treatment. Tissue and organ function can be assessed using any standard clinical test commonly used to evaluate tissue and organ function. In some embodiments, the subject is identified as having fibrosis prior to treatment with an ActRII chimera described herein. In some embodiments, the method includes a step of identifying the subject as having fibrosis (e.g., using imaging to visualize scar formation) prior to treatment with an ActRII chimera described herein. The method can further include evaluating fibrosis after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing PH (e.g., PAH, venous PH, hypoxic PH, thromboembolic PH, or miscellaneous PH) by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In any of the methods described herein, the subject may have or be at risk of developing PH. In some embodiments, the PH is PAH. In some embodiments, the PAH is idiopathic PAH. In some embodiments, the PAH is heritable PAH. In some embodiments, the PAH is PAH related to (e.g., caused by or associated with) HIV infection, schistosomiasis, portal hypertension, pulmonary veno-occlusive disease, pulmonary capillary hemangiomatosis, cirrhosis of the liver, a congenital heart abnormality, a connective tissue/autoimmune disorder (e.g., scleroderma or lupus), or drug use or abuse (e.g., methamphetamine or cocaine use). In some embodiments, the PH is venous PH. In some embodiments, the venous PH is venous PH related to (e.g., caused by or associated with) left ventricular systolic dysfunction, left ventricular diastolic dysfunction, valvular heart disease, congenital cardiomyopathy, or congenital/acquired pulmonary venous stenosis. In some embodiments, the PH is hypoxic PH. In some embodiments, the hypoxic PH is hypoxic PH related to (e.g., caused by or associated with) chronic obstructive pulmonary disease (e.g., emphysema), interstitial lung disease, sleep-disordered breathing (e.g., sleep apnea), lung disease (e.g., pulmonary fibrosis), an alveolar hypoventilation disorder, chronic exposure to high altitude, or a developmental abnormality. In some embodiments, the PH is thromboembolic PH. In some embodiments, the thromboembolic PH is thromboembolic PH related to (e.g., caused by or associated with) chronic thromboembolic pulmonary hypertension, or other pulmonary artery obstructions (e.g., pulmonary emboli, angiosarcoma, arteritis, congenital pulmonary artery stenosis, or parasitic infection). In some embodiments, the PH is miscellaneous PH. In some embodiments, the miscellaneous PH is miscellaneous PH related to (e.g., caused by or associated with) a hematologic disease (e.g., chronic hemolytic anemia, sickle cell disease), a systemic disease (e.g., sarcoidosis, pulmonary Langerhans cell histiocytosis, lymphangioleiomyomatosis, neurofibromatosis, or vasculitis), a metabolic disorder (e.g., glycogen storage disease, Gaucher disease, or a thyroid disease), pulmonary tumoral thrombotic microangiopathy, fibrosing mediastinitis, chronic kidney failure, or segmental pulmonary hypertension). In some embodiments, the methods described herein reduce the symptoms (e.g., reduce the severity or frequency of symptoms, such as shortness of breath (dyspnea), fatigue, swelling (e.g., edema) of the legs, feet, belly (ascites), or neck, chest pain or pressure, racing pulse or heart palpitations, bluish color to lips or skin (cyanosis), dizziness, or fainting) of PH compared to the frequency or severity of symptoms prior to treatment. In some embodiments, the methods described herein prevent the development of PH or reduce the risk of developing PH (e.g., reduce the risk of developing PH compared to the development of PH in untreated subjects). In some embodiments, the methods described herein slow or stop the progression of PH (e.g., slow the progression of PH compared to progression prior to treatment or compared to progression without treatment or in an untreated subject). In some embodiments, the methods described herein reduce pulmonary vascular remodeling or vascular remodeling in the heart of a subject (e.g., the initiation or progression of vascular remodeling in the heart or lungs) compared to vascular remodeling prior to treatment or compared to vascular remodeling in an untreated subject. In some embodiments, the methods described herein reduce right ventricular hypertrophy (e.g., reduce right ventricular hypertrophy or the progression of right ventricular hypertrophy) compared to right ventricular hypertrophy prior to treatment or compared to right ventricular hypertrophy in an untreated subject. In some embodiments, the methods described herein reduce PH-associated bone loss (e.g., reduce PAH-associated bone loss, such as preventing or reducing the reduction in bone mineral density that occurs in subjects with PAH) compared to bone loss prior to treatment or compared to bone loss in an untreated subject. In some embodiments, the methods described herein reduce pulmonary arterial muscularization and/or pulmonary arterial wall thickening compared to pulmonary arterial muscularization and/or pulmonary arterial wall thickening prior to treatment or compared to pulmonary arterial muscularization and/or pulmonary arterial wall thickening in an untreated subject. In some embodiments, the methods described herein reduce right ventricular compensation compared to right ventricular compensation prior to treatment or compared to right ventricular compensation in an untreated subject. Symptoms of PH can be evaluated before and after treatment using standard clinical tests. Commonly used tests for evaluating PH include electrocardiograms, pulmonary function tests, echocardiograms, right heart catheterization, computed tomography scan, measurement of pulmonary vascular resistance, and the 6-minute walk test. In some embodiments, the methods described herein reduce pulmonary vascular resistance (e.g., result in a reduction in pulmonary vascular resistance compared to pulmonary vascular resistance prior to treatment). In some embodiments, the methods described herein improve performance in the 6-minute walk test compared to performance in the 6-minute walk test prior to treatment. In some embodiments, the subject is identified as having PH prior to treatment with an ActRII chimera described herein. In some embodiments, the method includes a step of identifying the subject as having PH (e.g., by evaluating symptoms of PH) prior to treatment with an ActRII chimera described herein. The method can further include evaluating PH symptoms after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing a metabolic disease (e.g., obesity, Type 1 diabetes, or Type 2 diabetes) by administering to the subject an effective amount of a polypeptide described herein (e.g., a polypeptide including an extracellular ActRII chimera (e.g., an extracellular ActRII chimera having the sequence of any one of SEQ ID NOs: 1-43 (e.g., SEQ ID NOs: 22-43)). In some embodiments, the subject may have a disease that results in obesity. In some embodiments, the polypeptides described herein may be administered to a subject to prevent the development of obesity (e.g., in a subject at risk of developing obesity, e.g., a subject who is overweight, who has a family history of obesity, or who has other medical conditions or risk factors linked to increased risk of obesity (e.g., advanced age, or treatment with a medication associated with the development of obesity, such as a glucocorticoid (e.g., a corticosteroid, such as prednisone), a selective serotonin reuptake inhibitors (SSRI, e.g., paroxetine, mirtazapine, fluoxetine, escitalopram, sertraline), a tricyclic antidepressant (e.g., amitriptyline), a mood stabilizer (e.g., valproic acid, lithium), an antipsychotic (e.g., olanzapine, chlorpromazine, clozapine), and a diabetes medication (e.g., insulin, chlorpropamide)) and/or to treat a subject already diagnosed with obesity. In some embodiments, the subject has age-related obesity or metabolic disease. In some embodiments, the subject has treatment-related obesity or metabolic disease. Administration of an ActRII chimera described herein may reduce bodyweight by decreasing the amount of body fat. In some embodiments, the ActRII chimera decreases the amount of body fat while maintaining or increasing the amount of lean mass.

In some embodiments, the polypeptides described herein may be administered to a subject to prevent the development of diabetes (e.g., Type 1 or Type 2 diabetes, e.g., in a subject at risk of developing diabetes associated with advanced age or treatment with a medication associated with the development of diabetes, such as a glucocorticoid (e.g., a corticosteroid, e.g., glucocorticoid-induced diabetes mellitus), an SSRI, a serotonin-norepinephrine reuptake inhibitors (SNRI), a mood stabilizer (e.g., lithium and valproic acid), and an antipsychotic (e.g., olanzapine and clozapine)) and/or to treat a subject already diagnosed with diabetes. In some embodiments, the subject has age-related diabetes or metabolic disease. In some embodiments, the subject has treatment-related diabetes or metabolic disease. Subjects who are likely to develop diabetes, e.g., subjects with a genetic predisposition to diabetes, a family history of diabetes, prediabetes, an autoimmune disease associated with diabetes, another metabolic disease, subjects of advanced age, or subjects treated with a medication associated with the development of diabetes may be administered the polypeptides described herein (e.g., a polypeptide including an ActRII chimera (e.g., an extracellular ActRII chimera having the sequence of any one of SEQ ID NOs: 1-43 (e.g., SEQ ID NOs: 22-43)) e.g., an effective amount of an ActRII chimera) prophylactically, such that the extracellular ActRII chimeras may maintain the normal function and health of β-cells and/or prevent or delay autoimmune inflammatory damage to β-cells. In other embodiments, the polypeptides described herein (e.g., a polypeptide including an ActRII chimera (e.g., an extracellular ActRII chimera having the sequence of any one of SEQ ID NOs: 1-43 (e.g., SEQ ID NOs: 22-43)) e.g., an effective amount of an ActRII chimera) may be administered to individuals before diagnosis with diabetes (e.g., Type 1 and Type 2 diabetes) or the development of clinical symptoms of diabetes, e.g., high blood glucose level, high fasting insulin level, insulin resistance, polyuria, polydipsia, and polyphagia. In some embodiments, the extracellular ActRII chimeras may be administered to patients prior to the patients needing insulin. In some embodiments, the administration of extracellular ActRII chimeras may delay, reduce, or eliminate the need for insulin treatment in diabetic patients. For example, administration of the extracellular ActRII chimeras of the invention to a subject may help to increase the rate of glucose clearance from the blood.

In some embodiments, the methods described herein reduce body fat (e.g., reduce the amount of subcutaneous, visceral, and/or hepatic fat, reduce adiposity, reduce the weights of epididymal and perirenal fat pads, or reduce body fat percentage). In some embodiments, the methods described herein reduce body weight or reduce body weight gain (e.g., reduce the percentage of body weight gain). In some embodiments, the methods described herein reduce the proliferation of adipose cells. In some embodiments, the methods described herein reduce LDL. In some embodiments, the methods described herein reduce triglycerides. In some embodiments, the methods described herein improve the serum lipid profile of the subject. In some embodiments, the methods described herein reduce body fat and increase muscle mass. In some embodiments, the methods described herein reduce blood glucose levels (e.g., fasting glucose levels) or and/or increase glucose clearance. In some embodiments, the methods described herein reduce fasting insulin levels and/or improve insulin sensitivity (e.g., reduce insulin resistance). In some embodiments, the methods described herein regulate insulin biosynthesis and/or secretion from β-cells. These outcomes can be assessed by comparing measurements obtained after treatment to measurements taken prior to treatment. In some embodiments, the methods described herein do not affect the appetite for food intake. The polypeptides described herein (e.g., a polypeptide including an extracellular ActRII chimera (e.g., an extracellular ActRII chimera having the sequence of any one of SEQ ID NOs: 1-43 (e.g., SEQ ID NOs: 22-43))) may decrease body fat, decrease body weight, or increase insulin sensitivity and/or glucose clearance by increasing muscle mass. In some embodiments, the subject is identified as having a metabolic disease prior to treatment with an ActRII chimera described herein. In some embodiments, the method includes a step of identifying the subject as having a metabolic disease (e.g., by evaluating body weight, body fat, glucose clearance, or insulin sensitivity) prior to treatment with an ActRII chimera described herein. The method can further include evaluating body fat (e.g., amount of body fat or body fat percentage), body weight or body weight gain, fasting insulin levels, glucose clearance, serum lipid profile, or insulin sensitivity after administration of an ActRII chimera described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In any of the methods described herein, a polypeptide including an extracellular ActRII chimera (e.g., an extracellular ActRII chimera having the sequence of any one of SEQ ID NOs: 1-43 (e.g., SEQ ID NOs: 22-43)) that further includes a C-terminal extension of one to six amino acids (e.g., 1, 2, 3, 4, 5, 6 or more amino acids from extracellular ActRIIA or ActRIIB) may be used as the therapeutic protein. In any of the methods described herein, a dimer (e.g., homodimer or heterodimer) formed by the interaction of two Fc domain monomers that are each fused to a polypeptide including an extracellular ActRII chimera (e.g., an extracellular ActRII chimera having the sequence of any one of SEQ ID NOs: 1-43 (e.g., SEQ ID NOs: 22-43)) may be used as the therapeutic protein. In any of the methods described herein, a polypeptide including an extracellular ActRII chimera (e.g., an extracellular ActRII chimera having the sequence of any one of SEQ ID NOs: 1-43 (e.g., SEQ ID NOs: 22-43)) fused to a moiety (e.g., a wild-type Fc domain, an Fc domain with amino acid substitutions (e.g., one more substitutions that reduce dimerization), an albumin-binding peptide, a fibronectin domain, or a serum albumin) may be used as the therapeutic protein. Nucleic acids encoding the polypeptides described herein, or vectors containing said nucleic acids can also be administered according to any of the methods described herein. In any of the methods described herein, the polypeptide, nucleic acid, or vector can be administered as part of a pharmaceutical composition.

EXAMPLES

The following examples are provided to further illustrate some embodiments of the present invention, but are not intended to limit the scope of the invention; it will be understood by their exemplary nature that other procedures, methodologies, or techniques known to those skilled in the art may alternatively be used.

Example 1—Evaluation of ActRII Chimera Binding Affinity

Expression plasmids encoding the fusion proteins were transiently expressed in HEK293 or CHO cells and conditioned media was collected. Conditioned media was loaded onto a protein A column, and target protein was eluted with a low pH buffer. Following buffer exchange into TBS, pH 7.4, the purified protein was characterized by CE-SDS using LabChip GXII (Perkin Elmer). The sequences of these proteins are provided in Table 5, below.

TABLE 5

Sequences of tested ActRII-Fc and ActRII chimera-Fc proteins

| SEQ ID NO: | Amino Acid Sequence |
|---|---|
| ActRIIA-Fc (SEQ ID NO: 105) | GAILGRSETQECLFFNANWEKDRTNQTGVEPCYGDKDKRRHCFATWKNISGSIEIV KQGCWLDDINCYDRTDCVEKKDSPEVYFCCCEGNMCNEKFSYFPEMEVTQPTSG GGDKTHTCPPCPAPELLGGPSVFLFPPKPKDTLMISRTPEVTCVVVDVSHEDPEVK |

TABLE 5-continued

Sequences of tested ActRII-Fc and ActRII chimera-Fc proteins

| SEQ ID NO: | Amino Acid Sequence |
|---|---|
| | FNWYVDGVEVHNAKTKPREEQYNSTYRVVSVLTVLHQDWLNGKEYKCKVSNKALPA PIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPG |
| ActRIIB-Fc (SEQ ID NO: 106) | GRGEAETRECIYYNANWELERTNQSGLERCEGEQDKRLHCYASWRNSSGTIELVK KGCWLDDFNCYDRQECVATEENPQVYFCCCEGNFCNERFTHLPEAGGPEVTYEPP PTAPTGGGDKTHTCPPCPAPELLGGPSVFLFPPKPKDTLMISRTPEVTCVVVDVS HEDPEVKFNWYVDGVEVHNAKTKPREEQYNSTYRVVSVLTVLHQDWLNGKEYKCKV SNKALPAPIEKTISKAKGQPREPQVYTLPPSRDELTKNQVSLTCLVKGFYPSDIAV EWESNGQPENNYKTTPPVLDSDGSFFLYSKLTVDKSRWQQGNVFSCSVMHEALH NHYTQKSLSLSPG |
| Chimera 1-Fc (SEQ ID NO: 107) | GAILGRAETRECIYYNANWELERTNQSGLERCEGEQDKRLHCYASWRNSSGTIEIV KQGCWLDDINCYDRTDCVATEENPQVYFCCCEGNMCNEKFSYFPEMEVTQPTSGG GDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| Chimera 2-Fc (SEQ ID NO: 108) | GRGEAETRECIYYNANWELERTNQSGLERCEGEQDKRLHCYASWRNSSGTIEIVK QGCWLDDINCYDRTDCVEKKDSPEVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| Chimera 2 E81Q-FC (SEQ ID NO: 109) | GRGEAETRECIYYNANWELERTNQSGLERCEGEQDKRLHCYASWRNSSGTIEIVK QGCWLDDINCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| Chimera 2 I65F E81Q-FC (SEQ ID NO: 110) | GRGEAETRECIYYNANWELERTNQSGLERCEGEQDKRLHCYASWRNSSGTIEIVK QGCWLDDFNCYDRTDCVEKKDSPQVYFCCCEGNMCNEKFSYFPEMEVTQPTSG GGDKTHTCPPCPAPELLGGPSVFLFPPKPKDTLMISRTPEVTCVVVDVSHEDPEVK FNWYVDGVEVHNAKTKPREEQYNSTYRVVSVLTVLHQDWLNGKEYKCKVSNKAL PAPIEKTISKAKGQPREPQVYTLPPSRDELTKNQVSLTCLVKGFYPSDIAVEWESNG QPENNYKTTPPVLDSDGSFFLYSKLTVDKSRWQQGNVFSCSVMHEALHNHYTQKS LSLSPGK |
| Chimera 1/2b-Fc (SEQ ID NO: 216) | GAILGRSETQECIYYNANWELERTNQSGLERCEGEQDKRLHCYASWRNSSGTIEIV KQGCWLDDFNCYDRTDCVEKKDSPQVYFCCCEGNMCNEKFSYFPEMEVTQPTS GGGDKTHTCPPCPAPELLGGPSVFLFPPKPKDTLMISRTPEVTCVVVDVSHEDPEV KFNWYVDGVEVHNAKTKPREEQYNSTYRVVSVLTVLHQDWLNGKEYKCKVSNKA LPAPIEKTISKAKGQPREPQVYTLPPSRDELTKNQVSLTCLVKGFYPSDIAVEWESN GQPENNYKTTPPVLDSDGSFFLYSKLTVDKSRWQQGNVFSCSVMHEALHNHYTQ KSLSLSPGK |
| Chimera 3-Fc (SEQ ID NO: 213) | GRGEAETRECIYYNANWELERTNQSGLERCEGEQDKRRHCFATWKNISGSIEIVKQ GCWLDDFNCYDRTDCVEKKDSPQVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |
| Chimera 4-Fc (SEQ ID NO: 217) | GRGEAETRECIYYNANWELERTNQSGLERCEGEQDKRLHCYASWRNSSGTIELVK KGCWLDDFNCYDRQECVATKDSPEVYFCCCEGNMCNEKFSYFPEMEVTQPTSGG GDKTHTCPPCPAPELLGGPSVFLFPPKPKDTLMISRTPEVTCVVVDVSHEDPEVKF NWYVDGVEVHNAKTKPREEQYNSTYRVVSVLTVLHQDWLNGKEYKCKVSNKALP APIEKTISKAKGQPREPQVYTLPPSRDELTKNQVSLTCLVKGFYPSDIAVEWESNGQ PENNYKTTPPVLDSDGSFFLYSKLTVDKSRWQQGNVFSCSVMHEALHNHYTQKSL SLSPGK |

The GE Biacore 3000 was used to measure the kinetics of the interactions between the ActRII- and chimera-Fc proteins and Activin A/Activin B/growth differentiation factor 11 (GDF-11)/BMP-9/BMP-10. Anti-human capture antibody was immobilized on all four flow cells of a CM4 or CM5 chip using the reagents and protocol in the Biacore Human Antibody Capture Kit (GE Life Sciences). Briefly, anti-human IgG was diluted to 25 μg/mL in immobilization buffer. The carboxylated surface of the sensor was activated by injecting a mixture of EDC and NHS. The anti-human IgG was injected into the activated sensor chip flow cells at 10 mU/min for a total of 7 minutes until the chip had reached an immobilization level of 9000 response units (RU). Ethanolamine was injected to deactivate the sensor surfaces. Flow cell 1 was left empty and served as a reference cell to measure and subtract any nonspecific binding. The ActRII- and chimera-Fc proteins were captured in flow cells 2-4 to a maximum analyte binding response of 100 resonance units. This was done by injecting between 5-10 mL of the ActRII- and chimera-FC proteins into the flow cells at a concentration of 2 μg/mL until 200 RU. Each ligand was run in a duplicate concentration series. The data was analyzed using Scrubber2 by BioLogic Software to calculate the $K_D$ of each interaction (Table 6).

TABLE 6

Comparison of ActRII chimera binding affinity ($K_D$) to various ligands

| Construct | Activin A | Activin B | GDF-11 | BMP-9 | BMP-10 |
|---|---|---|---|---|---|
| ActRIIA-Fc (SEQ ID NO: 105) | 1000 pM | 373 pM | 81 pM | 25 nM | 115 pM |
| ActRIIB-Fc (SEQ ID NO: 106) | 63 pM | 23 pM | 115 pM | 278 pM | 67 pM |
| Chimera 1-Fc (SEQ ID NO: 107) | 52 pM | 51 pM | 9 pM | 1.8 nM | 37 pM |
| Chimera 2-Fc (SEQ ID NO: 108) | 296 pM | 8 pM | 5 pM | 695 pM | 20 pM |
| Chimera 2 E81Q-Fc (SEQ ID NO: 109) | 42 pM | 24 pM | 7 pM | 3.7 nM | 5 pM |
| Chimera 2 I65F E81Q-Fc (SEQ ID NO: 110) | 106 pM | 15 pM | 15 pM | 704 pM | 31 pM |
| Chimera 1/2b-Fc (SEQ ID NO: 216) | 17 pM | <2 pM | 4 pM | 820 pM | ND |
| Chimera 3-Fc (SEQ ID NO: 213) | 56 pM | <2 pM | 13 pM | 1.6 nM | ND |
| Chimera 4-Fc (SEQ ID NO: 217) | 48 pM | <2 pM | 1.8 pM | 200 pM | ND |

Example 2—Evaluation of ActRII Chimeras Using a Gene Luciferase Reporter Assay In this experiment, ActRII- and chimera-Fc proteins were assayed for their ability to inhibit BMP-9, BMP-10, activin A, activin B, and GDF-11 signaling. Briefly, the ligands (BMP-9, BMP-10, activin A, activin B, or GDF-11) were incubated with cells expressing a luciferase reporter, which activated the downstream signaling that results in luciferase expression. When the ligands were pre-incubated with a functional inhibitor (e.g., an ActRII- and chimera-Fc protein) before being added to the cells, there was a loss of luciferase signal corresponding to the extent of ligand inhibition.

Two stably transfected luciferase reporter systems were used to assess cellular inhibition of signaling by the same ligands. 02012 cells containing a BMP-responsive BRE-Luciferase construct (produced using protocol from Zilberberg, 2007) were used to assess inhibition of BMP-9 and BMP-10 signaling, and HEK293 cells containing a Smad binding element SBE-Luciferase (BPS Bioscience) were used to assess inhibition of activin A, activin B, and GDF-11 signaling. Cells were plated on 96-well plates in DMEM supplemented with 2% FBS and placed in an incubator overnight to acclimate to the plate surface. A dilution series spanning between 10 ng/mL to 100 μg/mL of each chimera-Fc or positive control (ActRIIA-Fc and ActRIIB-Fc) was made in 2% DMEM at concentrations spanning the $IC_{50}$ and incubated with Activin A (1 nM), Activin B (1 nM), GDF-11 (2 nM), BMP-9 (0.2 nM), or BMP10 (0.4 nM) for 60 minutes at 37° C. Wells containing only the ligand and no ActRII- or chimera-Fc served as the positive control against which inhibition was calculated. Media on the plates was aspirated and the chimera-Fc/ligand mixtures were added to the plates as media replacement. The remaining wells were used for replicates of positive controls and background. The plates were incubated overnight at 37° C., Promega Steady Glo was added to the plate according to the kit instructions, and the ODs of the wells were read on a Molecular Devices Spectramax M5e. Percent inhibition was calculated for each well by comparing the luciferase signal observed to the signal generated by the positive control. By testing a series of ActRII concentrations ranging from no inhibition to complete inhibition, the $IC_{50}$ concentrations were calculated using GraphPad Prism software in a 4-parameter nonlinear regression model. The cell-based assays demonstrate the ability of the chimeras to inhibit signaling at the endogenous cell surface receptors (Table 7).

TABLE 7

Cellular inhibition ($IC_{50}$) by ActRII chimeras of luciferase reporter response to various ligands

| Construct | Activin A | Activin B | GDF-11 | BMP-9 | BMP-10 |
|---|---|---|---|---|---|
| ActRIIA-Fc (SEQ ID NO: 105) | 390 ng/mL | 214 ng/mL | 390 ng/mL | 215 μg/mL | 749 ng/mL |
| ActRIIB-Fc (SEQ ID NO: 106) | 65 ng/mL | 231 ng/mL | 138 ng/mL | 0.2 μg/mL | 17.8 ng/mL |
| Chimera 1-Fc (SEQ ID NO: 107) | 69.2 ng/mL | 72.0 ng/mL | 37.2 ng/mL | 27.2 μg/mL | 11.6 ng/mL |

TABLE 7-continued

Cellular inhibition ($IC_{50}$) by ActRII chimeras of luciferase reporter response to various ligands

| Construct | Activin A | Activin B | GDF-11 | BMP-9 | BMP-10 |
|---|---|---|---|---|---|
| Chimera 2-Fc (SEQ ID NO: 108) | 117.1 ng/mL | 21.8 ng/mL | 54.8 ng/mL | 14.2 μg/mL | 6.9 ng/mL |
| Chimera 2 E81Q-Fc (SEQ ID NO: 109) | 78.3 ng/mL | 38.2 ng/mL | 50.2 ng/mL | 44.2 μg/mL | 6.7 ng/mL |
| Chimera 2 I65F E81Q-Fc (SEQ ID NO: 110) | 103.7 ng/mL | 30.0 ng/mL | 117.5 ng/mL | 5.0 μg/mL | 10.9 ng/mL |
| Chimera 1/2-Fc (SEQ ID NO: 215) | ND | 89 ng/mL | ND | 7.6 μg/mL | ND |
| Chimera 1/2b-Fc (SEQ ID NO: 216) | 61 ng/mL | 150 ng/mL | 38 ng/mL | 3.2 μg/mL | ND |
| Chimera 3-Fc (SEQ ID NO: 213) | 91 ng/mL | 74 ng/mL | 34 ng/mL | 5.8 μg/mL | ND |
| Chimera 4-Fc (SEQ ID NO: 217) | 170 ng/mL | 94 ng/mL | 41 ng/mL | 1.3 μg/mL | ND |
| Chimera 5-Fc (SEQ ID NO: 218) | ND | 180 ng/mL | ND | >50 μg/mL | ND |
| Chimera 2 I65E N66T E81Q-Fc (SEQ ID NO: 214) | ND | 79 ng/mL | ND | >50 μg/mL | ND |
| Chimera 2 D37R I65F E81Q-Fc (SEQ ID NO: 263) | ND | >500 ng/mL | ND | >50 μg/mL | ND |

Figure 3:
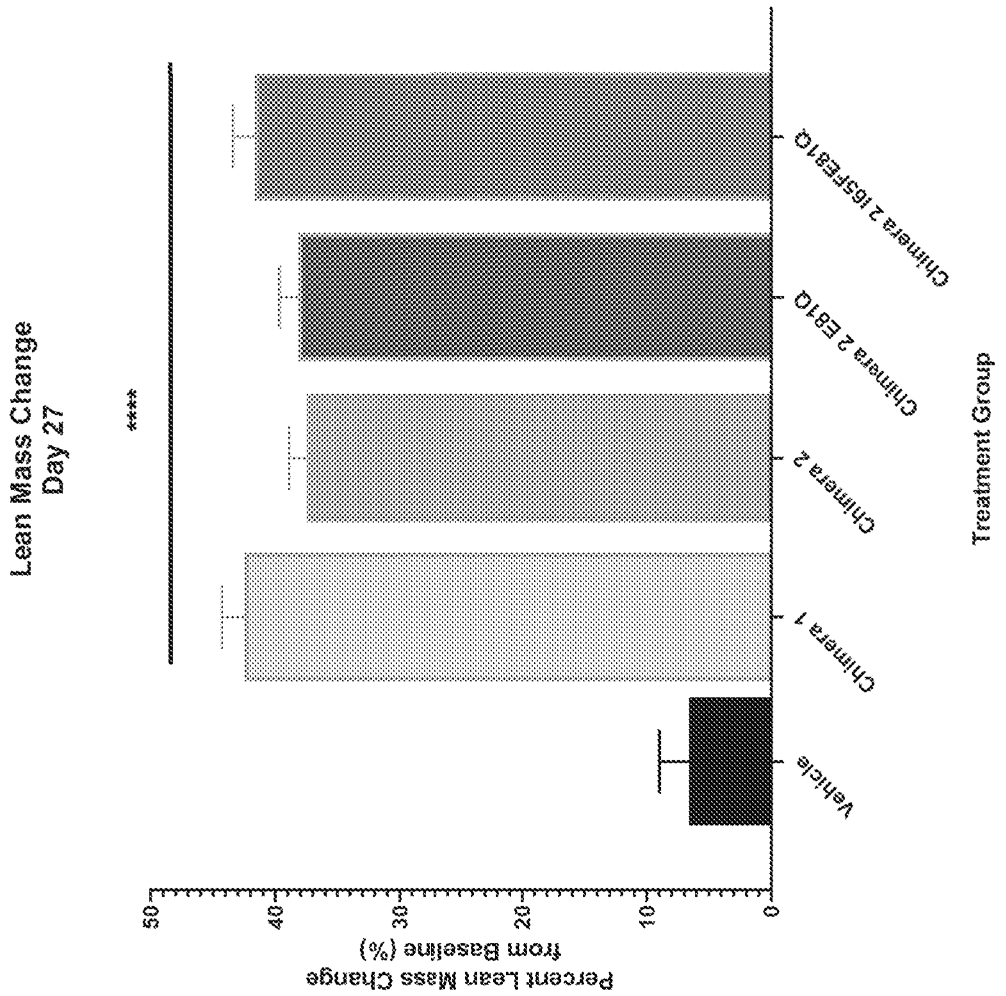
FIG. 3 is a bar graph showing the effects of extracellular ActRII chimeras on lean mass. Mice received a single hydrodynamic injection of a plasmid construct encoding the indicated ActRII chimera or vehicle.

Example 3—Effect of Hydrodynamic Injection of Extracellular ActRII Chimeras on Body Weight and Lean Mass Male C57BL/6 mice (n=10/group) received a bolus (0.75 mg/kg) of plasmid DNA (Chimera 1-Fc, Chimera 2-Fc, Chimera 2 E81 Q-Fc, or Chimera 2 I65F E81 Q-Fc) or vehicle via a single hydrodynamic injection into the lateral tail vein (15 μg/mouse). Mice were excluded if the entire injection did not flow smoothly into the vein, the injection took longer than 8 seconds, or the mice did not fully recover within 10 minutes of administration. Body weight and lean mass (by NMR) were measured longitudinally across the study for 28 days. As shown in FIG. 2, hydrodynamic delivery of Chimera 1-Fc, Chimera 2-Fc, Chimera 2 E81 Q-Fc, and Chimera 2 I65F E81 Q-Fc significantly increased body weight in mice compared to vehicle control (**p<0.0001 compared to vehicle cohort). In addition, hydrodynamic delivery of Chimera 1-Fc, Chimera 2-Fc, Chimera 2 E81 Q-Fc, and Chimera 2 I65F E81 Q-Fc significantly increased lean mass in mice compared to control (FIG. 3, **p<0.0001 compared to vehicle cohort).

Figure 4:
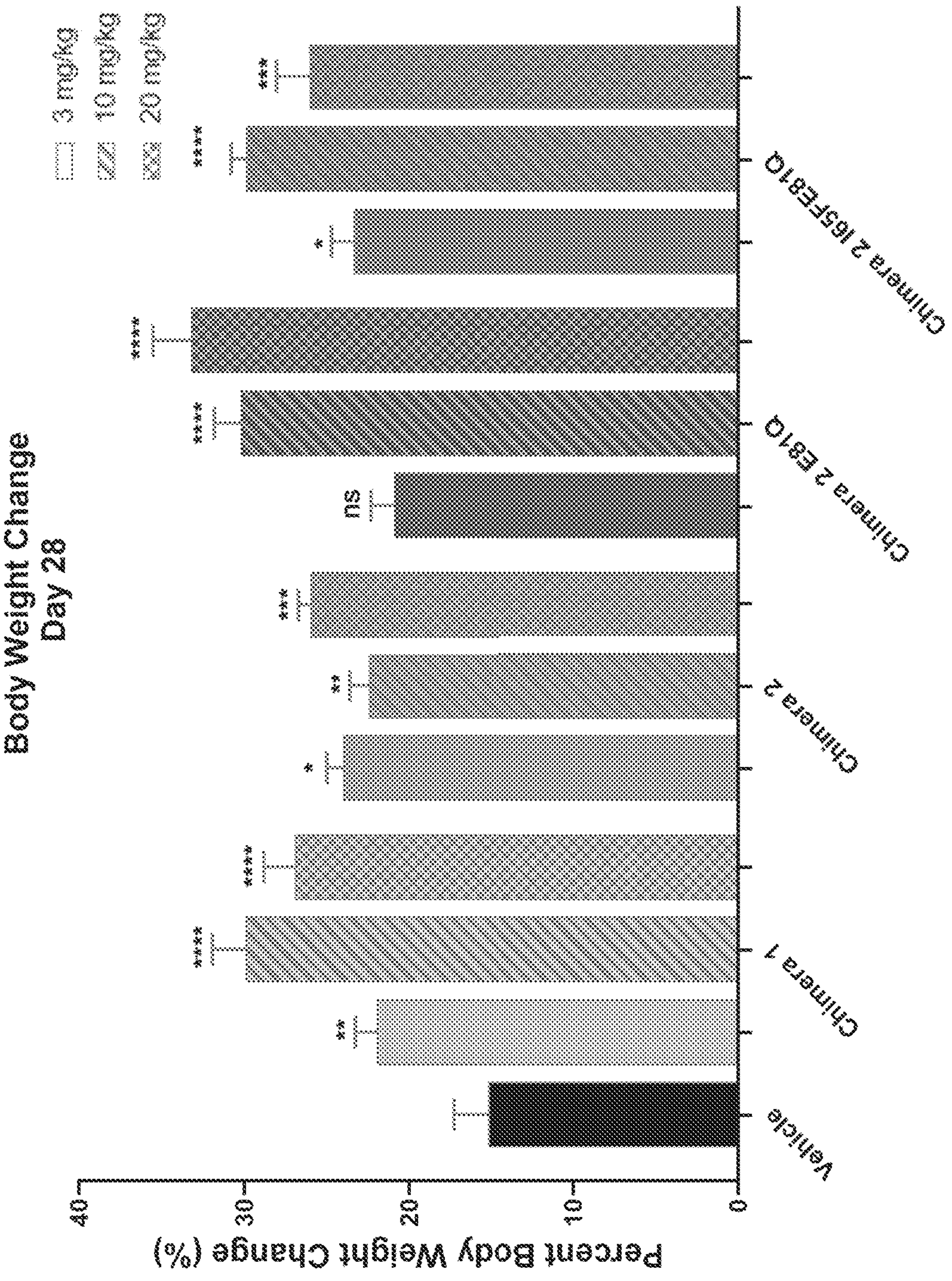
FIG. 4 is a bar graph showing the effects of extracellular ActRII chimeras on body weight. Mice received an intraperitoneal injection of the indicated recombinant ActRII chimera or a vehicle control twice weekly for four weeks.
Figure 5:
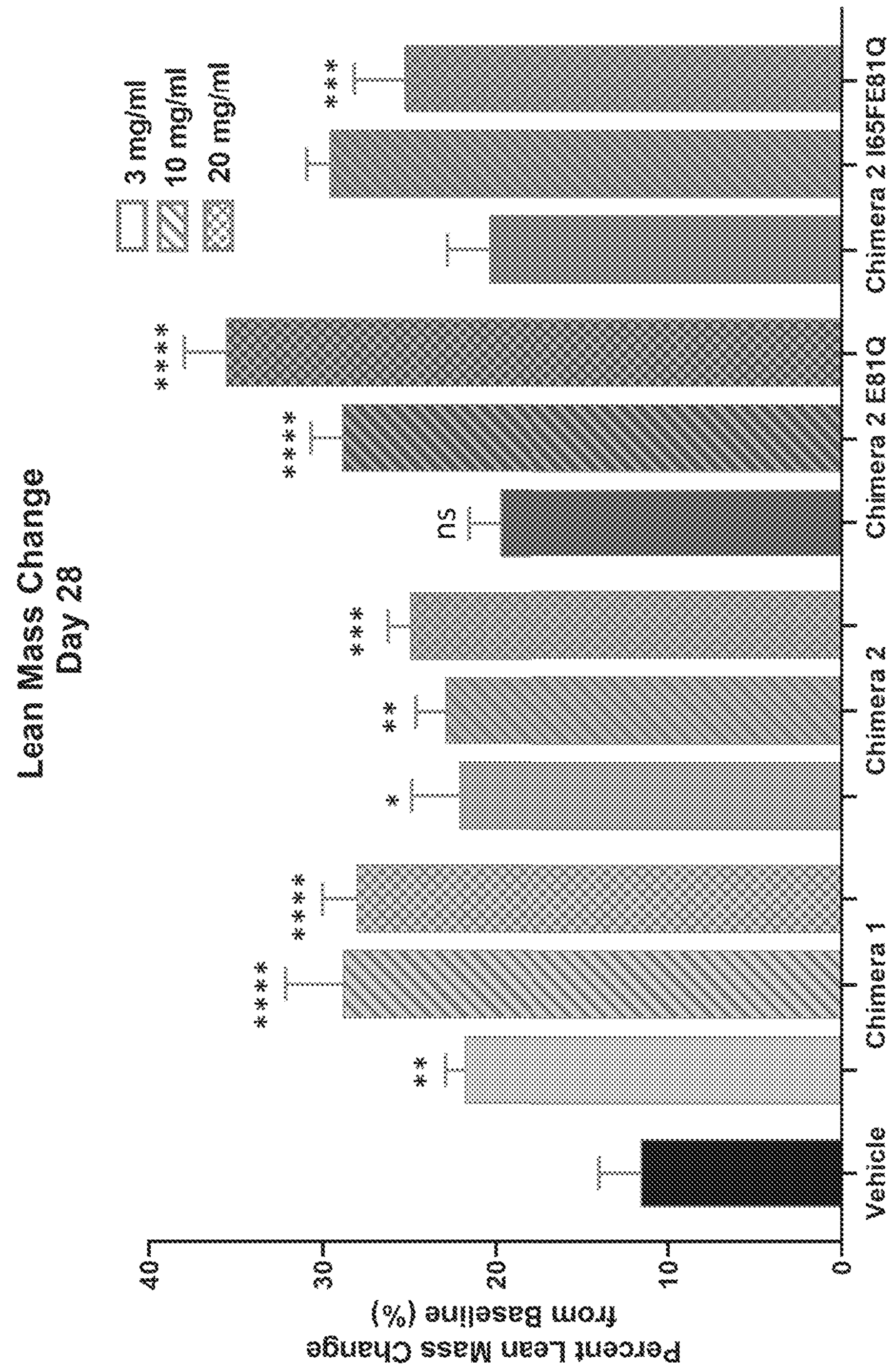
FIG. 5 is a bar graph showing the effects of extracellular ActRII chimeras on lean mass. Mice received an intraperitoneal injection of the indicated recombinant ActRII chimera or a vehicle control twice weekly for four weeks.
Figure 6A:
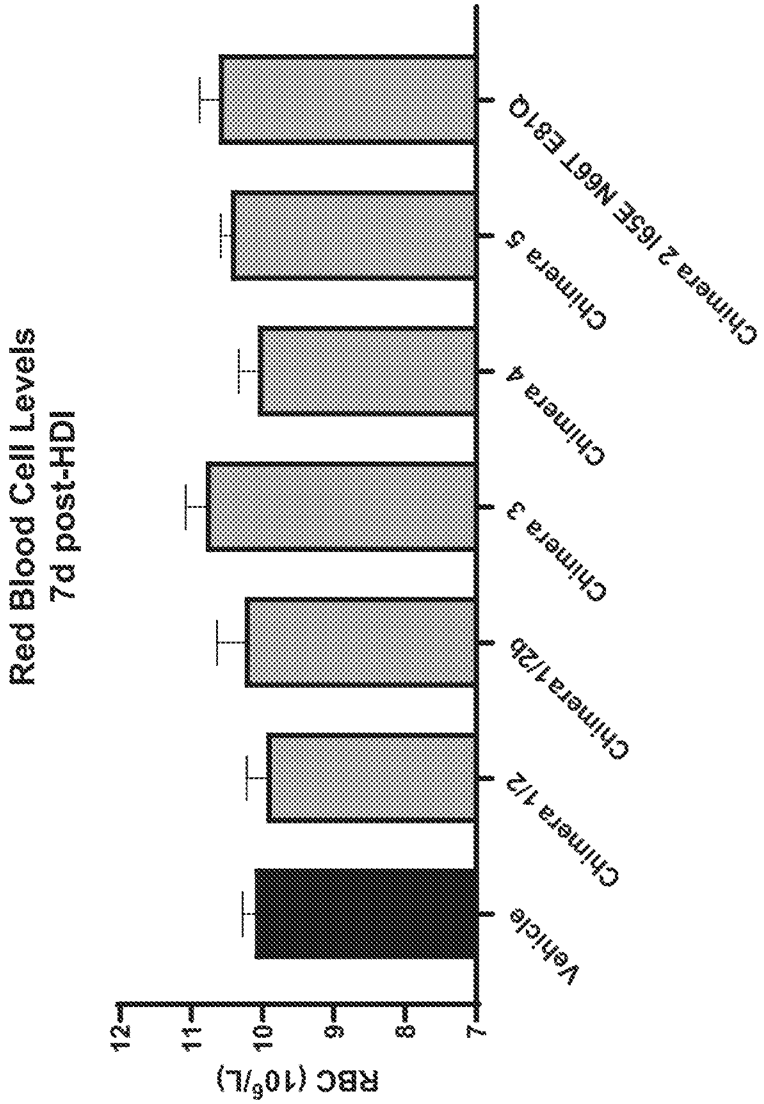
FIGS. 6A-6D are a series of bar graphs showing the effects of extracellular ActRII chimeras on hematology parameters. Ten-week-old wild type male C57Bl/6 mice received a hydrodynamic tail vain injection (HDI) with vehicle (n=7) or vehicle containing an expression vector for either Chimera 1/2-Fc (n=9), Chimera 1/2b-Fc (n=8), Chimera 3-Fc (n=8), Chimera 4-Fc (n=8), Chimera 5-Fc (n=8), or Chimera 2 I65E N66T E81 Q-Fc (n=9) at a dose of 0.75 mg/kg. Seven days post HDI, blood was sampled from the submandibular vein in restrained conscious mice. EDTA was used as an anticoagulant and blood was analyzed using a Heska HT5 veterinary blood analyzer. The effect of extracellular ActRII chimeras on red blood cell, hemoglobin, and hematocrit levels and absolute reticulocytes is shown in FIGS. 6A-6D. Data are shown as average±SEM. Statistics are shown relative to vehicle treatment using a 1-way ANOVA with a Fisher's LSD post test. *P<0.001, **P<0.0001.
Figure 6B:
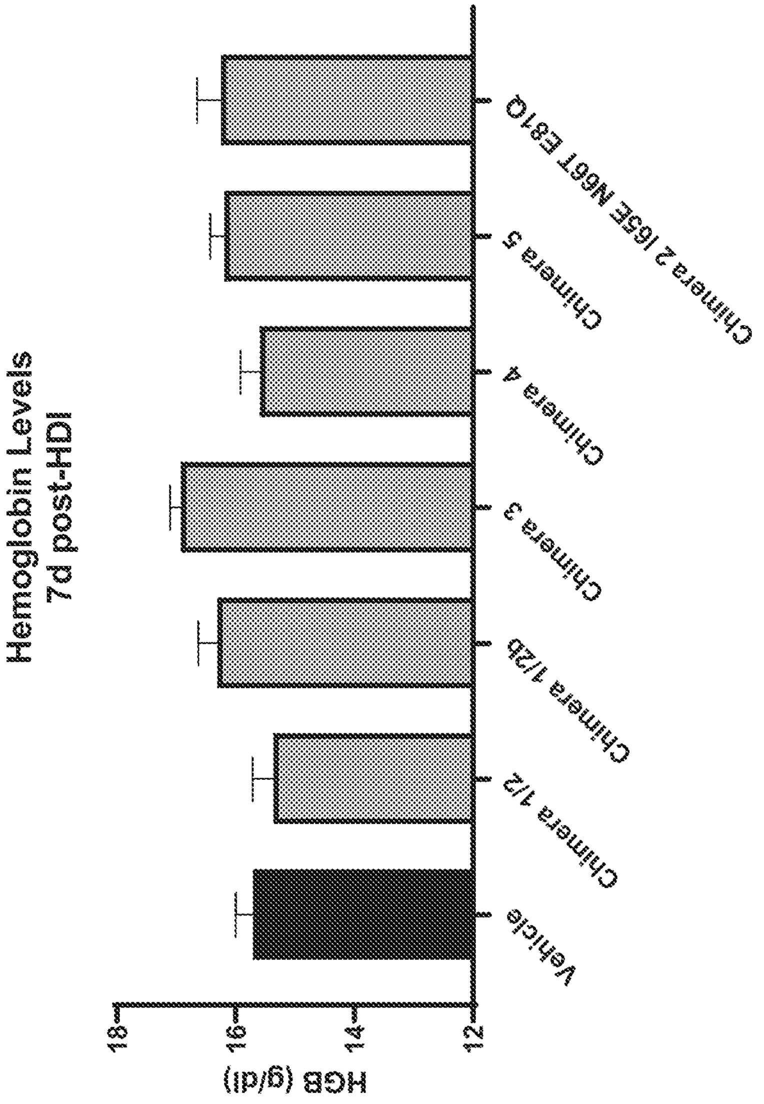
Figure 6C:
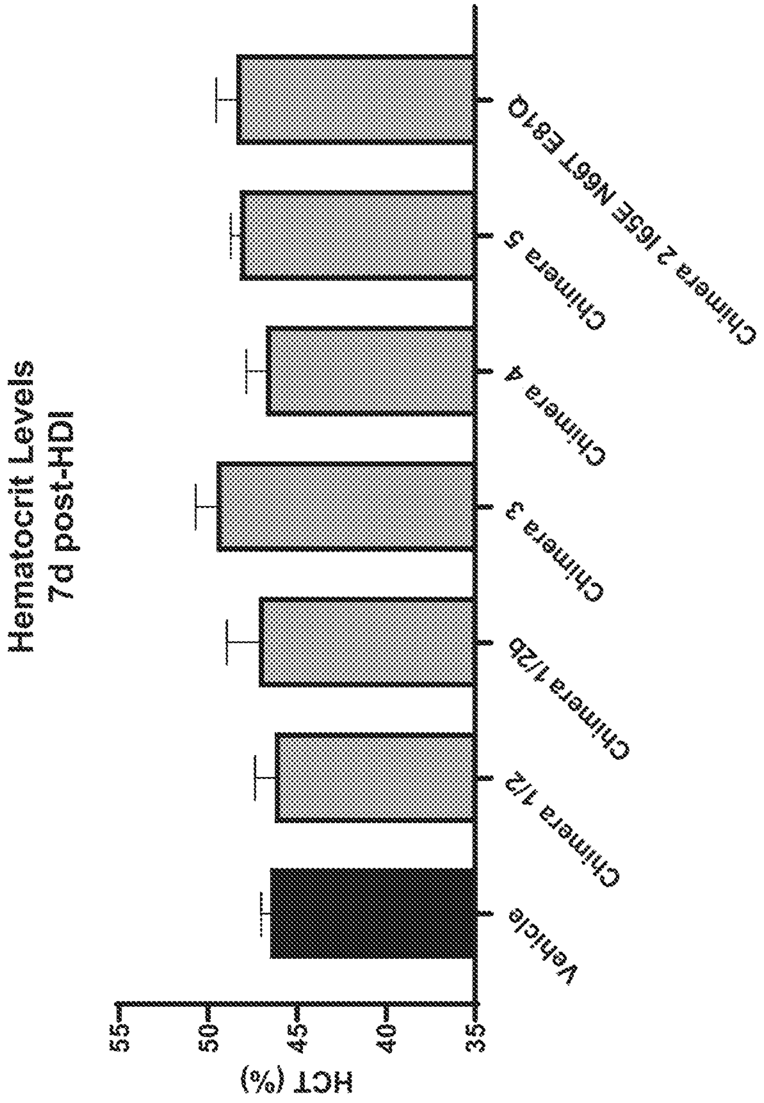
Figure 6D:
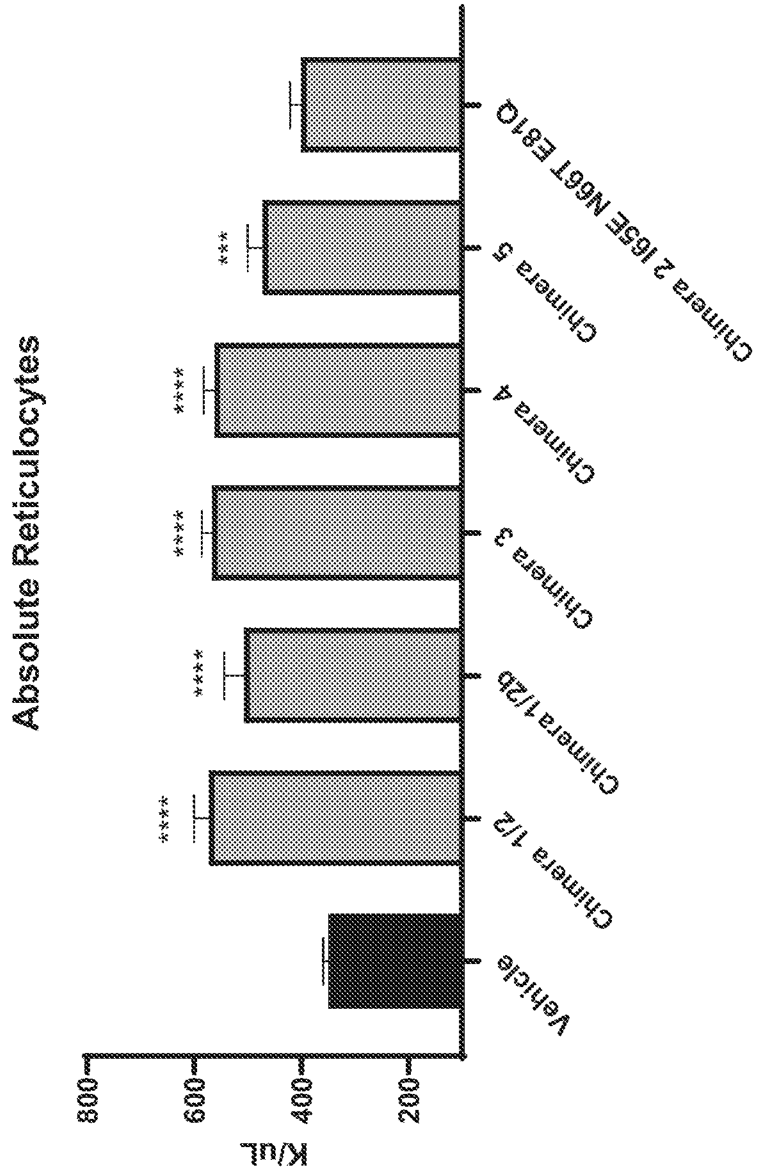

Example 4—Evaluating Dose-Response of Recombinant Extracellular ActRII Chimeras Eight-week old, male C57BL/6 mice (n=10/group) were dosed with either vehicle (Tris-Buffered Saline, pH 7.4), Chimera 1-Fc, Chimera 2-Fc, Chimera 2 E81 Q-Fc, or Chimera 2 I65F E81 Q-Fc at three, ten, and twenty mg/kg (mg of recombinant protein per kg of bodyweight). Treatments were administered intraperitoneally twice weekly for four weeks (eight doses), and the study was terminated on study day 28. Body weights were recorded on dosing days throughout the study, and at study termination, groups underwent NMR imaging for lean and fat mass analysis. As shown in FIG. 4, recombinant proteins Chimera 1-Fc, Chimera 2-Fc, Chimera 2 E81 Q-Fc, and Chimera 2 I65F E81 Q-Fc significantly increased body weight in wild-type mice compared to vehicle control (ns=not significant; *p<0.05; p<0.01; *p<0.001; **p<0.0001 compared to vehicle cohort). In addition, recombinant proteins Chimera 1-Fc, Chimera 2-Fc, Chimera 2 E81 Q-Fc, and Chimera 2 I65F E81 Q-Fc significantly increased lean mass in wild-type mice compared to control (FIG. 5**, ns=not significant; *p<0.05; p<0.01; *p<0.001; ****p<0.0001 compared to vehicle cohort).

Example 5—Effect of Extracellular ActRII Chimeras on Lean Mass, Hematology, and Bone Density and Structure To assess the effect of extracellular ActRII chimeras on lean mass, hematology, and bone density and structure, 10-week-old wild type male C57Bl/6 mice were enrolled in the study. Pre-dosing, mice were weight and lean mass determined using a small rodent nuclear magnetic resonance (NMR) analyzer (Bruker, Minispec LF50). Once baseline levels were determined, each mouse was injected, via hydrodynamic tail vain injections (HDI), with vehicle (n=7) or vehicle containing an expression vector for either Chimera 1/2-Fc (n=9), Chimera 1/2b-Fc (n=8), Chimera 3-Fc (n=8), Chimera 4-Fc (n=8), Chimera 5-Fc (n=8), or Chimera 2 I65E N66T E81 Q-Fc (n=9) at a dose of 0.75 mg/kg. Seven days post HDI, blood was sampled from the submandibular vein in restrained conscious mice. EDTA was used as an anticoagulant and blood was analyzed using a Heska HT5 veterinary blood analyzer. The study was terminated after 28 days and terminal body and lean mass were determined. Serum exposure levels of each chimera were determined by ELISA from terminal bleeds. μCT analysis was used to quantify tibial trabecular bone morphometry and tibial bone density.

Figure 7:
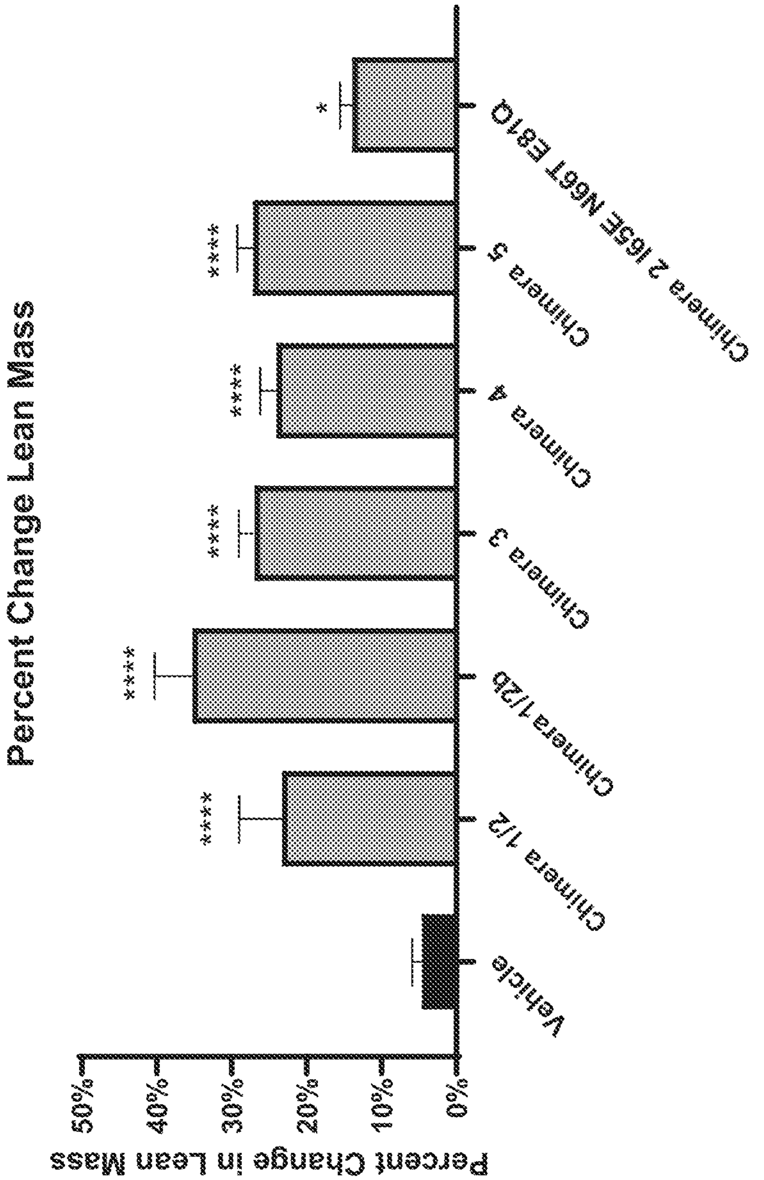
FIG. 7 is a bar graph showing the effect of ActRII chimeras on lean mass. Ten-week-old wild type male C57Bl/6 mice received a hydrodynamic tail vain injection (HDI) with vehicle (n=7) or vehicle containing an expression vector for either Chimera 1/2-Fc (n=9), Chimera 1/2b-Fc (n=8), Chimera 3-Fc (n=8), Chimera 4-Fc (n=8), Chimera 5-Fc (n=8), or Chimera 2 I65E N66T E81 Q-Fc (n=9) at a dose of 0.75 mg/kg. Pre-dosing, mice were weight and lean mass determined using a small rodent nuclear magnetic resonance (NMR) analyzer (Bruker, Minispec LF50). The study was terminated after 28 days and terminal body and lean mass were determined.
Figure 8A:
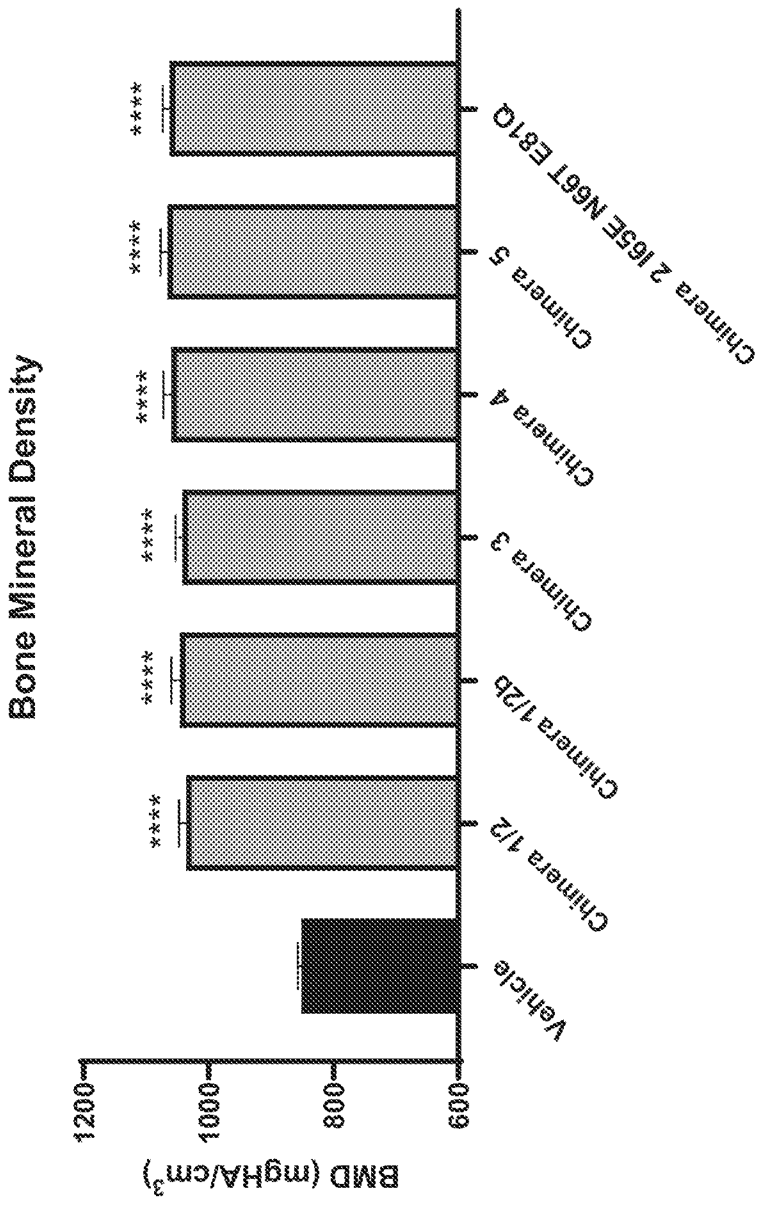
FIGS. 8A-8D are a series of bar graphs showing the effects of extracellular ActRII chimeras on bone density and structure. Ten-week-old wild type male C57Bl/6 mice received a hydrodynamic tail vain injection (HDI) with vehicle (n=7) or vehicle containing an expression vector for either Chimera 1/2-Fc (n=9), Chimera 1/2b-Fc (n=8), Chimera 3-Fc (n=8), Chimera 4-Fc (n=8), Chimera 5-Fc (n=8), or Chimera 2 I65E N66T E81 Q-Fc (n=9) at a dose of 0.75 mg/kg. μCT analysis was used to quantify tibial trabecular bone morphometry and tibial bone density. The effect of the extracellular ActRII chimeras on tibial bone mineral density, trabecular bone volume fraction of the proximal end of the tibia, trabecular spacing within the proximal end of the tibia, and trabecular number of the proximal end of the tibia are shown in FIGS. 8A-8D. Data are shown as average±SEM. Statistics are shown relative to vehicle treatment using a 1-way ANOVA with a Fisher's LSD post test. *P≤0.05, P<0.01, *P<0.001, ****P<0.0001.
Figure 8B:
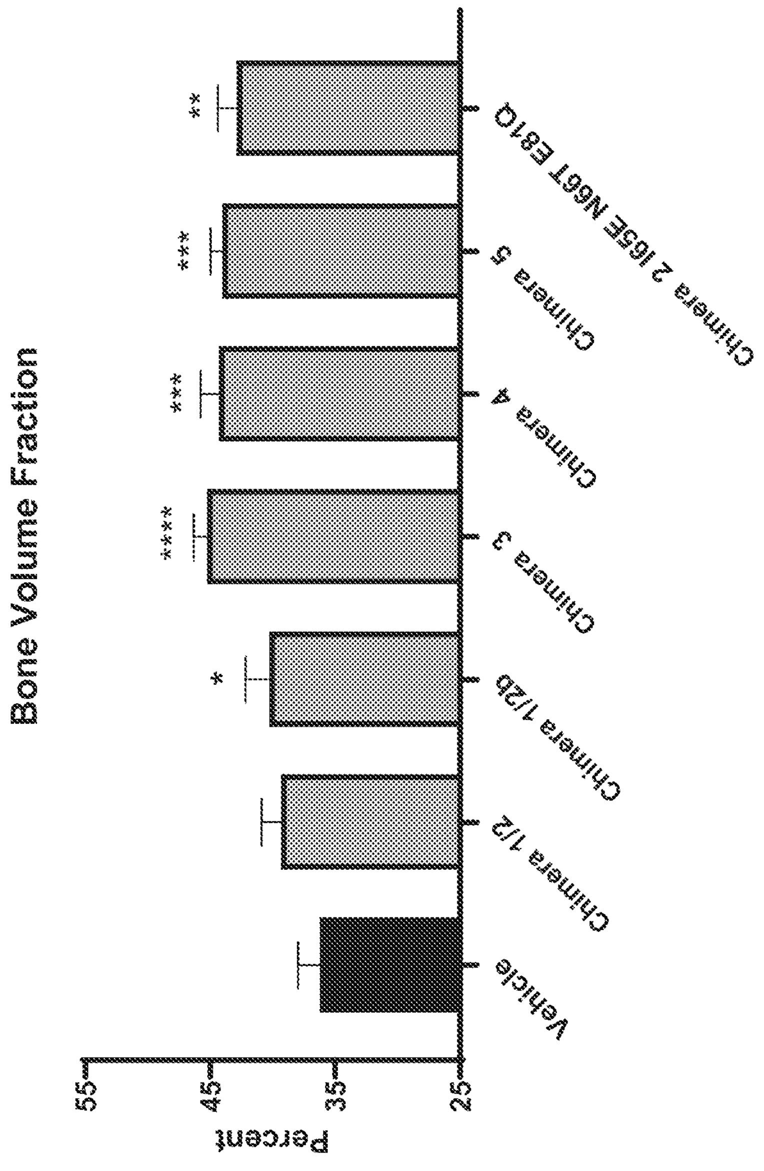
Figure 8C:
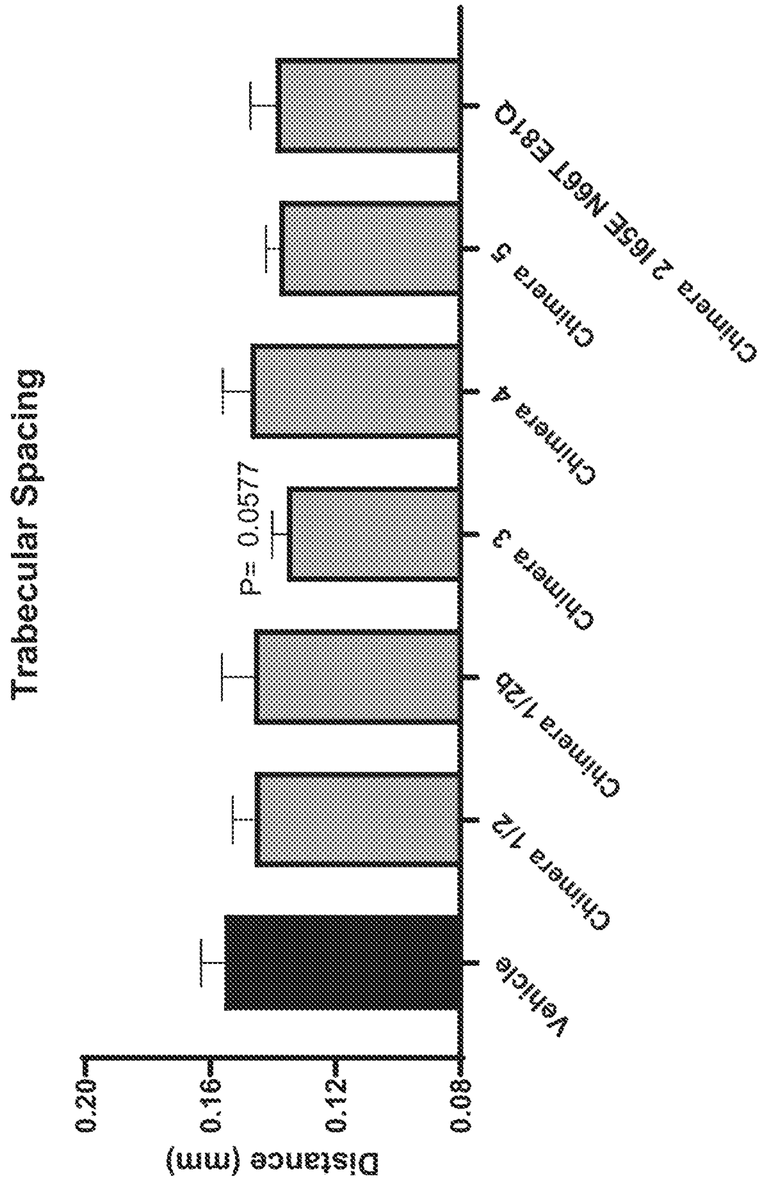
Figure 8D:
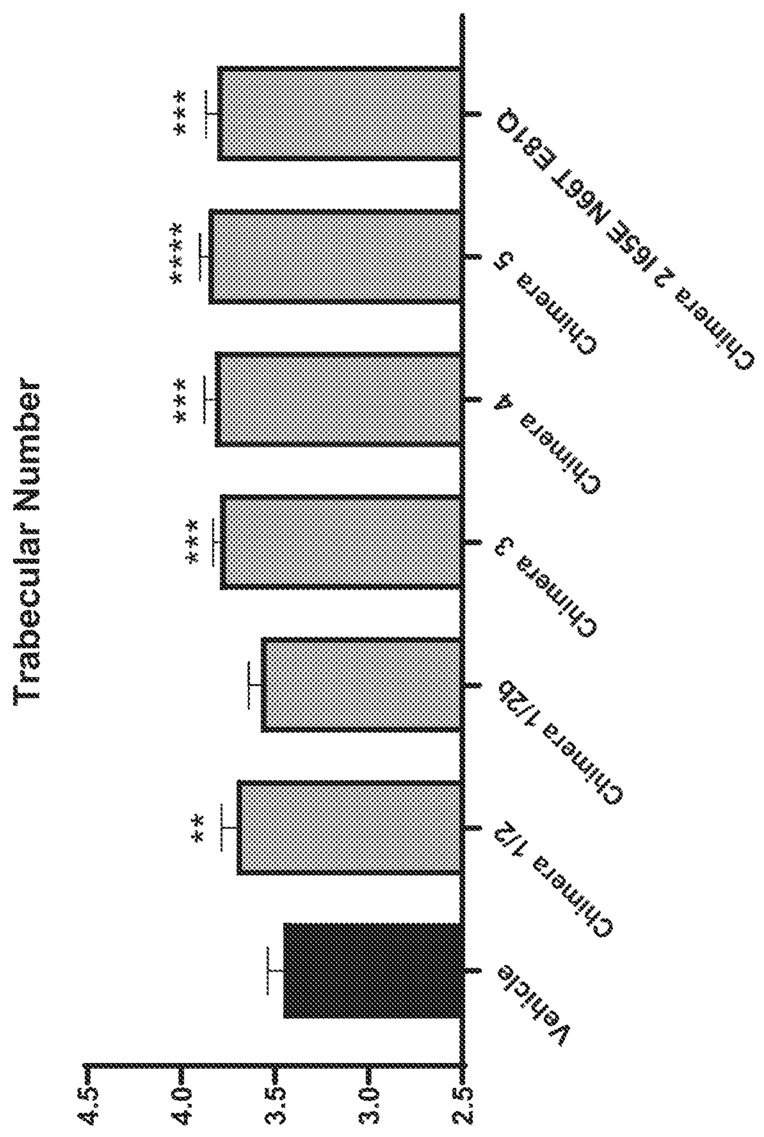

The effect of extracellular ActRII chimeras on red blood cell, hemoglobin, and hematocrit levels and absolute reticulocytes is shown in FIGS. 6A-6D. Data are shown as average±SEM. Statistics are shown relative to vehicle treatment using 1-way ANOVA with a Fisher's LSD post test. *P<0.001,  P<0.0001. FIG. 7** shows the effect of the extracellular ActRII chimeras on lean mass. Data are shown as average±SEM. Statistics are shown relative to vehicle treatment using 1-way ANOVA with a Fisher's LSD post test. *P≤0.05 and **P<0.0001. The effect of the extracellular ActRII chimeras on tibial bone mineral density, trabecular bone volume fraction of the proximal end of the tibia, trabecular spacing within the proximal end of the tibia, and trabecular number of the proximal end of the tibia are shown in FIGS. 8A-8**D. Data are shown as average±SEM. Statistics are shown relative to vehicle treatment using 1-way ANOVA with a Fisher's LSD post test. *P≤0.05, P<0.01, *P<0.001, ****P<0.0001.

Example 6—Effect of Extracellular ActRII Chimeras on Renal Fibrosis

The effect of extracellular ActRII chimeras on renal fibrosis is determined using a unilateral ureteral obstruction (UUO) mouse model of renal fibrosis. The UUO model involves complete ligation of the left ureter while keeping the right kidney function intact. Briefly, UUO is performed on mice under anesthesia, whereby the left ureter is accessed via flank incision, and two ligatures are placed on the proximal one-third of the ureter using silk thread at 5 mm apart. Sham surgeries are performed in a similar fashion without placing any ligatures on the ureter. In this model, severe fibrosis develops in the kidney within 14 days following UUO, assessed by measuring kidney collagen by directly measuring the amount of hydroxyproline in the sample. Fourteen days following UUO, dry kidney weight decreases as a result of parenchymal damage. Sham or UUO surgeries are performed on 16-week old male C57BL/6 mice, and the UUO surgery mice are divided into two groups. Each UUO group receives a subcutaneous injection of either an ActRII chimera (10 mg/kg) or vehicle (dosed body weight volume), which does not bind to any known mouse protein, starting a day before the surgeries, and on 1, 3, 6, 8, 10, and 13 days after the surgery. Sham surgery mice receive vehicle (sterile PBS) during this time using the same schedule as the UUO groups. All the mice are sacrificed on day 14 following surgery. The kidney weights are measured, and the kidneys are flash-frozen using liquid nitrogen and kept at −80° C. until the collagen content is measured by measuring the amount of hydroxyproline to assess fibrosis.

Example 7—Effect of Extracellular ActRII Chimeras on PAH

In one experiment, PAH is induced in male rats using a single subcutaneous injection of monocrotaline (MCT, 40 mg/kg). To determine whether treatment with ActRII chimeras can prevent the development of PAH, rats are randomized into vehicle or ActRII chimera treatment groups 24 hours after PAH induction and treated twice per week with an ActRII chimera (5 or 15 mg/kg) or vehicle for 21 days. Ventricular function and right ventricular (RV) remodeling are examined by electrocardiogram at day 14 by anesthetizing rats with 1.5% isoflurane and using a small animal high-frequency ultrasound probe to detect pulmonary flow acceleration, right ventricular function and hypertrophy, and left ventricular function while the animal is held in a supine position. Doppler across the mitral and tricuspid valves is used to determine if treatment with the ActRII chimera induces any obvious regurgitation or lesions. On day 21, rats are anesthetized with pentobarbital, intubated through the trachea, and mechanically ventilated using a rodent ventilator. Hemodynamics are assessed using a fluid-filled catheter through the RV apex. Rats are perfused with PBS followed by 1% formaldehyde. To measure RV hypertrophy (RVH), the heart is removed and the RV free wall dissected from the left ventricle plus septum (LV+S) and weighed separately. Degree of RVH is determined from the ratio RV/(LV+S).

In a second experiment, PAH is induced in male rats using a single subcutaneous injection of monocrotaline (MCT, 40 mg/kg). To determine whether treatment with ActRII chimeras can slow or reduce the progression of PAH, rats are injected again with MCT on day 18 and randomized into vehicle or ActRII chimera treatment groups. Rats are injected three times per week with an ActRII chimera (15 mg/kg) or vehicle. Hemodynamics and RVH are examined on day 35 as described above.

Example 8—Effect of Extracellular ActRII Chimeras on Obesity

Adult male C57BL/6 mice are assigned to weight-matched treatment groups (n=10/group). All animals are maintained on either regular chow diet (Chow; Purina LabDiet 5001; St. Louis, MO) or high fat diet (HFD; Research Diets D12331; New Brunswick, NJ). Chow- and HFD-fed groups are further divided into groups that are dosed twice weekly with either an ActRII chimera or vehicle for a period of 60 days. Body weights are measured twice per week at the time of treatment. Body composition is measured using the MiniSpec LF50 at baseline (before administration of treatments and transfer to HFD) and then every other week until the end of the study. At the study termination date, tissues of interest (serum, plasma, muscles, and fat depots) are surgically removed and weighed. Serum samples are subsequently evaluated for biomarkers of adiposity and plasma was evaluated for Hba1c levels.

Example 9—Treatment of Muscle Disease by Administration of an Extracellular ActRII Chimera According to the methods disclosed herein, a physician of skill in the art can treat a subject, such as a human patient, having muscle disease (e.g., neuromuscular disease, such as a muscular dystrophy, IBM, SMA, CMT, ALS, myasthenia gravis, or multiple sclerosis; sarcopenia; or cachexia) so as to increase muscle mass or maintain or improve muscle strength (e.g., reduce muscle weakness). The method of treatment can include diagnosing or identifying a subject as a candidate for treatment based on standard clinical tests for muscle diseases (e.g., blood test, muscle biopsy, genetic test, and/or electromyogram). To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) or by local administration (e.g., injection into the muscle) to treat muscle disease. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to increase muscle mass or maintain or improve muscle strength (e.g., reduce muscle weakness).

Following administration of the composition to a patient, a practitioner of skill in the art can monitor the patient's improvement in response to the therapy by a variety of methods. For example, a physician can monitor the patient's muscle mass, muscle strength, and motor function. A finding that the patient exhibits increased muscle mass or maintains or improves muscle strength following administration of the composition compared to test results prior to administration of the composition indicates that the patient is responding favorably to the treatment. Subsequent doses can be determined and administered as needed.

Example 10—Treatment of Bone Disease by Administration of an Extracellular ActRII Chimera According to the methods disclosed herein, a physician of skill in the art can treat a subject, such as a human patient, having bone disease (e.g., osteoporosis, osteogenesis imperfecta, or osteopenia) so as to increase bone mineral density, increase bone formation, reduce bone resorption, reduce bone loss, or reduce the risk or occurrence of bone fracture. The method of treatment can include diagnosing or identifying a subject as a candidate for treatment based on standard clinical tests for bone mineral density (e.g., dual X-ray absorptiometry). To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat bone disease. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to increase bone mineral density, increase bone formation, reduce bone resorption, reduce bone loss, or reduce the risk or occurrence of bone fracture.

Following administration of the composition to a patient, a practitioner of skill in the art can monitor the patient's improvement in response to the therapy by a variety of methods. For example, a physician can monitor the patient's bone mineral density by performing dual X-ray absorptiometry. A finding that the patient exhibits increased bone mineral density, increased bone formation, reduced bone resorption, reduced bone loss, or a reduced risk or occurrence of bone fracture following administration of the composition compared to test results prior to administration of the composition indicates that the patient is responding favorably to the treatment. Subsequent doses can be determined and administered as needed.

Example 11—Treatment of Anemia by Administration of an Extracellular ActRII Chimera According to the methods disclosed herein, a physician of skill in the art can treat a subject, such as a human patient, having anemia (e.g., anemia of inflammation, anemia associated with myelofibrosis, anemia associated with a myelodysplastic syndrome, or anemia associated with chronic kidney disease) so as to increase a parameter of red cell mass, such as red blood cell count, hemoglobin levels, or hematocrit, or to increase the maturation and/or differentiation of erythroid progenitors, increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage. The method of treatment can include diagnosing or identifying a subject as a candidate for treatment based on a blood test measuring hematological parameters. To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat anemia. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to increase hemoglobin levels, increase red blood cell counts, increase hematocrit, increase the maturation and/or differentiation of erythroid progenitors, increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage.

Following administration of the composition to a patient, a practitioner of skill in the art can monitor the patient's improvement in response to the therapy by a variety of methods. For example, a physician can monitor the patient's hemoglobin levels, red blood cell counts, or hematocrit by performing a blood test. A finding that the patient exhibits improved hemoglobin levels, red blood cell counts, or hematocrit following administration of the composition compared to test results prior to administration of the composition indicates that the patient is responding favorably to the treatment. Subsequent doses can be determined and administered as needed.

Example 12—Treatment of Fibrosis by Administration of an Extracellular ActRII Chimera According to the methods disclosed herein, a physician of skill in the art can treat a subject, such as a human patient, having fibrosis (e.g., pulmonary fibrosis, myelofibrosis, or fibrosis associated with chronic kidney disease) so as to reduce the symptoms of fibrosis or slow or stop the progression of fibrosis. The method of treatment can include diagnosing or identifying a subject as a candidate for treatment based on clinical tests for fibrosis (e.g., imaging tests, such as X-ray or CT scan). To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat fibrosis, or can be locally administered (e.g., injected) to the fibrotic tissue or organ. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to reduce the symptoms of fibrosis or slow or stop the progression of fibrosis.

Following administration of the composition to a patient, a practitioner of skill in the art can monitor the patient's improvement in response to the therapy by a variety of methods. For example, a physician can monitor the patient's fibrosis by performing imaging tests and can monitor the patient's symptoms using standard clinical tests. A finding that the patient's symptoms are reduced or that progression of the patient's fibrosis slows or stops following administration of the composition compared to test results prior to administration of the composition indicates that the patient is responding favorably to the treatment. Subsequent doses can be determined and administered as needed.

Example 13—Treatment of Pulmonary Hypertension by Administration of an Extracellular ActRII Chimera According to the methods disclosed herein, a physician of skill in the art can treat a subject, such as a human patient, having pulmonary hypertension (PH, e.g., PAH) so as to reduce the symptoms of PH or slow or stop the progression of PH. The method of treatment can include diagnosing or identifying a subject as a candidate for treatment based on standard clinical tests for PH (e.g., echocardiogram, electrocardiogram, chest X-ray, or right heart catheterization). To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat PH. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to reduce the symptoms of PH or slow or stop the progression of PH.

Following administration of the composition to a patient, a practitioner of skill in the art can monitor the patient's improvement in response to the therapy by a variety of methods. For example, a physician can monitor the patient's symptoms using standard clinical tests and patient self-reporting. A finding that the patient's symptoms are reduced the symptoms of PH or that progression of the patient's PH slows or stops following administration of the composition compared to test results prior to administration of the composition indicates that the patient is responding favorably to the treatment. Subsequent doses can be determined and administered as needed.

Example 14—Treatment of Metabolic Disease by Administration of an Extracellular ActRII Chimera According to the methods disclosed herein, a physician of skill in the art can treat a subject, such as a human patient, having a metabolic disease (e.g., obesity) so as to reduce body weight, body fat or percent body fat, or improve the serum lipid profile of the subject. To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat obesity. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to reduce body weight, body fat or percent body fat, or improve the serum lipid profile of the subject.

Following administration of the composition to a patient, a practitioner of skill in the art can monitor the patient's improvement in response to the therapy by a variety of methods. For example, a physician can monitor the patient's symptoms using standard clinical tests and patient self-reporting. A finding that the patient's body weight, body fat, or percent body fat is reduced, or that the patient's serum lipid profile is improved following administration of the composition compared to test results prior to administration of the composition indicates that the patient is responding favorably to the treatment. Subsequent doses can be determined and administered as needed.

Example 15—Treatment of Thrombocytopenia by Administration of an Extracellular ActRII Chimera According to the methods disclosed herein, a physician of skill in the art can treat a subject, such as a human patient, having thrombocytopenia (e.g., thrombocytopenia associated with a myelodysplastic syndrome or myelofibrosis) so as to increase platelet levels (e.g., increase platelet count), increase platelet production, and/or increase megakaryocyte differentiation and/or maturation. To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat thrombocytopenia. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to increase platelet levels (e.g., increase platelet count), increase platelet production, and/or increase megakaryocyte differentiation and/or maturation.

Following administration of the composition to a patient, a practitioner of skill in the art can monitor the patient's improvement in response to the therapy by a variety of methods. For example, a physician can monitor the patient's platelet count using a blood test. A finding that the patient's platelet levels are increased (e.g., a finding of an increased platelet count) following administration of the composition compared to test results prior to administration of the composition indicates that the patient is responding favorably to the treatment. Subsequent doses can be determined and administered as needed.

Example 16—Treatment of Neutropenia by Administration of an Extracellular ActRII Chimera According to the methods disclosed herein, a physician of skill in the art can treat a subject, such as a human patient, having neutropenia (e.g., neutropenia associated with a myelodysplastic syndrome or myelofibrosis) so as to increase neutrophil levels (e.g., increase neutrophil count), increase neutrophil production, and/or increase the differentiation and/or maturation of progenitor cells (e.g., myeloid progenitors, myeloblasts, or myelocytes) into neutrophils. To treat the subject, a physician of skill in the art can administer to the subject a composition containing an extracellular ActRII chimera (e.g., an extracellular ActRII chimera having the sequence of any one of SEQ ID NOs: 1-43 (e.g., SEQ ID NOs: 22-43)). The composition containing the extracellular ActRII chimera may be administered to the subject, for example, by parenteral injection (e.g., intravenous or subcutaneous injection) to treat neutropenia. The extracellular ActRII chimera (e.g., an extracellular ActRII chimera having the sequence of any one of SEQ ID NOs: 1-43 (e.g., SEQ ID NOs: 22-43)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRII chimera is administered bimonthly, once a month, once every four weeks, once every two weeks, or at least once a week or more (e.g., 1, 2, 3, 4, 5, 6, or 7 times a week or more). The extracellular ActRII chimera is administered in an amount sufficient to increase neutrophil levels (e.g., increase neutrophil count), increase neutrophil production, and/or increase the differentiation and/or maturation of progenitor cells (e.g., myeloid progenitors, myeloblasts, or myelocytes) into neutrophils.

Following administration of the composition to a patient, a practitioner of skill in the art can monitor the patient's improvement in response to the therapy by a variety of methods. For example, a physician can monitor the patient's neutrophil count using a blood test. A finding that the patient's neutrophil levels are increased (e.g., a finding of an increased neutrophil count) following administration of the composition compared to test results prior to administration of the composition indicates that the patient is responding favorably to the treatment. Subsequent doses can be determined and administered as needed.

OTHER EMBODIMENTS

While the invention has been described in connection with specific embodiments thereof, it will be understood that it is capable of further modifications and this application is intended to cover any variations, uses, or adaptations of the invention following, in general, the principles of the invention and including such departures from the present disclosure come within known or customary practice within the art to which the invention pertains and may be applied to the essential features hereinbefore set forth.

All publications, patents, and patent applications are herein incorporated by reference in their entirety to the same extent as if each individual publication, patent or patent application was specifically and individually indicated to be incorporated by reference in its entirety.

Other embodiments are within the following claims.

SEQUENCE LISTING

```
Sequence total quantity: 270
SEQ ID NO: 1           moltype = AA  length = 109
FEATURE                Location/Qualifiers
source                 1..109
                       mol_type = protein
                       organism = synthetic construct
                       note = Synthetic Construct
VARIANT                37
                       note = misc_feature - Xaa is Asp or Arg
VARIANT                65
                       note = misc_feature - Xaa is Ile, Phe, Glu, Asp, Tyr, Ser,
                        Asn, Gln, or Thr
VARIANT                66
```

```
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
                         note = misc_feature - Xaa is Asn or Ser
VARIANT                  81
                         note = misc_feature - Xaa is Gln, Glu, Lys, Arg, Asp, or Asn
SEQUENCE: 1
GAILGRAETR ECIYYNANWE LERTNQSGLE RCEGEQXKRR HCFATWKNIS GSIEIVKQGC  60
WLDDXXCYDR TDCVXXXXXP XVYFCCCEGN MCNEKFSYFP EMEVTQPTS             109

SEQ ID NO: 2             moltype = AA  length = 109
FEATURE                  Location/Qualifiers
source                   1..109
                         mol_type = protein
                         organism = synthetic construct
                         note = Synthetic Construct
VARIANT                  37
                         note = misc_feature - Xaa is Asp or Arg
VARIANT                  65
                         note = misc_feature - Xaa is Ile, Phe, Glu, Asp, Tyr, Ser,
                          Asn, Gln, or Thr
VARIANT                  66
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
                         note = misc_feature - Xaa is Asn or Ser
VARIANT                  81
                         note = misc_feature - Xaa is Gln, Glu, Lys, Arg, Asp, or Asn
SEQUENCE: 2
GAILGRAETR ECIYYNANWE LERTNQSGLE RCEGEQXKRL HCFATWKNIS GSIEIVKQGC  60
WLDDXXCYDR TDCVXXXXXP XVYFCCCEGN MCNEKFSYFP EMEVTQPTS             109

SEQ ID NO: 3             moltype = AA  length = 109
FEATURE                  Location/Qualifiers
source                   1..109
                         mol_type = protein
                         organism = synthetic construct
                         note = Synthetic Construct
VARIANT                  37
                         note = misc_feature - Xaa is Asp or Arg
VARIANT                  65
                         note = misc_feature - Xaa is Ile, Phe, Glu, Asp, Tyr, Ser,
                          Asn, Gln, or Thr
VARIANT                  66
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
                         note = misc_feature - Xaa is Asn or Ser
VARIANT                  81
                         note = misc_feature - Xaa is Gln, Glu, Lys, Arg, Asp, or Asn
SEQUENCE: 3
GAILGRAETR ECIYYNANWE LERTNQSGLE RCEGEQXKRL HCYASWKNIS GSIEIVKQGC  60
WLDDXXCYDR TDCVXXXXXP XVYFCCCEGN MCNEKFSYFP EMEVTQPTS             109

SEQ ID NO: 4             moltype = AA  length = 109
FEATURE                  Location/Qualifiers
source                   1..109
                         mol_type = protein
```

```
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 4
GAILGRAETR ECIYYNANWE LERTNQSGLE RCEGEQXKRL HCYASWRNSS GSIEIVKQGC  60
WLDDXXCYDR TDCVXXXXXP XVYFCCCEGN MCNEKFSYFP EMEVTQPTS              109

SEQ ID NO: 5            moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 5
GAILGRAETR ECIYYNANWE LERTNQSGLE RCEGEQXKRL HCYASWRNSS GTIEIVKQGC  60
WLDDXXCYDR TDCVXXXXXP XVYFCCCEGN MCNEKFSYFP EMEVTQPTS              109

SEQ ID NO: 6            moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
```

```
SEQUENCE: 6
GAILGRAETR ECIYYNANWE LERTNQSGLE RCEGEQXKRL HCYASWRNSS GTIELVKKGC  60
WLDDXXCYDR TDCVXXXXXP XVYFCCCEGN MCNEKFSYFP EMEVTQPTS              109

SEQ ID NO: 7            moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 7
GAILGRAETR ECIYYNANWE LERTNQSGLE RCEGEQXKRL HCYASWRNSS GTIELVKKGC  60
WLDDXXCYDR QECVXXXXXP XVYFCCCEGN MCNEKFSYFP EMEVTQPTS              109

SEQ ID NO: 8            moltype = AA  length = 107
FEATURE                 Location/Qualifiers
source                  1..107
                        mol_type = protein
                        organism = synthetic construct
                        note = Synthetic Construct
VARIANT                 35
                        note = misc_feature - Xaa is Asp or Arg
VARIANT                 63
                        note = misc_feature - Xaa is Ile, Phe, Glu, Asp, Tyr, Ser,
                         Asn, Gln, or Thr
VARIANT                 64
                        note = misc_feature - Xaa is Asn or Thr
VARIANT                 73
                        note = misc_feature - Xaa is Ala or Glu
VARIANT                 74
                        note = misc_feature - Xaa is Thr or Lys
VARIANT                 75
                        note = misc_feature - Xaa is Glu or Lys
VARIANT                 76
                        note = misc_feature - Xaa is Glu or Asp
VARIANT                 77
                        note = misc_feature - Xaa is Asn or Ser
VARIANT                 79
                        note = misc_feature - Xaa is Gln, Glu, Lys, Arg, Asp, or Asn
SEQUENCE: 8
GRGEAETREC IYYNANWELE RTNQSGLERC EGEQXKRRHC FATWKNISGS IEIVKQGCWL  60
DDXXCYDRTD CVXXXXXPXV YFCCCEGNMC NEKFSYFPEM EVTQPTS                107

SEQ ID NO: 9            moltype = AA  length = 107
FEATURE                 Location/Qualifiers
source                  1..107
                        mol_type = protein
                        organism = synthetic construct
                        note = Synthetic Construct
VARIANT                 35
                        note = misc_feature - Xaa is Asp or Arg
VARIANT                 63
                        note = misc_feature - Xaa is Ile, Phe, Glu, Asp, Tyr, Ser,
                         Asn, Gln, or Thr
VARIANT                 64
                        note = misc_feature - Xaa is Asn or Thr
VARIANT                 73
                        note = misc_feature - Xaa is Ala or Glu
VARIANT                 74
                        note = misc_feature - Xaa is Thr or Lys
```

```
VARIANT                 75
                        note = misc_feature - Xaa is Glu or Lys
VARIANT                 76
                        note = misc_feature - Xaa is Glu or Asp
VARIANT                 77
                        note = misc_feature - Xaa is Asn or Ser
VARIANT                 79
                        note = misc_feature - Xaa is Gln, Glu, Lys, Arg, Asp, or Asn
SEQUENCE: 9
GRGEAETREC IYYNANWELE RTNQSGLERC EGEQXKRLHC FATWKNISGS IEIVKQGCWL  60
DDXXCYDRTD CVXXXXXPXV YFCCCEGNMC NEKFSYFPEM EVTQPTS                107

SEQ ID NO: 10           moltype = AA  length = 107
FEATURE                 Location/Qualifiers
source                  1..107
                        mol_type = protein
                        organism = synthetic construct
                        note = Synthetic Construct
VARIANT                 35
                        note = misc_feature - Xaa is Asp or Arg
VARIANT                 63
                        note = misc_feature - Xaa is Ile, Phe, Glu, Asp, Tyr, Ser,
                         Asn, Gln, or Thr
VARIANT                 64
                        note = misc_feature - Xaa is Asn or Thr
VARIANT                 73
                        note = misc_feature - Xaa is Ala or Glu
VARIANT                 74
                        note = misc_feature - Xaa is Thr or Lys
VARIANT                 75
                        note = misc_feature - Xaa is Glu or Lys
VARIANT                 76
                        note = misc_feature - Xaa is Glu or Asp
VARIANT                 77
                        note = misc_feature - Xaa is Asn or Ser
VARIANT                 79
                        note = misc_feature - Xaa is Gln, Glu, Lys, Arg, Asp, or Asn
SEQUENCE: 10
GRGEAETREC IYYNANWELE RTNQSGLERC EGEQXKRLHC YASWKNISGS IEIVKQGCWL  60
DDXXCYDRTD CVXXXXXPXV YFCCCEGNMC NEKFSYFPEM EVTQPTS                107

SEQ ID NO: 11           moltype = AA  length = 107
FEATURE                 Location/Qualifiers
source                  1..107
                        mol_type = protein
                        organism = synthetic construct
                        note = Synthetic Construct
VARIANT                 35
                        note = misc_feature - Xaa is Asp or Arg
VARIANT                 63
                        note = misc_feature - Xaa is Ile, Phe, Glu, Asp, Tyr, Ser,
                         Asn, Gln, or Thr
VARIANT                 64
                        note = misc_feature - Xaa is Asn or Thr
VARIANT                 73
                        note = misc_feature - Xaa is Ala or Glu
VARIANT                 74
                        note = misc_feature - Xaa is Thr or Lys
VARIANT                 75
                        note = misc_feature - Xaa is Glu or Lys
VARIANT                 76
                        note = misc_feature - Xaa is Glu or Asp
VARIANT                 77
                        note = misc_feature - Xaa is Asn or Ser
VARIANT                 79
                        note = misc_feature - Xaa is Gln, Glu, Lys, Arg, Asp, or Asn
SEQUENCE: 11
GRGEAETREC IYYNANWELE RTNQSGLERC EGEQXKRLHC YASWRNSSGS IEIVKQGCWL  60
DDXXCYDRTD CVXXXXXPXV YFCCCEGNMC NEKFSYFPEM EVTQPTS                107

SEQ ID NO: 12           moltype = AA  length = 107
FEATURE                 Location/Qualifiers
source                  1..107
                        mol_type = protein
                        organism = synthetic construct
                        note = Synthetic Construct
VARIANT                 35
                        note = misc_feature - Xaa is Asp or Arg
VARIANT                 63
```

```
                       note = misc_feature - Xaa is Ile, Phe, Glu, Asp, Tyr, Ser,
                        Asn, Gln, or Thr
VARIANT                64
                       note = misc_feature - Xaa is Asn or Thr
VARIANT                73
                       note = misc_feature - Xaa is Ala or Glu
VARIANT                74
                       note = misc_feature - Xaa is Thr or Lys
VARIANT                75
                       note = misc_feature - Xaa is Glu or Lys
VARIANT                76
                       note = misc_feature - Xaa is Glu or Asp
VARIANT                77
                       note = misc_feature - Xaa is Asn or Ser
VARIANT                79
                       note = misc_feature - Xaa is Gln, Glu, Lys, Arg, Asp, or Asn
SEQUENCE: 12
GRGEAETREC IYYNANWELE RTNQSGLERC EGEQXKRLHC YASWRNSSGT IEIVKQGCWL  60
DDXXCYDRTD CVXXXXXPXV YFCCCEGNMC NEKFSYFPEM EVTQPTS                107

SEQ ID NO: 13          moltype = AA  length = 107
FEATURE                Location/Qualifiers
source                 1..107
                       mol_type = protein
                       organism = synthetic construct
                       note = Synthetic Construct
VARIANT                35
                       note = misc_feature - Xaa is Asp or Arg
VARIANT                63
                       note = misc_feature - Xaa is Ile, Phe, Glu, Asp, Tyr, Ser,
                        Asn, Gln, or Thr
VARIANT                64
                       note = misc_feature - Xaa is Asn or Thr
VARIANT                73
                       note = misc_feature - Xaa is Ala or Glu
VARIANT                74
                       note = misc_feature - Xaa is Thr or Lys
VARIANT                75
                       note = misc_feature - Xaa is Glu or Lys
VARIANT                76
                       note = misc_feature - Xaa is Glu or Asp
VARIANT                77
                       note = misc_feature - Xaa is Asn or Ser
VARIANT                79
                       note = misc_feature - Xaa is Gln, Glu, Lys, Arg, Asp, or Asn
SEQUENCE: 13
GRGEAETREC IYYNANWELE RTNQSGLERC EGEQXKRLHC YASWRNSSGT IELVKKGCWL  60
DDXXCYDRTD CVXXXXXPXV YFCCCEGNMC NEKFSYFPEM EVTQPTS                107

SEQ ID NO: 14          moltype = AA  length = 107
FEATURE                Location/Qualifiers
source                 1..107
                       mol_type = protein
                       organism = synthetic construct
                       note = Synthetic Construct
VARIANT                35
                       note = misc_feature - Xaa is Asp or Arg
VARIANT                63
                       note = misc_feature - Xaa is Ile, Phe, Glu, Asp, Tyr, Ser,
                        Asn, Gln, or Thr
VARIANT                64
                       note = misc_feature - Xaa is Asn or Thr
VARIANT                73
                       note = misc_feature - Xaa is Ala or Glu
VARIANT                74
                       note = misc_feature - Xaa is Thr or Lys
VARIANT                75
                       note = misc_feature - Xaa is Glu or Lys
VARIANT                76
                       note = misc_feature - Xaa is Glu or Asp
VARIANT                77
                       note = misc_feature - Xaa is Asn or Ser
VARIANT                79
                       note = misc_feature - Xaa is Gln, Glu, Lys, Arg, Asp, or Asn
SEQUENCE: 14
GRGEAETREC IYYNANWELE RTNQSGLERC EGEQXKRLHC YASWRNSSGT IELVKKGCWL  60
DDXXCYDRQE CVXXXXXPXV YFCCCEGNMC NEKFSYFPEM EVTQPTS                107

SEQ ID NO: 15          moltype = AA  length = 109
```

```
FEATURE                  Location/Qualifiers
source                   1..109
                         mol_type = protein
                         organism = synthetic construct
                         note = Synthetic Construct
VARIANT                  37
                         note = misc_feature - Xaa is Asp or Arg
VARIANT                  65
                         note = misc_feature - Xaa is Ile, Phe, Glu, Asp, Tyr, Ser,
                          Asn, Gln, or Thr
VARIANT                  66
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
                         note = misc_feature - Xaa is Asn or Ser
VARIANT                  81
                         note = misc_feature - Xaa is Gln, Glu, Lys, Arg, Asp, or Asn
SEQUENCE: 15
GAILGRSETQ ECIYYNANWE LERTNQSGLE RCEGEQXKRR HCFATWKNIS GSIEIVKQGC  60
WLDDXXCYDR TDCVXXXXXP XVYFCCCEGN MCNEKFSYFP EMEVTQPTS              109

SEQ ID NO: 16            moltype = AA  length = 109
FEATURE                  Location/Qualifiers
source                   1..109
                         mol_type = protein
                         organism = synthetic construct
                         note = Synthetic Construct
VARIANT                  37
                         note = misc_feature - Xaa is Asp or Arg
VARIANT                  65
                         note = misc_feature - Xaa is Ile, Phe, Glu, Asp, Tyr, Ser,
                          Asn, Gln, or Thr
VARIANT                  66
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
                         note = misc_feature - Xaa is Asn or Ser
VARIANT                  81
                         note = misc_feature - Xaa is Gln, Glu, Lys, Arg, Asp, or Asn
SEQUENCE: 16
GAILGRSETQ ECIYYNANWE LERTNQSGLE RCEGEQXKRL HCFATWKNIS GSIEIVKQGC  60
WLDDXXCYDR TDCVXXXXXP XVYFCCCEGN MCNEKFSYFP EMEVTQPTS              109

SEQ ID NO: 17            moltype = AA  length = 109
FEATURE                  Location/Qualifiers
source                   1..109
                         mol_type = protein
                         organism = synthetic construct
                         note = Synthetic Construct
VARIANT                  37
                         note = misc_feature - Xaa is Asp or Arg
VARIANT                  65
                         note = misc_feature - Xaa is Ile, Phe, Glu, Asp, Tyr, Ser,
                          Asn, Gln, or Thr
VARIANT                  66
                         note = misc_feature - Xaa is Asn or Thr
VARIANT                  75
                         note = misc_feature - Xaa is Ala or Glu
VARIANT                  76
                         note = misc_feature - Xaa is Thr or Lys
VARIANT                  77
                         note = misc_feature - Xaa is Glu or Lys
VARIANT                  78
                         note = misc_feature - Xaa is Glu or Asp
VARIANT                  79
```

```
                        note = misc_feature - Xaa is Asn or Ser
VARIANT                 81
                        note = misc_feature - Xaa is Gln, Glu, Lys, Arg, Asp, or Asn
SEQUENCE: 17
GAILGRSETQ ECIYYNANWE LERTNQSGLE RCEGEQXKRL HCYASWKNIS GSIEIVKQGC  60
WLDDXXCYDR TDCVXXXXXP XVYFCCCEGN MCNEKFSYFP EMEVTQPTS              109

SEQ ID NO: 18           moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 18
GAILGRSETQ ECIYYNANWE LERTNQSGLE RCEGEQXKRL HCYASWRNSS GSIEIVKQGC  60
WLDDXXCYDR TDCVXXXXXP XVYFCCCEGN MCNEKFSYFP EMEVTQPTS              109

SEQ ID NO: 19           moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 19
GAILGRSETQ ECIYYNANWE LERTNQSGLE RCEGEQXKRL HCYASWRNSS GTIEIVKQGC  60
WLDDXXCYDR TDCVXXXXXP XVYFCCCEGN MCNEKFSYFP EMEVTQPTS              109

SEQ ID NO: 20           moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
```

```
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 20
GAILGRSETQ ECIYYNANWE LERTNQSGLE RCEGEQXKRL HCYASWRNSS GTIELVKKGC  60
WLDDXXCYDR TDCVXXXXXP XVYFCCCEGN MCNEKFSYFP EMEVTQPTS              109

SEQ ID NO: 21           moltype = AA  length = 109
FEATURE                 Location/Qualifiers
source                  1..109
                        mol_type = protein
                        organism = synthetic construct
                        note = Synthetic Construct
VARIANT                 37
                        note = misc_feature - Xaa is Asp or Arg
VARIANT                 65
                        note = misc_feature - Xaa is Ile, Phe, Glu, Asp, Tyr, Ser,
                         Asn, Gln, or Thr
VARIANT                 66
                        note = misc_feature - Xaa is Asn or Thr
VARIANT                 75
                        note = misc_feature - Xaa is Ala or Glu
VARIANT                 76
                        note = misc_feature - Xaa is Thr or Lys
VARIANT                 77
                        note = misc_feature - Xaa is Glu or Lys
VARIANT                 78
                        note = misc_feature - Xaa is Glu or Asp
VARIANT                 79
                        note = misc_feature - Xaa is Asn or Ser
VARIANT                 81
                        note = misc_feature - Xaa is Gln, Glu, Lys, Arg, Asp, or Asn
SEQUENCE: 21
GAILGRSETQ ECIYYNANWE LERTNQSGLE RCEGEQXKRL HCYASWRNSS GTIELVKKGC  60
WLDDXXCYDR QECVXXXXXP XVYFCCCEGN MCNEKFSYFP EMEVTQPTS              109

SEQ ID NO: 22           moltype = AA  length = 109
FEATURE                 Location/Qualifiers
source                  1..109
                        mol_type = protein
                        organism = synthetic construct
                        note = Synthetic Construct
SEQUENCE: 22
GAILGRAETR ECIYYNANWE LERTNQSGLE RCEGEQDKRL HCYASWRNSS GTIEIVKQGC  60
WLDDINCYDR TDCVATEENP QVYFCCCEGN MCNEKFSYFP EMEVTQPTS              109

SEQ ID NO: 23           moltype = AA  length = 107
FEATURE                 Location/Qualifiers
source                  1..107
                        mol_type = protein
                        organism = synthetic construct
                        note = Synthetic Construct
SEQUENCE: 23
GRGEAETREC IYYNANWELE RTNQSGLERC EGEQDKRLHC YASWRNSSGT IEIVKQGCWL  60
DDINCYDRTD CVEKKDSPEV YFCCCEGNMC NEKFSYFPEM EVTQPTS                107

SEQ ID NO: 24           moltype = AA  length = 107
FEATURE                 Location/Qualifiers
source                  1..107
                        mol_type = protein
                        organism = synthetic construct
                        note = Synthetic Construct
SEQUENCE: 24
GRGEAETREC IYYNANWELE RTNQSGLERC EGEQDKRLHC YASWRNSSGT IEIVKQGCWL  60
DDINCYDRTD CVEKKDSPQV YFCCCEGNMC NEKFSYFPEM EVTQPTS                107

SEQ ID NO: 25           moltype = AA  length = 107
FEATURE                 Location/Qualifiers
source                  1..107
                        mol_type = protein
                        organism = synthetic construct
```

```
                        note = Synthetic Construct
SEQUENCE: 25
GRGEAETREC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTS                107

SEQ ID NO: 26           moltype = AA  length = 109
FEATURE                 Location/Qualifiers
source                  1..109
                        mol_type = protein
                        organism = synthetic construct
                        note = Synthetic Construct
SEQUENCE: 26
GAILGRAETR ECIYYNANWE LERTNQSGLE RCEGEQDKRL HCYASWRNSS GTIEIVKQGC  60
WLDDFNCYDR TDCVATEENP QVYFCCCEGN MCNEKFSYFP EMEVTQPTS              109

SEQ ID NO: 27           moltype = AA  length = 107
FEATURE                 Location/Qualifiers
source                  1..107
                        mol_type = protein
                        organism = synthetic construct
                        note = Synthetic Construct
SEQUENCE: 27
GRGEAETREC IYYNANWELE RTNQSGLERC EGEQDKRLHC YASWRNSSGT IEIVKQGCWL  60
DDFNCYDRTD CVEKKDSPEV YFCCCEGNMC NEKFSYFPEM EVTQPTS                107

SEQ ID NO: 28           moltype = AA  length = 107
FEATURE                 Location/Qualifiers
source                  1..107
                        mol_type = protein
                        organism = synthetic construct
                        note = Synthetic Construct
SEQUENCE: 28
GRGEAETREC IYYNANWELE RTNQSGLERC EGEQDKRRHC FATWKNISGS IEIVKQGCWL  60
DDFNCYDRTD CVEKKDSPQV YFCCCEGNMC NEKFSYFPEM EVTQPTS                107

SEQ ID NO: 29           moltype = AA  length = 107
FEATURE                 Location/Qualifiers
source                  1..107
                        mol_type = protein
                        organism = synthetic construct
                        note = Synthetic Construct
SEQUENCE: 29
GRGEAETREC IYYNANWELE RTNQSGLERC EGEQDKRLHC FATWKNISGS IEIVKQGCWL  60
DDFNCYDRTD CVEKKDSPQV YFCCCEGNMC NEKFSYFPEM EVTQPTS                107

SEQ ID NO: 30           moltype = AA  length = 107
FEATURE                 Location/Qualifiers
source                  1..107
                        mol_type = protein
                        organism = synthetic construct
                        note = Synthetic Construct
SEQUENCE: 30
GRGEAETREC IYYNANWELE RTNQSGLERC EGEQDKRLHC YASWKNISGS IEIVKQGCWL  60
DDFNCYDRTD CVEKKDSPQV YFCCCEGNMC NEKFSYFPEM EVTQPTS                107

SEQ ID NO: 31           moltype = AA  length = 107
FEATURE                 Location/Qualifiers
source                  1..107
                        mol_type = protein
                        organism = synthetic construct
                        note = Synthetic Construct
SEQUENCE: 31
GRGEAETREC IYYNANWELE RTNQSGLERC EGEQDKRLHC YASWRNSSGS IEIVKQGCWL  60
DDFNCYDRTD CVEKKDSPQV YFCCCEGNMC NEKFSYFPEM EVTQPTS                107

SEQ ID NO: 32           moltype = AA  length = 107
FEATURE                 Location/Qualifiers
source                  1..107
                        mol_type = protein
                        organism = synthetic construct
                        note = Synthetic Construct
SEQUENCE: 32
GRGEAETREC IYYNANWELE RTNQSGLERC EGEQDKRLHC YASWRNSSGT IELVKKGCWL  60
DDFNCYDRTD CVEKKDSPQV YFCCCEGNMC NEKFSYFPEM EVTQPTS                107

SEQ ID NO: 33           moltype = AA  length = 107
FEATURE                 Location/Qualifiers
source                  1..107
                        mol_type = protein
```

```
                         organism = synthetic construct
                         note = Synthetic Construct
SEQUENCE: 33
GRGEAETREC IYYNANWELE RTNQSGLERC EGEQDKRLHC YASWRNSSGT IELVKKGCWL  60
DDFNCYDRQE CVATKDSPQV YFCCCEGNMC NEKFSYFPEM EVTQPTS             107

SEQ ID NO: 34            moltype = AA  length = 107
FEATURE                  Location/Qualifiers
source                   1..107
                         mol_type = protein
                         organism = synthetic construct
                         note = Synthetic Construct
SEQUENCE: 34
GRGEAETREC IYYNANWELE RTNQSGLERC EGEQDKRLHC YASWRNSSGT IELVKKGCWL  60
DDFNCYDRQE CVATEENPQV YFCCCEGNMC NEKFSYFPEM EVTQPTS             107

SEQ ID NO: 35            moltype = AA  length = 107
FEATURE                  Location/Qualifiers
source                   1..107
                         mol_type = protein
                         organism = synthetic construct
                         note = Synthetic Construct
SEQUENCE: 35
GRGEAETREC IYYNANWELE RTNQSGLERC EGEQDKRLHC YASWRNSSGT IEIVKQGCWL  60
DDNNCYDRTD CVEKKDSPQV YFCCCEGNMC NEKFSYFPEM EVTQPTS             107

SEQ ID NO: 36            moltype = AA  length = 107
FEATURE                  Location/Qualifiers
source                   1..107
                         mol_type = protein
                         organism = synthetic construct
                         note = Synthetic Construct
SEQUENCE: 36
GRGEAETREC IYYNANWELE RTNQSGLERC EGEQDKRLHC YASWRNSSGT IEIVKQGCWL  60
DDTNCYDRTD CVEKKDSPQV YFCCCEGNMC NEKFSYFPEM EVTQPTS             107

SEQ ID NO: 37            moltype = AA  length = 107
FEATURE                  Location/Qualifiers
source                   1..107
                         mol_type = protein
                         organism = synthetic construct
                         note = Synthetic Construct
SEQUENCE: 37
GRGEAETREC IYYNANWELE RTNQSGLERC EGEQDKRLHC YASWRNSSGT IEIVKQGCWL  60
DDETCYDRTD CVEKKDSPQV YFCCCEGNMC NEKFSYFPEM EVTQPTS             107

SEQ ID NO: 38            moltype = AA  length = 107
FEATURE                  Location/Qualifiers
source                   1..107
                         mol_type = protein
                         organism = synthetic construct
                         note = Synthetic Construct
SEQUENCE: 38
GRGEAETREC IYYNANWELE RTNQSGLERC EGEQRKRLHC YASWRNSSGT IEIVKQGCWL  60
DDFNCYDRTD CVEKKDSPQV YFCCCEGNMC NEKFSYFPEM EVTQPTS             107

SEQ ID NO: 39            moltype = AA  length = 107
FEATURE                  Location/Qualifiers
source                   1..107
                         mol_type = protein
                         organism = synthetic construct
                         note = Synthetic Construct
SEQUENCE: 39
GRGEAETREC IYYNANWELE RTNQSGLERC EGEQDKRLHC YASWRNSSGT IEIVKQGCWL  60
DDFNCYDRTD CVETKDSPQV YFCCCEGNMC NEKFSYFPEM EVTQPTS             107

SEQ ID NO: 40            moltype = AA  length = 109
FEATURE                  Location/Qualifiers
source                   1..109
                         mol_type = protein
                         organism = synthetic construct
                         note = Synthetic Construct
SEQUENCE: 40
GAILGRAETR ECIYYNANWE LERTNQSGLE RCEGEQDKRL HCYASWRNSS GTIEIVKQGC  60
WLDDFNCYDR TDCVEKKDSP QVYFCCCEGN MCNEKFSYFP EMEVTQPTS           109

SEQ ID NO: 41            moltype = AA  length = 109
FEATURE                  Location/Qualifiers
source                   1..109
```

```
                         mol_type = protein
                         organism = synthetic construct
                         note = Synthetic Construct
SEQUENCE: 41
GAILGRSETQ ECIYYNANWE LERTNQSGLE RCEGEQDKRL HCYASWRNSS GTIEIVKQGC  60
WLDDFNCYDR TDCVEKKDSP QVYFCCCEGN MCNEKFSYFP EMEVTQPTS             109

SEQ ID NO: 42            moltype = AA  length = 107
FEATURE                  Location/Qualifiers
source                   1..107
                         mol_type = protein
                         organism = synthetic construct
                         note = Synthetic Construct
SEQUENCE: 42
GRGEAETREC IYYNANWELE RTNQSGLERC EGEQDKRLHC YASWRNSSGT IELVKKGCWL  60
DDFNCYDRQE CVATKDSPEV YFCCCEGNMC NEKFSYFPEM EVTQPTS               107

SEQ ID NO: 43            moltype = AA  length = 107
FEATURE                  Location/Qualifiers
source                   1..107
                         mol_type = protein
                         organism = synthetic construct
                         note = Synthetic Construct
SEQUENCE: 43
GRGEAETREC IYYNANWELE RTNQSGLERC EGEQDKRLHC YASWRNSSGT IELVKKGCWL  60
DDFNCYDRQE CVATKENPQV YFCCCEGNMC NEKFSYFPEM EVTQPTS               107

SEQ ID NO: 44            moltype = AA  length = 109
FEATURE                  Location/Qualifiers
source                   1..109
                         mol_type = protein
                         organism = Homo sapiens
SEQUENCE: 44
GAILGRSETQ ECLFFNANWE KDRTNQTGVE PCYGDKDKRR HCFATWKNIS GSIEIVKQGC  60
WLDDINCYDR TDCVEKKDSP EVYFCCCEGN MCNEKFSYFP EMEVTQPTS             109

SEQ ID NO: 45            moltype = AA  length = 115
FEATURE                  Location/Qualifiers
source                   1..115
                         mol_type = protein
                         organism = Homo sapiens
SEQUENCE: 45
GRGEAETREC IYYNANWELE RTNQSGLERC EGEQDKRLHC YASWRNSSGT IELVKKGCWL  60
DDFNCYDRQE CVATEENPQV YFCCCEGNFC NERFTHLPEA GGPEVTYEPP PTAPT       115

SEQ ID NO: 46            moltype = AA  length = 512
FEATURE                  Location/Qualifiers
source                   1..512
                         mol_type = protein
                         organism = Homo sapiens
SEQUENCE: 46
MTAPWVALAL LWGSLCAGSG RGEAETRECI YYNANWELER TNQSGLERCE GEQDKRLHCY  60
ASWRNSSGTI ELVKKGCWLD DFNCYDRQEC VATEENPQVY FCCCEGNFCN ERFTHLPEAG  120
GPEVTYEPPP TAPTLLTVLA YSLLPIGGLS LIVLLAFWMY RHRKPPYGHV DIHEDPGPPP  180
PSPLVGLKPL QLLEIKARGR FGCVWKAQLM NDFVAVKIFP LQDKQSWQSE REIFSTPGMK  240
HENLLQFIAA EKRGSNLEVE LWLITAFHDK GSLTDYLKGN IITWNELCHV AETMSRGLSY  300
LHEDVPWCRG EGHKPSIAHR DFKSKNVLLK SDLTAVLADF GLAVRFEPGK PPGDTHGQVG  360
TRRYMAPEVL EGAINFQRDA FLRIDMYAMG LVLWELVSRC KAADGPVDEY MLPFEEEIGQ  420
HPSLEELQEV VVHKKMRPTI KDHWLKHPGL AQLCVTIEEC WDHDAEARLS AGCVEERVSL  480
IRRSVNGTTS DCLVSLVTSV TNVDLPPKES SI                                512

SEQ ID NO: 47            moltype = AA  length = 513
FEATURE                  Location/Qualifiers
source                   1..513
                         mol_type = protein
                         organism = Homo sapiens
SEQUENCE: 47
MGAAAKLAFA VFLISCSSGA ILGRSETQEC LFFNANWEKD RTNQTGVEPC YGDKDKRRHC  60
FATWKNISGS IEIVKQGCWL DDINCYDRTD CVEKKDSPEV YFCCCEGNMC NEKFSYFPEM  120
EVTQPTSNPV TPKPPYYNIL LYSLVPLMLI AGIVICAFWV YRHHKMAYPP VLVPTQDPGP  180
PPPSPLLGLK PLQLLEVKAR GRFGCVWKAQ LLNEYVAVKI FPIQDKQSWQ NEYEVYSLPG  240
MKHENILQFI GAEKRGTSVD VDLWLITAFH EKGSLSDFLK ANVVSWNELC HIAETMARGL  300
AYLHEDIPGL KDGHKPAISH RDIKSKNVLL KNNLTACIAD FGLALKFEAG KSAGDTHGQV  360
GTRRYMAPEV LEGAINFQRD AFLRIDMYAM GLVLWELASR CTAADGPVDE YMLPFEEEIG  420
QHPSLEDMQE VVVHKKKRPV LRDYWQKHAG MAMLCETIEE CWDHDAEARL SAGCVGERIT  480
QMQRLTNIIT TEDIVTVVTM VTNVDFPPKE SSL                               513

SEQ ID NO: 48            moltype = AA  length = 225
FEATURE                  Location/Qualifiers
```

```
source                1..225
                      mol_type = protein
                      organism = Homo sapiens
SEQUENCE: 48
THTCPPCPAP ELLGGPSVFL FPPKPKDTLM ISRTPEVTCV VVDVSHEDPE VKFNWYVDGV  60
EVHNAKTKPR EEQYNSTYRV VSVLTVLHQD WLNGKEYKCK VSNKALPVPI EKTISKAKGQ  120
PREPQVYTLP PSREEMTKNQ VSLTCLVKGF YPSDIAVEWE SNGQPENNYK TTPPVLDSDG  180
PFFLYSKLTV DKSRWQQGNV FSCSVMHEAL HNHYTQKSLS LSPGK                 225

SEQ ID NO: 49         moltype = AA  length = 4
FEATURE               Location/Qualifiers
source                1..4
                      mol_type = protein
                      organism = synthetic construct
                      note = Synthetic Construct
SEQUENCE: 49
GGGA                                                              4

SEQ ID NO: 50         moltype = AA  length = 4
FEATURE               Location/Qualifiers
source                1..4
                      mol_type = protein
                      organism = synthetic construct
                      note = Synthetic Construct
SEQUENCE: 50
GGGS                                                              4

SEQ ID NO: 51         moltype = AA  length = 4
FEATURE               Location/Qualifiers
source                1..4
                      mol_type = protein
                      organism = synthetic construct
                      note = Synthetic Construct
SEQUENCE: 51
GGGG                                                              4

SEQ ID NO: 52         moltype = AA  length = 5
FEATURE               Location/Qualifiers
source                1..5
                      mol_type = protein
                      organism = synthetic construct
                      note = Synthetic Construct
SEQUENCE: 52
GGGGA                                                             5

SEQ ID NO: 53         moltype = AA  length = 5
FEATURE               Location/Qualifiers
source                1..5
                      mol_type = protein
                      organism = synthetic construct
                      note = Synthetic Construct
SEQUENCE: 53
GGGGS                                                             5

SEQ ID NO: 54         moltype = AA  length = 5
FEATURE               Location/Qualifiers
source                1..5
                      mol_type = protein
                      organism = synthetic construct
                      note = Synthetic Construct
SEQUENCE: 54
GGGGG                                                             5

SEQ ID NO: 55         moltype = AA  length = 4
FEATURE               Location/Qualifiers
source                1..4
                      mol_type = protein
                      organism = synthetic construct
                      note = Synthetic Construct
SEQUENCE: 55
GGAG                                                              4

SEQ ID NO: 56         moltype = AA  length = 4
FEATURE               Location/Qualifiers
source                1..4
                      mol_type = protein
                      organism = synthetic construct
                      note = Synthetic Construct
SEQUENCE: 56
```

```
GGSG                                                                    4

SEQ ID NO: 57           moltype = AA  length = 4
FEATURE                 Location/Qualifiers
source                  1..4
                        mol_type = protein
                        organism = synthetic construct
                        note = Synthetic Construct
SEQUENCE: 57
AGGG                                                                    4

SEQ ID NO: 58           moltype = AA  length = 4
FEATURE                 Location/Qualifiers
source                  1..4
                        mol_type = protein
                        organism = synthetic construct
                        note = Synthetic Construct
SEQUENCE: 58
SGGG                                                                    4

SEQ ID NO: 59           moltype = AA  length = 4
FEATURE                 Location/Qualifiers
source                  1..4
                        mol_type = protein
                        organism = synthetic construct
                        note = Synthetic Construct
SEQUENCE: 59
GAGA                                                                    4

SEQ ID NO: 60           moltype = AA  length = 4
FEATURE                 Location/Qualifiers
source                  1..4
                        mol_type = protein
                        organism = synthetic construct
                        note = Synthetic Construct
SEQUENCE: 60
GSGS                                                                    4

SEQ ID NO: 61           moltype = AA  length = 6
FEATURE                 Location/Qualifiers
source                  1..6
                        mol_type = protein
                        organism = synthetic construct
                        note = Synthetic Construct
SEQUENCE: 61
GAGAGA                                                                  6

SEQ ID NO: 62           moltype = AA  length = 6
FEATURE                 Location/Qualifiers
source                  1..6
                        mol_type = protein
                        organism = synthetic construct
                        note = Synthetic Construct
SEQUENCE: 62
GSGSGS                                                                  6

SEQ ID NO: 63           moltype = AA  length = 8
FEATURE                 Location/Qualifiers
source                  1..8
                        mol_type = protein
                        organism = synthetic construct
                        note = Synthetic Construct
SEQUENCE: 63
GAGAGAGA                                                                8

SEQ ID NO: 64           moltype = AA  length = 8
FEATURE                 Location/Qualifiers
source                  1..8
                        mol_type = protein
                        organism = synthetic construct
                        note = Synthetic Construct
SEQUENCE: 64
GSGSGSGS                                                                8

SEQ ID NO: 65           moltype = AA  length = 10
FEATURE                 Location/Qualifiers
source                  1..10
                        mol_type = protein
                        organism = synthetic construct
```

```
                        note = Synthetic Construct
SEQUENCE: 65
GAGAGAGAGA                                                      10

SEQ ID NO: 66           moltype = AA  length = 10
FEATURE                 Location/Qualifiers
source                  1..10
                        mol_type = protein
                        organism = synthetic construct
                        note = Synthetic Construct
SEQUENCE: 66
GSGSGSGSGS                                                      10

SEQ ID NO: 67           moltype = AA  length = 12
FEATURE                 Location/Qualifiers
source                  1..12
                        mol_type = protein
                        organism = synthetic construct
                        note = Synthetic Construct
SEQUENCE: 67
GAGAGAGAGA GA                                                   12

SEQ ID NO: 68           moltype = AA  length = 12
FEATURE                 Location/Qualifiers
source                  1..12
                        mol_type = protein
                        organism = synthetic construct
                        note = Synthetic Construct
SEQUENCE: 68
GSGSGSGSGS GS                                                   12

SEQ ID NO: 69           moltype = AA  length = 6
FEATURE                 Location/Qualifiers
source                  1..6
                        mol_type = protein
                        organism = synthetic construct
                        note = Synthetic Construct
SEQUENCE: 69
GGAGGA                                                          6

SEQ ID NO: 70           moltype = AA  length = 6
FEATURE                 Location/Qualifiers
source                  1..6
                        mol_type = protein
                        organism = synthetic construct
                        note = Synthetic Construct
SEQUENCE: 70
GGSGGS                                                          6

SEQ ID NO: 71           moltype = AA  length = 9
FEATURE                 Location/Qualifiers
source                  1..9
                        mol_type = protein
                        organism = synthetic construct
                        note = Synthetic Construct
SEQUENCE: 71
GGAGGAGGA                                                       9

SEQ ID NO: 72           moltype = AA  length = 9
FEATURE                 Location/Qualifiers
source                  1..9
                        mol_type = protein
                        organism = synthetic construct
                        note = Synthetic Construct
SEQUENCE: 72
GGSGGSGGS                                                       9

SEQ ID NO: 73           moltype = AA  length = 12
FEATURE                 Location/Qualifiers
source                  1..12
                        mol_type = protein
                        organism = synthetic construct
                        note = Synthetic Construct
SEQUENCE: 73
GGAGGAGGAG GA                                                   12

SEQ ID NO: 74           moltype = AA  length = 12
FEATURE                 Location/Qualifiers
source                  1..12
```

```
                          mol_type = protein
                          organism = synthetic construct
                          note = Synthetic Construct
SEQUENCE: 74
GGSGGSGGSG GS                                                          12

SEQ ID NO: 75             moltype = AA  length = 8
FEATURE                   Location/Qualifiers
source                    1..8
                          mol_type = protein
                          organism = synthetic construct
                          note = Synthetic Construct
SEQUENCE: 75
GGAGGGAG                                                               8

SEQ ID NO: 76             moltype = AA  length = 8
FEATURE                   Location/Qualifiers
source                    1..8
                          mol_type = protein
                          organism = synthetic construct
                          note = Synthetic Construct
SEQUENCE: 76
GGSGGGSG                                                               8

SEQ ID NO: 77             moltype = AA  length = 12
FEATURE                   Location/Qualifiers
source                    1..12
                          mol_type = protein
                          organism = synthetic construct
                          note = Synthetic Construct
SEQUENCE: 77
GGAGGGAGGG AG                                                          12

SEQ ID NO: 78             moltype = AA  length = 12
FEATURE                   Location/Qualifiers
source                    1..12
                          mol_type = protein
                          organism = synthetic construct
                          note = Synthetic Construct
SEQUENCE: 78
GGSGGGSGGG SG                                                          12

SEQ ID NO: 79             moltype = AA  length = 15
FEATURE                   Location/Qualifiers
source                    1..15
                          mol_type = protein
                          organism = synthetic construct
                          note = Synthetic Construct
SEQUENCE: 79
GGGGAGGGGA GGGGA                                                       15

SEQ ID NO: 80             moltype = AA  length = 15
FEATURE                   Location/Qualifiers
source                    1..15
                          mol_type = protein
                          organism = synthetic construct
                          note = Synthetic Construct
SEQUENCE: 80
GGGGSGGGGS GGGGS                                                       15

SEQ ID NO: 81             moltype = AA  length = 5
FEATURE                   Location/Qualifiers
source                    1..5
                          mol_type = protein
                          organism = synthetic construct
                          note = Synthetic Construct
SEQUENCE: 81
GGGAG                                                                  5

SEQ ID NO: 82             moltype = AA  length = 6
FEATURE                   Location/Qualifiers
source                    1..6
                          mol_type = protein
                          organism = synthetic construct
                          note = Synthetic Construct
SEQUENCE: 82
GGGAGG                                                                 6

SEQ ID NO: 83             moltype = AA  length = 7
```

```
FEATURE                 Location/Qualifiers
source                  1..7
                        mol_type = protein
                        organism = synthetic construct
                        note = Synthetic Construct
SEQUENCE: 83
GGGAGGG                                                     7

SEQ ID NO: 84           moltype = AA  length = 4
FEATURE                 Location/Qualifiers
source                  1..4
                        mol_type = protein
                        organism = synthetic construct
                        note = Synthetic Construct
SEQUENCE: 84
AAAL                                                        4

SEQ ID NO: 85           moltype = AA  length = 4
FEATURE                 Location/Qualifiers
source                  1..4
                        mol_type = protein
                        organism = synthetic construct
                        note = Synthetic Construct
SEQUENCE: 85
AAAK                                                        4

SEQ ID NO: 86           moltype = AA  length = 4
FEATURE                 Location/Qualifiers
source                  1..4
                        mol_type = protein
                        organism = synthetic construct
                        note = Synthetic Construct
SEQUENCE: 86
AAAR                                                        4

SEQ ID NO: 87           moltype = AA  length = 14
FEATURE                 Location/Qualifiers
source                  1..14
                        mol_type = protein
                        organism = synthetic construct
                        note = Synthetic Construct
SEQUENCE: 87
EGKSSGSGSE SKST                                             14

SEQ ID NO: 88           moltype = AA  length = 12
FEATURE                 Location/Qualifiers
source                  1..12
                        mol_type = protein
                        organism = synthetic construct
                        note = Synthetic Construct
SEQUENCE: 88
GSAGSAAGSG EF                                               12

SEQ ID NO: 89           moltype = AA  length = 12
FEATURE                 Location/Qualifiers
source                  1..12
                        mol_type = protein
                        organism = synthetic construct
                        note = Synthetic Construct
SEQUENCE: 89
AEAAAKEAAA KA                                               12

SEQ ID NO: 90           moltype = AA  length = 18
FEATURE                 Location/Qualifiers
source                  1..18
                        mol_type = protein
                        organism = synthetic construct
                        note = Synthetic Construct
SEQUENCE: 90
KESGSVSSEQ LAQFRSLD                                         18

SEQ ID NO: 91           moltype = AA  length = 10
FEATURE                 Location/Qualifiers
source                  1..10
                        mol_type = protein
                        organism = synthetic construct
                        note = Synthetic Construct
SEQUENCE: 91
GENLYFQSGG                                                  10
```

```
SEQ ID NO: 92           moltype = AA  length = 8
FEATURE                 Location/Qualifiers
source                  1..8
                        mol_type = protein
                        organism = synthetic construct
                        note = Synthetic Construct
SEQUENCE: 92
SACYCELS                                                                8

SEQ ID NO: 93           moltype = AA  length = 5
FEATURE                 Location/Qualifiers
source                  1..5
                        mol_type = protein
                        organism = synthetic construct
                        note = Synthetic Construct
SEQUENCE: 93
RSIAT                                                                   5

SEQ ID NO: 94           moltype = AA  length = 17
FEATURE                 Location/Qualifiers
source                  1..17
                        mol_type = protein
                        organism = synthetic construct
                        note = Synthetic Construct
SEQUENCE: 94
RPACKIPNDL KQKVMNH                                                      17

SEQ ID NO: 95           moltype = AA  length = 36
FEATURE                 Location/Qualifiers
source                  1..36
                        mol_type = protein
                        organism = synthetic construct
                        note = Synthetic Construct
SEQUENCE: 95
GGSAGGSGSG SSGGSSGASG TGTAGGTGSG SGTGSG                                 36

SEQ ID NO: 96           moltype = AA  length = 17
FEATURE                 Location/Qualifiers
source                  1..17
                        mol_type = protein
                        organism = synthetic construct
                        note = Synthetic Construct
SEQUENCE: 96
AAANSSIDLI SVPVDSR                                                      17

SEQ ID NO: 97           moltype = AA  length = 36
FEATURE                 Location/Qualifiers
source                  1..36
                        mol_type = protein
                        organism = synthetic construct
                        note = Synthetic Construct
SEQUENCE: 97
GGSGGGSEGG GSEGGGSEGG GSEGGGSEGG GSGGGS                                 36

SEQ ID NO: 98           moltype = AA  length = 5
FEATURE                 Location/Qualifiers
source                  1..5
                        mol_type = protein
                        organism = synthetic construct
                        note = Synthetic Construct
SEQUENCE: 98
EAAAK                                                                   5

SEQ ID NO: 99           moltype = AA  length = 5
FEATURE                 Location/Qualifiers
source                  1..5
                        mol_type = protein
                        organism = synthetic construct
                        note = Synthetic Construct
SEQUENCE: 99
PAPAP                                                                   5

SEQ ID NO: 100          moltype = AA  length = 227
FEATURE                 Location/Qualifiers
source                  1..227
                        mol_type = protein
                        organism = Homo sapiens
SEQUENCE: 100
```

```
DKTHTCPPCP APELLGGPSV FLFPPKPKDT LMISRTPEVT CVVVDVSHED PEVKFNWYVD  60
GVEVHNAKTK PREEQYNSTY RVVSVLTVLH QDWLNGKEYK CKVSNKALPA PIEKTISKAK  120
GQPREPQVYT LPPSRDELTK NQVSLTCLVK GFYPSDIAVE WESNGQPENN YKTTPPVLDS  180
DGSFFLYSKL TVDKSRWQQG NVFSCSVMHE ALHNHYTQKS LSLSPGK                227

SEQ ID NO: 101         moltype = AA  length = 11
FEATURE                Location/Qualifiers
source                 1..11
                       mol_type = protein
                       organism = synthetic construct
                       note = Synthetic Construct
SEQUENCE: 101
DICLPRWGCL W                                                       11

SEQ ID NO: 102         moltype = AA  length = 93
FEATURE                Location/Qualifiers
source                 1..93
                       mol_type = protein
                       organism = Homo sapiens
SEQUENCE: 102
GPVEVFITET PSQPNSHPIQ WNAPQPSHIS KYILRWRPKN SVGRWKEATI PGHLNSYTIK  60
GLKPGVVYEG QLISIQQYGH QEVTRFDFTT TST                               93

SEQ ID NO: 103         moltype = AA  length = 609
FEATURE                Location/Qualifiers
source                 1..609
                       mol_type = protein
                       organism = Homo sapiens
SEQUENCE: 103
MKWVTFISLL FLFSSAYSRG VFRRDAHKSE VAHRFKDLGE ENFKALVLIA FAQYLQQCPF  60
EDHVKLVNEV TEFAKTCVAD ESAENCDKSL HTLFGDKLCT VATLRETYGE MADCCAKQEP  120
ERNECFLQHK DDNPNLPRLV RPEVDVMCTA FHDNEETFLK KYLYEIARRH PYFYAPELLF  180
FAKRYKAAFT ECCQAADKAA CLLPKLDELR DEGKASSAKQ RLKCASLQKF GERAFKAWAV  240
ARLSQRFPKA EFAEVSKLVT DLTKVHTECC HGDLLECADD RADLAKYICE NQDSISSKLK  300
ECCEKPLLEK SHCIAEVEND EMPADLPSLA ADFVESKDVC KNYAEAKDVF LGMFLYEYAR  360
RHPDYSVVLL LRLAKTYETT LEKCCAAADP HECYAKVFDE FKPLVEEPQN LIKQNCELFE  420
QLGEYKFQNA LLVRYTKKVP QVSTPTLVEV SRNLGKVGSK CCKHPEAKRM PCAEDYLSVV  480
LNQLCVLHEK TPVSDRVTKC CTESLVNRRP CFSALEVDET YVPKEFNAET FTFHADICTL  540
SEKERQIKKQ TALVELVKHK PKATKEQLKA VMDDFAAFVE KCCKADDKET CFAEEGKKLV  600
AASQAALGL                                                          609

SEQ ID NO: 104         moltype = AA  length = 6
FEATURE                Location/Qualifiers
source                 1..6
                       mol_type = protein
                       organism = synthetic construct
                       note = Synthetic Construct
SEQUENCE: 104
NPVTPK                                                             6

SEQ ID NO: 105         moltype = AA  length = 338
FEATURE                Location/Qualifiers
source                 1..338
                       mol_type = protein
                       organism = synthetic construct
                       note = Synthetic Construct
SEQUENCE: 105
GAILGRSETQ ECLFFNANWE KDRTNQTGVE PCYGDKDKRR HCFATWKNIS GSIEIVKQGC  60
WLDDINCYDR TDCVEKKDSP EVYFCCCEGN MCNEKFSYFP EMEVTQPTSG GGDKTHTCPP  120
CPAPELLGGP SVFLFPPKPK DTLMISRTPE VTCVVVDVSH EDPEVKFNWY VDGVEVHNAK  180
TKPREEQYNS TYRVVSVLTV LHQDWLNGKE YKCKVSNKAL PAPIEKTISK AKGQPREPQV  240
YTLPPSRDEL TKNQVSLTCL VKGFYPSDIA VEWESNGQPE NNYKTTPPVL DSDGSFFLYS  300
KLTVDKSRWQ QGNVFSCSVM HEALHNHYTQ KSLSLSPG                          338

SEQ ID NO: 106         moltype = AA  length = 344
FEATURE                Location/Qualifiers
source                 1..344
                       mol_type = protein
                       organism = synthetic construct
                       note = Synthetic Construct
SEQUENCE: 106
GRGEAETREC IYYNANWELE RTNQSGLERC EGEQDKRLHC YASWRNSSGT IELVKKGCWL  60
DDFNCYDRQE CVATEENPQV YFCCCEGNFC NERFTHLPEA GGPEVTYEPP PTAPTGGGDK  120
THTCPPCPAP ELLGGPSVFL FPPKPKDTLM ISRTPEVTCV VVDVSHEDPE VKFNWYVDGV  180
EVHNAKTKPR EEQYNSTYRV VSVLTVLHQD WLNGKEYKCK VSNKALPAPI EKTISKAKGQ  240
PREPQVYTLP PSRDELTKNQ VSLTCLVKGF YPSDIAVEWE SNGQPENNYK TTPPVLDSDG  300
SFFLYSKLTV DKSRWQQGNV FSCSVMHEAL HNHYTQKSLS LSPG                   344

SEQ ID NO: 107         moltype = AA  length = 339
```

```
FEATURE                Location/Qualifiers
source                 1..339
                       mol_type = protein
                       organism = synthetic construct
                       note = Synthetic Construct
SEQUENCE: 107
GAILGRAETR ECIYYNANWE LERTNQSGLE RCEGEQDKRL HCYASWRNSS GTIEIVKQGC  60
WLDDINCYDR TDCVATEENP QVYFCCCEGN MCNEKFSYFP EMEVTQPTSG GGDKTHTCPP  120
CPAPELLGGP SVFLFPPKPK DTLMISRTPE VTCVVVDVSH EDPEVKFNWY VDGVEVHNAK  180
TKPREEQYNS TYRVVSVLTV LHQDWLNGKE YKCKVSNKAL PAPIEKTISK AKGQPREPQV  240
YTLPPSRDEL TKNQVSLTCL VKGFYPSDIA VEWESNGQPE NNYKTTPPVL DSDGSFFLYS  300
KLTVDKSRWQ QGNVFSCSVM HEALHNHYTQ KSLSLSPGK                        339

SEQ ID NO: 108         moltype = AA  length = 337
FEATURE                Location/Qualifiers
source                 1..337
                       mol_type = protein
                       organism = synthetic construct
                       note = Synthetic Construct
SEQUENCE: 108
GRGEAETREC IYYNANWELE RTNQSGLERC EGEQDKRLHC YASWRNSSGT IEIVKQGCWL  60
DDINCYDRTD CVEKKDSPEV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 109         moltype = AA  length = 337
FEATURE                Location/Qualifiers
source                 1..337
                       mol_type = protein
                       organism = synthetic construct
                       note = Synthetic Construct
SEQUENCE: 109
GRGEAETREC IYYNANWELE RTNQSGLERC EGEQDKRLHC YASWRNSSGT IEIVKQGCWL  60
DDINCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 110         moltype = AA  length = 337
FEATURE                Location/Qualifiers
source                 1..337
                       mol_type = protein
                       organism = synthetic construct
                       note = Synthetic Construct
SEQUENCE: 110
GRGEAETREC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 111         moltype = AA  length = 107
FEATURE                Location/Qualifiers
source                 1..107
                       mol_type = protein
                       organism = synthetic construct
                       note = Synthetic Construct
SEQUENCE: 111
ILGRAETREC IYYNANWELE RTNQSGLERC EGEQDKRLHC YASWRNSSGT IEIVKQGCWL  60
DDINCYDRTD CVATEENPQV YFCCCEGNMC NEKFSYFPEM EVTQPTS               107

SEQ ID NO: 112         moltype = AA  length = 106
FEATURE                Location/Qualifiers
source                 1..106
                       mol_type = protein
                       organism = synthetic construct
                       note = Synthetic Construct
SEQUENCE: 112
RGEAETRECI YYNANWELER TNQSGLERCE GEQDKRLHCY ASWRNSSGTI EIVKQGCWLD  60
DINCYDRTDC VEKKDSPEVY FCCCEGNMCN EKFSYFPEME VTQPTS                106

SEQ ID NO: 113         moltype = AA  length = 106
FEATURE                Location/Qualifiers
source                 1..106
                       mol_type = protein
```

```
                         organism = synthetic construct
                         note = Synthetic Construct
SEQUENCE: 113
RGEAETRECI YYNANWELER TNQSGLERCE GEQDKRLHCY ASWRNSSGTI EIVKQGCWLD  60
DINCYDRTDC VEKKDSPQVY FCCCEGNMCN EKFSYFPEME VTQPTS                 106

SEQ ID NO: 114           moltype = AA  length = 106
FEATURE                  Location/Qualifiers
source                   1..106
                         mol_type = protein
                         organism = synthetic construct
                         note = Synthetic Construct
SEQUENCE: 114
RGEAETRECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTS                 106

SEQ ID NO: 115           moltype = AA  length = 106
FEATURE                  Location/Qualifiers
source                   1..106
                         mol_type = protein
                         organism = synthetic construct
                         note = Synthetic Construct
SEQUENCE: 115
LGRAETRECI YYNANWELER TNQSGLERCE GEQDKRLHCY ASWRNSSGTI EIVKQGCWLD  60
DINCYDRTDC VATEENPQVY FCCCEGNMCN EKFSYFPEME VTQPTS                 106

SEQ ID NO: 116           moltype = AA  length = 105
FEATURE                  Location/Qualifiers
source                   1..105
                         mol_type = protein
                         organism = synthetic construct
                         note = Synthetic Construct
SEQUENCE: 116
GEAETRECIY YNANWELERT NQSGLERCEG EQDKRLHCYA SWRNSSGTIE IVKQGCWLDD  60
INCYDRTDCV EKKDSPEVYF CCCEGNMCNE KFSYFPEMEV TQPTS                  105

SEQ ID NO: 117           moltype = AA  length = 105
FEATURE                  Location/Qualifiers
source                   1..105
                         mol_type = protein
                         organism = synthetic construct
                         note = Synthetic Construct
SEQUENCE: 117
GEAETRECIY YNANWELERT NQSGLERCEG EQDKRLHCYA SWRNSSGTIE IVKQGCWLDD  60
INCYDRTDCV EKKDSPQVYF CCCEGNMCNE KFSYFPEMEV TQPTS                  105

SEQ ID NO: 118           moltype = AA  length = 105
FEATURE                  Location/Qualifiers
source                   1..105
                         mol_type = protein
                         organism = synthetic construct
                         note = Synthetic Construct
SEQUENCE: 118
GEAETRECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTS                  105

SEQ ID NO: 119           moltype = AA  length = 105
FEATURE                  Location/Qualifiers
source                   1..105
                         mol_type = protein
                         organism = synthetic construct
                         note = Synthetic Construct
SEQUENCE: 119
GRAETRECIY YNANWELERT NQSGLERCEG EQDKRLHCYA SWRNSSGTIE IVKQGCWLDD  60
INCYDRTDCV ATEENPQVYF CCCEGNMCNE KFSYFPEMEV TQPTS                  105

SEQ ID NO: 120           moltype = AA  length = 104
FEATURE                  Location/Qualifiers
source                   1..104
                         mol_type = protein
                         organism = synthetic construct
                         note = Synthetic Construct
SEQUENCE: 120
EAETRECIYY NANWELERTN QSGLERCEGE QDKRLHCYAS WRNSSGTIEI VKQGCWLDDI  60
NCYDRTDCVE KKDSPEVYFC CCEGNMCNEK FSYFPEMEVT QPTS                   104

SEQ ID NO: 121           moltype = AA  length = 104
FEATURE                  Location/Qualifiers
source                   1..104
```

```
                         mol_type = protein
                         organism = synthetic construct
                         note = Synthetic Construct
SEQUENCE: 121
EAETRECIYY NANWELERTN QSGLERCEGE QDKRLHCYAS WRNSSGTIEI VKQGCWLDDI  60
NCYDRTDCVE KKDSPQVYFC CCEGNMCNEK FSYFPEMEVT QPTS                   104

SEQ ID NO: 122           moltype = AA  length = 104
FEATURE                  Location/Qualifiers
source                   1..104
                         mol_type = protein
                         organism = synthetic construct
                         note = Synthetic Construct
SEQUENCE: 122
EAETRECIYY NANWELERTN QSGLERCEGE QDKRLHCYAS WRNSSGTIEI VKQGCWLDDF  60
NCYDRTDCVE KKDSPQVYFC CCEGNMCNEK FSYFPEMEVT QPTS                   104

SEQ ID NO: 123           moltype = AA  length = 104
FEATURE                  Location/Qualifiers
source                   1..104
                         mol_type = protein
                         organism = synthetic construct
                         note = Synthetic Construct
SEQUENCE: 123
RAETRECIYY NANWELERTN QSGLERCEGE QDKRLHCYAS WRNSSGTIEI VKQGCWLDDI  60
NCYDRTDCVA TEENPQVYFC CCEGNMCNEK FSYFPEMEVT QPTS                   104

SEQ ID NO: 124           moltype = AA  length = 103
FEATURE                  Location/Qualifiers
source                   1..103
                         mol_type = protein
                         organism = synthetic construct
                         note = Synthetic Construct
SEQUENCE: 124
AETRECIYYN ANWELERTNQ SGLERCEGEQ DKRLHCYASW RNSSGTIEIV KQGCWLDDIN  60
CYDRTDCVEK KDSPEVYFCC CEGNMCNEKF SYFPEMEVTQ PTS                    103

SEQ ID NO: 125           moltype = AA  length = 103
FEATURE                  Location/Qualifiers
source                   1..103
                         mol_type = protein
                         organism = synthetic construct
                         note = Synthetic Construct
SEQUENCE: 125
AETRECIYYN ANWELERTNQ SGLERCEGEQ DKRLHCYASW RNSSGTIEIV KQGCWLDDIN  60
CYDRTDCVEK KDSPQVYFCC CEGNMCNEKF SYFPEMEVTQ PTS                    103

SEQ ID NO: 126           moltype = AA  length = 103
FEATURE                  Location/Qualifiers
source                   1..103
                         mol_type = protein
                         organism = synthetic construct
                         note = Synthetic Construct
SEQUENCE: 126
AETRECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTS                    103

SEQ ID NO: 127           moltype = AA  length = 103
FEATURE                  Location/Qualifiers
source                   1..103
                         mol_type = protein
                         organism = synthetic construct
                         note = Synthetic Construct
SEQUENCE: 127
AETRECIYYN ANWELERTNQ SGLERCEGEQ DKRLHCYASW RNSSGTIEIV KQGCWLDDIN  60
CYDRTDCVAT EENPQVYFCC CEGNMCNEKF SYFPEMEVTQ PTS                    103

SEQ ID NO: 128           moltype = AA  length = 102
FEATURE                  Location/Qualifiers
source                   1..102
                         mol_type = protein
                         organism = synthetic construct
                         note = Synthetic Construct
SEQUENCE: 128
ETRECIYYNA NWELERTNQS GLERCEGEQD KRLHCYASWR NSSGTIEIVK QGCWLDDINC  60
YDRTDCVEKK DSPEVYFCCC EGNMCNEKFS YFPEMEVTQP TS                     102

SEQ ID NO: 129           moltype = AA  length = 102
FEATURE                  Location/Qualifiers
```

```
source                1..102
                      mol_type = protein
                      organism = synthetic construct
                      note = Synthetic Construct
SEQUENCE: 129
ETRECIYYNA NWELERTNQS GLERCEGEQD KRLHCYASWR NSSGTIEIVK QGCWLDDINC  60
YDRTDCVEKK DSPQVYFCCC EGNMCNEKFS YFPEMEVTQP TS                     102

SEQ ID NO: 130        moltype = AA  length = 102
FEATURE               Location/Qualifiers
source                1..102
                      mol_type = protein
                      organism = synthetic construct
                      note = Synthetic Construct
SEQUENCE: 130
ETRECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TS                     102

SEQ ID NO: 131        moltype = AA  length = 102
FEATURE               Location/Qualifiers
source                1..102
                      mol_type = protein
                      organism = synthetic construct
                      note = Synthetic Construct
SEQUENCE: 131
ETRECIYYNA NWELERTNQS GLERCEGEQD KRLHCYASWR NSSGTIEIVK QGCWLDDINC  60
YDRTDCVATE ENPQVYFCCC EGNMCNEKFS YFPEMEVTQP TS                     102

SEQ ID NO: 132        moltype = AA  length = 101
FEATURE               Location/Qualifiers
source                1..101
                      mol_type = protein
                      organism = synthetic construct
                      note = Synthetic Construct
SEQUENCE: 132
TRECIYYNAN WELERTNQSG LERCEGEQDK RLHCYASWRN SSGTIEIVKQ GCWLDDINCY  60
DRTDCVEKKD SPEVYFCCCE GNMCNEKFSY FPEMEVTQPT S                      101

SEQ ID NO: 133        moltype = AA  length = 101
FEATURE               Location/Qualifiers
source                1..101
                      mol_type = protein
                      organism = synthetic construct
                      note = Synthetic Construct
SEQUENCE: 133
TRECIYYNAN WELERTNQSG LERCEGEQDK RLHCYASWRN SSGTIEIVKQ GCWLDDINCY  60
DRTDCVEKKD SPQVYFCCCE GNMCNEKFSY FPEMEVTQPT S                      101

SEQ ID NO: 134        moltype = AA  length = 101
FEATURE               Location/Qualifiers
source                1..101
                      mol_type = protein
                      organism = synthetic construct
                      note = Synthetic Construct
SEQUENCE: 134
TRECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT S                      101

SEQ ID NO: 135        moltype = AA  length = 101
FEATURE               Location/Qualifiers
source                1..101
                      mol_type = protein
                      organism = synthetic construct
                      note = Synthetic Construct
SEQUENCE: 135
TRECIYYNAN WELERTNQSG LERCEGEQDK RLHCYASWRN SSGTIEIVKQ GCWLDDINCY  60
DRTDCVATEE NPQVYFCCCE GNMCNEKFSY FPEMEVTQPT S                      101

SEQ ID NO: 136        moltype = AA  length = 100
FEATURE               Location/Qualifiers
source                1..100
                      mol_type = protein
                      organism = synthetic construct
                      note = Synthetic Construct
SEQUENCE: 136
RECIYYNANW ELERTNQSGL ERCEGEQDKR LHCYASWRNS SGTIEIVKQG CWLDDINCYD  60
RTDCVEKKDS PEVYFCCCEG NMCNEKFSYF PEMEVTQPTS                        100

SEQ ID NO: 137        moltype = AA  length = 100
```

```
FEATURE                Location/Qualifiers
source                 1..100
                       mol_type = protein
                       organism = synthetic construct
                       note = Synthetic Construct
SEQUENCE: 137
RECIYYNANW ELERTNQSGL ERCEGEQDKR LHCYASWRNS SGTIEIVKQG CWLDDINCYD  60
RTDCVEKKDS PQVYFCCCEG NMCNEKFSYF PEMEVTQPTS                        100

SEQ ID NO: 138         moltype = AA  length = 100
FEATURE                Location/Qualifiers
source                 1..100
                       mol_type = protein
                       organism = synthetic construct
                       note = Synthetic Construct
SEQUENCE: 138
RECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS                        100

SEQ ID NO: 139         moltype = AA  length = 100
FEATURE                Location/Qualifiers
source                 1..100
                       mol_type = protein
                       organism = synthetic construct
                       note = Synthetic Construct
SEQUENCE: 139
RECIYYNANW ELERTNQSGL ERCEGEQDKR LHCYASWRNS SGTIEIVKQG CWLDDINCYD  60
RTDCVATEEN PQVYFCCCEG NMCNEKFSYF PEMEVTQPTS                        100

SEQ ID NO: 140         moltype = AA  length = 106
FEATURE                Location/Qualifiers
source                 1..106
                       mol_type = protein
                       organism = synthetic construct
                       note = Synthetic Construct
SEQUENCE: 140
RGEAETRECI YYNANWELER TNQSGLERCE GEQDKRRHCF ATWKNISGSI EIVKQGCWLD  60
DFNCYDRTDC VEKKDSPQVY FCCCEGNMCN EKFSYFPEME VTQPTS                 106

SEQ ID NO: 141         moltype = AA  length = 106
FEATURE                Location/Qualifiers
source                 1..106
                       mol_type = protein
                       organism = synthetic construct
                       note = Synthetic Construct
SEQUENCE: 141
RGEAETRECI YYNANWELER TNQSGLERCE GEQDKRLHCY ASWRNSSGTI EIVKQGCWLD  60
DETCYDRTDC VEKKDSPQVY FCCCEGNMCN EKFSYFPEME VTQPTS                 106

SEQ ID NO: 142         moltype = AA  length = 107
FEATURE                Location/Qualifiers
source                 1..107
                       mol_type = protein
                       organism = synthetic construct
                       note = Synthetic Construct
SEQUENCE: 142
ILGRAETREC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTS                107

SEQ ID NO: 143         moltype = AA  length = 107
FEATURE                Location/Qualifiers
source                 1..107
                       mol_type = protein
                       organism = synthetic construct
                       note = Synthetic Construct
SEQUENCE: 143
ILGRSETQEC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTS                107

SEQ ID NO: 144         moltype = AA  length = 106
FEATURE                Location/Qualifiers
source                 1..106
                       mol_type = protein
                       organism = synthetic construct
                       note = Synthetic Construct
SEQUENCE: 144
RGEAETRECI YYNANWELER TNQSGLERCE GEQDKRLHCY ASWRNSSGTI ELVKKGCWLD  60
DFNCYDRQEC VATKDSPEVY FCCCEGNMCN EKFSYFPEME VTQPTS                 106
```

```
SEQ ID NO: 145         moltype = AA  length = 106
FEATURE                Location/Qualifiers
source                 1..106
                       mol_type = protein
                       organism = synthetic construct
                       note = Synthetic Construct
SEQUENCE: 145
RGEAETRECI YYNANWELER TNQSGLERCE GEQDKRLHCY ASWRNSSGTI ELVKKGCWLD  60
DFNCYDRQEC VATKENPQVY FCCCEGNMCN EKFSYFPEME VTQPTS                 106

SEQ ID NO: 146         moltype = AA  length = 105
FEATURE                Location/Qualifiers
source                 1..105
                       mol_type = protein
                       organism = synthetic construct
                       note = Synthetic Construct
SEQUENCE: 146
GEAETRECIY YNANWELERT NQSGLERCEG EQDKRRHCFA TWKNISGSIE IVKQGCWLDD  60
FNCYDRTDCV EKKDSPQVYF CCCEGNMCNE KFSYFPEMEV TQPTS                  105

SEQ ID NO: 147         moltype = AA  length = 105
FEATURE                Location/Qualifiers
source                 1..105
                       mol_type = protein
                       organism = synthetic construct
                       note = Synthetic Construct
SEQUENCE: 147
GEAETRECIY YNANWELERT NQSGLERCEG EQDKRLHCYA SWRNSSGTIE IVKQGCWLDD  60
ETCYDRTDCV EKKDSPQVYF CCCEGNMCNE KFSYFPEMEV TQPTS                  105

SEQ ID NO: 148         moltype = AA  length = 106
FEATURE                Location/Qualifiers
source                 1..106
                       mol_type = protein
                       organism = synthetic construct
                       note = Synthetic Construct
SEQUENCE: 148
LGRAETRECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTS                 106

SEQ ID NO: 149         moltype = AA  length = 106
FEATURE                Location/Qualifiers
source                 1..106
                       mol_type = protein
                       organism = synthetic construct
                       note = Synthetic Construct
SEQUENCE: 149
LGRSETQECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTS                 106

SEQ ID NO: 150         moltype = AA  length = 105
FEATURE                Location/Qualifiers
source                 1..105
                       mol_type = protein
                       organism = synthetic construct
                       note = Synthetic Construct
SEQUENCE: 150
GEAETRECIY YNANWELERT NQSGLERCEG EQDKRLHCYA SWRNSSGTIE LVKKGCWLDD  60
FNCYDRQECV ATKDSPEVYF CCCEGNMCNE KFSYFPEMEV TQPTS                  105

SEQ ID NO: 151         moltype = AA  length = 105
FEATURE                Location/Qualifiers
source                 1..105
                       mol_type = protein
                       organism = synthetic construct
                       note = Synthetic Construct
SEQUENCE: 151
GEAETRECIY YNANWELERT NQSGLERCEG EQDKRLHCYA SWRNSSGTIE LVKKGCWLDD  60
FNCYDRQECV ATKENPQVYF CCCEGNMCNE KFSYFPEMEV TQPTS                  105

SEQ ID NO: 152         moltype = AA  length = 104
FEATURE                Location/Qualifiers
source                 1..104
                       mol_type = protein
                       organism = synthetic construct
                       note = Synthetic Construct
SEQUENCE: 152
EAETRECIYY NANWELERTN QSGLERCEGE QDKRRHCFAT WKNISGSIEI VKQGCWLDDF  60
NCYDRTDCVE KKDSPQVYFC CCEGNMCNEK FSYFPEMEVT QPTS                   104
```

```
SEQ ID NO: 153          moltype = AA  length = 104
FEATURE                 Location/Qualifiers
source                  1..104
                        mol_type = protein
                        organism = synthetic construct
                        note = Synthetic Construct
SEQUENCE: 153
EAETRECIYY NANWELERTN QSGLERCEGE QDKRLHCYAS WRNSSGTIEI VKQGCWLDDE  60
TCYDRTDCVE KKDSPQVYFC CCEGNMCNEK FSYFPEMEVT QPTS                   104

SEQ ID NO: 154          moltype = AA  length = 105
FEATURE                 Location/Qualifiers
source                  1..105
                        mol_type = protein
                        organism = synthetic construct
                        note = Synthetic Construct
SEQUENCE: 154
GRAETRECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTS                  105

SEQ ID NO: 155          moltype = AA  length = 105
FEATURE                 Location/Qualifiers
source                  1..105
                        mol_type = protein
                        organism = synthetic construct
                        note = Synthetic Construct
SEQUENCE: 155
GRSETQECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTS                  105

SEQ ID NO: 156          moltype = AA  length = 104
FEATURE                 Location/Qualifiers
source                  1..104
                        mol_type = protein
                        organism = synthetic construct
                        note = Synthetic Construct
SEQUENCE: 156
EAETRECIYY NANWELERTN QSGLERCEGE QDKRLHCYAS WRNSSGTIEL VKKGCWLDDF  60
NCYDRQECVA TKDSPEVYFC CCEGNMCNEK FSYFPEMEVT QPTS                   104

SEQ ID NO: 157          moltype = AA  length = 104
FEATURE                 Location/Qualifiers
source                  1..104
                        mol_type = protein
                        organism = synthetic construct
                        note = Synthetic Construct
SEQUENCE: 157
EAETRECIYY NANWELERTN QSGLERCEGE QDKRLHCYAS WRNSSGTIEL VKKGCWLDDF  60
NCYDRQECVA TKENPQVYFC CCEGNMCNEK FSYFPEMEVT QPTS                   104

SEQ ID NO: 158          moltype = AA  length = 103
FEATURE                 Location/Qualifiers
source                  1..103
                        mol_type = protein
                        organism = synthetic construct
                        note = Synthetic Construct
SEQUENCE: 158
AETRECIYYN ANWELERTNQ SGLERCEGEQ DKRRHCFATW KNISGSIEIV KQGCWLDDFN  60
CYDRTDCVEK KDSPQVYFCC CEGNMCNEKF SYFPEMEVTQ PTS                    103

SEQ ID NO: 159          moltype = AA  length = 103
FEATURE                 Location/Qualifiers
source                  1..103
                        mol_type = protein
                        organism = synthetic construct
                        note = Synthetic Construct
SEQUENCE: 159
AETRECIYYN ANWELERTNQ SGLERCEGEQ DKRLHCYASW RNSSGTIEIV KQGCWLDDET  60
CYDRTDCVEK KDSPQVYFCC CEGNMCNEKF SYFPEMEVTQ PTS                    103

SEQ ID NO: 160          moltype = AA  length = 104
FEATURE                 Location/Qualifiers
source                  1..104
                        mol_type = protein
                        organism = synthetic construct
                        note = Synthetic Construct
SEQUENCE: 160
RAETRECIYY NANWELERTN QSGLERCEGE QDKRLHCYAS WRNSSGTIEI VKQGCWLDDF  60
```

```
NCYDRTDCVE KKDSPQVYFC CCEGNMCNEK FSYFPEMEVT QPTS                    104

SEQ ID NO: 161         moltype = AA  length = 104
FEATURE                Location/Qualifiers
source                 1..104
                       mol_type = protein
                       organism = synthetic construct
                       note = Synthetic Construct
SEQUENCE: 161
RSETQECIYY NANWELERTN QSGLERCEGE QDKRLHCYAS WRNSSGTIEI VKQGCWLDDF  60
NCYDRTDCVE KKDSPQVYFC CCEGNMCNEK FSYFPEMEVT QPTS                    104

SEQ ID NO: 162         moltype = AA  length = 103
FEATURE                Location/Qualifiers
source                 1..103
                       mol_type = protein
                       organism = synthetic construct
                       note = Synthetic Construct
SEQUENCE: 162
AETRECIYYN ANWELERTNQ SGLERCEGEQ DKRLHCYASW RNSSGTIELV KKGCWLDDFN  60
CYDRQECVAT KDSPEVYFCC CEGNMCNEKF SYFPEMEVTQ PTS                     103

SEQ ID NO: 163         moltype = AA  length = 103
FEATURE                Location/Qualifiers
source                 1..103
                       mol_type = protein
                       organism = synthetic construct
                       note = Synthetic Construct
SEQUENCE: 163
AETRECIYYN ANWELERTNQ SGLERCEGEQ DKRLHCYASW RNSSGTIELV KKGCWLDDFN  60
CYDRQECVAT KENPQVYFCC CEGNMCNEKF SYFPEMEVTQ PTS                     103

SEQ ID NO: 164         moltype = AA  length = 102
FEATURE                Location/Qualifiers
source                 1..102
                       mol_type = protein
                       organism = synthetic construct
                       note = Synthetic Construct
SEQUENCE: 164
ETRECIYYNA NWELERTNQS GLERCEGEQD KRRHCFATWK NISGSIEIVK QGCWLDDFNC  60
YDRTDCVEKK DSPQVYFCCC EGNMCNEKFS YFPEMEVTQP TS                      102

SEQ ID NO: 165         moltype = AA  length = 102
FEATURE                Location/Qualifiers
source                 1..102
                       mol_type = protein
                       organism = synthetic construct
                       note = Synthetic Construct
SEQUENCE: 165
ETRECIYYNA NWELERTNQS GLERCEGEQD KRLHCYASWR NSSGTIEIVK QGCWLDDETC  60
YDRTDCVEKK DSPQVYFCCC EGNMCNEKFS YFPEMEVTQP TS                      102

SEQ ID NO: 166         moltype = AA  length = 103
FEATURE                Location/Qualifiers
source                 1..103
                       mol_type = protein
                       organism = synthetic construct
                       note = Synthetic Construct
SEQUENCE: 166
AETRECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTS                     103

SEQ ID NO: 167         moltype = AA  length = 103
FEATURE                Location/Qualifiers
source                 1..103
                       mol_type = protein
                       organism = synthetic construct
                       note = Synthetic Construct
SEQUENCE: 167
SETQECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTS                     103

SEQ ID NO: 168         moltype = AA  length = 102
FEATURE                Location/Qualifiers
source                 1..102
                       mol_type = protein
                       organism = synthetic construct
                       note = Synthetic Construct
SEQUENCE: 168
```

```
ETRECIYYNA NWELERTNQS GLERCEGEQD KRLHCYASWR NSSGTIELVK KGCWLDDFNC  60
YDRQECVATK DSPEVYFCCC EGNMCNEKFS YFPEMEVTQP TS                     102

SEQ ID NO: 169         moltype = AA  length = 102
FEATURE                Location/Qualifiers
source                 1..102
                       mol_type = protein
                       organism = synthetic construct
                       note = Synthetic Construct
SEQUENCE: 169
ETRECIYYNA NWELERTNQS GLERCEGEQD KRLHCYASWR NSSGTIELVK KGCWLDDFNC  60
YDRQECVATK ENPQVYFCCC EGNMCNEKFS YFPEMEVTQP TS                     102

SEQ ID NO: 170         moltype = AA  length = 101
FEATURE                Location/Qualifiers
source                 1..101
                       mol_type = protein
                       organism = synthetic construct
                       note = Synthetic Construct
SEQUENCE: 170
TRECIYYNAN WELERTNQSG LERCEGEQDK RRHCFATWKN ISGSIEIVKQ GCWLDDFNCY  60
DRTDCVEKKD SPQVYFCCCE GNMCNEKFSY FPEMEVTQPT S                      101

SEQ ID NO: 171         moltype = AA  length = 101
FEATURE                Location/Qualifiers
source                 1..101
                       mol_type = protein
                       organism = synthetic construct
                       note = Synthetic Construct
SEQUENCE: 171
TRECIYYNAN WELERTNQSG LERCEGEQDK RLHCYASWRN SSGTIEIVKQ GCWLDDETCY  60
DRTDCVEKKD SPQVYFCCCE GNMCNEKFSY FPEMEVTQPT S                      101

SEQ ID NO: 172         moltype = AA  length = 102
FEATURE                Location/Qualifiers
source                 1..102
                       mol_type = protein
                       organism = synthetic construct
                       note = Synthetic Construct
SEQUENCE: 172
ETRECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TS                     102

SEQ ID NO: 173         moltype = AA  length = 102
FEATURE                Location/Qualifiers
source                 1..102
                       mol_type = protein
                       organism = synthetic construct
                       note = Synthetic Construct
SEQUENCE: 173
ETQECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TS                     102

SEQ ID NO: 174         moltype = AA  length = 101
FEATURE                Location/Qualifiers
source                 1..101
                       mol_type = protein
                       organism = synthetic construct
                       note = Synthetic Construct
SEQUENCE: 174
TRECIYYNAN WELERTNQSG LERCEGEQDK RLHCYASWRN SSGTIELVKK GCWLDDFNCY  60
DRQECVATKD SPEVYFCCCE GNMCNEKFSY FPEMEVTQPT S                      101

SEQ ID NO: 175         moltype = AA  length = 101
FEATURE                Location/Qualifiers
source                 1..101
                       mol_type = protein
                       organism = synthetic construct
                       note = Synthetic Construct
SEQUENCE: 175
TRECIYYNAN WELERTNQSG LERCEGEQDK RLHCYASWRN SSGTIELVKK GCWLDDFNCY  60
DRQECVATKE NPQVYFCCCE GNMCNEKFSY FPEMEVTQPT S                      101

SEQ ID NO: 176         moltype = AA  length = 100
FEATURE                Location/Qualifiers
source                 1..100
                       mol_type = protein
                       organism = synthetic construct
                       note = Synthetic Construct
```

```
SEQUENCE: 176
RECIYYNANW ELERTNQSGL ERCEGEQDKR RHCFATWKNI SGSIEIVKQG CWLDDFNCYD  60
RTDCVEKKDS PQVYFCCCEG NMCNEKFSYF PEMEVTQPTS                        100

SEQ ID NO: 177         moltype = AA  length = 100
FEATURE                Location/Qualifiers
source                 1..100
                       mol_type = protein
                       organism = synthetic construct
                       note = Synthetic Construct
SEQUENCE: 177
RECIYYNANW ELERTNQSGL ERCEGEQDKR LHCYASWRNS SGTIEIVKQG CWLDDETCYD  60
RTDCVEKKDS PQVYFCCCEG NMCNEKFSYF PEMEVTQPTS                        100

SEQ ID NO: 178         moltype = AA  length = 101
FEATURE                Location/Qualifiers
source                 1..101
                       mol_type = protein
                       organism = synthetic construct
                       note = Synthetic Construct
SEQUENCE: 178
TRECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT S                      101

SEQ ID NO: 179         moltype = AA  length = 101
FEATURE                Location/Qualifiers
source                 1..101
                       mol_type = protein
                       organism = synthetic construct
                       note = Synthetic Construct
SEQUENCE: 179
TQECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT S                      101

SEQ ID NO: 180         moltype = AA  length = 100
FEATURE                Location/Qualifiers
source                 1..100
                       mol_type = protein
                       organism = synthetic construct
                       note = Synthetic Construct
SEQUENCE: 180
RECIYYNANW ELERTNQSGL ERCEGEQDKR LHCYASWRNS SGTIELVKKG CWLDDFNCYD  60
RQECVATKDS PEVYFCCCEG NMCNEKFSYF PEMEVTQPTS                        100

SEQ ID NO: 181         moltype = AA  length = 100
FEATURE                Location/Qualifiers
source                 1..100
                       mol_type = protein
                       organism = synthetic construct
                       note = Synthetic Construct
SEQUENCE: 181
RECIYYNANW ELERTNQSGL ERCEGEQDKR LHCYASWRNS SGTIELVKKG CWLDDFNCYD  60
RQECVATKEN PQVYFCCCEG NMCNEKFSYF PEMEVTQPTS                        100

SEQ ID NO: 182         moltype = AA  length = 100
FEATURE                Location/Qualifiers
source                 1..100
                       mol_type = protein
                       organism = synthetic construct
                       note = Synthetic Construct
SEQUENCE: 182
RECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS                        100

SEQ ID NO: 183         moltype = AA  length = 100
FEATURE                Location/Qualifiers
source                 1..100
                       mol_type = protein
                       organism = synthetic construct
                       note = Synthetic Construct
SEQUENCE: 183
QECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS                        100

SEQ ID NO: 184         moltype = AA  length = 337
FEATURE                Location/Qualifiers
source                 1..337
                       mol_type = protein
                       organism = synthetic construct
```

```
                         note = Synthetic Construct
SEQUENCE: 184
ILGRAETREC IYYNANWELE RTNQSGLERC EGEQDKRLHC YASWRNSSGT IEIVKQGCWL  60
DDINCYDRTD CVATEENPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                            337

SEQ ID NO: 185           moltype = AA  length = 336
FEATURE                  Location/Qualifiers
source                   1..336
                         mol_type = protein
                         organism = synthetic construct
                         note = Synthetic Construct
SEQUENCE: 185
RGEAETRECI YYNANWELER TNQSGLERCE GEQDKRLHCY ASWRNSSGTI EIVKQGCWLD  60
DINCYDRTDC VEKKDSPEVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                             336

SEQ ID NO: 186           moltype = AA  length = 336
FEATURE                  Location/Qualifiers
source                   1..336
                         mol_type = protein
                         organism = synthetic construct
                         note = Synthetic Construct
SEQUENCE: 186
RGEAETRECI YYNANWELER TNQSGLERCE GEQDKRLHCY ASWRNSSGTI EIVKQGCWLD  60
DINCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                             336

SEQ ID NO: 187           moltype = AA  length = 336
FEATURE                  Location/Qualifiers
source                   1..336
                         mol_type = protein
                         organism = synthetic construct
                         note = Synthetic Construct
SEQUENCE: 187
RGEAETRECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                             336

SEQ ID NO: 188           moltype = AA  length = 336
FEATURE                  Location/Qualifiers
source                   1..336
                         mol_type = protein
                         organism = synthetic construct
                         note = Synthetic Construct
SEQUENCE: 188
LGRAETRECI YYNANWELER TNQSGLERCE GEQDKRLHCY ASWRNSSGTI EIVKQGCWLD  60
DINCYDRTDC VATEENPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                             336

SEQ ID NO: 189           moltype = AA  length = 335
FEATURE                  Location/Qualifiers
source                   1..335
                         mol_type = protein
                         organism = synthetic construct
                         note = Synthetic Construct
SEQUENCE: 189
GEAETRECIY YNANWELERT NQSGLERCEG EQDKRLHCYA SWRNSSGTIE IVKQGCWLDD  60
INCYDRTDCV EKKDSPEVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                              335
```

```
SEQ ID NO: 190         moltype = AA  length = 335
FEATURE                Location/Qualifiers
source                 1..335
                       mol_type = protein
                       organism = synthetic construct
                       note = Synthetic Construct
SEQUENCE: 190
GEAETRECIY YNANWELERT NQSGLERCEG EQDKRLHCYA SWRNSSGTIE IVKQGCWLDD  60
INCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                             335

SEQ ID NO: 191         moltype = AA  length = 335
FEATURE                Location/Qualifiers
source                 1..335
                       mol_type = protein
                       organism = synthetic construct
                       note = Synthetic Construct
SEQUENCE: 191
GEAETRECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                             335

SEQ ID NO: 192         moltype = AA  length = 335
FEATURE                Location/Qualifiers
source                 1..335
                       mol_type = protein
                       organism = synthetic construct
                       note = Synthetic Construct
SEQUENCE: 192
GRAETRECIY YNANWELERT NQSGLERCEG EQDKRLHCYA SWRNSSGTIE IVKQGCWLDD  60
INCYDRTDCV ATEENPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                             335

SEQ ID NO: 193         moltype = AA  length = 334
FEATURE                Location/Qualifiers
source                 1..334
                       mol_type = protein
                       organism = synthetic construct
                       note = Synthetic Construct
SEQUENCE: 193
EAETRECIYY NANWELERTN QSGLERCEGE QDKRLHCYAS WRNSSGTIEI VKQGCWLDDI  60
NCYDRTDCVE KKDSPEVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 194         moltype = AA  length = 334
FEATURE                Location/Qualifiers
source                 1..334
                       mol_type = protein
                       organism = synthetic construct
                       note = Synthetic Construct
SEQUENCE: 194
EAETRECIYY NANWELERTN QSGLERCEGE QDKRLHCYAS WRNSSGTIEI VKQGCWLDDI  60
NCYDRTDCVE KKDSPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 195         moltype = AA  length = 334
FEATURE                Location/Qualifiers
source                 1..334
                       mol_type = protein
                       organism = synthetic construct
                       note = Synthetic Construct
SEQUENCE: 195
EAETRECIYY NANWELERTN QSGLERCEGE QDKRLHCYAS WRNSSGTIEI VKQGCWLDDF  60
NCYDRTDCVE KKDSPQVYFC CCEGNMCNEK FSYFPEMEVT QPTSGGGDKT HTCPPCPAPE  120
```

```
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                             334

SEQ ID NO: 196         moltype = AA  length = 334
FEATURE                Location/Qualifiers
source                 1..334
                       mol_type = protein
                       organism = synthetic construct
                       note = Synthetic Construct
SEQUENCE: 196
RAETRECIYY NANWELERTN QSGLERCEGE QDKRLHCYAS WRNSSGTIEI VKQGCWLDDI  60
NCYDRTDCVA TEENPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                             334

SEQ ID NO: 197         moltype = AA  length = 333
FEATURE                Location/Qualifiers
source                 1..333
                       mol_type = protein
                       organism = synthetic construct
                       note = Synthetic Construct
SEQUENCE: 197
AETRECIYYN ANWELERTNQ SGLERCEGEQ DKRLHCYASW RNSSGTIEIV KQGCWLDDIN  60
CYDRTDCVEK KDSPEVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                              333

SEQ ID NO: 198         moltype = AA  length = 333
FEATURE                Location/Qualifiers
source                 1..333
                       mol_type = protein
                       organism = synthetic construct
                       note = Synthetic Construct
SEQUENCE: 198
AETRECIYYN ANWELERTNQ SGLERCEGEQ DKRLHCYASW RNSSGTIEIV KQGCWLDDIN  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                              333

SEQ ID NO: 199         moltype = AA  length = 333
FEATURE                Location/Qualifiers
source                 1..333
                       mol_type = protein
                       organism = synthetic construct
                       note = Synthetic Construct
SEQUENCE: 199
AETRECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                              333

SEQ ID NO: 200         moltype = AA  length = 333
FEATURE                Location/Qualifiers
source                 1..333
                       mol_type = protein
                       organism = synthetic construct
                       note = Synthetic Construct
SEQUENCE: 200
AETRECIYYN ANWELERTNQ SGLERCEGEQ DKRLHCYASW RNSSGTIEIV KQGCWLDDIN  60
CYDRTDCVAT EENPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                              333

SEQ ID NO: 201         moltype = AA  length = 332
FEATURE                Location/Qualifiers
source                 1..332
                       mol_type = protein
```

```
                         organism = synthetic construct
                         note = Synthetic Construct
SEQUENCE: 201
ETRECIYYNA NWELERTNQS GLERCEGEQD KRLHCYASWR NSSGTIEIVK QGCWLDDINC  60
YDRTDCVEKK DSPEVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 202           moltype = AA  length = 332
FEATURE                  Location/Qualifiers
source                   1..332
                         mol_type = protein
                         organism = synthetic construct
                         note = Synthetic Construct
SEQUENCE: 202
ETRECIYYNA NWELERTNQS GLERCEGEQD KRLHCYASWR NSSGTIEIVK QGCWLDDINC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 203           moltype = AA  length = 332
FEATURE                  Location/Qualifiers
source                   1..332
                         mol_type = protein
                         organism = synthetic construct
                         note = Synthetic Construct
SEQUENCE: 203
ETRECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 204           moltype = AA  length = 332
FEATURE                  Location/Qualifiers
source                   1..332
                         mol_type = protein
                         organism = synthetic construct
                         note = Synthetic Construct
SEQUENCE: 204
ETRECIYYNA NWELERTNQS GLERCEGEQD KRLHCYASWR NSSGTIEIVK QGCWLDDINC  60
YDRTDCVATE ENPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 205           moltype = AA  length = 331
FEATURE                  Location/Qualifiers
source                   1..331
                         mol_type = protein
                         organism = synthetic construct
                         note = Synthetic Construct
SEQUENCE: 205
TRECIYYNAN WELERTNQSG LERCEGEQDK RLHCYASWRN SSGTIEIVKQ GCWLDDINCY  60
DRTDCVEKKD SPEVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                 331

SEQ ID NO: 206           moltype = AA  length = 331
FEATURE                  Location/Qualifiers
source                   1..331
                         mol_type = protein
                         organism = synthetic construct
                         note = Synthetic Construct
SEQUENCE: 206
TRECIYYNAN WELERTNQSG LERCEGEQDK RLHCYASWRN SSGTIEIVKQ GCWLDDINCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                 331
```

```
SEQ ID NO: 207          moltype = AA  length = 331
FEATURE                 Location/Qualifiers
source                  1..331
                        mol_type = protein
                        organism = synthetic construct
                        note = Synthetic Construct
SEQUENCE: 207
TRECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                 331

SEQ ID NO: 208          moltype = AA  length = 331
FEATURE                 Location/Qualifiers
source                  1..331
                        mol_type = protein
                        organism = synthetic construct
                        note = Synthetic Construct
SEQUENCE: 208
TRECIYYNAN WELERTNQSG LERCEGEQDK RLHCYASWRN SSGTIEIVKQ GCWLDDINCY  60
DRTDCVATEE NPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                 331

SEQ ID NO: 209          moltype = AA  length = 330
FEATURE                 Location/Qualifiers
source                  1..330
                        mol_type = protein
                        organism = synthetic construct
                        note = Synthetic Construct
SEQUENCE: 209
RECIYYNANW ELERTNQSGL ERCEGEQDKR LHCYASWRNS SGTIEIVKQG CWLDDINCYD  60
RTDCVEKKDS PEVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 210          moltype = AA  length = 330
FEATURE                 Location/Qualifiers
source                  1..330
                        mol_type = protein
                        organism = synthetic construct
                        note = Synthetic Construct
SEQUENCE: 210
RECIYYNANW ELERTNQSGL ERCEGEQDKR LHCYASWRNS SGTIEIVKQG CWLDDINCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 211          moltype = AA  length = 330
FEATURE                 Location/Qualifiers
source                  1..330
                        mol_type = protein
                        organism = synthetic construct
                        note = Synthetic Construct
SEQUENCE: 211
RECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 212          moltype = AA  length = 330
FEATURE                 Location/Qualifiers
source                  1..330
                        mol_type = protein
                        organism = synthetic construct
                        note = Synthetic Construct
SEQUENCE: 212
RECIYYNANW ELERTNQSGL ERCEGEQDKR LHCYASWRNS SGTIEIVKQG CWLDDINCYD  60
```

```
RTDCVATEEN PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 213          moltype = AA  length = 337
FEATURE                 Location/Qualifiers
source                  1..337
                        mol_type = protein
                        organism = synthetic construct
                        note = Synthetic Construct
SEQUENCE: 213
GRGEAETREC IYYNANWELE RTNQSGLERC EGEQDKRRHC FATWKNISGS IEIVKQGCWL  60
DDFNCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 214          moltype = AA  length = 337
FEATURE                 Location/Qualifiers
source                  1..337
                        mol_type = protein
                        organism = synthetic construct
                        note = Synthetic Construct
SEQUENCE: 214
GRGEAETREC IYYNANWELE RTNQSGLERC EGEQDKRLHC YASWRNSSGT IEIVKQGCWL  60
DDETCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 215          moltype = AA  length = 339
FEATURE                 Location/Qualifiers
source                  1..339
                        mol_type = protein
                        organism = synthetic construct
                        note = Synthetic Construct
SEQUENCE: 215
GAILGRAETR ECIYYNANWE LERTNQSGLE RCEGEQDKRL HCYASWRNSS GTIEIVKQGC  60
WLDDFNCYDR TDCVEKKDSP QVYFCCCEGN MCNEKFSYFP EMEVTQPTSG GGDKTHTCPP  120
CPAPELLGGP SVFLFPPKPK DTLMISRTPE VTCVVVDVSH EDPEVKFNWY VDGVEVHNAK  180
TKPREEQYNS TYRVVSVLTV LHQDWLNGKE YKCKVSNKAL PAPIEKTISK AKGQPREPQV  240
YTLPPSRDEL TKNQVSLTCL VKGFYPSDIA VEWESNGQPE NNYKTTPPVL DSDGSFFLYS  300
KLTVDKSRWQ QGNVFSCSVM HEALHNHYTQ KSLSLSPGK                        339

SEQ ID NO: 216          moltype = AA  length = 339
FEATURE                 Location/Qualifiers
source                  1..339
                        mol_type = protein
                        organism = synthetic construct
                        note = Synthetic Construct
SEQUENCE: 216
GAILGRSETQ ECIYYNANWE LERTNQSGLE RCEGEQDKRL HCYASWRNSS GTIEIVKQGC  60
WLDDFNCYDR TDCVEKKDSP QVYFCCCEGN MCNEKFSYFP EMEVTQPTSG GGDKTHTCPP  120
CPAPELLGGP SVFLFPPKPK DTLMISRTPE VTCVVVDVSH EDPEVKFNWY VDGVEVHNAK  180
TKPREEQYNS TYRVVSVLTV LHQDWLNGKE YKCKVSNKAL PAPIEKTISK AKGQPREPQV  240
YTLPPSRDEL TKNQVSLTCL VKGFYPSDIA VEWESNGQPE NNYKTTPPVL DSDGSFFLYS  300
KLTVDKSRWQ QGNVFSCSVM HEALHNHYTQ KSLSLSPGK                        339

SEQ ID NO: 217          moltype = AA  length = 337
FEATURE                 Location/Qualifiers
source                  1..337
                        mol_type = protein
                        organism = synthetic construct
                        note = Synthetic Construct
SEQUENCE: 217
GRGEAETREC IYYNANWELE RTNQSGLERC EGEQDKRLHC YASWRNSSGT IELVKKGCWL  60
DDFNCYDRQE CVATKDSPEV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 218          moltype = AA  length = 337
FEATURE                 Location/Qualifiers
source                  1..337
```

```
                        mol_type = protein
                        organism = synthetic construct
                        note = Synthetic Construct
SEQUENCE: 218
GRGEAETREC IYYNANWELE RTNQSGLERC EGEQDKRLHC YASWRNSSGT IELVKKGCWL  60
DDFNCYDRQE CVATKENPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 219          moltype = AA  length = 336
FEATURE                 Location/Qualifiers
source                  1..336
                        mol_type = protein
                        organism = synthetic construct
                        note = Synthetic Construct
SEQUENCE: 219
RGEAETRECI YYNANWELER TNQSGLERCE GEQDKRRHCF ATWKNISGSI EIVKQGCWLD  60
DFNCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                           336

SEQ ID NO: 220          moltype = AA  length = 336
FEATURE                 Location/Qualifiers
source                  1..336
                        mol_type = protein
                        organism = synthetic construct
                        note = Synthetic Construct
SEQUENCE: 220
RGEAETRECI YYNANWELER TNQSGLERCE GEQDKRLHCY ASWRNSSGTI EIVKQGCWLD  60
DETCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                           336

SEQ ID NO: 221          moltype = AA  length = 337
FEATURE                 Location/Qualifiers
source                  1..337
                        mol_type = protein
                        organism = synthetic construct
                        note = Synthetic Construct
SEQUENCE: 221
ILGRAETREC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 222          moltype = AA  length = 337
FEATURE                 Location/Qualifiers
source                  1..337
                        mol_type = protein
                        organism = synthetic construct
                        note = Synthetic Construct
SEQUENCE: 222
ILGRSETQEC IYYNANWELE RTNQSGLERC EGEQDKRLHC YASWRNSSGT IEIVKQGCWL  60
DDFNCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                          337

SEQ ID NO: 223          moltype = AA  length = 336
FEATURE                 Location/Qualifiers
source                  1..336
                        mol_type = protein
                        organism = synthetic construct
                        note = Synthetic Construct
SEQUENCE: 223
RGEAETRECI YYNANWELER TNQSGLERCE GEQDKRLHCY ASWRNSSGTI ELVKKGCWLD  60
DFNCYDRQEC VATKDSPEVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
```

```
VDKSRWQQGN VFSCSVMHEA LHNHYTQKSL SLSPGK                        336

SEQ ID NO: 224          moltype = AA  length = 336
FEATURE                 Location/Qualifiers
source                  1..336
                        mol_type = protein
                        organism = synthetic construct
                        note = Synthetic Construct
SEQUENCE: 224
RGEAETRECI YYNANWELER TNQSGLERCE GEQDKRLHCY ASWRNSSGTI ELVKKGCWLD  60
DFNCYDRQEC VATKENPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                        336

SEQ ID NO: 225          moltype = AA  length = 335
FEATURE                 Location/Qualifiers
source                  1..335
                        mol_type = protein
                        organism = synthetic construct
                        note = Synthetic Construct
SEQUENCE: 225
GEAETRECIY YNANWELERT NQSGLERCEG EQDKRRHCFA TWKNISGSIE IVKQGCWLDD  60
FNCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                         335

SEQ ID NO: 226          moltype = AA  length = 335
FEATURE                 Location/Qualifiers
source                  1..335
                        mol_type = protein
                        organism = synthetic construct
                        note = Synthetic Construct
SEQUENCE: 226
GEAETRECIY YNANWELERT NQSGLERCEG EQDKRLHCYA SWRNSSGTIE IVKQGCWLDD  60
ETCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                         335

SEQ ID NO: 227          moltype = AA  length = 336
FEATURE                 Location/Qualifiers
source                  1..336
                        mol_type = protein
                        organism = synthetic construct
                        note = Synthetic Construct
SEQUENCE: 227
LGRAETRECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                        336

SEQ ID NO: 228          moltype = AA  length = 336
FEATURE                 Location/Qualifiers
source                  1..336
                        mol_type = protein
                        organism = synthetic construct
                        note = Synthetic Construct
SEQUENCE: 228
LGRSETQECI YYNANWELER TNQSGLERCE GEQDKRLHCY ASWRNSSGTI EIVKQGCWLD  60
DFNCYDRTDC VEKKDSPQVY FCCCEGNMCN EKFSYFPEME VTQPTSGGGD KTHTCPPCPA  120
PELLGGPSVF LFPPKPKDTL MISRTPEVTC VVVDVSHEDP EVKFNWYVDG VEVHNAKTKP  180
REEQYNSTYR VVSVLTVLHQ DWLNGKEYKC KVSNKALPAP IEKTISKAKG QPREPQVYTL  240
PPSRDELTKN QVSLTCLVKG FYPSDIAVEW ESNGQPENNY KTTPPVLDSD GSFFLYSKLT  300
VDKSRWQQGN VFSCSVMHEA LHNHYTQKSL SLSPGK                        336

SEQ ID NO: 229          moltype = AA  length = 335
FEATURE                 Location/Qualifiers
source                  1..335
                        mol_type = protein
                        organism = synthetic construct
                        note = Synthetic Construct
SEQUENCE: 229
```

```
GEAETRECIY YNANWELERT NQSGLERCEG EQDKRLHCYA SWRNSSGTIE LVKKGCWLDD  60
FNCYDRQECV ATKDSPEVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                            335

SEQ ID NO: 230         moltype = AA  length = 335
FEATURE                Location/Qualifiers
source                 1..335
                       mol_type = protein
                       organism = synthetic construct
                       note = Synthetic Construct
SEQUENCE: 230
GEAETRECIY YNANWELERT NQSGLERCEG EQDKRLHCYA SWRNSSGTIE LVKKGCWLDD  60
FNCYDRQECV ATKENPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                            335

SEQ ID NO: 231         moltype = AA  length = 334
FEATURE                Location/Qualifiers
source                 1..334
                       mol_type = protein
                       organism = synthetic construct
                       note = Synthetic Construct
SEQUENCE: 231
EAETRECIYY NANWELERTN QSGLERCEGE QDKRRHCFAT WKNISGSIEI VKQGCWLDDF  60
NCYDRTDCVE KKDSPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                             334

SEQ ID NO: 232         moltype = AA  length = 334
FEATURE                Location/Qualifiers
source                 1..334
                       mol_type = protein
                       organism = synthetic construct
                       note = Synthetic Construct
SEQUENCE: 232
EAETRECIYY NANWELERTN QSGLERCEGE QDKRLHCYAS WRNSSGTIEI VKQGCWLDDE  60
TCYDRTDCVE KKDSPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                             334

SEQ ID NO: 233         moltype = AA  length = 335
FEATURE                Location/Qualifiers
source                 1..335
                       mol_type = protein
                       organism = synthetic construct
                       note = Synthetic Construct
SEQUENCE: 233
GRAETRECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                            335

SEQ ID NO: 234         moltype = AA  length = 335
FEATURE                Location/Qualifiers
source                 1..335
                       mol_type = protein
                       organism = synthetic construct
                       note = Synthetic Construct
SEQUENCE: 234
GRSETQECIY YNANWELERT NQSGLERCEG EQDKRLHCYA SWRNSSGTIE IVKQGCWLDD  60
FNCYDRTDCV EKKDSPQVYF CCCEGNMCNE KFSYFPEMEV TQPTSGGGDK THTCPPCPAP  120
ELLGGPSVFL FPPKPKDTLM ISRTPEVTCV VVDVSHEDPE VKFNWYVDGV EVHNAKTKPR  180
EEQYNSTYRV VSVLTVLHQD WLNGKEYKCK VSNKALPAPI EKTISKAKGQ PREPQVYTLP  240
PSRDELTKNQ VSLTCLVKGF YPSDIAVEWE SNGQPENNYK TTPPVLDSDG SFFLYSKLTV  300
DKSRWQQGNV FSCSVMHEAL HNHYTQKSLS LSPGK                            335

SEQ ID NO: 235         moltype = AA  length = 334
FEATURE                Location/Qualifiers
```

```
source                 1..334
                       mol_type = protein
                       organism = synthetic construct
                       note = Synthetic Construct
SEQUENCE: 235
EAETRECIYY NANWELERTN QSGLERCEGE QDKRLHCYAS WRNSSGTIEL VKKGCWLDDF  60
NCYDRQECVA TKDSPEVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 236         moltype = AA  length = 334
FEATURE                Location/Qualifiers
source                 1..334
                       mol_type = protein
                       organism = synthetic construct
                       note = Synthetic Construct
SEQUENCE: 236
EAETRECIYY NANWELERTN QSGLERCEGE QDKRLHCYAS WRNSSGTIEL VKKGCWLDDF  60
NCYDRQECVA TKENPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 237         moltype = AA  length = 333
FEATURE                Location/Qualifiers
source                 1..333
                       mol_type = protein
                       organism = synthetic construct
                       note = Synthetic Construct
SEQUENCE: 237
AETRECIYYN ANWELERTNQ SGLERCEGEQ DKRRHCFATW KNISGSIEIV KQGCWLDDFN  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                               333

SEQ ID NO: 238         moltype = AA  length = 333
FEATURE                Location/Qualifiers
source                 1..333
                       mol_type = protein
                       organism = synthetic construct
                       note = Synthetic Construct
SEQUENCE: 238
AETRECIYYN ANWELERTNQ SGLERCEGEQ DKRLHCYASW RNSSGTIEIV KQGCWLDDET  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                               333

SEQ ID NO: 239         moltype = AA  length = 334
FEATURE                Location/Qualifiers
source                 1..334
                       mol_type = protein
                       organism = synthetic construct
                       note = Synthetic Construct
SEQUENCE: 239
RAETRECIYY NANWELERTN QSGLERCEGE QDKRLHCYAS WRNSSGTIEI VKQGCWLDDF  60
NCYDRTDCVE KKDSPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 240         moltype = AA  length = 334
FEATURE                Location/Qualifiers
source                 1..334
                       mol_type = protein
                       organism = synthetic construct
                       note = Synthetic Construct
SEQUENCE: 240
RSETQECIYY NANWELERTN QSGLERCEGE QDKRLHCYAS WRNSSGTIEI VKQGCWLDDF  60
NCYDRTDCVE KKDSPQVYFC CCEGNMCNEK FSYFPEMEVT QPTSGGGDKT HTCPPCPAPE  120
LLGGPSVFLF PPKPKDTLMI SRTPEVTCVV VDVSHEDPEV KFNWYVDGVE VHNAKTKPRE  180
EQYNSTYRVV SVLTVLHQDW LNGKEYKCKV SNKALPAPIE KTISKAKGQP REPQVYTLPP  240
```

```
SRDELTKNQV SLTCLVKGFY PSDIAVEWES NGQPENNYKT TPPVLDSDGS FFLYSKLTVD  300
KSRWQQGNVF SCSVMHEALH NHYTQKSLSL SPGK                              334

SEQ ID NO: 241          moltype = AA  length = 333
FEATURE                 Location/Qualifiers
source                  1..333
                        mol_type = protein
                        organism = synthetic construct
                        note = Synthetic Construct
SEQUENCE: 241
AETRECIYYN ANWELERTNQ SGLERCEGEQ DKRLHCYASW RNSSGTIELV KKGCWLDDFN  60
CYDRQECVAT KDSPEVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                               333

SEQ ID NO: 242          moltype = AA  length = 333
FEATURE                 Location/Qualifiers
source                  1..333
                        mol_type = protein
                        organism = synthetic construct
                        note = Synthetic Construct
SEQUENCE: 242
AETRECIYYN ANWELERTNQ SGLERCEGEQ DKRLHCYASW RNSSGTIELV KKGCWLDDFN  60
CYDRQECVAT KENPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                               333

SEQ ID NO: 243          moltype = AA  length = 332
FEATURE                 Location/Qualifiers
source                  1..332
                        mol_type = protein
                        organism = synthetic construct
                        note = Synthetic Construct
SEQUENCE: 243
ETRECIYYNA NWELERTNQS GLERCEGEQD KRRHCFATWK NISGSIEIVK QGCWLDDFNC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 244          moltype = AA  length = 332
FEATURE                 Location/Qualifiers
source                  1..332
                        mol_type = protein
                        organism = synthetic construct
                        note = Synthetic Construct
SEQUENCE: 244
ETRECIYYNA NWELERTNQS GLERCEGEQD KRLHCYASWR NSSGTIEIVK QGCWLDDETC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                                332

SEQ ID NO: 245          moltype = AA  length = 333
FEATURE                 Location/Qualifiers
source                  1..333
                        mol_type = protein
                        organism = synthetic construct
                        note = Synthetic Construct
SEQUENCE: 245
AETRECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                               333

SEQ ID NO: 246          moltype = AA  length = 333
FEATURE                 Location/Qualifiers
source                  1..333
                        mol_type = protein
                        organism = synthetic construct
                        note = Synthetic Construct
```

```
SEQUENCE: 246
SETQECIYYN ANWELERTNQ SGLERCEGEQ DKRLHCYASW RNSSGTIEIV KQGCWLDDFN  60
CYDRTDCVEK KDSPQVYFCC CEGNMCNEKF SYFPEMEVTQ PTSGGGDKTH TCPPCPAPEL  120
LGGPSVFLFP PKPKDTLMIS RTPEVTCVVV DVSHEDPEVK FNWYVDGVEV HNAKTKPREE  180
QYNSTYRVVS VLTVLHQDWL NGKEYKCKVS NKALPAPIEK TISKAKGQPR EPQVYTLPPS  240
RDELTKNQVS LTCLVKGFYP SDIAVEWESN GQPENNYKTT PPVLDSDGSF FLYSKLTVDK  300
SRWQQGNVFS CSVMHEALHN HYTQKSLSLS PGK                              333

SEQ ID NO: 247         moltype = AA  length = 332
FEATURE                Location/Qualifiers
source                 1..332
                       mol_type = protein
                       organism = synthetic construct
                       note = Synthetic Construct
SEQUENCE: 247
ETRECIYYNA NWELERTNQS GLERCEGEQD KRLHCYASWR NSSGTIELVK KGCWLDDFNC  60
YDRQECVATK DSPEVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                               332

SEQ ID NO: 248         moltype = AA  length = 332
FEATURE                Location/Qualifiers
source                 1..332
                       mol_type = protein
                       organism = synthetic construct
                       note = Synthetic Construct
SEQUENCE: 248
ETRECIYYNA NWELERTNQS GLERCEGEQD KRLHCYASWR NSSGTIELVK KGCWLDDFNC  60
YDRQECVATK ENPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                               332

SEQ ID NO: 249         moltype = AA  length = 331
FEATURE                Location/Qualifiers
source                 1..331
                       mol_type = protein
                       organism = synthetic construct
                       note = Synthetic Construct
SEQUENCE: 249
TRECIYYNAN WELERTNQSG LERCEGEQDK RRHCFATWKN ISGSIEIVKQ GCWLDDFNCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 250         moltype = AA  length = 331
FEATURE                Location/Qualifiers
source                 1..331
                       mol_type = protein
                       organism = synthetic construct
                       note = Synthetic Construct
SEQUENCE: 250
TRECIYYNAN WELERTNQSG LERCEGEQDK RLHCYASWRN SSGTIEIVKQ GCWLDDETCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 251         moltype = AA  length = 330
FEATURE                Location/Qualifiers
source                 1..330
                       mol_type = protein
                       organism = synthetic construct
                       note = Synthetic Construct
SEQUENCE: 251
QECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 252         moltype = AA  length = 332
```

```
FEATURE                Location/Qualifiers
source                 1..332
                       mol_type = protein
                       organism = synthetic construct
                       note = Synthetic Construct
SEQUENCE: 252
ETRECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                               332

SEQ ID NO: 253         moltype = AA  length = 332
FEATURE                Location/Qualifiers
source                 1..332
                       mol_type = protein
                       organism = synthetic construct
                       note = Synthetic Construct
SEQUENCE: 253
ETQECIYYNA NWELERTNQS GLERCEGEQD KRLHCYASWR NSSGTIEIVK QGCWLDDFNC  60
YDRTDCVEKK DSPQVYFCCC EGNMCNEKFS YFPEMEVTQP TSGGGDKTHT CPPCPAPELL  120
GGPSVFLFPP KPKDTLMISR TPEVTCVVVD VSHEDPEVKF NWYVDGVEVH NAKTKPREEQ  180
YNSTYRVVSV LTVLHQDWLN GKEYKCKVSN KALPAPIEKT ISKAKGQPRE PQVYTLPPSR  240
DELTKNQVSL TCLVKGFYPS DIAVEWESNG QPENNYKTTP PVLDSDGSFF LYSKLTVDKS  300
RWQQGNVFSC SVMHEALHNH YTQKSLSLSP GK                               332

SEQ ID NO: 254         moltype = AA  length = 331
FEATURE                Location/Qualifiers
source                 1..331
                       mol_type = protein
                       organism = synthetic construct
                       note = Synthetic Construct
SEQUENCE: 254
TRECIYYNAN WELERTNQSG LERCEGEQDK RLHCYASWRN SSGTIELVKK GCWLDDFNCY  60
DRQECVATKD SPEVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 255         moltype = AA  length = 331
FEATURE                Location/Qualifiers
source                 1..331
                       mol_type = protein
                       organism = synthetic construct
                       note = Synthetic Construct
SEQUENCE: 255
TRECIYYNAN WELERTNQSG LERCEGEQDK RLHCYASWRN SSGTIELVKK GCWLDDFNCY  60
DRQECVATKE NPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 256         moltype = AA  length = 330
FEATURE                Location/Qualifiers
source                 1..330
                       mol_type = protein
                       organism = synthetic construct
                       note = Synthetic Construct
SEQUENCE: 256
RECIYYNANW ELERTNQSGL ERCEGEQDKR RHCFATWKNI SGSIEIVKQG CWLDDFNCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 257         moltype = AA  length = 330
FEATURE                Location/Qualifiers
source                 1..330
                       mol_type = protein
                       organism = synthetic construct
                       note = Synthetic Construct
SEQUENCE: 257
RECIYYNANW ELERTNQSGL ERCEGEQDKR LHCYASWRNS SGTIEIVKQG CWLDDETCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
```

```
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 258         moltype = AA  length = 331
FEATURE                Location/Qualifiers
source                 1..331
                       mol_type = protein
                       organism = synthetic construct
                       note = Synthetic Construct
SEQUENCE: 258
TRECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 259         moltype = AA  length = 331
FEATURE                Location/Qualifiers
source                 1..331
                       mol_type = protein
                       organism = synthetic construct
                       note = Synthetic Construct
SEQUENCE: 259
TQECIYYNAN WELERTNQSG LERCEGEQDK RLHCYASWRN SSGTIEIVKQ GCWLDDFNCY  60
DRTDCVEKKD SPQVYFCCCE GNMCNEKFSY FPEMEVTQPT SGGGDKTHTC PPCPAPELLG  120
GPSVFLFPPK PKDTLMISRT PEVTCVVVDV SHEDPEVKFN WYVDGVEVHN AKTKPREEQY  180
NSTYRVVSVL TVLHQDWLNG KEYKCKVSNK ALPAPIEKTI SKAKGQPREP QVYTLPPSRD  240
ELTKNQVSLT CLVKGFYPSD IAVEWESNGQ PENNYKTTPP VLDSDGSFFL YSKLTVDKSR  300
WQQGNVFSCS VMHEALHNHY TQKSLSLSPG K                                331

SEQ ID NO: 260         moltype = AA  length = 330
FEATURE                Location/Qualifiers
source                 1..330
                       mol_type = protein
                       organism = synthetic construct
                       note = Synthetic Construct
SEQUENCE: 260
RECIYYNANW ELERTNQSGL ERCEGEQDKR LHCYASWRNS SGTIELVKKG CWLDDFNCYD  60
RQECVATKDS PEVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 261         moltype = AA  length = 330
FEATURE                Location/Qualifiers
source                 1..330
                       mol_type = protein
                       organism = synthetic construct
                       note = Synthetic Construct
SEQUENCE: 261
RECIYYNANW ELERTNQSGL ERCEGEQDKR LHCYASWRNS SGTIELVKKG CWLDDFNCYD  60
RQECVATKEN PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 262         moltype = AA  length = 330
FEATURE                Location/Qualifiers
source                 1..330
                       mol_type = protein
                       organism = synthetic construct
                       note = Synthetic Construct
SEQUENCE: 262
RECIYYNANW ELERTNQSGL ERCEGEQDKR LHCYASWRNS SGTIEIVKQG CWLDDFNCYD  60
RTDCVEKKDS PQVYFCCCEG NMCNEKFSYF PEMEVTQPTS GGGDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330

SEQ ID NO: 263         moltype = AA  length = 337
FEATURE                Location/Qualifiers
source                 1..337
                       mol_type = protein
                       organism = synthetic construct
```

```
                         note = Synthetic Construct
SEQUENCE: 263
GRGEAETREC IYYNANWELE RTNQSGLERC EGEQRKRLHC YASWRNSSGT IEIVKQGCWL  60
DDFNCYDRTD CVEKKDSPQV YFCCCEGNMC NEKFSYFPEM EVTQPTSGGG DKTHTCPPCP  120
APELLGGPSV FLFPPKPKDT LMISRTPEVT CVVVDVSHED PEVKFNWYVD GVEVHNAKTK  180
PREEQYNSTY RVVSVLTVLH QDWLNGKEYK CKVSNKALPA PIEKTISKAK GQPREPQVYT  240
LPPSRDELTK NQVSLTCLVK GFYPSDIAVE WESNGQPENN YKTTPPVLDS DGSFFLYSKL  300
TVDKSRWQQG NVFSCSVMHE ALHNHYTQKS LSLSPGK                           337

SEQ ID NO: 264           moltype = AA  length = 226
FEATURE                  Location/Qualifiers
source                   1..226
                         mol_type = protein
                         organism = Homo sapiens
SEQUENCE: 264
DKTHTCPPCP APELLGGPSV FLFPPKPKDT LMISRTPEVT CVVVDVSHED PEVKFNWYVD  60
GVEVHNAKTK PREEQYNSTY RVVSVLTVLH QDWLNGKEYK CKVSNKALPA PIEKTISKAK  120
GQPREPQVYT LPPSRDELTK NQVSLTCLVK GFYPSDIAVE WESNGQPENN YKTTPPVLDS  180
DGSFFLYSKL TVDKSRWQQG NVFSCSVMHE ALHNHYTQKS LSLSPG                 226

SEQ ID NO: 265           moltype = AA  length = 4
FEATURE                  Location/Qualifiers
source                   1..4
                         mol_type = protein
                         organism = synthetic construct
SEQUENCE: 265
TEEN                                                               4

SEQ ID NO: 266           moltype = AA  length = 4
FEATURE                  Location/Qualifiers
source                   1..4
                         mol_type = protein
                         organism = synthetic construct
SEQUENCE: 266
TKEN                                                               4

SEQ ID NO: 267           moltype = AA  length = 4
FEATURE                  Location/Qualifiers
source                   1..4
                         mol_type = protein
                         organism = synthetic construct
SEQUENCE: 267
KKDS                                                               4

SEQ ID NO: 268           moltype = AA  length = 4
FEATURE                  Location/Qualifiers
source                   1..4
                         mol_type = protein
                         organism = synthetic construct
SEQUENCE: 268
TKDS                                                               4

SEQ ID NO: 269           moltype = AA  length = 10
FEATURE                  Location/Qualifiers
source                   1..10
                         mol_type = protein
                         organism = synthetic construct
VARIANT                  1
                         note = Any amino acid
VARIANT                  3
                         note = Any amino acid
VARIANT                  5
                         note = Any amino acid
VARIANT                  7
                         note = Any amino acid
VARIANT                  9
                         note = Any amino acid
VARIANT                  1..10
                         note = This sequence may encompass 1-5 XP repeating units
SEQUENCE: 269
XPXPXPXPXP                                                         10

SEQ ID NO: 270           moltype = AA  length = 6
FEATURE                  Location/Qualifiers
source                   1..6
```

-continued

```
                        mol_type = protein
                        organism = synthetic construct
SEQUENCE: 270
HHHHHH                                                      6
```

The invention claimed is:

1. A polypeptide comprising an extracellular activin receptor type II (ActRII) chimera, the chimera having a sequence of any one of (SEQ ID NO: 1)
GAILGRAETRECIYYNANWELERTNQSGLERCEGEQX$_1$
KRRHCFATWKNISGSIEIVKQGCWLDDX$_2$X$_3$CYDRTDC
VX$_4$X$_5$X$_6$X$_7$X$_8$PXVYFCCCEGNMCNEKFSYFPEMEVTQ
PTS, (SEQ ID NO: 2)
GAILGRAETRECIYYNANWELERTNQSGLERCEGEQX$_1$
KRLHCFATWKNISGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 3)
GAILGRAETRECIYYNANWELERTNQSGLERCEGEQX$_1$
KRLHCYASWKNISGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 4)
GAILGRAETRECIYYNANWELERTNQSGLERCEGEQX$_1$
KRLHCYASWRNSSGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 5)
GAILGRAETRECIYYNANWELERTNQSGLERCEGEQX$_1$
KRLHCYASWRNSSGTIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 6)
GAILGRAETRECIYYNANWELERTNQSGLERCEGEQX$_1$
KRLHCYASWRNSSGTIELVKKGCWLDDX$_2$X$_3$CYDRTDC
VX$_4$X$_5$X$_6$X$_7$X$_8$PX$_9$VYFCCCEGNMCNEKFSYFPEMEVT
QPTS, (SEQ ID NO: 7)
GAILGRAETRECIYYNANWELERTNQSGLERCEGEQX$_1$
KRLHCYASWRNSSGTIELVKKGCWLDDX$_2$X$_3$CYDRQEC
VX$_4$X$_5$X$_6$X$_7$X$_8$PX$_9$VYFCCCEGNMCNEKFSYFPEMEVT
QPTS, (SEQ ID NO: 8)
GRGEAETRECIYYNANWELERTNQSGLERCEGEQX$_1$KR -continued RHCFATWKNISGSIEIVKQGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 9)
GRGEAETRECIYYNANWELERTNQSGLERCEGEQX$_1$KR
LHCFATWKNISGSIEIVKQGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 10)
GRGEAETRECIYYNANWELERTNQSGLERCEGEQX$_1$KR
LHCYASWKNISGSIEIVKQGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 11)
GRGEAETRECIYYNANWELERTNQSGLERCEGEQX$_1$KR
LHCYASWRNSSGSIEIVKQGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 12)
GRGEAETRECIYYNANWELERTNQSGLERCEGEQX$_1$KR
LHCYASWRNSSGTIEIVKQGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 13)
GRGEAETRECIYYNANWELERTNQSGLERCEGEQX$_1$KR
LHCYASWRNSSGTIELVKKGCWLDDX$_2$X$_3$CYDRTDCVX
4X$_5$X$_6$X$_7$X$_8$PX$_9$VYFCCCEGNMCNEKFSYFPEMEVTQP
TS, (SEQ ID NO: 14)
GRGEAETRECIYYNANWELERTNQSGLERCEGEQX$_1$KR
LHCYASWRNSSGTIELVKKGCWLDDX$_2$X$_3$CYDRQECVX
4X$_5$X$_6$X$_7$X$_8$PX$_9$VYFCCCEGNMCNEKFSYFPEMEVTQP
TS, (SEQ ID NO: 15)
GAILGRSETQECIYYNANWELERTNQSGLERCEGEQX$_1$
KRRHCFATWKNISGSIEIVKQGCWLDDX$_2$X$_3$CYDRTDC
VX$_4$X$_5$X$_6$X$_7$X$_8$PX$_9$VYFCCCEGNMCNEKFSYFPEMEVT
QPTS, -continued (SEQ ID NO: 16)
GAILGRSETQECIYYNANWELERTNQSGLERCEGEQ$X_1$
KRLHCFATWKNISGSIEIVKQGCWLDD$X_2X_3$CYDRTDC
V$X_4X_5X_6X_7X_8$P$X_9$VYFCCCEGNMCNEKFSYFPEMEVT
QPTS, (SEQ ID NO: 17)
GAILGRSETQECIYYNANWELERTNQSGLERCEGEQ$X_1$
KRLHCYASWKNISGSIEIVKQGCWLDD$X_2X_3$CYDRTD
CV$X_4X_5X_6X_7X_8$P$X_9$VYFCCCEGNMCNEKFSYFPEMEV
TQPTS, (SEQ ID NO: 18)
GAILGRSETQECIYYNANWELERTNQSGLERCEGEQ$X_1$
KRLHCYASWRNSSGSIEIVKQGCWLDD$X_2X_3$CYD RTD
CV$X_4X_5X_6X_7X_8$P$X_9$VYFCCCEGNMCNEKFSYFPEMEV
TQPTS, (SEQ ID NO: 19)
GAILGRSETQECIYYNANWELERTNQSGLERCEGEQ$X_1$
KRLHCYASWRNSSGTIEIVKQGCWLDD$X_2X_3$CYD RTD
CV$X_4X_5X_6X_7X_8$P$X_9$VYFCCCEGNMCNEKFSYFPEMEV
TQPTS, (SEQ ID NO: 20)
GAILGRSETQECIYYNANWELERTNQSGLERCEGEQ$X_1$
KRLHCYASWRNSSGTIELVKKGCWLDD$X_2X_3$CYD RTD
CV$X_4X_5X_6X_7X_8$P$X_9$VYFCCCEGNMCNEKFSYFPEMEV
TQPTS, and (SEQ ID NO: 21)
GAILGRSETQECIYYNANWELERTNQSGLERCEGEQ$X_1$
KRLHCYASWRNSSGTIELVKKGCWLDD$X_2X_3$CYD RQE
CV$X_4X_5X_6X_7X_8$P$X_9$VYFCCCEGNMCNEKFSYFPEMEV
TQPTS, wherein $X_1$ is D or R, $X_2$ is I, F, E, D, Y, S, N, Q, or T, $X_3$ is N or T, $X_4$ is A or E, $X_5$ is T or K, $X_6$ is E or K, $X_7$ is E or D, $X_8$ is N or S, and $X_9$ is Q, E, K, R, D, or N, optionally wherein the chimera is truncated from the N-terminus by deletion of 1, 2, 3, 4, 5, 6, 7, 8, or 9 amino acids, wherein the chimera retains the two amino acids before the first cysteine.

2. The polypeptide of claim 1, wherein the chimera has the sequence of any one of SEQ ID NOs: 22-43.

3. The polypeptide of claim 1, wherein the chimera has the sequence of any one of SEQ ID NOs: 111-183.

4. The polypeptide of claim 1, further comprising a C-terminal extension of one or more amino acids.

5. The polypeptide of claim 4, wherein the C-terminal extension is NP or NPVTPK (SEQ ID NO: 104).

6. The polypeptide of claim 1, further comprising an Fc domain monomer, an Fc domain, an albumin-binding peptide, a fibronectin domain, or a human serum albumin fused to the C-terminus of the polypeptide by way of a linker.

7. The polypeptide of claim 6, wherein the polypeptide comprises the sequence of any one of SEQ ID NOs: 107-110 and SEQ ID NOs: 184-263.

* * * * *